US012781970B2

(12) United States Patent
Yang

(10) Patent No.: US 12,781,970 B2
(45) Date of Patent: Nov. 3, 2026

(54) COOKING APPLIANCE

(71) Applicant: LG ELECTRONICS INC., Seoul (KR)

(72) Inventor: Jae Won Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 496 days.

(21) Appl. No.: 18/228,927

(22) Filed: Aug. 1, 2023

(65) Prior Publication Data

US 2024/0044503 A1 Feb. 8, 2024

(30) Foreign Application Priority Data

Aug. 2, 2022 (KR) ........................ 10-2022-0096313

(51) Int. Cl.

*F24C 15/00* (2006.01)
*E05B 47/00* (2006.01)
*E05B 65/00* (2006.01)
*F24C 15/02* (2006.01)

(52) U.S. Cl.

CPC ........ *F24C 15/022* (2013.01); *E05B 47/0012* (2013.01); *E05B 65/00* (2013.01); *E05B 2047/0017* (2013.01); *E05B 2047/002* (2013.01); *E05B 2047/0068* (2013.01)

(58) Field of Classification Search

CPC ............................... F24C 15/02; F24C 15/022
See application file for complete search history.

(56) References Cited

U.S. PATENT DOCUMENTS

| | | | |
|---|---|---|---|
| 5,220,153 A | 6/1993 | Malone et al. | |
| 2010/0206414 A1 | 8/2010 | Adamczak et al. | |
| 2011/0149551 A1 | 6/2011 | Camarillo Fernandez et al. | |
| 2017/0122016 A1 | 5/2017 | Lampitelli | |
| 2017/0328576 A1* | 11/2017 | Dino | F24C 14/02 |

(Continued)

FOREIGN PATENT DOCUMENTS

| | | |
|---|---|---|
| CN | 204909136 | 12/2015 |
| CN | 207575013 | 7/2018 |

(Continued)

OTHER PUBLICATIONS

Australian Examination Report issued in Application No. 2023206223 dated Aug. 5, 2024.

(Continued)

*Primary Examiner* — Ko-Wei Lin
(74) *Attorney, Agent, or Firm* — KED & ASSOCIATES, LLP

(57) ABSTRACT

A cooking appliance may include a casing having a cavity therein, and a door configured to open and close the cavity. A door locking device disposed in the casing may lock the door in a closed state. A locking housing of the door locking device may include a latch and a closing button. The latch may be caught by a fixing hole of the door while being rotated, and the closing button may be pressed by a rear surface of the door. As described above, a device (closing button) that detects closing of the door, and a device (latch) that locks the door into the closed state may be formed in one door locking device. Thus, the closing button and the latch may occupy only a small amount of installation space in the cooking appliance, so that the cooking appliance may be miniaturized.

20 Claims, 58 Drawing Sheets

(56) References Cited

U.S. PATENT DOCUMENTS

| | | | | |
|---|---|---|---|---|
| 2019/0316781 | A1* | 10/2019 | Kim | F24C 15/028 |
| 2021/0348769 | A1* | 11/2021 | Bramhane | F24C 15/023 |

FOREIGN PATENT DOCUMENTS

| | | |
|---|---|---|
| CN | 111493675 | 8/2020 |
| CN | 112704383 | 4/2021 |
| CN | 111248725 | 7/2021 |
| CN | 114652175 | 6/2022 |
| CN | 110693311 | 7/2022 |
| DE | 2310290 | 7/1978 |
| DE | 10-2014-203530 | 8/2015 |
| EP | 1703212 | 9/2006 |
| EP | 2463588 | 6/2012 |
| EP | 3 594 573 | 7/2018 |
| EP | 1860382 | 1/2019 |
| EP | 03080517 | 7/2019 |
| EP | 3 557 135 | 10/2019 |
| EP | 3 599 429 | 1/2020 |
| EP | 3 627 965 | 3/2020 |
| EP | 3555393 | 1/2021 |
| EP | 3551942 | 8/2021 |
| JP | 2000-012209 | 1/2000 |
| JP | 3937591 | 4/2007 |
| KR | 10-2020-0009929 | 1/2020 |
| KR | 10-2064799 | 1/2020 |
| KR | 10-2208563 | 1/2021 |
| KR | 10-2253487 | 5/2021 |
| KR | 10-2280927 | 7/2021 |
| KR | 10-2399409 | 5/2022 |
| WO | WO 2006/072903 | 7/2006 |
| WO | WO 2008/032903 | 3/2008 |
| WO | WO 2009/046811 | 4/2009 |
| WO | WO 2015/086247 | 6/2015 |
| WO | WO 2018/103967 | 6/2018 |
| WO | WO 2018/113038 | 6/2018 |
| WO | WO 2023/281297 | 1/2023 |

OTHER PUBLICATIONS

European Search Report issued in Application No. 23189767.2 dated Oct. 24, 2023.
European Search Report issued in Application No. 23189197.9 dated Oct. 26, 2023.
Extended European Search Report dated Dec. 11, 2023 in Application No. 23189187.0.
U.S. Appl. No. 18/228,760, filed Aug. 1, 2023.
U.S. Appl. No. 18/228,816, filed Aug. 1, 2023.
U.S. Appl. No. 18/228,838, filed Aug. 1, 2023.
U.S. Appl. No. 18/228,860, filed Aug. 1, 2023.
U.S. Appl. No. 18/228,884, filed Aug. 1, 2023.
U.S. Appl. No. 18/228,927, filed Aug. 1, 2023.
U.S. Appl. No. 18/228,957, filed Aug. 1, 2023.
Extended European Search Report dated Jan. 15, 2024 issued in Application No. 23189199.5.
Extended European Search Report dated Jan. 3, 2024 issued in Application No. 23189174.8.
European Search Report issued in Application No. 23819156.5 dated Dec. 7, 2023.
European Search Report issued in Application No. 23189196.1 dated Dec. 7, 2023.
Korean Office Action issued in Application No. 10-2022-0096313 dated Apr. 26, 2026.

* cited by examiner

COOKING APPLIANCE

CROSS-REFERENCE TO RELATED APPLICATION(S)

The present application claims priority to Korean Patent Application No. 10-2022-0096313, filed in Korea on Aug. 2, 2022, the entire contents of which is incorporated herein for all purposes by this reference.

BACKGROUND

1. Field

A cooking appliance is disclosed herein.

2. Background

Various types of cooking appliances are used to heat food or other items (hereinafter, collectively "food") at home or in restaurants. For example, various cooking appliances, such as microwave ovens, induction heating electric ranges, and grill heaters, are used.

When classifying the cooking appliance according to a shape of a cooking chamber in which food is cooked, the cooking appliance may be classified into an open-type cooking appliance and a sealed-type cooking appliance. The sealed-type cooking appliance includes an oven, and a microwave oven, for example, having a door, and the open-type cooking appliance includes a cooktop, and a hob, for example.

Recently, as the sealed-type cooking appliance, a steam oven has been used. The steam oven refers to an oven equipped with a function of injecting high temperature steam into a cooking chamber and controlling a humidity of food using the steam. The steam oven may prevent food from drying out and maintain a taste and aroma of the food. The sealed type cooking appliance may include a cooking appliance in which a locking device is provided to prevent the door from being arbitrarily opened. For example, in case of a cooking appliance providing a self-cleaning function of thermally pyrolyzing food residue by heating the internal space of the cooking chamber to a high temperature, it is necessary to prevent the door from being opened for safety.

Korean Patent Application Publication No. 10-2020-0009929 (related art 1) disclosed a door locking device locking the door as a locker is rotated, and EU Patent No. EP 1 860 382 B1 (related art 2) disclosed a technique in which a rotatable locking pin is provided to lock the door.

When the door is closed, the locking device is operated to turn the door into a locked state. For this function, both of a sensor device for recognizing closing of the door and the locking device locking the door are required. For example, in Korean Patent No. 10-2280927 (related art 3), a lever switch is provided to detect the locked state of the door separately from a detection sensor to detect opening and closing states of the door.

However, in the related art 3, the detection sensor and the lever switch are disposed to be spaced apart from each other at a front portion and a rear portion of a casing, respectively, so that an installation space thereof expands. As described above, in order to recognize closing of the door and to implement a function of closing the door with the recognition as a signal, the number of components of the device is increased and the installation space for installing the device expands, which are problems.

In addition, the locking device of the door is operated by a driving source such as a motor, and a rotation force of the motor needs to be changed to a proper torque and a proper rotation speed. In the related art 1, a rotation force of the motor is transmitted to a cam structure, and as the cam structure performs the locking function while being rotated, but the cam structure has a problem in that a precise control thereof is difficult. The related art 2 has a gear structure including a worm gear, so there is a problem in that a structure thereof is complex and the number of components is great, and specifically, a link structure to operate a sensor is disposed in a vertical direction and thus the entire installation height is high, which is a problem. The related art 3 adopts a long rod structure to transmit a rotation force of the motor, i.e., the driving source, to a restriction unit, so that it is disadvantageous in precise control thereof, and a wide installation space is required, which are disadvantages.

BRIEF DESCRIPTION OF THE DRAWINGS

Embodiments will be described in detail with reference to the following drawings in which like reference numerals refer to like elements, and wherein.

DETAILED DESCRIPTION

Figure 1:
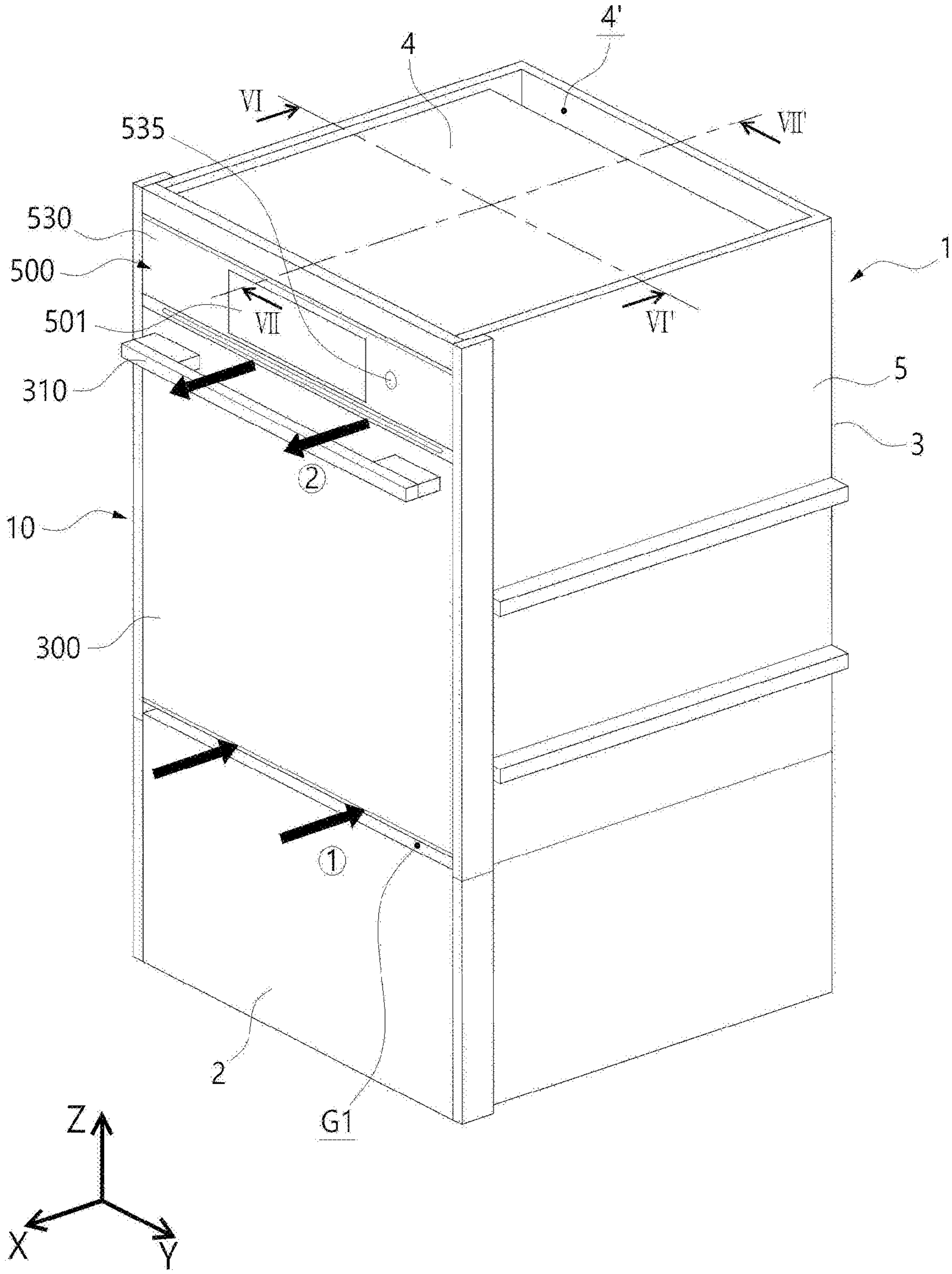
FIG. 1 is a perspective view of a cooking appliance according to an embodiment installed using a built-in method.

Hereinafter, exemplary embodiments will be described with reference to accompanying drawings. Wherever possible, the same reference numerals will be used throughout the drawings and the description to refer to the same or like elements or parts. Further, it is to be noted that, when description of functions and configuration of conventional elements make the gist unclear, repetitive description of those elements has been omitted.

A cooking appliance according to an embodiment is provided to cook food to be cooked (hereinafter, referred to as "object to be cooked") using one heat source or a plurality of heat sources. The cooking appliance according to an embodiment may include a first heat source module 150 (referring to FIG. 7), a second heat source module 160 (referring to FIG. 7), and a third heat source module 170 (referring to FIG. 7). The first heat source module 150, the second heat source module 160, and the third heat source module 170 may be respectively arranged in the cooking appliance according to an embodiment, and may include different types of heat sources. As another example, some of the first heat source module 150, the second heat source module 160, and the third heat source module 170 may be omitted.

The cooking appliance according to an embodiment may include a steam device. The steam device may supply steam to a cavity S1, which is a cooking chamber provided inside of the cooking appliance. The steam device may include a heater (not shown) that heats water, and a water tank 450 that supplies water to the heater.

In addition, the cooking appliance according to an embodiment may include a panel unit 500. The panel unit 500 may include at least one of an input means through which a signal for operating the cooking appliance is input, and an output means that displays a cooking state of the cooking appliance.

In the cooking appliance according to an embodiment, each of the panel unit 500 and the water tank 450 may be disposed at a front portion of the cooking appliance. The panel unit 500 may cover or open an entrance 424 of the water tank 450 while being moved. Hereinafter, structure for a moving operation of the panel unit 500 will be described.

FIG. 1 is a view of a cooking appliance according to an embodiment installed using a built-in method. As shown in FIG. 1, the cooking appliance according to an embodiment may be installed to a kitchen system 1, for example, and only a front surface of the cooking appliance may be exposed forward. A door 300 and the panel unit 500, which will be described hereinafter, may be included at a front surface of the cooking appliance. The water tank 450 according to an embodiment may be exposed to the front surface of the cooking appliance, but is shown as being covered by the panel unit 500 in FIG. 1. Reference numeral 501 indicates a display unit exposed to the front surface of the panel unit 500.

For example, in FIG. 1, arrow X indicates a frontward-rearward direction, arrow Y indicates a leftward-rightward direction, and arrow Z indicates an upward-downward direction. The frontward-rearward direction may be a depth direction of the cooking appliance, the leftward-rightward direction may be a widthwise direction of the cooking appliance, and the upward-downward direction may be a heightwise direction of the cooking appliance. Hereinafter, these terms will be used when indicating directions.

Briefly describing a structure of the kitchen system 1, the kitchen system 1 may surround a lower surface, a rear surface, an upper surface, and side surfaces of the cooking appliance, except for the front surface of the cooking appliance. The kitchen system 1 may include a lower surface 2 (referring to FIG. 6), a rear surface 3, an upper surface 4, and a side surface 5. The lower surface 2, the rear surface 3, the upper surface 4, and the side surface 5 may cover a lower surface, a rear surface, an upper surface, and side surfaces of the cooking appliance, respectively, and only the front surface of the cooking appliance may be exposed outwards. As another example, some of the lower surface 2, the rear surface 3, the upper surface 4, and/or the side surface 5 may be omitted.

A gap may exist between the kitchen system 1 and the cooking appliance. External air may flow into the gap (lower intake port G1) between the kitchen system 1 and the cooking appliance. As shown in FIG. 1, air may flow into the gap between the kitchen system 1 and a lower portion of the cooking appliance (direction of arrow ①). Further, air cooling the cooking appliance while passing through an inside space of the cooking appliance may be discharged forward again. More specifically, the air may be discharged through a gap formed between the door 300 and the panel unit 500 of the cooking appliance (direction of arrow ②). This circulation process of air will be described again hereinafter.

Figure 2:
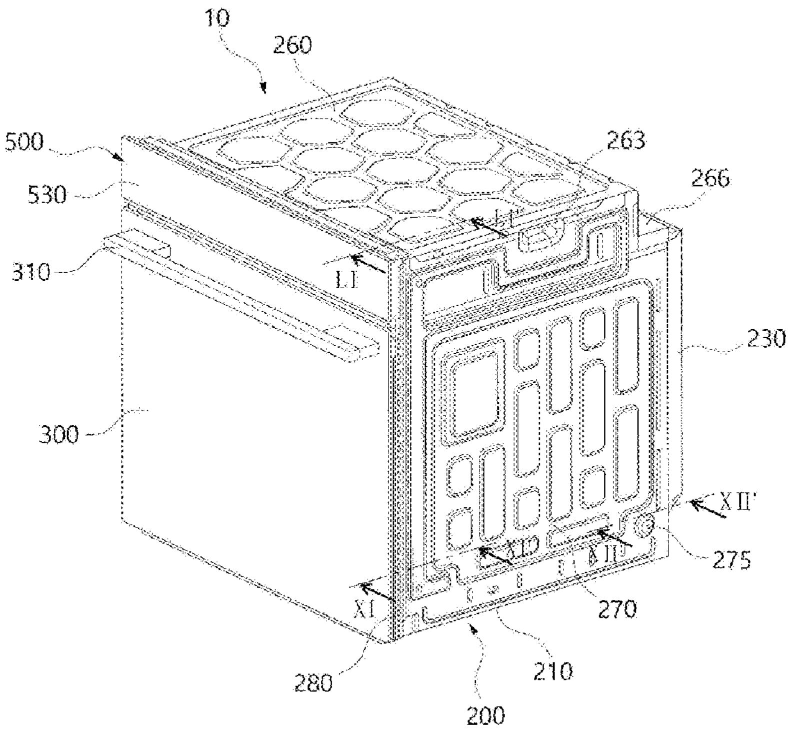
FIG. 2 is a perspective view of the cooking appliance according to an embodiment.

As shown in FIG. 2, the view shows the cooking appliance according to an embodiment. As shown in the drawing, the cooking appliance may be shaped as an approximate hexahedron. A frontward-rearward length, a leftward-rightward length, and a vertical height of the cooking appliance may be formed in approximately similar sizes. On the other hand, the frontward-rearward length, the leftward-rightward length, and the vertical height of the cooking appliance may be formed in different sizes.

The cavity S1 (referring to FIG. 6) is provided inside of the cooking appliance. The cavity S1 may be formed inside of a casing 100, 200 forming a frame of the cooking appliance. The cavity S1 may be an empty space in which an object to be cooked may be placed, and may be understood as a cooking chamber. The cavity S1 may be divided from an electric chamber S2 (referring to FIGS. 6 and 7), which will be described hereinafter.

The casing 100, 200 may include inner casing 100 and outer casing 200. The outer casing 200 may be coupled to the inner casing 100 in a shape of surrounding the inner casing 100. An insulator (not shown) may be filled between the inner casing 100 and the outer casing 200, and the insulator may serve to block heat of each heat source module transmitted outwards.

Figure 3:
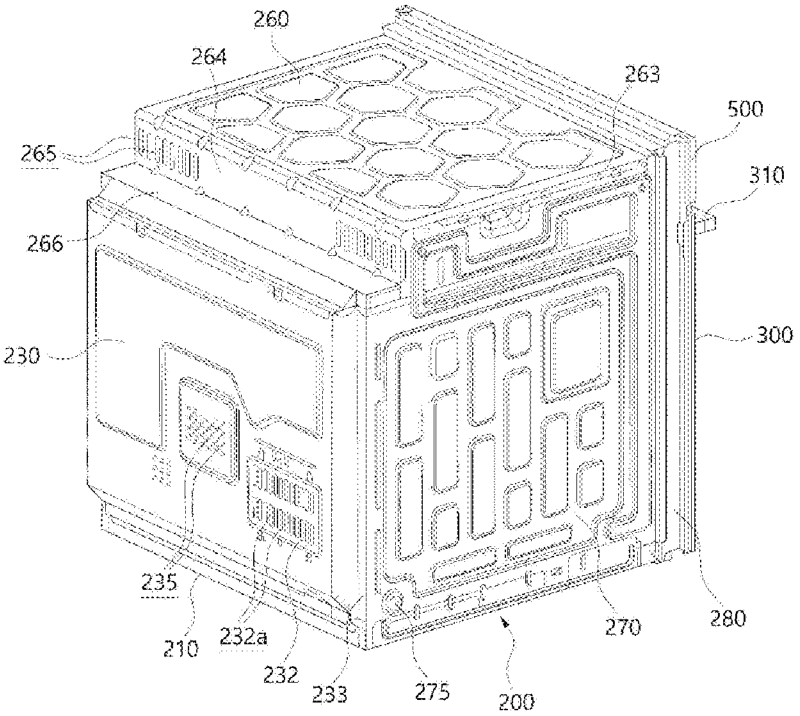
FIG. 3 is a perspective view of the cooking appliance according to an embodiment, at a different angle from an angle of FIG. 2.

As shown in FIGS. 2 and 3, the panel unit 500 described hereinafter may be disposed above the door 300. The panel unit 500 may include at least one of an input means into which a signal for operating the cooking appliance is input, and an output means that displays a cooking state of the cooking appliance. The input means and the output means of the panel unit 500 may be configured as one display. Structure of the panel unit 500 will be described hereinafter.

Figure 4:
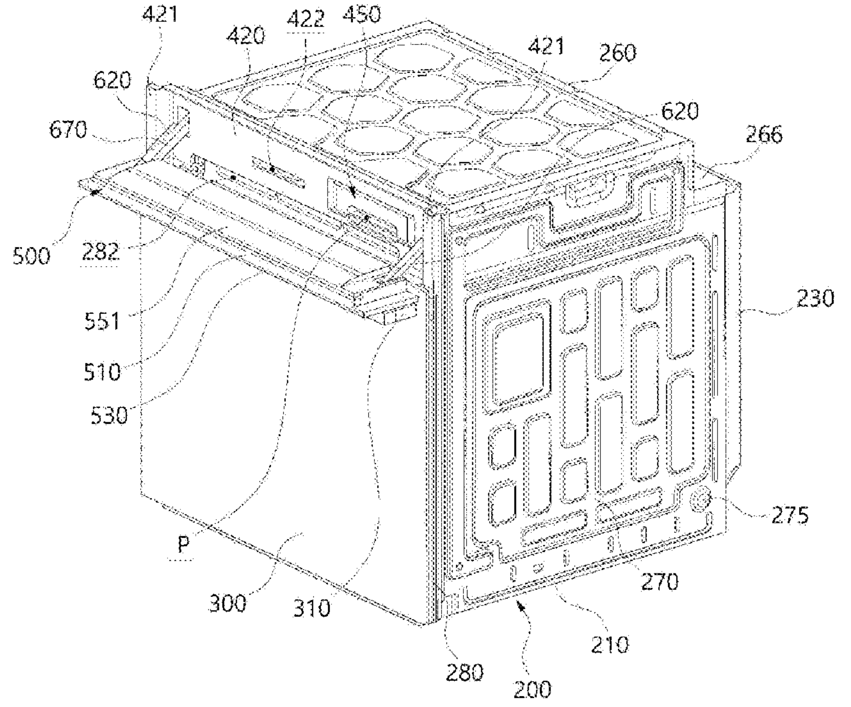
FIG. 4 is a perspective view showing an opened state of a panel unit of the cooking appliance according to an embodiment.

As shown in FIG. 4, the panel unit 500 is shown in an open state. In this embodiment, the panel unit 500 may be rotated such that an upper end of the panel unit 500 is moved downward. In other words, the panel unit 500 may be operated in a kind of pull-down method in which the upper end thereof is rotated upward and downward with respect to a lower end thereof.

Figure 5:
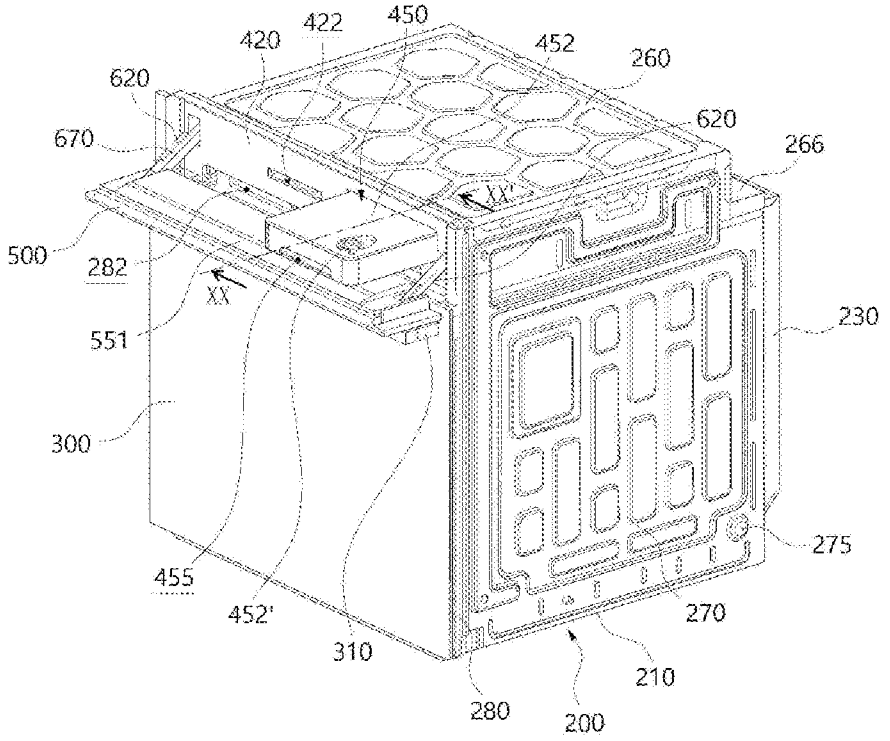
FIG. 5 is a perspective view of a water tank of the cooking appliance according to an embodiment, the water tank being taken out from the cooking appliance.

As shown in FIG. 5, the water tank 450 may be ejected out while the panel unit 500 is opened. In this embodiment, the water tank 450 for a steam effect is disposed at a rear of the panel unit 500 in an operational state of the cooking appliance so as to be covered by the panel unit 500. When the water tank 450 is ejected or inserted again, the panel unit 500 should be opened to open an entrance of a tank chamber 450*a*. The term "operational state" means a state in which the cooking appliance is operated, that is, a state in which an object to be cooked is cooked.

As described above, in this embodiment, the panel unit 500 may be disposed in front of the water tank 450 at all times except for during ejecting and inserting processes of the water tank 450. The panel unit 500 disposed in front of the water tank 450 may cover the entrance 424 of the water tank 450, more specifically, an entrance 424 of the tank chamber 450*a* described hereinafter. As such, the water tank 450 and the entrance are prevented from being exposed outwards, and a sense of beauty of the cooking appliance may be improved.

For example, an open state of the panel unit 500 means a rotated state of the panel unit 500 such that the upper end of the panel unit 500 is moved downward, as shown in FIG. 4. On the other hand, a closed state of the panel unit 500 means a rotated state of the panel unit 500 such that the upper end thereof is rotated upward to allow the panel unit 500 to be disposed in parallel to the door 300, as shown in FIG. 2.

Figure 6:
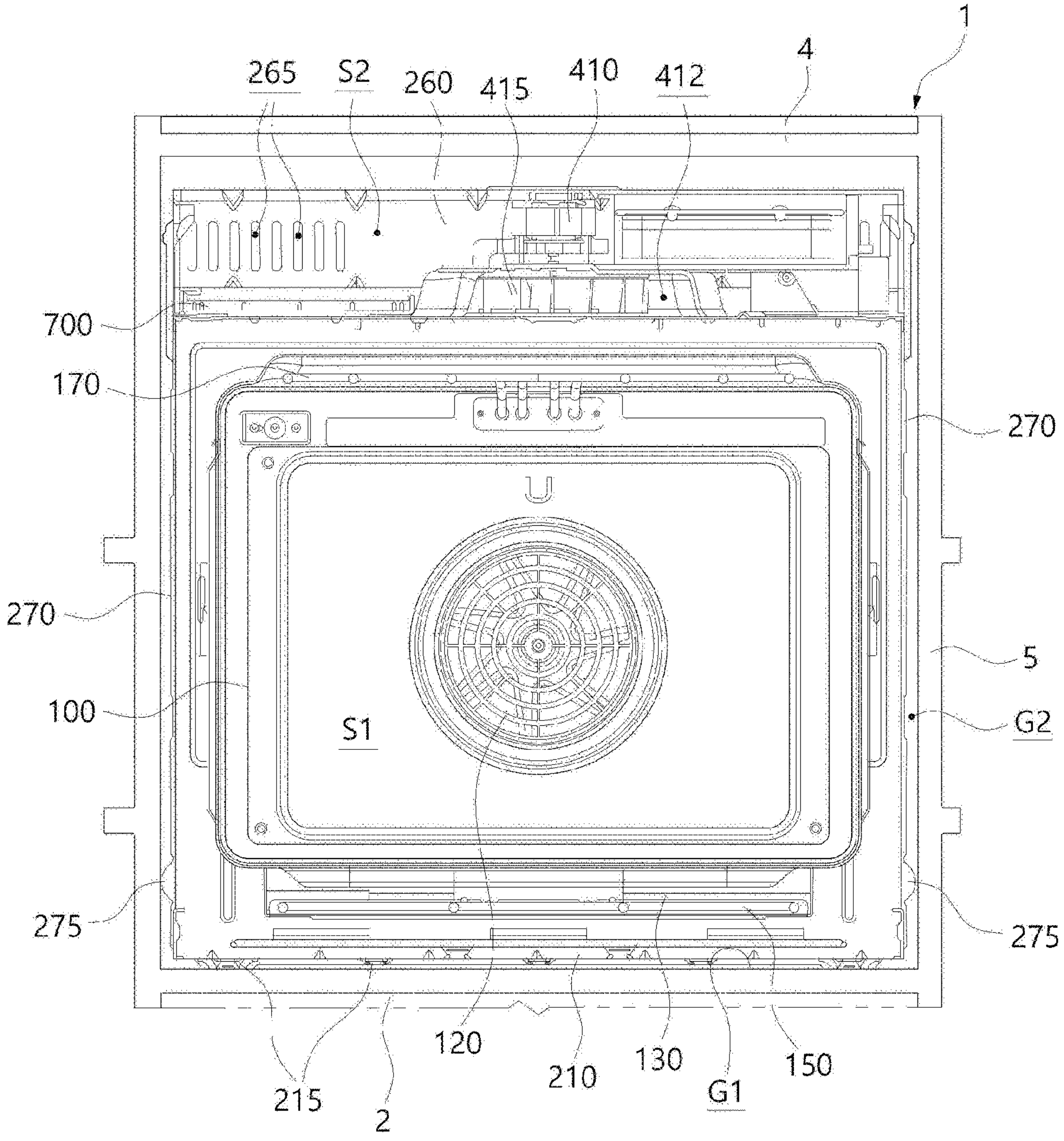
FIG. 6 is a cross-sectional view, taken along line VI-VI' in FIG. 1.

As shown in FIG. 6, the cooking appliance stored in the kitchen system 1 is shown. The cavity S1 may be provided in the inner casing 100. It may be understood that an empty space of the cavity S1 is defined by the inner casing 100. The inner casing 100 may be shaped as an approximate hexahedron, and may be open forward.

A rear surface of the inner casing 100 may have an opening 120. The opening 120 may serve to transmit heat generated from the second heat source module 160 into the cavity S1. The opening 120 may be formed by penetrating a portion of the rear surface of the inner casing 100. In this embodiment, the opening 120 is shaped as an approximate circular shape.

Figure 7:
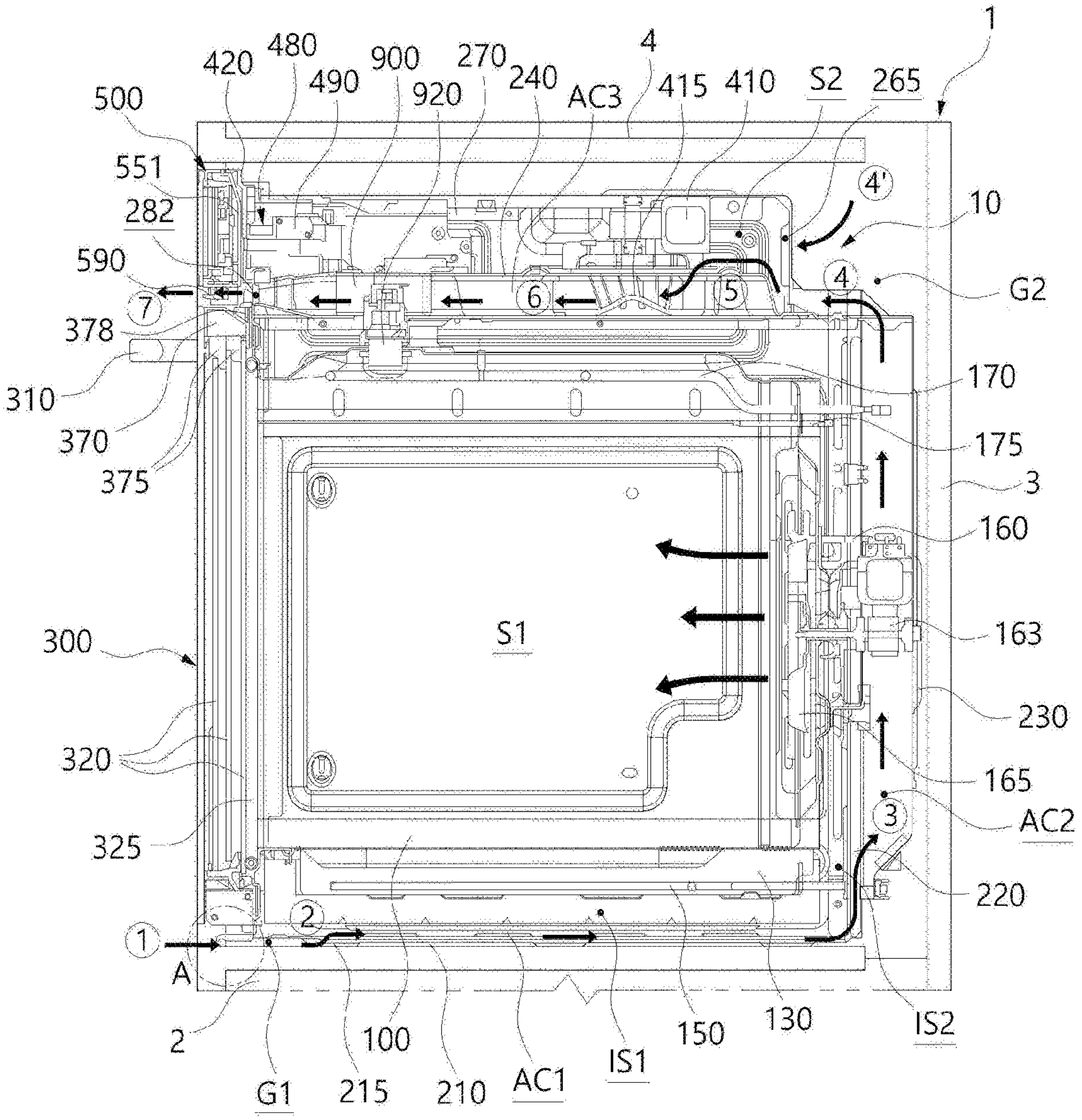
FIG. 7 is a cross-sectional view, taken along line VII-VII' in FIG. 1.

Steam may flow into the cavity S1 through the opening 120. The steam is generated by the steam device. As shown in FIG. 7, the steam may flow into the cavity S1 via a convection fan provided in the second heat source module 160.

As shown in FIGS. 6 and 7, a lower frame 130 may be provided at a lower portion of the inner casing 100. The lower frame 130 may protrude downward more than a bottom surface of the inner casing 100. The first heat source module 150 may be disposed inside of the lower frame 130. The lower frame 130 may be disposed at an upper portion of a bottom casing 210 described hereinafter. A first insulating space IS1 may be formed between the lower frame 130 and the bottom casing 210, and the first insulating space IS1 may be filled with an insulator (not shown), so that heat of the first heat source module 150 may be prevented from being discharged outwards.

In this embodiment, a plurality of heat sources may be included. The heat sources may include the first heat source module 150, the second heat source module 160, and the third heat source module 170. The first heat source module 150 may be disposed at a lower surface of the cavity S1, the second heat source module 160 may be disposed at a rear surface of the cavity S1, and the third heat source module 170 may be disposed at an upper surface of the cavity S1. As described above, the multiple heat sources may be disposed at difference positions, so that a surface of an object to be cooked may be heated more evenly, and a cooking time may be reduced. Further, when the plurality of heat sources is used, a cooking method that requires high temperature may be implemented.

Referring to FIGS. 6 and 7, the first heat source module 150 may be disposed in the lower frame 130 of the inner casing 100. The first heat source module 150 may emit radiant heat into the cavity S1. The first heat source module 150 may include a heater. The heater may emit radiant heat upward, that is, towards the cavity S1, and may heat a lower portion of the object to be cooked. The heater may be a graphite heater. This heater may serve as a kind of broil heater, and the heater may be used as a grill use using a direct heat or radiant heat.

As another example, the first heat source module 150 may heat the object to be cooked in an inductive heating method using a magnetic field generated in a working coil.

The second heat source module 160 may be a kind of convection heater. The second heat source module 160 may emit convection heat into the cavity S1 together with the convection fan so as to serve to improve uniformity of cooking. On the other hand, the second heat source module 160 is provided without the convection fan, and may supply radiant heat to the object to be cooked by using a heat wire like the first heat source module 150.

A convection heater 165 may be disposed in the second heat source module 160. The convection heater may be formed in a bar type having predetermined length and diameter. For example, the convection heater may be a sheath heater in which a protecting tube of a heat wire is made of metal. On the other hand, the convection heater may be a carbon heater, a ceramic heater, a halogen heater that are configured such that a filament is enclosed inside a tube made of a transparent or translucent material.

The third heat source module 170 may be disposed at the upper surface of the cavity S1 to face the first heat source module 150. The third heat source module 170 may emit radiant heat into the cavity S1 by using a heater, like the first heat source module 150. The heater may emit radiant heat downward, that is, towards the cavity S1, and may heat an upper portion of the object to be cooked. In FIG. 7, reference numeral 175 indicates a temperature probe to measure a temperature in the cavity S1.

Although not shown in the drawing, the casing 100,200 may include a fourth heat source module. The fourth heat source module may include a magnetron that oscillates microwaves and a wave guide that guides the microwaves oscillated from the magnetron to the cavity S1.

The outer casing 200 may be disposed outside of the inner casing 100. As shown in FIGS. 2 and 3, an exterior shape of the cooking appliance may be composed of the outer casing 200. The outer casing 200 may include the bottom casing 210 forming a bottom of the cooking appliance, a rear casing 220 forming a rear surface thereof, and an upper casing 240 forming an upper surface thereof. In addition, the door 300 described hereinafter may be disposed in front of the cooking appliance to form the front surface of the cooking appliance.

The bottom casing 210 may be provided to be spaced apart from the lower frame 130 of the inner casing 100. The bottom casing 210 may be formed in an approximate plate shape. The bottom casing 210 may be placed on the lower surface 2 of the kitchen system 1. An insulator (not shown) may be filled in the first insulating space IS1 between the bottom casing 210 and the lower frame 130.

As shown in FIGS. 6 to 7, a bottom spacer 215 may protrude from the bottom casing 210. The bottom spacer 215 may protrude downward from the bottom casing 210. The bottom spacer 215 may be in contact with the lower surface 2 of the kitchen system 1 to support the cooking appliance. In this embodiment, a plurality of the bottom spacers 215 may be provided at the bottom casing 210.

The bottom casing 210 and the lower surface 2 of the kitchen system 1 may be spaced apart from each other to form a gap by the bottom spacers 215. In addition, the lower gap G1 may serve as the lower intake port, and a first air flow path AC1 may be connected to the lower intake port G1. Air flowing from the outside space may be moved along the first air flow path AC1. In FIG. 7, arrow ① indicates a direction in which external air flows into the first air flow path AC1, and arrow ② indicates a direction in which the air is moved toward a rear space of the cooking appliance along the first air flow path AC1. The first air flow path AC1 will be described again hereinafter.

As the bottom spacers 215 space the bottom casing 210 and the lower surface 2 of the kitchen system 1 from each other, the bottom spacers 215 may form the lower intake port G1 through which the external air may flow inwards. Referring to FIG. 1, the external air may flow in a direction of arrow ① through the lower intake port G1 formed by the bottom spacers 215. The air flowing as described above along the outer casing 200 of the cooking appliance may reduce a surface temperature of the cooking appliance and the temperature inside of the electric chamber S2.

Figure 9:
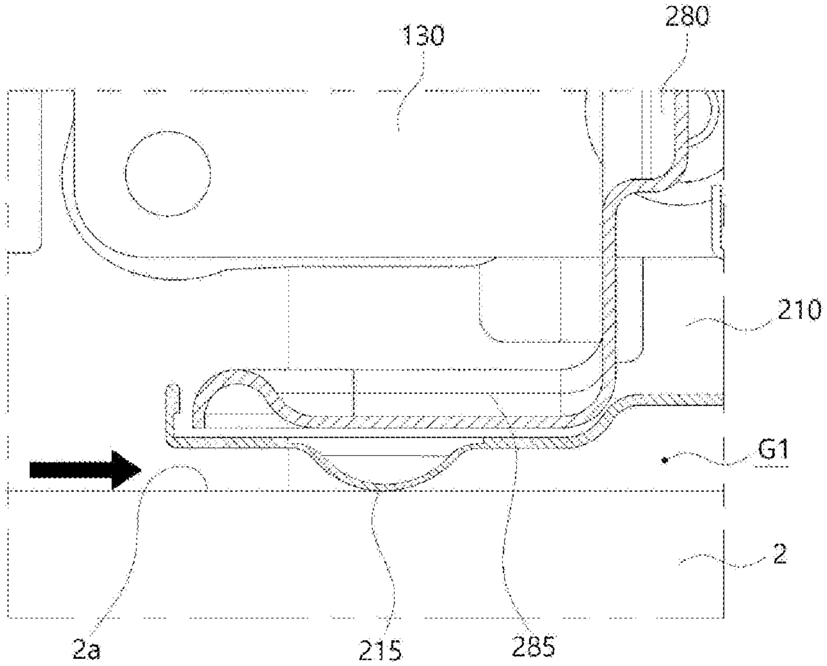
FIG. 9 is an enlarged, cross-sectional view showing part A in FIG. 7.

FIG. 9 is an enlarged view showing portion A in FIG. 7. As shown in the drawing, an upper surface 2*a* of the lower surface 2 of the kitchen system 1 may be spaced apart from the bottom casing 210 by the bottom spacers 215. External air may flow into the lower intake port G1 spaced as described above. The upper surface 2*a* of the lower surface 2 of the kitchen system 1 may be understood as a placing surface on which the cooking appliance may be placed.

A lower end placing portion 285 of a front frame 280 described hereinafter may be placed on the bottom casing 210. Some of the plurality of bottom spacers 215 may be formed in positions at which the front frame 280 and the bottom casing 210 overlap, thereby reinforcing a strength of the bottom casing 210.

Figure 10:
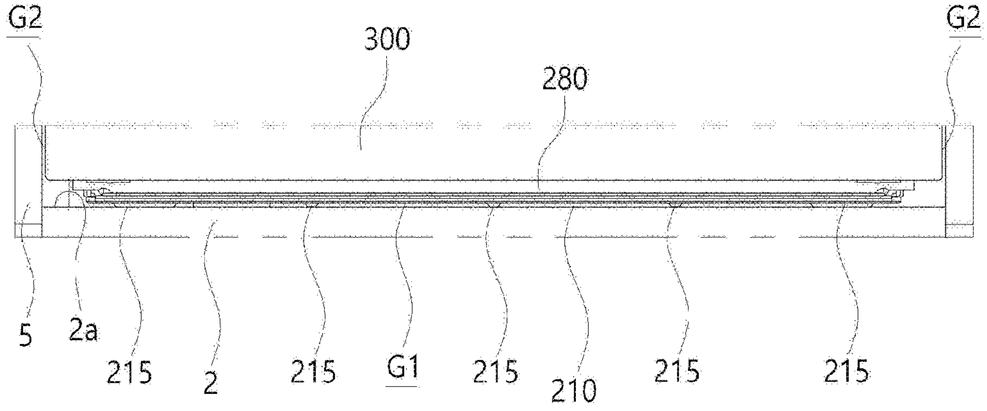
FIG. 10 is a front view showing a lower portion of the cooking appliance of FIG. 1.

As shown in FIG. 10 in which the bottom casing 210 is shown from a front side, the plurality of bottom spacers 215 may be disposed under the bottom casing 210 with intervals therebetween. The lower intake port G1 may be formed between the upper surface 2*a* of the lower surface 2 of the kitchen system 1 and the bottom casing 210 by the bottom spacers 215. Further, a side gap G2 may be formed between the side surface 5 and the cooking appliance. The side gap G2 will be described again hereinafter.

Figure 11:
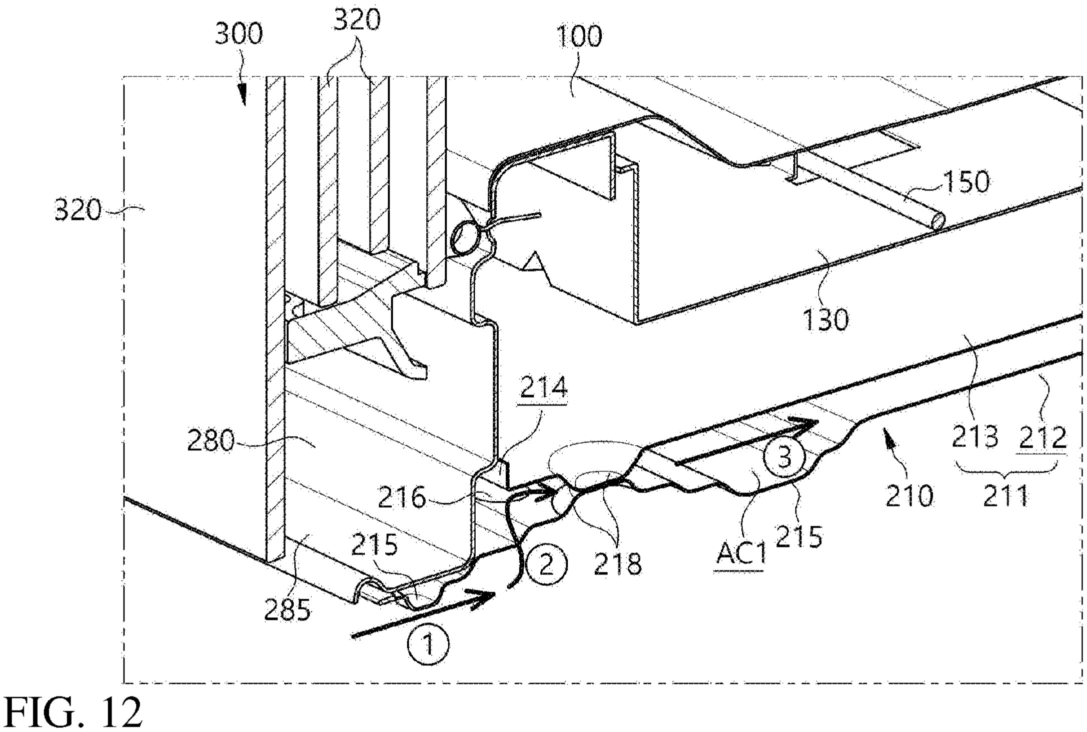
FIG. 11 is a cross-sectional view, taken along line XI-XI' in FIG. 2.
Figure 12:
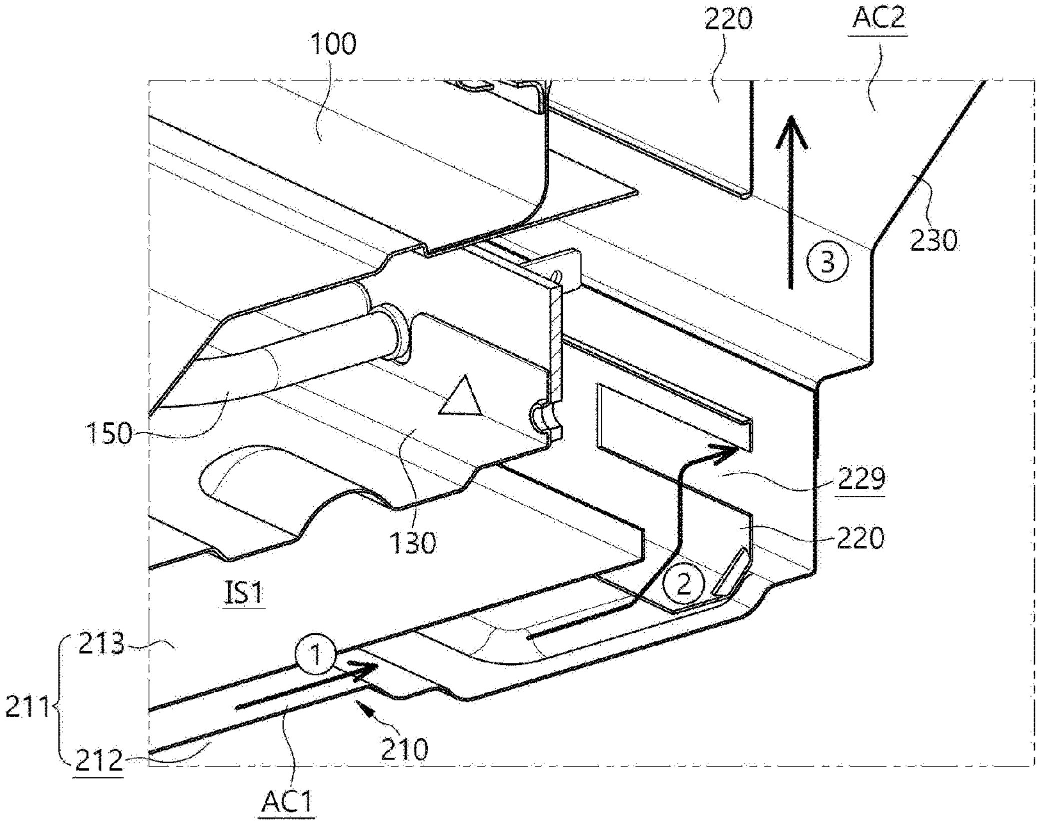
FIG. 12 is a cross-sectional view, taken along line XII-XII' in FIG. 2.

FIGS. 11 and 12 are views showing structure of the bottom casing 210. For reference, FIG. 11 shows a front structure of the bottom casing 210, and FIG. 12 shows a rear structure of the bottom casing 210. As shown in the drawings, in this embodiment, the bottom casing 210 may have a double structure. The bottom casing 210 may include an upper plate 213 and a lower plate 212, and a predetermined space may provided between the upper plate 213 and the lower plate 212.

This space may provide a portion of the first air flow path AC1. As described above, the first air flow path AC1 divided from other spaces may be provided between the lower plate 212 and the upper plate 213 of the bottom casing 210. The first air flow path AC1 may be disposed below the first heat source module 150. Therefore, air flowing rearwards along the first air flow path AC1 may cool the first heat source module 150.

As the first air flow path AC1 is provided inside of the bottom casing 210, the first air flow path AC1 may be prevented from being affected by surrounding structures of the cooking appliance. In other words, regardless of shape, size, or material of the kitchen system in which the cooking appliance is installed, external air may stably flow along the first air flow path AC1 having a constant size and shape. In addition, the first air flow path AC1 may be connected to a second air flow path AC2 described hereinafter, thereby providing a continuous air flow path in the cooking appliance.

The lower end placing portion 285 of the front frame 280 may be placed on a front portion of the bottom casing 210, the portion facing the door 300. The lower end placing portion 285 of the front frame 280 may be understood to be supported by the front portion of the bottom casing 210. More specifically, the lower end placing portion 285 of the front frame 280 may be overlapped with an upper portion of the lower plate 212 constituting the bottom casing 210.

A blocking portion 214 may be provided at a first end of the upper plate 213. The blocking portion 214 may block heat of the first heat source module 150 from being transferred toward a door hinge H (referring to FIG. 8) disposed at a front of the upper plate 213. The blocking portion 214 may be bent at an end of the upper plate 213. The blocking portion 214 may be provided at a front portion of the upper plate 213, that is, a portion facing the door 300. The blocking portion 214 may be bent in a direction in which a height of the upper plate 213 is increased. Unlike what is shown in FIG. 11, the blocking portion 214 may be formed higher to match with a height of the door hinge H.

The upper plate 213 and the lower plate 212 may be spaced apart from each other. The upper plate 213 and the lower plate 212 may be in close contact with each other at some positions. As shown in FIG. 11, the upper plate 213 and the lower plate 212 may protrude to face each other to form a close contact portion 218. The close contact portion 218 allows the upper plate 213 and the lower plate 212 to be in close contact with each other, so that the upper and lower plates support a weight of components disposed on an upper portion of the bottom casing 210. The close contact portion 218 may include a plurality of close contact portions 218 disposed along a widthwise direction of the bottom casing 210.

An inlet 216 may be formed in the lower plate 212. The inlet 216 may be formed by vertically penetrating a portion of the lower plate 212. The inlet 216 may be connected to the lower intake port G1. The external air flowing into the lower intake port G1 may be suctioned into the first air flow path AC1 through the inlet 216. A suctioning force of a cooling fan module 410 described hereinafter extends to the first air flow path AC1, so that air of the first air flow path AC1 may flow rearwards.

Therefore, the external air flowing into the lower intake port G1 formed by the bottom spacers 215 may flow into the gap between the upper plate 213 and the lower plate 212 through the inlet 216 formed in the lower plate 212. In addition, the flowing air may move rearwards along the first air flow path AC1, and may flow into the second air flow path AC2 the rear casing 220 and a rear cover 230 described hereinafter.

The inlet 216 may be formed in a front portion of the lower plate 212, and the portion may be close to the door 300. In other words, the inlet 216 is not formed at several positions of the lower plate 212, and is focused to the front portion close to the door 300. As such, dispersion of a suctioning force of cooling fan module 410 may be prevented, and the suctioning force may be focused to both of the inlet 216 and the lower intake port G1. Of course, a plurality of inlets 216 may be disposed at the front portion of the lower plate 212.

For reference, in FIG. 11, arrow ① indicates a passage through which external air flows into the lower intake port G1, arrow ② indicates a passage through which the inflow air flows into the first air flow path AC1 through the inlet 216, and arrow ③ indicates a passage through which the air is moved rearwards along the first air flow path AC1.

The air flowing along the first air flow path AC1 between the lower plate 212 and the upper plate 213 may be delivered to the second air flow path AC2. The above-described state is shown in FIG. 12. As shown in the drawing, the air moved rearwards (direction of arrow ①) along the first air flow path AC1 may flow (direction of arrow ②) toward the second air flow path AC2 between the rear casing 220 and the rear cover 230. In addition, the air flowing in the second air flow path AC2 may be moved upward (direction of arrow ③) along the second air flow path AC2.

The rear casing 220 may include a connection passage 229 that connects the first air flow path AC1 to the second air flow path AC2. The connection passage 229 may be formed in a shape that penetrates the rear casing 220 in the frontward-rearward direction. The connection passage 229 may be formed at a lower portion of the rear casing 220. More specifically, the connection passage 229 may be formed at a lower end of the rear casing 220, and the lower portion may be close to the bottom casing 210.

As described above, the air moves upward (direction of arrow ③) along the second air flow path AC2 passing a rear side of the second heat source module 160. Accordingly, the air passing through the second air flow path AC2 may cool the rear side of the second heat source module 160.

In addition, as described again hereinafter, the air moving upward along the second air flow path AC2 may be delivered to the electric chamber S2. The air in the electric chamber S2 may be suctioned by the cooling fan module 410, and may be discharged outwards through a third air flow path AC3. The air delivered to the electric chamber S2 may cool the inside space of the electric chamber S2. In addition, the third air flow path AC3 may be disposed at an upper portion of the third heat source module 170, so that the air passing through the third air flow path AC3 may cool the upper portion of the third heat source module 170.

The state is shown in FIG. 7. As shown in the drawing, external air (direction of arrow ①) flowing inwards through the lower intake port G1 may be suctioned into the first air flow path AC1 (direction of arrow ②) through the inlet 216. The air may be moved rearwards along the first air flow path AC1.

The air moved rearwards may pass through the second air flow path AC2 (direction of arrow ③). As the second air flow path AC2 is formed in a direction of gravity, a suctioning force of the cooling fan module 410 is required in order to move air along the second air flow path AC2.

Further, the air may flow into the electric chamber S2 through a connection holes 242 of the upper casing 240 described hereinafter (direction of arrow ④). The air flowing into the electric chamber S2 is suctioned into the cooling fan module 410 (direction of arrow ⑤), and then may be moved forward (direction of arrow ⑥) along the third air flow path AC3. Eventually, the air may be discharged outwards through an exhaust port 282.

It may be understood that the external air flows inwards through a front lower portion of the cooking appliance, is circulated inside of the cooking appliance, and then is discharged outwards through a front upper portion thereof. In this process, the external air may cool all surroundings of the first heating source module (AC1), the second heating source module (AC2), and the third heating source module (AC3).

In FIG. 7, arrow ④' indicates an inflow direction of air flowing inwards through an air in-outflow portion 265 of an upper cover 260 described hereinafter. The external air does not necessarily flow only through the front lower portion of the cooking appliance, but may also flow through a clearance formed in an upper rear portion of the cooking appliance. Of course, when the air in-outflow portion 265 is not formed in the upper cover 260, there may be no inflow of air through arrow ④'. When the upper cover 260 does not have the air in-outflow portion 265, the air inflow path is reduced, but the suctioning force of the cooling fan module 410 may be focused to the front lower portion of the cooking appliance.

Referring to FIG. 8 again, this view shows the outer casing 200 surrounding the inner casing 100. A second insulating space IS2 may be formed between the rear casing 220 constituting the outer casing 200 and the inner casing 100. The second insulating space IS2 is filled with an insulator (not shown), thereby preventing heat of the cavity S1 from being discharged outwards.

The rear cover 230 may be disposed at a rear of the rear casing 220 constituting the outer casing 200. Further, a predetermined empty space may be formed between the rear casing 220 and the rear cover 230. The empty space between the rear casing 220 and the rear cover 230 may serve as the second air flow path AC2. Further, as shown in FIG. 7, a convection motor 163 for rotation of a convection fan constituting the second heat source module 160 may be disposed in the second air flow path AC2. For reference, reference numeral 165 indicates a heater structure of the second heat source module 160.

The upper cover 260 may be disposed above the upper casing 240. The upper cover 260 may cover an upper portion of the electric chamber S2 to shield the electric chamber S2. The electric chamber S2 may be formed between the upper casing 240 and the upper cover 260. The cooling fan module 410 may be disposed in the electric chamber S2. The cooling fan module 410 suctions external air, and may discharge air that has risen in temperature while passing through the inside space of the cooking appliance, outwards. The electric chamber S2 may be understood as an upper space distinguished from the cavity S1. As another example, the electric chamber S2 may be disposed at a lower portion of the cavity S1 to serve as a lower space distinguished from the cavity S1. The cooling fan module 410 will be described again hereinafter.

The air moved along the second air flow path AC2 may be moved forward along the third air flow path AC3 (referring to FIG. 7) formed in the cooling fan module 410. The air moved forward may finally be discharged outwards. An outlet through which the air is discharged outwards may be formed between the door 300 and the panel unit 500 (referring to arrow ② in FIG. 1). More specifically, the air may be discharged through the exhaust port 282 formed in the front frame 280 described hereinafter, and the air may finally be discharged outwards through the gap between the door 300 disposed in front of the exhaust port 282 and the panel unit 500.

Figure 8:
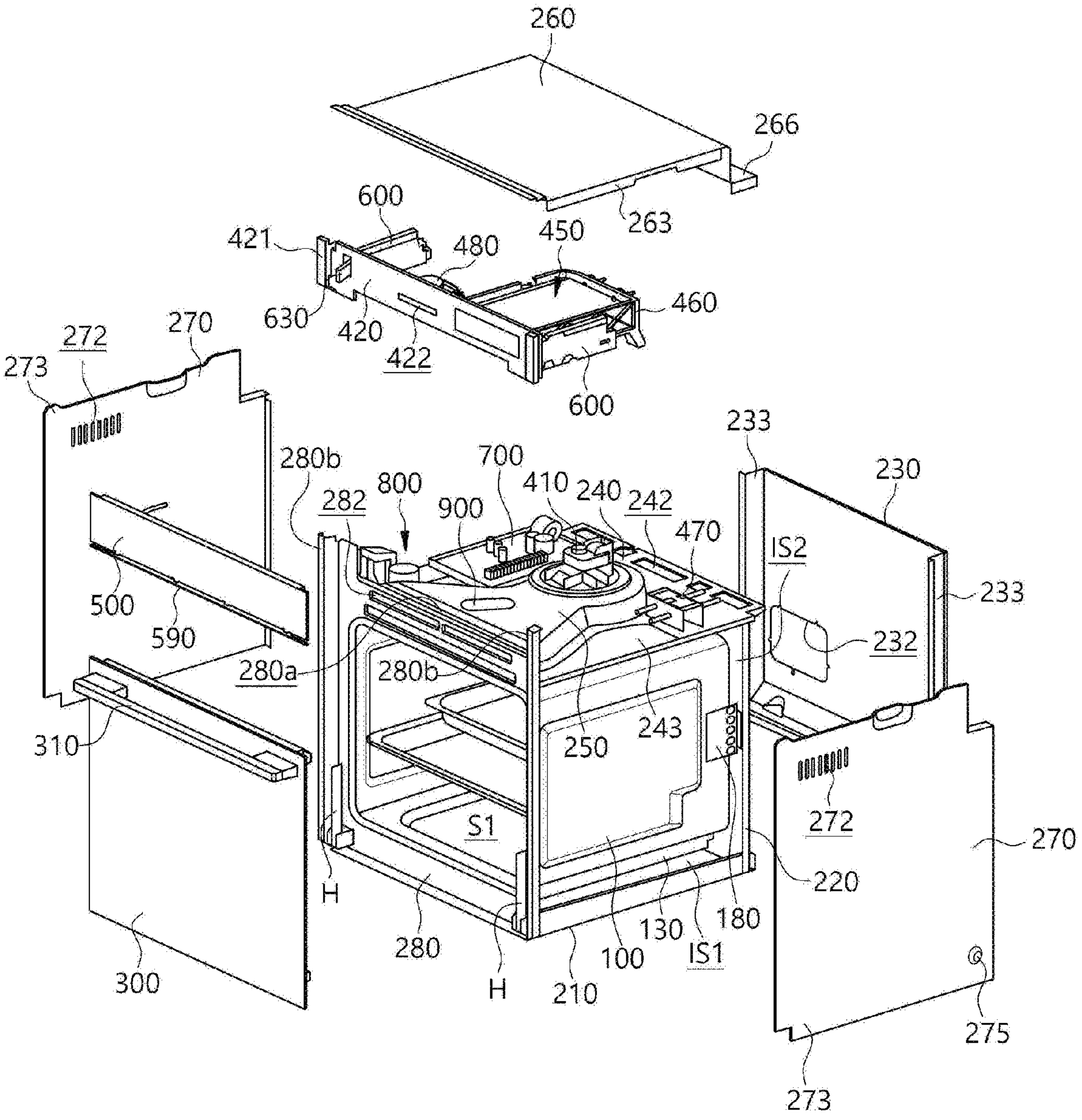
FIG. 8 is an exploded-perspective view showing components of the cooking appliance according to an embodiment.

Referring to FIGS. 3 and 8, the rear cover 230 may be shaped as an approximate square plate. The rear cover 230 may have a through portion 232. A shield cover 232*a* may be coupled to the through portion 232. The shield cover 232*a* may cover the through portion 232, and when the shield cover 232*a* is removed, the through portion 232 may be opened. An operator may open the shield cover 232*a* and then approach the second air flow path AC2. In other words, the shield cover 232*a* may be removed when approaching a rear inside portion of the cooking appliance for maintenance of the cooking appliance.

A rear through hole 235 may be formed in the rear cover 230. The rear through hole 235 may be understood as an air flow path connected to the outside space. The rear through hole 235 may be formed in a center portion of the rear cover 230. As another example, the rear through hole 235 may be omitted in the rear cover 230.

A rear fastening portion 233 may be provided on an edge of the rear cover 230. The rear fastening portion 233 may have the rear cover 230 having a bent edge portion. The rear fastening portion 233 is provided to couple the rear cover 230 and a side cover 270 to each other. The rear fastening portion 233 and a side end of the side cover 270 may be assembled with a fastener, such as a screw. Further, the rear cover 230 may be assembled to the rear casing 220 at the same time.

The upper casing 240 may be disposed on an upper surface of the inner casing 100. The upper casing 240 may be understood to form a bottom surface of the electric chamber S2. Various components including the cooling fan module 410 may be disposed at the upper casing 240.

Referring to FIG. 8, the connection holes 242 may be open in rear of the upper casing 240. The connection holes 242 may be formed as a vertically penetrating shape at a rear side of the upper casing 240. The connection holes 242 may connect the second air flow path AC2 and the electric chamber S2 to each other. The connection hole 242 may include a plurality of connection holes 242 disposed along a rear edge of the upper casing 240.

As described above, the plurality of connection holes 242 is opened vertically, but the plurality of connection holes 242 may be shielded by the upper cover 260. Referring to FIG. 8, a cover plate 266 of the upper cover 260 may be disposed above the connection holes 242. The cover plate 266 may cover the connection holes 242 while being spaced upward from the connection holes 242 at a predetermined distance. In this state, the connection holes 242 are not directly connected to an outside space of the outer casing 200, and the connection holes 242 may connect only the second air flow path AC2 and the electric chamber S2 to each other.

Figure 13:
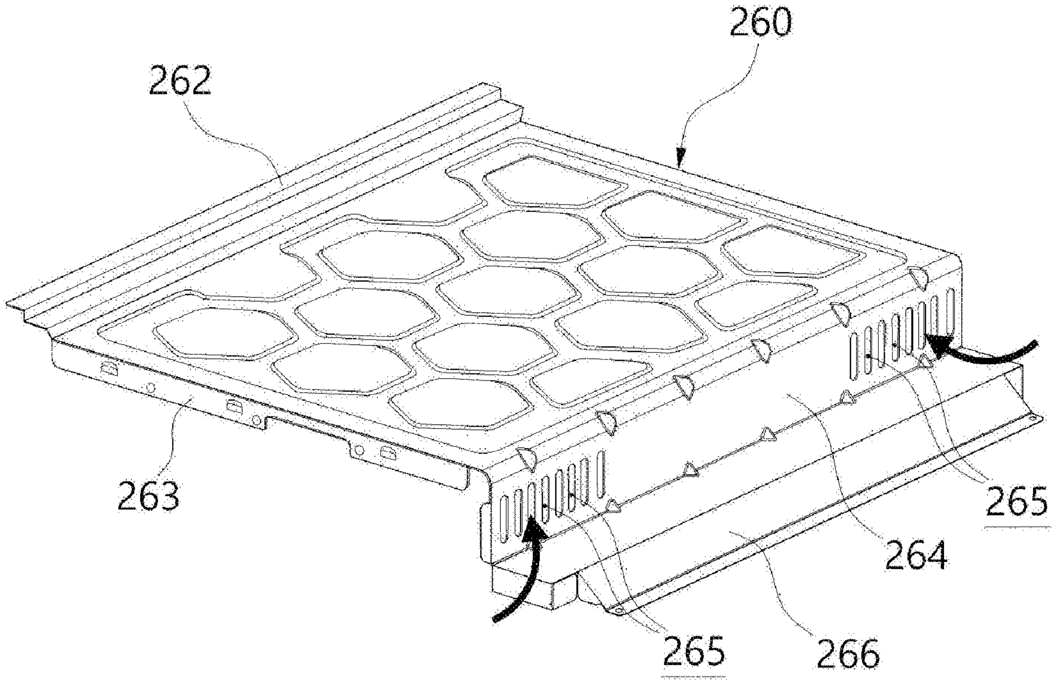
FIG. 13 is a perspective view showing a structure of an upper cover of the cooking appliance according to an embodiment.

For convenience of description, describing the upper cover 260 first, as shown in FIG. 13, the upper cover 260 may be shaped as an approximate square plate. The upper cover 260 may be coupled to the upper casing 240 to form the electric chamber S2 between the upper cover 260 and the upper casing 240. More specifically, the electric chamber S2 may be provided in a space surrounded by the upper casing 240, the upper cover 260, the side cover 270, and a front housing 420 described hereinafter.

Showing structure of the upper cover 260, a cover end 262 may be provided at a front portion of a plate body of the upper cover 260. The cover end 262 may be formed in a direction increasing a height of the upper cover 260. The cover end 262 may be formed in a step shape and may be disposed on an upper surface of the front housing 420.

Fastening ends 263 may be provided on opposite portions of the upper cover 260. Each of the fastening ends 263 may be shaped as a shape in which the opposite ends of the upper cover 260 are bent downward. Each fastening end 263 may be overlapped with an upper end of the side cover 270. The upper cover 260 may be coupled to the upper end of the side cover 270 by each fastening end 263.

A connecting-bent portion 264 may be provided at a rear portion of the body of the upper cover 260. The connecting-bent portion 264 may be formed in a shape bent downward from the rear portion of the body of the upper cover 260. An upper end of the connecting-bent portion 264 is connected to the rear portion of the body of the upper cover 260, and a lower end thereof is connected to the cover plate 266.

The air in-outflow portion 265 may be formed in the connecting-bent portion 264. The air in-outflow portion 265 may be formed by penetrating a portion of the connecting-bent portion 264. The air in-outflow portion 265 may connect the electric chamber S2 to the external space. The external air may flow into the electric chamber S2 through the air in-outflow portion 265, or the air in the electric chamber S2 may be discharged outwards through the air in-outflow portion 265.

Referring to FIG. 7, a flow path of the air flowing into the electric chamber S2 may include (i) a passage through the second air flow path AC2 (direction of arrow ④), and (ii) a passage through the air in-outflow portion 265 (direction of arrow ④'). In addition, the external air may also flow into the electric chamber S2 through (iii) a side through hole 272 (referring to FIG. 8) of the side cover 270 described hereinafter.

The cover plate 266 may be connected to the connecting-bent portion 264. The cover plate 266 may cover a portion of a rear portion of the upper casing 240. More specifically, the cover plate 266 may be disposed above the connection holes 242 of the upper casing 240. The cover plate 266 may cover the connection holes 242 while being spaced apart from the connection holes 242 at a predetermined distance. As the cover plate 266 is located lower than the body of the upper cover 260, a distance between the cover plate 266 and the connection holes 242 may be reduced. As described above, when a distance between the cover plate 266 and the connection holes 242 are reduced, air passing through the connection holes 242 may be efficiently guided to the internal space of the electric chamber S2 along a lower surface of the cover plate 266.

Figure 14:
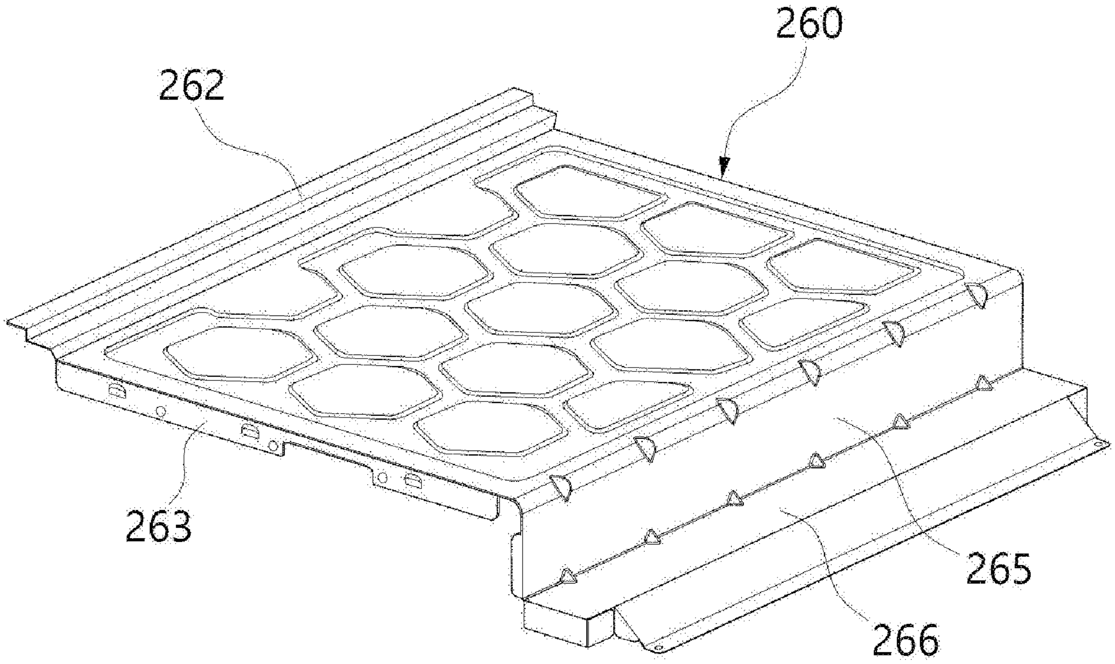
FIG. 14 is a perspective view showing a structure of the upper cover constituting the cooking appliance according to another embodiment.

As shown in FIG. 14 showing another embodiment of the upper cover 260, the air in-outflow portion 265 may be omitted. As such, the external air is prevented from flowing into the electric chamber S2 through the upper cover 260. External air may flow only through the lower intake port G1, that is, the gap below the bottom casing 210 to be moved along the first air flow path AC1, the second air flow path AC2, and the third air flow path AC3 of the cooking appliance. The external air may flow inwards through the side through hole 272 formed in the side cover 270, but most of the air may flow through the gap below the bottom casing 210.

Figure 15:
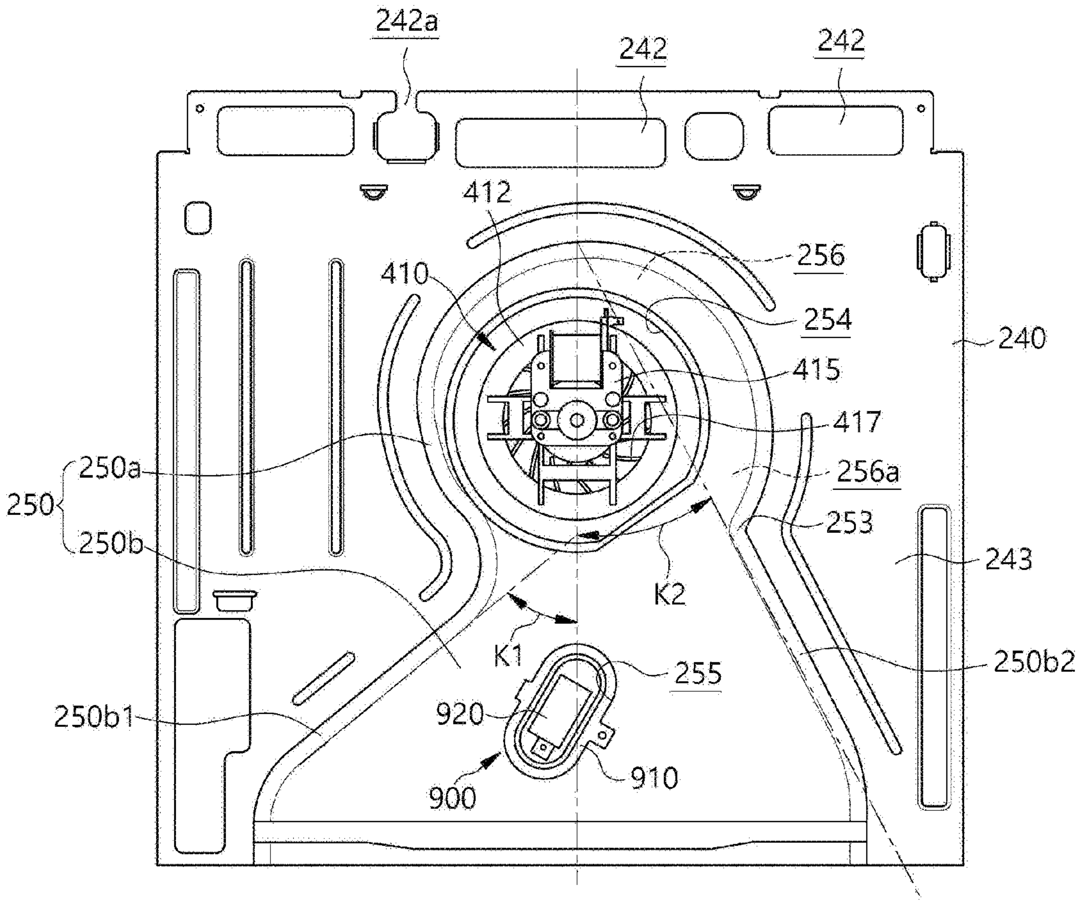
FIG. 15 is a plan view of an electric chamber of the cooking appliance according to an embodiment.
Figure 16:
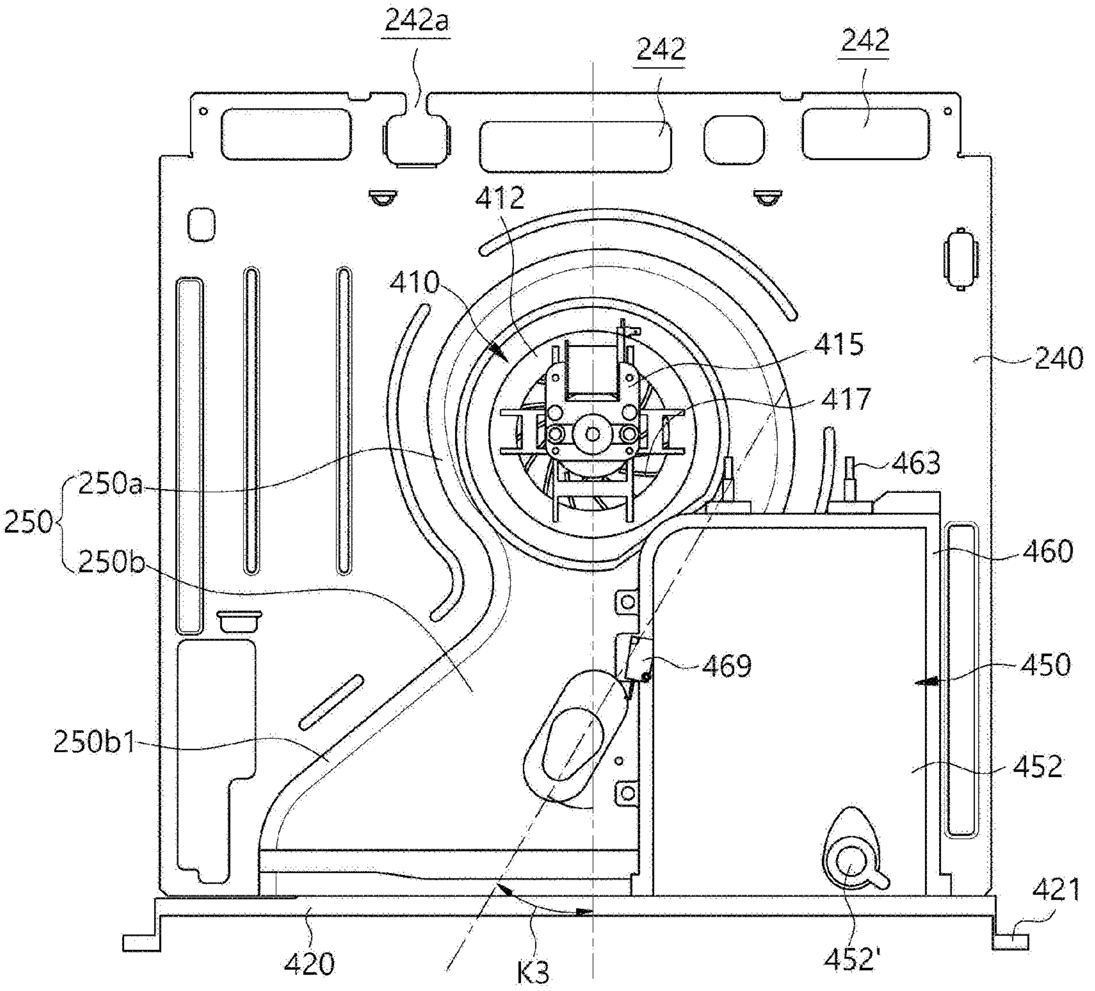
FIG. 16 is a plan view showing a state in which the water tank and a tank housing are mounted to an inside space of the electric chamber of FIG. 15.

Referring to FIGS. 15 and 16, the upper casing 240 will be described. The upper casing 240 may be fixed to an upper surface of the inner casing 100. The upper casing 240 may be disposed between the upper surface of the inner casing 100 and the upper cover 260. An upper surface of the upper casing 240 may serve as a bottom surface of the electric chamber S2.

The connection holes 242 described above may be provided by penetrating the rear portion of the upper casing 240. The connection holes 242 may be one or a plurality of connection holes 242. In addition, a portion of the connection holes 242 may be open rearwards to form a guide opening portion 242*a*. A wire harness (not shown) connected to the external space may be inserted through the guide opening portion 242*a*, and the wire harness may be disposed inside of the connection holes 242.

The upper surface of the upper casing 240 may be understood as a mounting surface. Various components including the cooling fan module 410 and a lighting module 900 may be disposed on the mounting surface. The mounting surface may have a planar structure, and a portion thereof may be shaped in a bent rib to serve a strength reinforcing function.

A tank mounting portion 243 may be formed at one portion of the upper casing 240. The tank mounting portion 243 may be understood as a portion in which the water tank 450 and a tank housing 460, in which the water tank 450 is placed, described hereinafter, are disposed. The tank mounting portion 243 may be formed at a position biased towards a front side (a lower side based on FIG. 15) in a mounting surface of the upper casing 240. In other words, the tank mounting portion 243 may be formed to be biased towards the front side of the cooking appliance.

Further, the tank mounting portion 243 may be formed to be biased from a center portion towards either side in the leftward-rightward width direction of the upper casing 240. In this embodiment, the tank mounting portion 243 is disposed at a right portion of the upper casing 240. On a left portion of the upper casing 240, which is opposite to the tank mounting portion 243, a door locking device 800 described hereinafter, for example, may be disposed.

The tank mounting portion 243 may include a portion of the mounting surface, and an upper surface of a guide duct 250 described hereinafter. The tank housing 460 may be disposed to cover not only a portion of the mounting surface but also a portion of the guide duct 250. As shown in FIG. 16, this view shows tank housing 460 disposed to be overlapped with the guide duct 250.

The guide duct 250 may be provided on the mounting surface. The guide duct 250 may have a structure covering a portion of the mounting surface. The guide duct 250 may form a guide passage between the guide duct 250 and the mounting surface. The guide passage may be understood as the third air flow path AC3 connected to the second air flow path AC2. Air discharged from the cooling fan module 410 may be discharged outwards through the guide passage. Therefore, the guide duct 250 may be understood as a portion of the cooling fan module 410.

As shown in FIG. 15, the guide duct 250 may include a body 250*a*, and a guide 250*b* to which the body 250*a* is connected. The cooling fan module 410 may be installed in the body 250*a*. The guide 250*b* may form the third air flow path AC3 that allows the air discharged from the cooling fan module 410 to be discharged forward of the cooking appliance. Therefore, the third air flow path AC3 may be understood as an air discharge flow path.

The body 250*a* may be disposed on the center portion in a leftward-rightward width direction of the guide duct 250 (leftward-rightward direction based on FIG. As such, the guide duct 250 may allow air flowing along the second air flow path AC2 of the cooking appliance to be evenly suctioned without being biased to either side.

In addition, the body 250*a* may be disposed at a position that is biased to the rear side in a frontward-rearward depth direction (upward-downward direction based on FIG. 15) from the center portion. In other words, the body 250*a* may be disposed at a position closer to the connection holes 242 than the exhaust port 282 of the cooking appliance. When the body 250*a* is disposed close to the connection holes 242, a suctioning of air in the second air flow path AC2 may be stronger. Further, when the body 250*a* is disposed at a rear portion close to the connection holes 242, the guide 250*b* connected from the body 250*a* may be formed sufficiently wider.

The guide 250*b* may be formed with a width gradually increased toward the front side of the cooking appliance (lower side based on FIG. 15). The guide 250*b* may include a first side portion 250*b*1 and a second side portion 250*b*2. The first side portion 250*b*1 and the second side portion 250*b*2 may extend in inclined directions to make a width of the guide 250*b* wider.

The first side portion 250*b*1 may constitute a first side surface of the guide 250*b*. The first side portion 250*b*1 may extend in a direction away from an outlet 256*a* of a discharge space 256 formed in the body 250*a*. In other words, based on FIG. 15, the first side portion 250*b*1 may extend downward and leftwards.

In addition, the second side portion 250*b*2 may constitute a second side surface of the guide 250*b*. The second side portion 250*b*2 may extend in a direction in which a width between the second side portion 250*b*2 and the first side portion 250*b*1 is gradually wider.

When an angle between an imaginary extension line passing through the center portion of the cooling fan module 410 and an extension line extending along the first side portion 250*b*1 is referred to as K1, and an angle between the imaginary extension line passing through the center portion of the cooling fan module 410 and an extension line extending along the second side portion 250*b*2 is referred to as K2, K1 may be greater than K2 (K1>K2). A cooling fan of the cooling fan module 410 discharges air while being rotated clockwise, so that the discharged air tends to flow while being biased to the first side portion 250*b*1. Reflecting this tendency, there may be the third air flow path AC3 in which an inclination angle the first side portion 250*b*1 is relatively gentler than an inclination angle of the second side portion 250*b*2.

A recessed portion 253 may be formed between the body 250*a* and the second side portion 250*b*2. The recessed portion 253 may reduce a width of a connection part portion the body 250*a* and the second side portion 250*b*2. The recessed portion 253 may provide a kind of inclined structure, and this inclined structure may allow the air discharged from the cooling fan module 410 to be guided in a direction of the first side portion 250*b*1.

A fan coupling portion 254 may be formed in the body 250*a*. The fan coupling portion 254 is a kind of empty space, and the cooling fan module 410 may be disposed therein. A fan body 412 of the cooling fan module 410 described hereinafter may be fixed to the fan coupling portion 254. Air flowing into the electric chamber S2 through the connection holes 242 may be suctioned into the cooling fan module 410 through a hole of the fan body 412 disposed in the fan coupling portion 254.

In this embodiment, the fan coupling portion 254 may be formed in a position spaced apart from the center portion of the body 250*a*. The fan coupling portion 254 may be provided eccentrically from the center portion of the body 250*a* toward one side. More specifically, based on FIG. 15, the fan coupling portion 254 may be disposed to be biased leftwards and rightwards or laterally from the center portion of the body 250*a*. Based on the FIG. 15, in other words, the fan coupling portion 254 may be understood to be disposed to be biased leftwards from the center portion of the body 250*a* and forward toward the door. When a rotational direction of a fan blade 417 of the cooling fan module 410 is counterclockwise, the fan coupling portion 254 may be disposed at the right side of the center portion of the body 250*a*, not the left side thereof.

As described above, when the fan coupling portion 254 is spaced apart from the center portion of the body 250*a*, the predetermined discharge space 256 may be formed between the right side of the cooling fan module 410 and an inner wall of the body 250*a*. Based on FIG. 15, the predetermined discharge space 256 may be formed at the right side of the fan coupling portion 254. This space may provide a clearance in which air discharged from the cooling fan module 410 flows to some degree without directly hitting with the inner wall of the body 250*a*.

The discharge space 256 may be gradually wider toward the outlet 256*a* of the discharge space 256. As shown in FIG. 15, as the fan coupling portion 254 is spaced apart from the center portion of the body 250*a*, the width of the discharge space 256 is wider toward the outlet. As such, the air suctioned through the cooling fan module 410 is compressed at a small entrance of the discharge space 256, and then gradually expands along the inner wall of the body 250*a* to be discharged through the outlet 256*a* of the discharge space 256. In addition, a discharge direction of the air discharged through the outlet 256*a* of the discharge space 256 may be parallel to an inclined direction of the fan coupling portion 254.

A lighting coupling portion 255 may be formed in the upper casing 240. The lighting module 900 may be disposed in the lighting coupling portion 255. The lighting coupling portion 255 may penetrate the upper casing 240 to be open toward the cavity S1. In this embodiment, the lighting coupling portion 255 may extend toward the guide duct 250. In other words, the lighting coupling portion 255 may be formed by penetrating the guide duct 250 and the upper casing 240 sequentially.

The lighting coupling portion 255 may be disposed at the guide 250*b* of the guide duct 250. More specifically, the lighting coupling portion 255 may be disposed on an imaginary extension line passing through the center portion of the cooling fan module 410. In other words, it may be understood that both the cooling fan module 410 and the lighting module 900 is disposed on the center portion in the leftward-rightward width direction of the upper casing 240, and as a result, are disposed on the center portion in the leftward-rightward width direction of the cooking appliance.

As shown in FIG. 1, the lighting coupling portion 255 may be disposed obliquely to have a predetermined angle with respect to the imaginary extension line passing through the center portion of the cooling fan module 410. An angle between the imaginary extension line passing through the center portion of the cooling fan module 410 and an imaginary extension line extending in a longitudinal direction of the lighting coupling portion 255 may be referred to as K3. As described above, when the lighting coupling portion 255 is disposed obliquely, resistance generated when air discharged along the guide duct 250 passes through the left and right sides of the lighting module 900 may be reduced.

More specifically, a lighting guide 910 disposed in the lighting coupling portion 255 may be disposed to be inclined in the rotational direction (clockwise direction based on FIG. 16) of the fan blade 417 based on a center line of the cooling fan module 410, the center line extending in the frontward-rearward direction. This structure will be described again hereinafter.

As shown in FIG. 8, the outer casing 200 may include the side cover 270. The side cover 270 may include a pair of side covers. The pair of side covers 270 may cover left and right surfaces of the inner casing 100. Each of the side covers 270 may have an approximate flat plate structure.

Each of the side covers 270 may have side through hole 272. The side through hole 272 may be formed by penetrating each side cover 270. External air may flow into the cooking appliance through the side through hole 272.

The side through hole 272 may be formed in an upper portion of each side cover 270. The side through hole 272 may be formed in the upper portion of each side cover 270 constituting the electric chamber S2. Accordingly, the side through hole 272 may allow the external air to be supplied to the electric chamber S2.

The side through hole 272 may be formed at a position close to a front portion in the upper portion of each side cover 270. In other words, the side through hole 272 may be formed on a position close to the exhaust port 282 of the front frame 280. When the side through hole 272 is formed close to the front portion of each side cover 270, the cooling fan module 410 may be located far away from the passage through which air of the second air flow path AC2 is suctioned. However, when the side through hole 272 is formed close to a rear portion of each side cover 270, air flowing through the side through hole 272 may also be suctioned by the cooling fan module 410. Accordingly, a suctioning force for the cooling fan module 410 to suction the air of the second air flow path AC2 may be reduced.

In this embodiment, the side through hole 272 may be open toward the tank mounting portion 243 of the upper casing 240. Then, the external air flowing inwards through the side through hole 272 may cool the water tank 450, and eventually, may lower a temperature of water stored in the water tank 450.

Further, the side through hole 272 formed in either of the two side covers 270 may be open toward a main panel unit 700. The entire or a portion of the side through hole 272 may be formed to face the main panel unit 700. The main panel unit 700 may emit a lot of heat with mounted elements, and the external air flowing inwards through the side through hole 272 may efficiently cool the main panel unit 700.

A side coupling portion 273 may be provided on an edge of each side cover 270. The side coupling portion 273 may couple each side cover 270 to other components, such as the bottom casing 210, the upper casing 240, and the front frame 280, or example. The side coupling portion 273 may be coupled to other components with a fastener, such as a screw, or may be coupled to other components in a welding manner. In this embodiment, a lower side coupling portion 273 of a plurality of side coupling portions 273 may be fixed to the door hinge H with the fastener.

A side spacer 275 may be formed in each side cover 270. The side spacer 275 may protrude outwards from each side cover 270. The side spacer 275 may space the side covers 270 and the side surface 5 of the kitchen system 1 from each other. Accordingly, the external air may flow inwards through the side gap G2 (FIGS. 6 and 10) formed by the side spacer 275, and may be supplied to the electric chamber S2 through the side through hole 272. Therefore, the side gap G2 may be understood as a side intake port G2. The side intake port G2 may serve as an intake port of the cooking appliance together with the lower intake port G1.

Next, as shown in FIG. 8, the front frame 280 may be shaped in an approximate square frame. The front frame 280 may be disposed at a front of the inner casing 100. The front frame 280 may be open at a center portion thereof to prevent the cavity S1 from being covered. The front frame 280 may be understood as a front casing.

The front frame 280 may protrude upward higher than the inner casing 100. The portion protruding upward may form a portion of the electric chamber S2. An upper portion of the front frame 280 may constitute the electric chamber S2 together with the rear cover 230, the upper casing 240, the upper cover 260, and the side covers 270.

Figure 17:
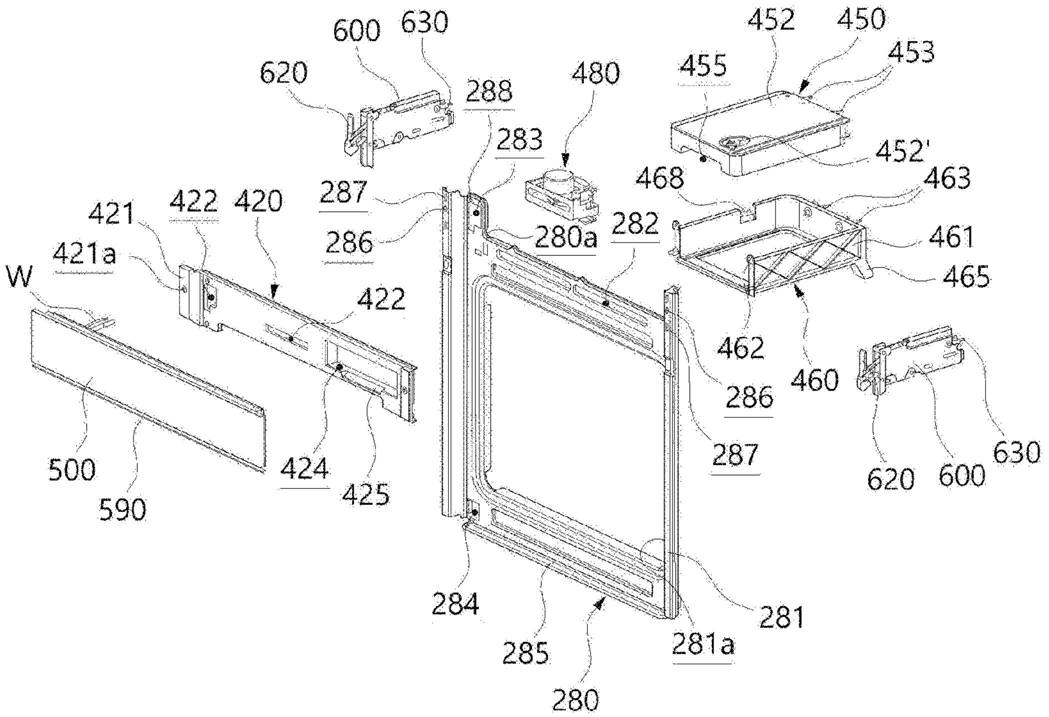
FIG. 17 is an exploded-perspective view showing a front surface of a casing according to an embodiment.
Figure 18:
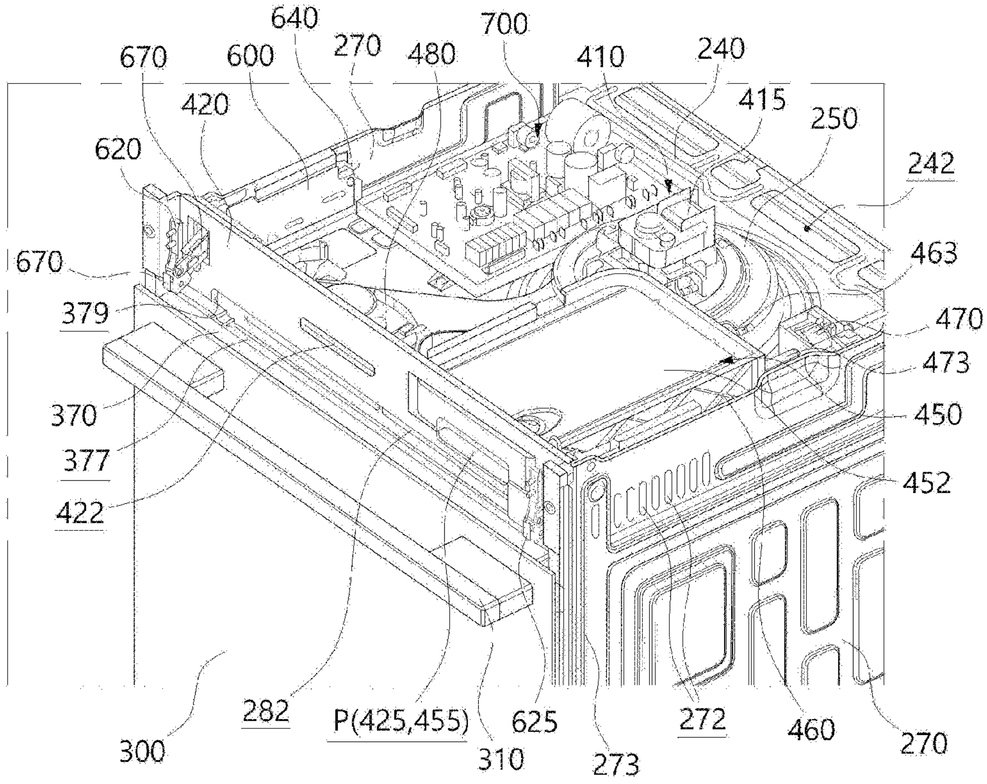
FIG. 18 is a perspective view showing the inside space of the electric chamber without the upper cover according to an embodiment.

In this embodiment, opposite ends of the front frame 280 protrude upward, but a portion between the opposite ends may be formed to have a relatively low height. In other words, an upper center portion of the front frame 280 may have a partially omitted structure, and may have a cut-out portion 280*a* (FIGS. 8 and 17). As described above, the cut-out portion 280*a* shaped to be depressed from the upper portion of the front frame 280 may be covered by the front housing 420 described hereinafter. As shown in FIG. 18, the front housing 420 is disposed at a front of the front frame 280, so that the cut-out portion 280*a* of the front frame 280 is covered.

A pair of coupling posts 280*b* relatively protruding upward may be provided at opposite ends of the cut-out portion 280*a*. Opposite ends of the front housing 420 may be respectively coupled to the coupling posts 280*b*. More specifically, a pair of panel fixing portions 421 provided at the opposite ends of the front housing 420 may be respectively coupled to the pair of coupling posts 280*b*.

The front frame 280 may be made of a metal material, for example. In addition, the front frame 280 may be coated with glassiness ceramics, for example. In other words, a surface of the front frame 280 may be formed in a vitreous enamel method. For reference, in FIG. 8, reference numeral 180 indicates a casing holder, and the casing holder 180 may serve to fix the inner casing 100 and the front frame 280 using a vitreous enamel method during vitreous enamel manufacturing of the inner casing 100 and the front frame 280. Further, the casing holder 180 may serve as a connector when the inner casing 100 and the rear casing 220 are assembled to each other.

However, when the surface of the front frame 280 is formed in the vitreous enamel method, the front frame 280 may be twisted due to a hot manufacturing method. When the front frame 280 is twisted, an assembly error may occur in a portion where the front frame and other components are coupled to each other. More specifically, in this embodiment, a hinge module 600 that is an operated component, and an opening device 480 are disposed at the upper portion of the front frame 280, so it is necessary to suppress deformation of the front frame 280 as much as possible. In order to prevent this problem, in this embodiment, the cut-out portion 280*a* may be formed at the upper center portion of the front frame 280. The cut-out portion 280*a* omitted as described above may be free from deformation of the front frame 280.

As described above, the relatively protruding coupling posts 280*b* may be respectively provided at opposite sides of the cut-out portion 280*a* of the front frame 280. The coupling posts 280*b* may be respectively coupled to the hinge module 600. The hinge module 600 may be connected to the panel unit 500 to load weight generated when the panel unit 500 is rotated. Accordingly, as the front frame 280 is made of a metal material, even when a large weight is loaded to the hinge module 600, the front frame 280 may firmly support the hinge module 600.

As another example, the front housing 420 may be formed to be integrated with the front frame 280, not a separate object. Further, the cut-out portion 280*a* formed by omitting a portion of the upper center portion of the front frame 280 is not provided, and the entire upper end of the front frame 280 may have a same height. A structure of the front housing 420 will be described hereinafter.

As shown in FIG. 17, the front frame 280 and components directly or indirectly connected to the front frame 280 are shown while disassembled. Indirect connection of components means that the components are not directly fixed to the front frame 280, but a portion of each component passes through the front frame 280.

A frame of the front frame 280 may include a frame body 281 of an approximate square frame shape. An edge of the frame body 281 may be directly fixed to the inner casing 100. In addition, a lower end of the front frame 280 may be fixed to the bottom casing 210 described above. Further, opposite ends of the frame body 281 may be respectively coupled to the side covers 270. As described above, a plurality of components may be connected to each other through the frame body 281.

A frame through portion 281*a* may be formed at a center portion of the frame body 281. The frame through portion 281*a* may be a portion through which the cavity S1 is exposed. A size and a shape of the frame through portion 281*a* may be variously deformed in response to the cavity S1.

The exhaust port 282 may be formed in the front frame 280. The exhaust port 282 may be formed by penetrating an upper portion of the front frame 280 in the frontward-rearward direction. The exhaust port 282 may serve as an outlet through which air discharged through the guide duct 250 may be discharged outwards from the cooking appliance. The exhaust port 282 may extend lengthwise in the leftward-rightward direction at the upper portion of the front frame 280. The exhaust port 282 may be composed of one or a plurality of exhaust ports.

The exhaust port 282 may be open toward a gap between the door 300 and the panel unit 500. Accordingly, air discharged through the exhaust port 282 may be discharged forward through the space between the door 300 and the panel unit 500. The exhaust port 282 is usually covered by the panel unit 500, so the exhaust port 282 does not hurt the aesthetics of the cooking appliance. More specifically, the panel unit 500 may include an air guide 590 described hereinafter and may make the exhaust port 282 more invisible from a user's field of view. This structure will be described again hereinafter.

Figure 20:
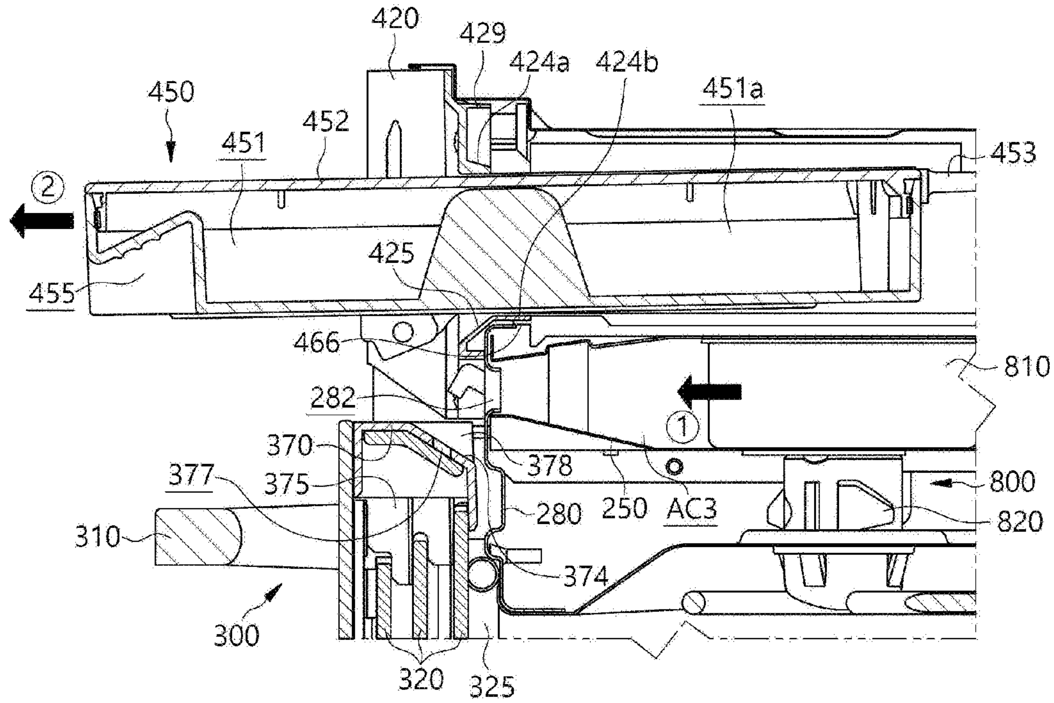
FIG. 20 is a cross-sectional view, taken along line XX-XX' in FIG. 5.

For reference, FIG. 20 shows a direction in which air is discharged forward along the third air flow path AC3 formed in the guide duct 250 with arrow ①. The air may be moved forward and be discharged through the exhaust port 282. An upper end of the door 300 may be disposed at a lower portion of the exhaust port 282, and the water tank 450 may be disposed at an upper portion of lower portion of the exhaust port 282.

As shown in FIG. 17, the front frame 280 and components directly or indirectly connected to the front frame 280 are shown while being disassembled. An upper hinge hole 283 may be formed in the upper portion of the front frame 280. The upper hinge hole 283 is a portion formed by penetrating each of the coupling post 280*b* of the front frame 280, and a drive arm 820 that is a part of the hinge module 600 may protrudes forward through the upper hinge hole 283. In this embodiment, the upper hinge hole 283 is formed in each of the pair of coupling posts 280*b*. More specifically, the upper hinge hole 283 may be formed at a position higher than the exhaust port 282.

A lower hinge hole 284 may be formed in a lower portion of the front frame 280. The lower hinge hole 284 is a portion formed by penetrating a part portion of the front frame 280, and a portion of the door hinge H may protrude forward through the lower hinge hole 284. In this embodiment, the lower hinge hole 284 is formed in each of opposite portions of a lower end of the front frame 280. The door hinge H connected to a lower end of the door 300 through the lower hinge hole 284 may allow the door 300 to be rotated in a pull-down method in which an upper end is rotated vertically on a lower end.

The lower end placing portion 285 may be provided at the lower portion of the front frame 280. The lower end placing portion 285 may be shaped to be bent from the lower portion of the front frame 280. Referring to FIG. 9, the lower end placing portion 285 may be placed on the upper portion of the bottom casing 210.

Referring to FIG. 17, each of the coupling posts 280*b* provided at the upper portion of the front frame 280 may have a frame coupling hole 286 and a frame hanging hole 287. The frame coupling hole 286 may be understood as a penetrated hole so as to be fixed with a fastener (not shown) when the front housing 420 is coupled to the front frame 280. The fastener may pass through both a panel fixing hole 421*a* of the front housing 420 and the frame coupling hole 286 to assemble the front housing 420 and the front frame 280 to each other.

The frame hanging hole 287 may be a hole that temporarily fixes the front housing 420 before the fastener is tightened in the frame coupling hole 286. A hanging hook 421*b* (referring to FIG. 22) of the front housing 420 is inserted into the frame hanging hole 287, so that the front housing 420 is temporarily fixed to the front frame 280. In this embodiment, a pair of frame hanging holes 287 is disposed at opposite portions with the coupling hole 286 as the center.

A first hinge assembly hole 288 may be formed in the front frame 280. The first hinge assembly hole 288 serves to fix the hinge module 600 to the front frame 280. The first hinge assembly hole 288 may be formed at a surround portion of the upper hinge hole 283. In this embodiment, the first hinge assembly hole 288 is disposed at each of an upper portion and a lower portion of the upper hinge hole 283. On the other hand, the first hinge assembly hole 288 may be composed of one first hinge assembly hole.

A second hinge assembly hole 427 (referring to FIG. 25) of the front housing 420 described hereinafter may be sequentially formed in front of the first hinge assembly hole 288. Therefore, a hinge fastener B3 (referring to FIG. 51) inserted into the second hinge assembly hole 427 may pass through the second hinge assembly hole 427 and the first hinge assembly hole 288, and may be tightened to a housing assembly hole 613 of the hinge module 600 disposed in rear of the front frame 280.

Figure 51:
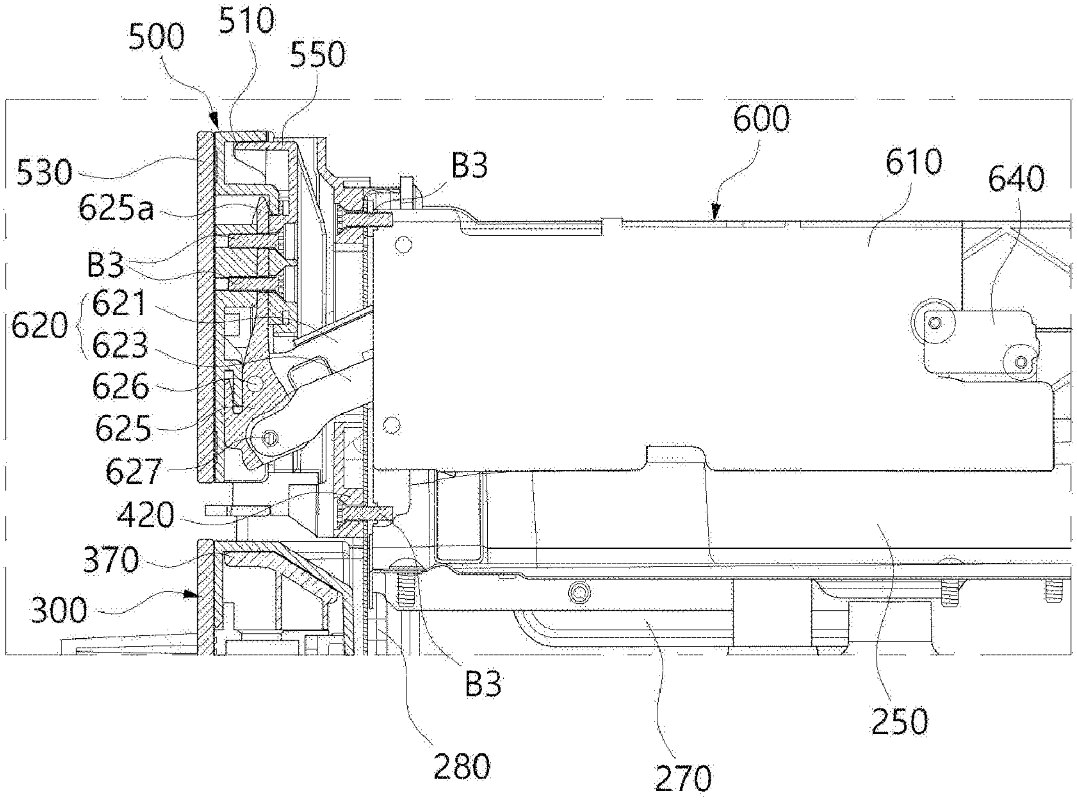
FIG. 51 is a cross-sectional view, taken along line LI-LI' in FIG. 2.

Therefore, the front housing 420, the front frame 280, and the hinge module 600 may be assembled to each other with one fastener. FIG. 51 is a view showing the hinge fastener B3 passing through the front housing 420 and the front frame 280 and then assembled to the hinge module 600.

The door 300 may be provided in front of the front frame 280. The door 300 may serve to open and close the cavity S1. The door hinge H may be connected to a lower portion of the door 300, so that the door 300 may be rotated. In this embodiment, the door hinge H is composed of a pair of door hinges H, and the pair of the door hinges may be connected to opposite sides on a lower end of the door 300. The door 300 may open and close the cavity S1 in the pull-down method in which the upper end is vertically rotated on the lower end.

The door 300 may be shaped as a hexahedron entirely having a predetermined thickness. In addition, a window may be applied to at least a portion of the door 300 through which the cavity S1 may be viewed. The window may necessarily be formed to withstand high temperature and high pressure, and may need functions, such as waterproofing, and dissipation, for example.

Reference numeral 310 indicates a handle. The handle 310 may serve to open and close the door 300. The handle 310 may be disposed at an upper front surface of the door 300.

In this embodiment, the door 300 may include a plurality of boards 320. The plurality of boards 320 may be made of a transparent or translucent glass or plastic material, for example. The plurality of boards 320 may be stacked with each other at predetermined intervals to form one door 300. For example, the door 300 may include a front board disposed at a foremost side, a rear board disposed at a rearmost side, and one or a plurality of inner boards disposed between the front board and the rear board.

As shown in FIG. 20, this view shows the plurality of boards 320 constituting the door 300. The boards 320 may be stacked with each other forward and rearwards. The front board disposed at the foremost side to form the front surface of the door 300 may be, for example, coated or applied with a film to have a different color to the boards 320. Reference numeral 325 is a door gasket attached to a rear surface of the door 300, and the door gasket 325 may serve to seal a gap between the door 300 and the front frame 280.

The front board 320 may have a larger area than areas of the other boards 320 disposed at a rear of the front board. Therefore, the user in front of the cooking appliance may only observe the front board 320 of the door 300. In addition, the remaining boards 320 disposed at the rear of the front board 320 and the door frame 370 may be hidden from the user's view. Then, the aesthetic of the door 300 may be enhanced.

When the front board 320 has a relatively larger area, a step occurs between the front board and the remaining boards 320. The door frame 370 may be coupled to the step. In other words, the step may be filled with the door frame 370.

A frame of the door 300 may be formed by door frame 370. The door frame 370 may form an external appearance of upper, lower, and side surfaces of the door 300. The door frame 370 may be shaped as a hexahedron having open front and rear surfaces. In other words, the door frame 370 may be shaped as a kind of square frame. The door hinges H may be connected to the door frame 370.

As shown in FIG. 20, a spacer 375 provided at the door frame 370 may be inserted into the plurality of boards 320. The spacer 375 may maintain a distance between the plurality of the boards 320.

Figure 21:
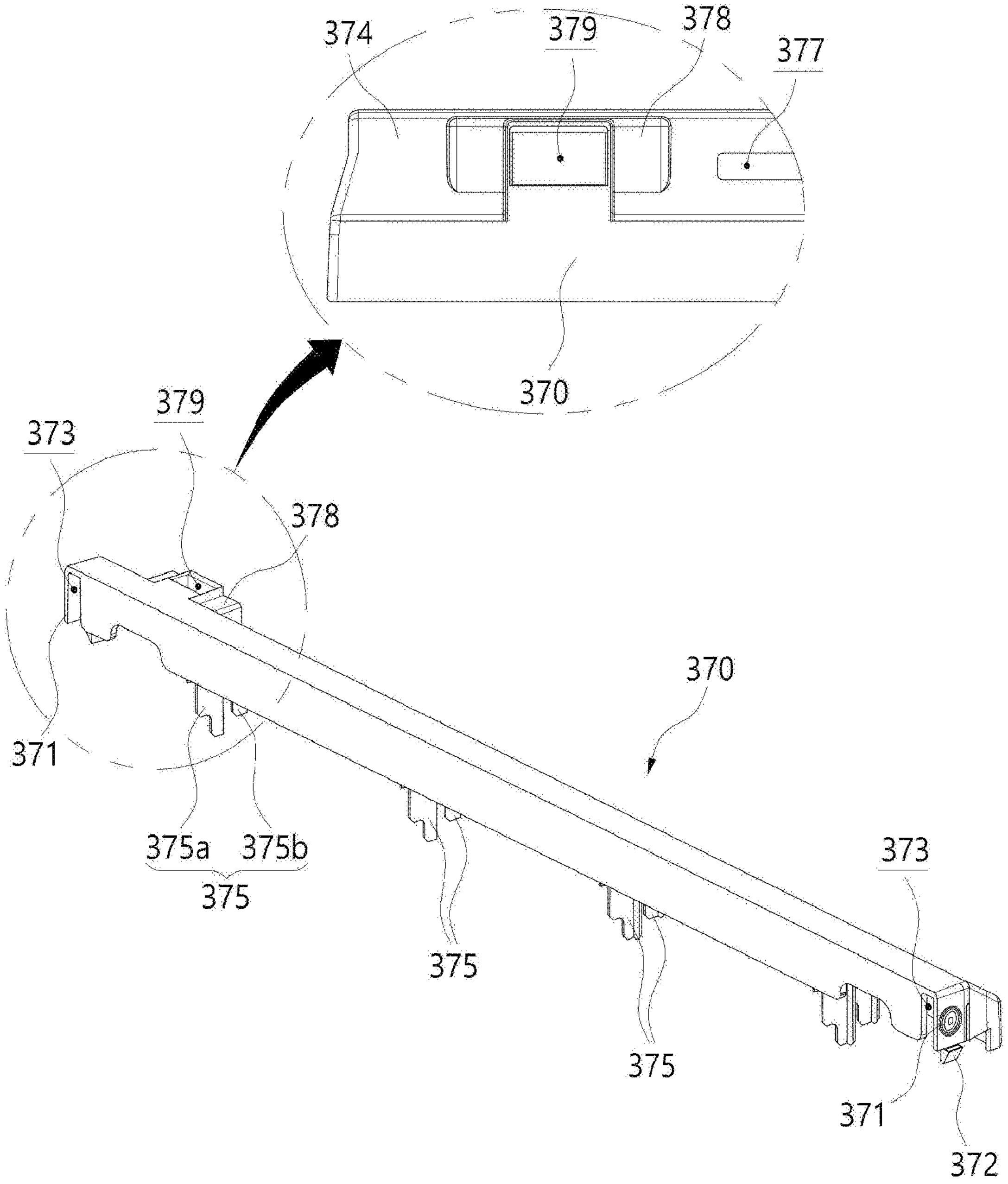
FIG. 21 is a perspective view of a door frame according to an embodiment.

FIG. 21 shows the door frame 370 forming an upper surface of the door 300. The door frame 370 may be shaped as a bar extending lengthwise in one direction. The door frame 370 may be composed of a plurality of door frames, and the plurality of door frames may be assembled to each other. For example, door frames 370 forming side surfaces of the door 300 may be coupled to opposite ends of the door frame 370 forming an upper surface of the door 300, as shown in FIG. 21, and a door frame 370 forming a lower surface of the door 300 may be coupled to the side door frames 370.

Frame coupling portions 371 may be respectively provided at the opposite ends of the door frame 370 to couple the upper door frame to other door frames 370 constituting the door frame 370. Each of the frame coupling portions 371 may have an approximate flat plate structure. In addition, coupling hook portions 372 may be provided at lower ends of the frame coupling portions 371. The coupling hook portions 372 may be elastically fastened to other door frames 370. Elastic slits 373 are respectively open inside the coupling hook portions 372, thereby providing spaces in which the coupling hook portions 372 may be elastically deformed.

A plurality of spacers 375 may be provided in the door frame 370. As described above, the plurality of spacers 375 may be inserted into gaps between the plurality of boards 320 to maintain distances between the boards 320. Further, the spacers 375 may help the door 300 and the door frame 370 to be stably coupled to each other.

The plurality of spacers 375 may include first spacer 375*a* disposed at a front portion thereof and second spacer 375*b* disposed at a rear portion thereof. Among the plurality of boards 320, the first spacer 375*a* may be fitted into a gap between the front board and the inner boards disposed at the rear of the front board, and the second spacer 375*b* may be fitted into a gap between the rear board and the inner board disposed at the front of the rear board.

An end of the first spacer 375*a* and an end of the second spacer 375*b* may form a step therebetween with different protruding lengths. This step may serve to correct a height difference formed as the plurality of the boards 320 is formed to have different areas. This is shown in FIG. 20.

Referring to FIGS. 18 and 21, a door exhaust port 377 may be provided in the door frame 370. The door exhaust port 377 may form a passage that allows an inside space of the door 300 to open to the external space of the door 300 may be formed on the upper end of the door 300. The door exhaust port 377 may be formed by penetrating the upper end of the door frame 370 in the upward-downward direction. Air flowing upward while cooling the door 300 inside of the door 300 may be discharged upward through the door exhaust port 377 and then be discharged forward. For reference, the air cooling the door 300 may flow between the plurality of boards 320 constituting the door 300.

Referring to FIG. 21 again, the door frame 370 may include a locking body 378. The locking body 378 may operate the door locking device 800 so as to maintain a closed state of the door 300. The locking body 378 may protrude rearwards from the door frame 370. The locking body 378 may be shaped as an approximate hexahedron shape. The locking body 378 may be disposed to be biased to either of the opposite of the door frame 370. In this embodiment, the locking body 378 is formed in the door frame 370, but as another example, the locking body 378 may directly be provided on the door 300, not on the door frame 370.

The locking body 378 may be disposed on an inclined surface 374 formed on an upper portion of the door frame 370. The upper portion of the door frame 370 may be formed to be inclined downward toward the casing 100, 200, and the inclined portion may form the inclined surface 374. In addition, the locking body 378 may be disposed at the inclined surface 374. Further, an upper entrance of the door exhaust port 377 may be open.

The inclined surface 374 may form a kind of recessed space between the door 300 and the front frame 280. The locking body 378 may protrude upward from the recessed space, and may fill the recessed space. In addition, when this recessed space is formed between the door 300 and the front frame 280, when latch 850 is rotated, the latch 850 may be prevented from being interfering with a rear surface of the door 300.

A fixing hole 379 with an open upper portion may be formed in the locking body 378. The latch 850 of the door locking device 800 which will be described hereinafter may be inserted into the fixing hole 379. When the latch 850 is inserted into the fixing hole 379, the latch 850 catches the door 300 to prevent the door 300 from being opened arbitrarily.

An entrance of the fixing hole 379 may be located higher than an upper end of a pushing surface 378*a*. Accordingly, a rotational angle at which the latch 850 is caught by the fixing hole 379 may be reduced. Further, a state in which the latch 850 is caught by the relatively protruding entrance of the fixing hole 379 may be stably maintained.

Figure 79:
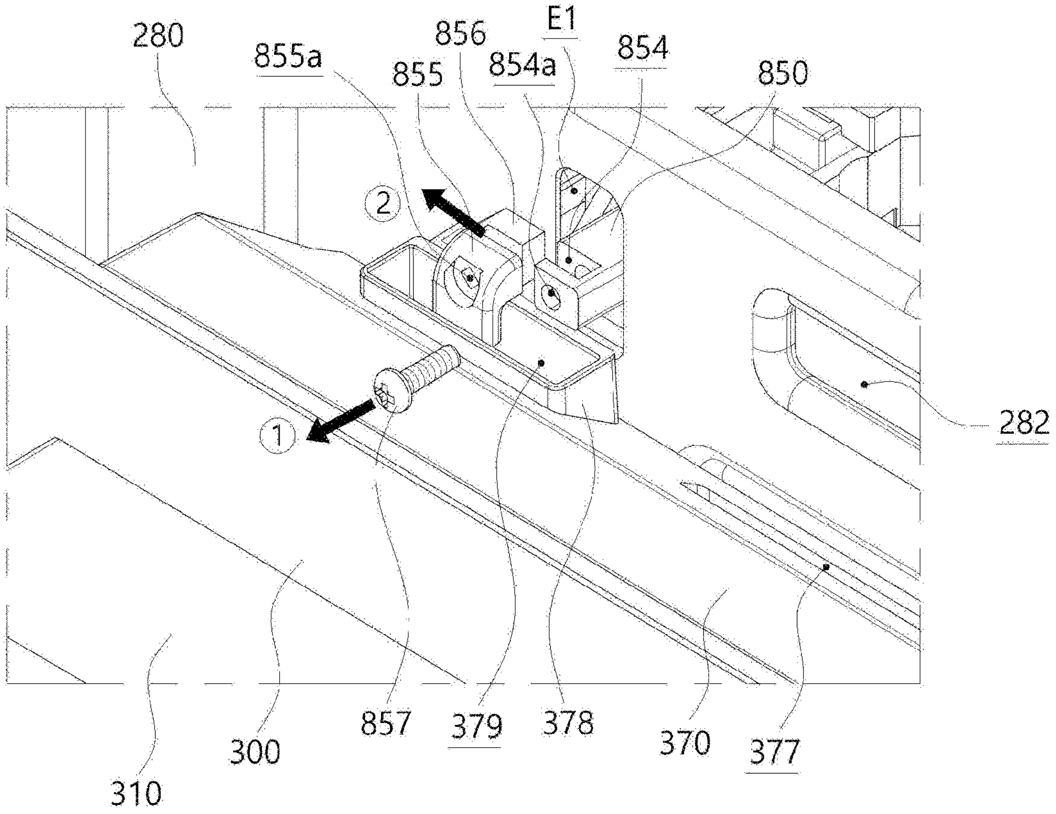
FIG. 79 is a perspective view showing a state in which the locking head of the door locking device according to an embodiment is separated to result emergency cancellation.

As shown in an enlarged view of FIG. 21, the fixing hole 379 may extend lengthwise leftwards and rightwards. A leftward-rightward length of the fixing hole 379 may be larger than a leftward-rightward length of the latch 850. Accordingly, a locking head 855 coupled to an end of the latch 850 may be separated from the latch 850 and then may be moved leftwards rightwards along the fixing hole 379. On the other hand, the fixing hole 379 is a portion to which the latch 850 is caught, and at the same time, may be a passage through which the locking head 855 is moved after being separated. FIG. 79 is a view showing the locking head 855 separated from the latch 850 and then is moved leftwards along the fixing hole 379.

Figure 68:
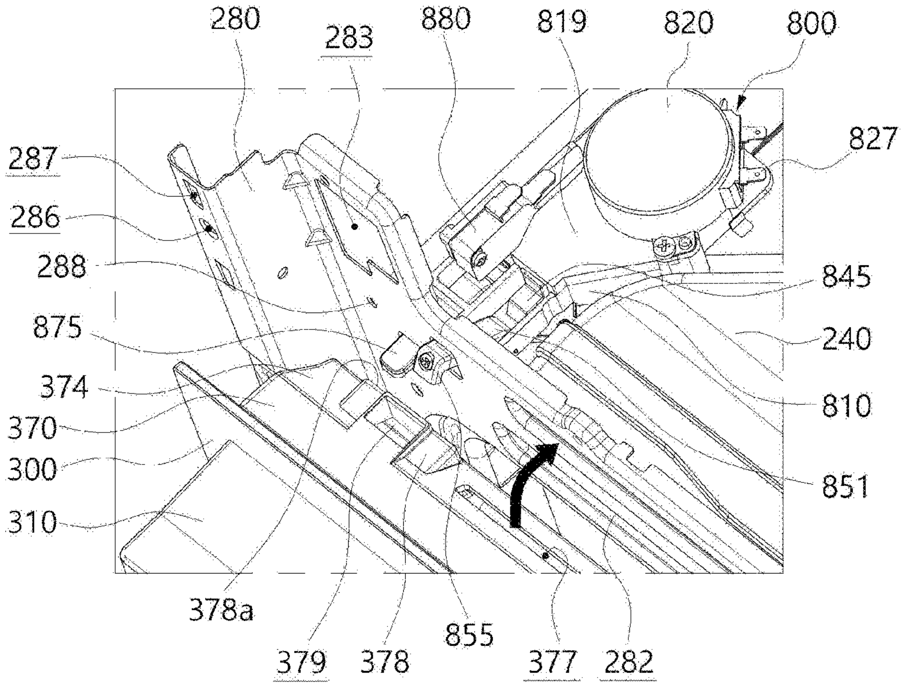
FIG. 68 is a perspective view showing a spaced state of a door according to an embodiment spaced apart from a front surface of the casing.

Referring to FIG. 68, the fixing hole 379 may be open upward at a center portion of the locking body 378, and the planar pushing surface 378*a* may be formed on a left or right side of the fixing hole 379 in the locking body 378. The pushing surface 378*a* interferes with a closing button 870, and the pushing surface may be a surface pushing the closing button 870. The entrance of the fixing hole 379 may have a same height as an upper surface of the door frame 370. Accordingly, the door 300 may provide the unified aesthetic for the user.

In this embodiment, the pushing surface 378*a* may be formed symmetrically at opposite sides with the fixing hole 379 as the center. Referring to FIG. 68, left pushing surface 378*a* actually pushes the closing button 870, and as such, when the pushing surface 378*a* has a symmetric structure, the aesthetic may be increased, and a strength of the locking body 378 may be prevented from being weakened by the fixing hole 379.

In addition, when the door 300 is closed, the pushing surface 378*a* may form a flat surface that extends parallel to a front surface of the casing 100, 200, more specifically, to a front surface of the front frame 280. Then, as the front surface of the front frame 280 and the pushing surface 378*a* are in close contact with each other, a unified aesthetic may be provided.

The cooling fan module 410 may suction air of the second air flow path AC2 and discharge the air into the third air flow path AC3 formed in the guide duct 250. Further, the cooling fan module 410 may suction air flowing through the air in-outflow portion 265 of the upper cover 260 and discharge the air into the third air flow path AC3 formed in the guide duct 250. In other words, after the cooling fan module 410 suctions external air through the plurality of passages, the cooling fan module 410 may discharge the air forward along the guide duct 250.

The cooling fan module 410 may be disposed at the guide duct 250. More specifically, as shown in FIG. 15, the fan body 412 of the cooling fan module 410 may be fixed to the fan coupling portion 254 of the guide duct 250. The fan body 412 may be shaped as an approximate circular frame. The fan body 412 has a plurality of holes, through which air flowing from the second air flow path AC2 into the electric chamber S2 is suctioned.

The cooling fan module 410 may include a fan motor 415. The fan motor 415 may be supplied with power from the main panel unit 700 to generate a rotational force. The fan blade 417 may be connected to the fan motor 415. The fan blade 417 may suction and discharge air through rotation. The fan blade 417 may have a centrifugal fan shape, such as a blower fan or a sirocco fan, that is a multi-blade fan. This is just one example, and the fan blade 417 may have various types of fan structure that configured to suction and discharge air.

The front housing 420 disposed in front of the front frame 280 will be described hereinafter. The front housing 420 may be located between a rear surface of the panel unit 500 and the front frame 280 when the panel unit 500 is closed. The front housing 420 may enhance the aesthetic by covering the upper portion of the front frame 280, and a cam protruding port 422, that is, an entrance through which a cam 485 of the opening device 480 described hereinafter protrudes, and the entrance 424 of the tank chamber 450*a* through which the water tank 450 is drawn in/out may be respectively formed in the front housing 420.

The front housing 420 may be made of a synthetic resin material, for example. In this way, the front housing 420 may be more easily formed with a shape more complex than a front housing made of a metal material. The complex shape is implemented in the front housing 420, and the front housing 420 is assembled to the front frame 280, thereby forming a front surface of the cooking appliance. Unlike this embodiment, the front housing 420 may be integrally formed in the upper portion of the front frame 280.

As shown in FIG. 17, the front housing 420 may have a thin flat plate structure. The front housing 420 may be disposed in front of the upper portion of the front frame 280. More specifically, the front housing 420 may cover the cut-out portion 280*a* of the front frame 280. As shown in FIG. 18, this view shows the upper portion of the front frame 280 covered with the front housing 420.

Referring to FIGS. 22 to 27, structure of the front housing 420 will be described hereinafter. The panel fixing portions 421 may be provided at opposite ends of the front housing 420. The panel fixing portions 421 may constitute partially the opposite ends of the front housing 420, and may be respectively coupled to the opposite ends of the upper portion of the front frame 280.

The panel fixing portions 421 may protrude further forward than the center portion of the front housing 420. The panel fixing portions 421 may have structures in which steps are formed at the opposite ends of the front housing 420, so that the panel fixing portions 421 may protrude forward. A gap between the pair of panel fixing portions 421 protruding as described above may be shaped to be recessed relatively rearwards.

When the panel unit 500 is located in a first position, a main housing 510 of the panel unit 500 may be disposed in the relatively recessed portion between the pair of panel fixing portions 421. In addition, opposite ends of a control panel 530 constituting a front surface of the panel unit 500 may be disposed in front of the pair of panel fixing portions 421, respectively. Then, as shown in FIG. 2, when the panel unit 500 is closed, only the control panel 530 of the panel unit 500 may be exposed to an upper front surface of the cooking appliance. At the same time, the main housing 510 of the panel unit 500 may be covered with the upper surface 4 of the cooking appliance between the pair of panel fixing portions 421 in rear of the main housing 510. Close contact between the panel unit 500 and the front housing 420 may provide a unified aesthetic for the cooking appliance.

The panel fixing portions 421 may have the panel fixing hole 421*a* so as to fix the panel fixing portions 421 to the front frame 280. The panel fixing hole 421*a* may correspond to the coupling hole 286 of the front frame 280. When a fastener passes through the panel fixing hole 421*a* and the coupling hole 286 of the front frame 280 in order to be tightened, each panel fixing portion 421 may be fixed to the front frame 280.

Figure 22:
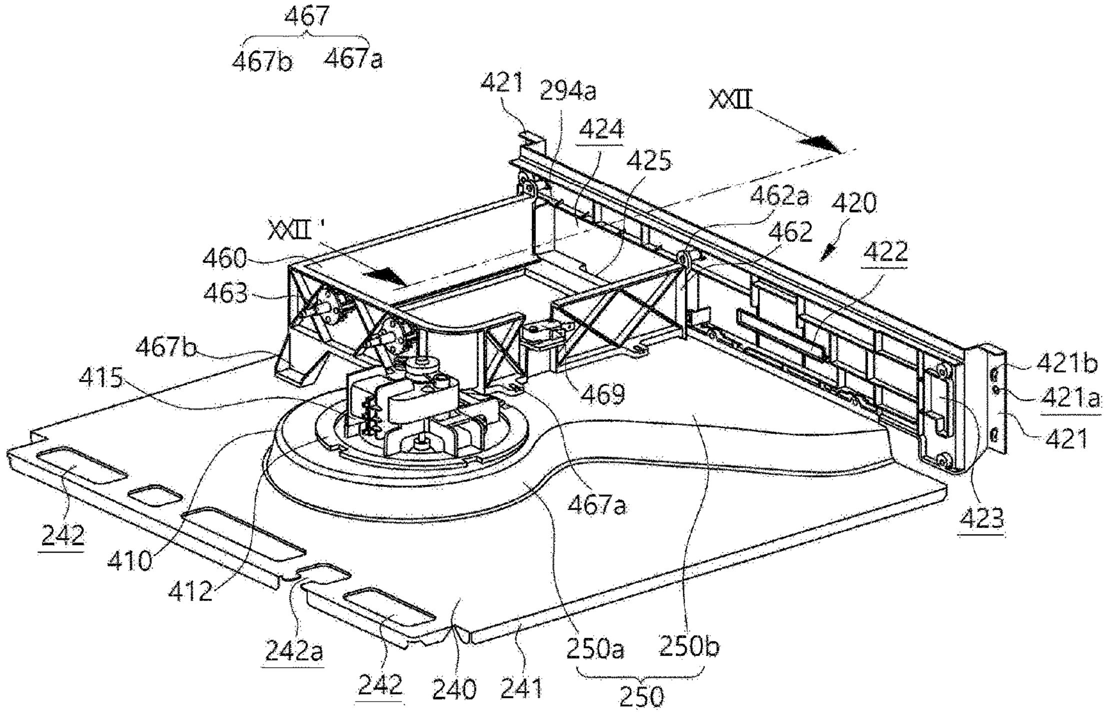
FIG. 22 is a perspective view showing a coupled state of an upper casing, a front housing, and a tank housing according to an embodiment.
Figure 23:
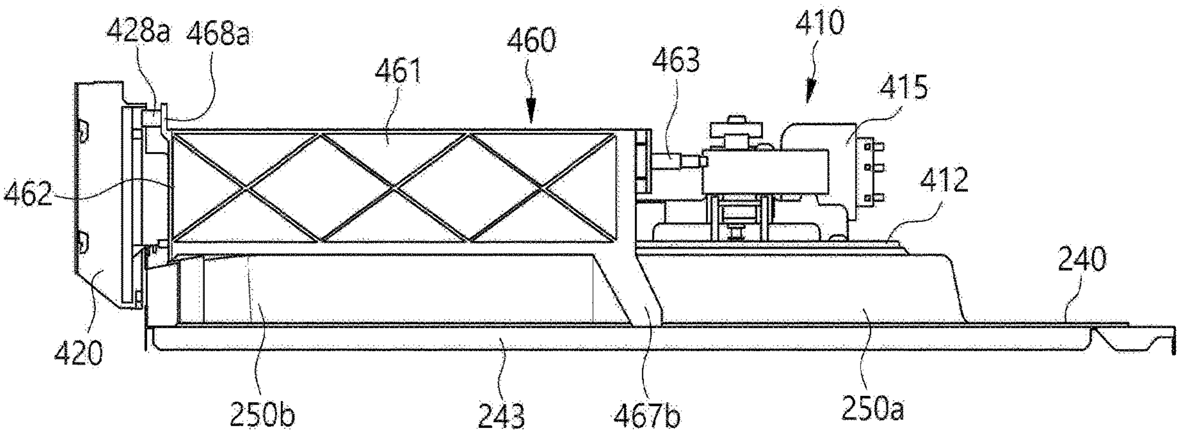
FIG. 23 is a side view showing the coupled state of the upper casing, the front housing, and the tank housing according to an embodiment.

As shown in FIG. 22, the hanging hook 421*b* may be provided at each of the panel fixing portions 421 to be close to each panel fixing hole 421*a*. The hanging hook 421*b* may protrude from a rear surface of each of the panel fixing portions 421. Each of the hanging hooks 421*b* may be caught by the frame hanging hole 287 of the front frame 280. When the hanging hook 421*b* is caught by the frame hanging hole 287, even before the fastener is tightened, the front housing 420 remains temporarily coupled to the front frame 280. In this state, when the fastener is fastened to both the panel fixing hole 421*a* and the coupling hole 286, the front housing 420 may be completely assembled to the front frame 280. In this embodiment, the hanging hook 421*b* is respectively provided at an upper side and a lower side of the panel fixing hole 421*a*, and on the other ha; however, embodiments are not so limited and the hanging hook 421*b* may include one hanging hook or may be omitted.

The cam protruding port 422 may penetrate the front housing 420. The cam protruding port 422 may have a shape in which a portion of the center portion of the front housing 420 is penetrated in the frontward-rearward direction. The cam 485 of the opening device 480 may protrude forward through the cam protruding port 422, or may be inserted rearwards again. The cam protruding port 422 may be formed with a long transverse width to correspond to a shape of the cam 485.

As the entrance 424 of the water tank 450 is formed in the front housing 420, the cam protruding port 422 may be disposed to be biased to either side of the center portion so as not to interfere with the entrance 424 of the water tank 450. In this embodiment, the cam protruding port 422 may be formed at a position biased leftwards of the center portion of the front housing 420.

A hinge through hole 423 may be formed in the front housing 420. The hinge through hole 423 may be disposed at a portion of the front housing 420 closer to the center portion than the panel fixing portions 421 of the front housing 420. The hinge through hole 423 may be connected to the upper hinge hole 283 of the front frame 280 to form a continued passage. A portion of the hinge module 600, more particularly, a drive arm 620 of the hinge module 600 may protrude forward through the hinge through hole 423. The drive arm 620 may protrude forward while passing through the upper hinge hole 283 of the front frame 280, and the hinge through hole 423 in order, and the protruding drive arm 620 may be connected to the panel unit 500.

The entrance 424 of the water tank 450 may be formed in the front housing 420. The entrance 424 of the water tank 450 refers to an entrance through which the water tank 450 is removed out of the cooking appliance, or inserted into the cooking appliance. The entrance 424 of the water tank 450 may be an entrance of the tank chamber 450*a* described hereinafter. Hereinafter, the entrance 424 of the water tank 450 may be referred to as the tank entrance 424.

The tank entrance 424 may extend longer in the leftward-rightward direction than an upward-downward direction. The tank entrance 424 may be formed to correspond to a shape of the water tank 450. Therefore, the tank entrance 424 does not have to be limited as shown in the drawings.

Figure 24:
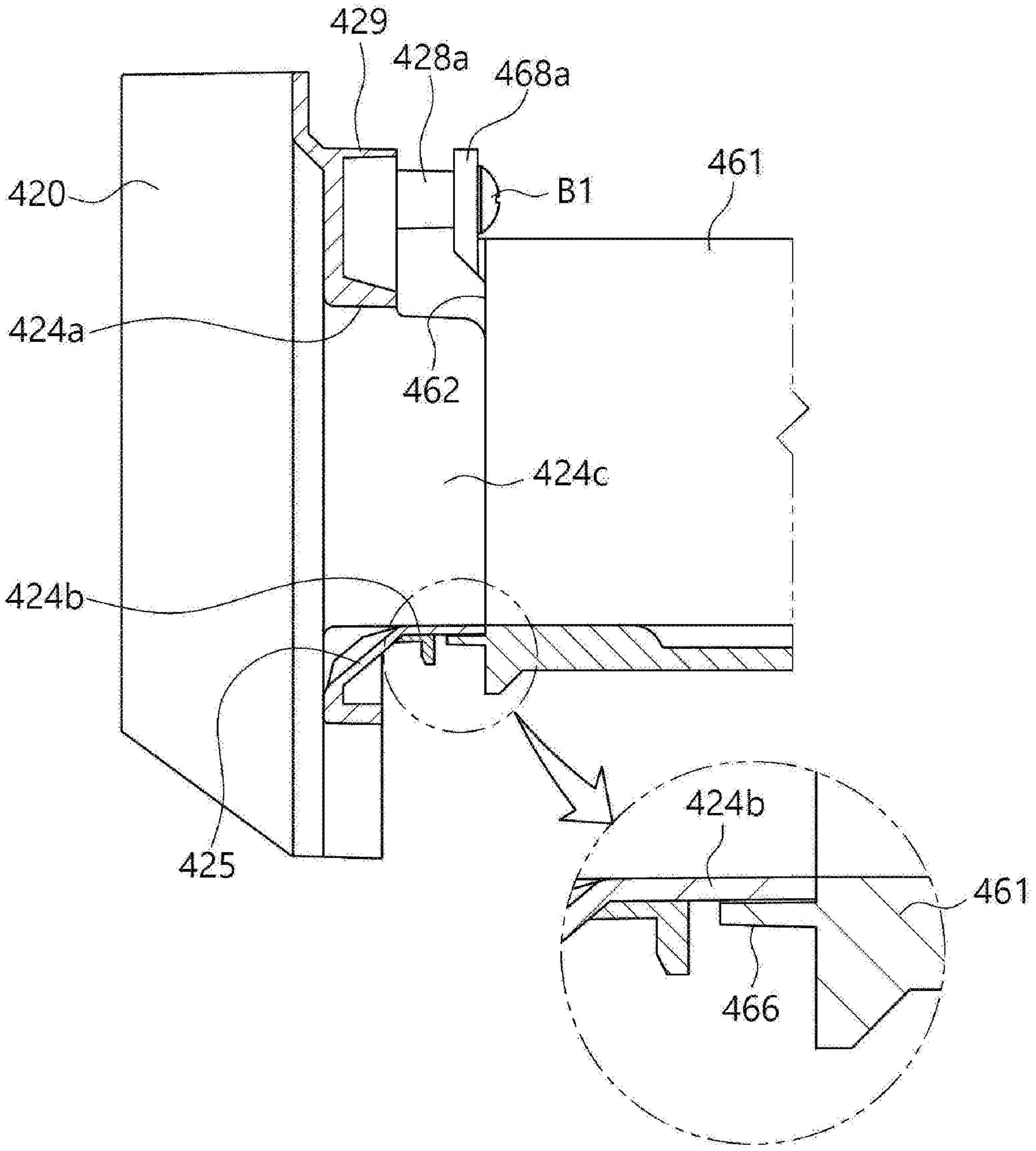
FIG. 24 is an enlarged, cross-sectional view showing a coupled portion of the front housing and the tank housing according to an embodiment.
Figure 25:
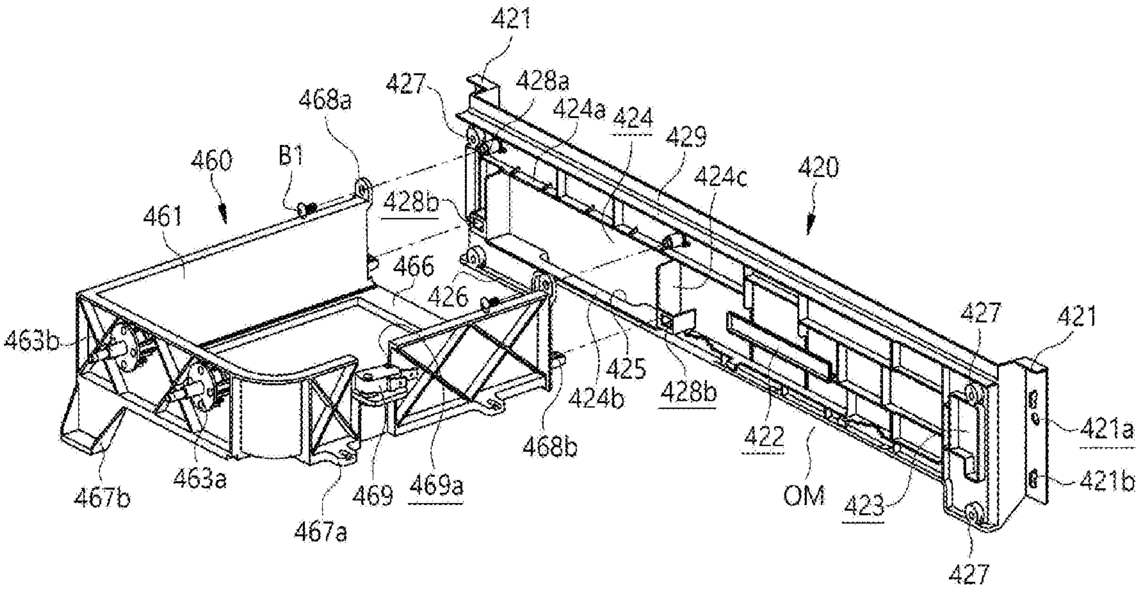
FIG. 25 is a perspective view showing a separated state of the front housing and the tank housing according to an embodiment.
Figure 26:
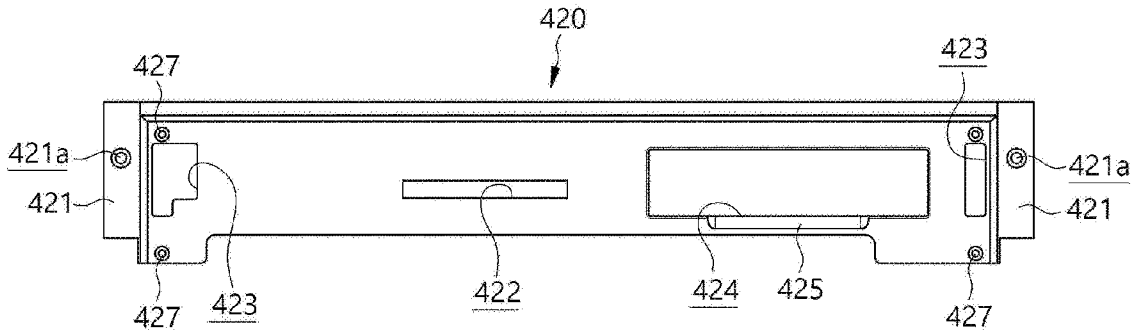
FIG. 26 is a front view of the front housing according to an embodiment.

Referring to FIGS. 24 and 25, the tank entrance 424 may include an entering guide 424*a*, 424*b*, 424*c*. The entering guide 424*a*, 424*b*, 424*c* may guide an entering direction of the water tank 450. Further, the entering guide 424*a*, 424*b*, 424*c* may prevent the water tank 450 from leaning in either direction during an entering process thereof.

The entering guide 424*a*, 424*b*, 424*c* may include upper guide 424*a*, lower guide 424*b*, and side guides 424*c*. The upper guide 424*a* and the lower guide 424*b* may extend in parallel directions.

More specifically, the upper guide 424*a* and the lower guide 424*b* may extend in a direction parallel to removal and insertion directions of the water tank 450. For reference, as shown in FIG. 20, this view shows the upper guide 424*a* and the lower guide 424*b* extending in parallel to an upper surface and a lower surface of the water tank 450, respectively. Therefore, the water tank 450 may be ejected toward the front side (direction of arrow ②) without twisting in any one direction.

As shown in FIG. 20, the upper guide 424*a* and the lower guide 424*b* may be disposed to surround edges of the tank entrance 424. Therefore, the upper guide 424*a* and the lower guide 424*b* may be understood as a portion of the tank entrance 424. The upper guide 424*a* may extend along an upper edge of the tank entrance 424, and the lower guide 424*b* may extend along a lower edge of the tank entrance 424.

The upper guide 424*a* and the lower guide 424*b* may extend in parallel to each other. The upper guide 424*a* may support the upper surface of the water tank 450, and the lower guide 424*b* may support the lower surface of the water tank 450. The upper guide 424*a* and the lower guide 424*b* may be in surface-contact with the surfaces of the water tank 450, respectively. Therefore, the water tank 450 may be precisely moved forward and rearwards without leaning toward one side.

The upper guide 424*a* may have a thin flat plate structure. In addition, the upper guide 424*a* may extend along an upper end of the tank entrance 424. The upper guide 424*a* may extend rearwards from the upper end of the tank entrance 424.

As shown in FIG. 24, an end of the upper guide 424*a* may be spaced apart from a front surface 462 of the tank housing 460 described hereinafter. As described above, when the end of the upper guide 424*a* is spaced apart from the front surface 462 of the tank housing 460, the spacing may serve as a clearance that may correct deformation to some extent even when the tank housing 460 or the front housing 420 is deformed.

The lower guide 424*b* may be provided to face the upper guide 424*a*, and may extend parallel to the upper guide 424*a*. The lower guide 424*b* may be a thin plate shape extending along a lower end of the tank entrance 424. In this embodiment, like the upper guide 424*a*, the lower guide 424*b* may also extend rearwards from a lower portion of the tank entrance 424.

The lower guide 424*b* may further protrude toward the front surface 462 of the tank housing 460 than the upper guide 424*a*. As shown in FIG. 24, one end of the lower guide 424*b* is in contact with the front surface 462 of the tank housing 460, and one end of the upper guide 424*a* is spaced forward from the front surface 462 of the tank housing 460. As the water tank 450 is configured such that a main surface is mainly supported by the front housing 420 due to a weight thereof, a length of the lower guide 424*b* is increased and stable insertion and removal of the water tank may be possible.

Further, the side guides 424*c* may be provided between the upper guide 424*a* and the lower guide 424*b*. The side guides 424*c* may have thin plate structures protruding rearwards of the front housing 420. The side guides 424*c* may constitute side walls of the tank entrance 424.

As shown in FIG. 24, this view shows one end of each of the side guides 424*c* in contact with the front surface 462 of the tank housing 460. In other words, like the lower guide 424*b*, one end of each of the side guides 424*c* may also extend toward the front surface 462 of the tank housing 460.

In this embodiment, the lower guide 424*b* and the side guides 424*c* may protrude by the same lengths toward the front surface 462 of the tank housing 460. Accordingly, each of the lower guide 424*b* and the side guides 424*c* may be in surface-contact with the front surface 462 of the tank housing 460. Therefore, the lower portion and the side portions to which the weight is mainly applied during the insertion and removal process of the water tank 450 may be supported by the lower guide 424*b* and the side guides 424*c*. Further, when the tank entrance 424 is exposed outwards, the lower portion and the side portions of the entrance that are primarily observed with the user's naked eyes are in surface-contact with the front surface 462 of the tank housing 460, so that there is no deterioration of the aesthetic in a connection portion of a component.

Figure 31:
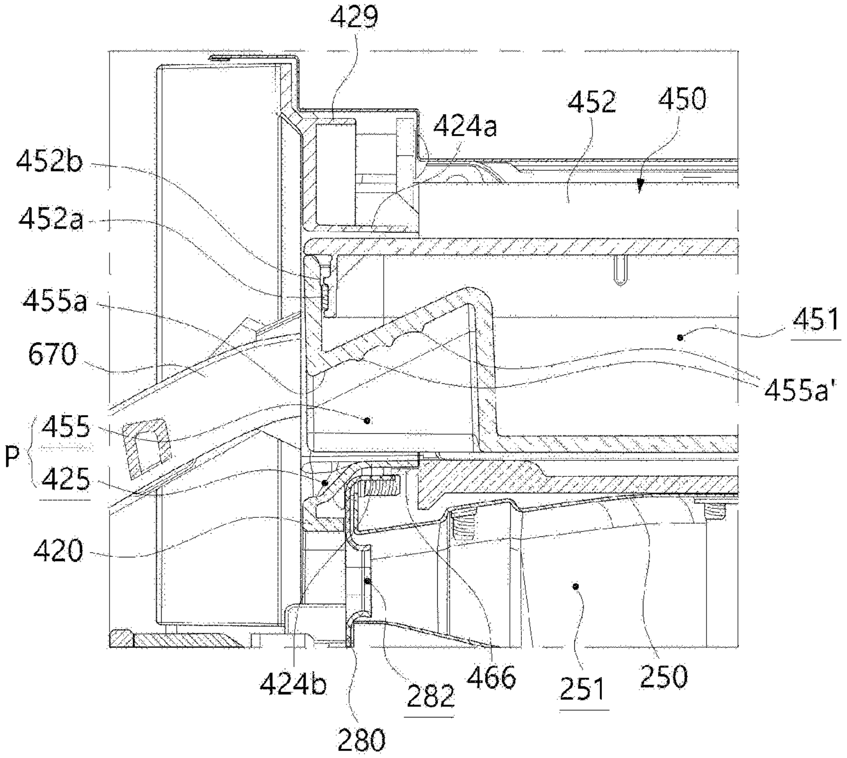
FIG. 31 is a cross-sectional view, taken along line XXXI-XXXI' in FIG. 30.

As shown in FIG. 31, an end of the lower guide 424*b* may be in close contact with a step difference rib 466 of the tank housing 460. More specifically, a lower surface of an end of the lower guide 424*b* may be stacked on an upper surface of the step difference rib 466. Therefore, a surface contact section may be formed between the lower guide 424*b* and the step difference rib 466.

The surface contact section may prevent leaking from occurring through a coupling portion between the front housing 420 and the tank housing 460. For example, when leaking occurs in the water tank 450, water may collect on a bottom of the tank housing 460. The water collected in the tank housing 460 may be moved to the coupling portion between the front housing 420 and the tank housing 460, and the surface contact section between the lower guide 424*b* and the step difference rib 466 of the tank housing 460 may prevent leaking of the water.

The tank entrance 424 may include a first pocket 425. The first pocket 425 may be formed in a direction that expands a width of the tank entrance 424. When the user grips the water tank 450 through the tank entrance 424, the first pocket 425 may allow the user to easily grip the water tank 450.

The first pocket 425 may be shaped as a shape inclined downward toward the front side of the front housing 420. In this embodiment, the first pocket 425 is formed in a direction in which a vertical height of the tank entrance 424 is increased as the first pocket extends forward. Referring to FIG. 31 which is a cross-sectional view, the first pocket 425 may have an inclined surface or a curved surface such that the first pocket is reduced in height as the first pocket extends forward (left side based on FIG. 31). Therefore, the user may more easily access the water tank 450 through the wide entrance. Further, the first pocket 425 may allow the user to recognize intuitively a gripping location of the water tank 450.

Figure 30:
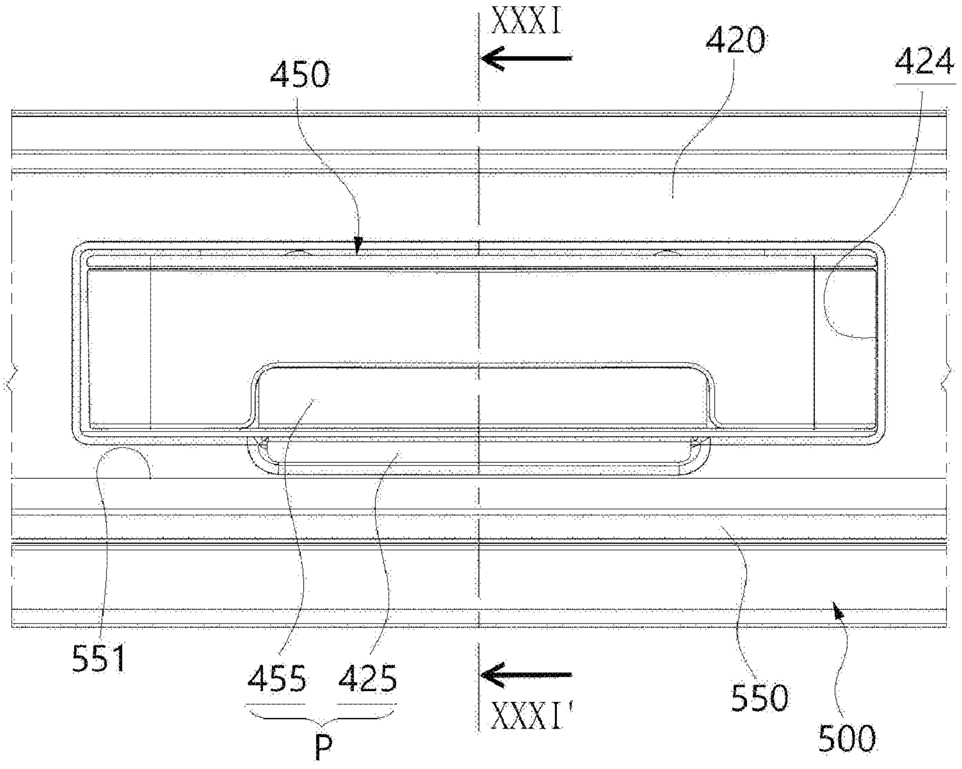
FIG. 30 is a front view showing a mounted state of the water tank to the front housing according to an embodiment.

In this embodiment, the water tank 450 may include a second pocket 455 at the same position as the first pocket 425 of the front housing 420. Therefore, the first pocket 425 and the second pocket 455 may be connected to each other to form one pocket P. As shown in FIGS. 30 and 31, the first pocket 425 and the second pocket 455 may be formed in recessed shapes at corresponding positions. The user's finger may be inserted into the pocket P. A shape of the second pocket 455 will be described hereinafter.

As shown in FIG. 25, the second hinge assembly hole 427 may be formed by penetrating the front housing 420. The second hinge assembly hole 427 may be formed in a position adjacent to the hinge through hole 423. The hinge fastener B3 inserted into the second hinge assembly hole 427 passes through the first hinge assembly hole 288 of the front frame 280 located in rear of the second hinge assembly hole 427, and then may be tightened to the housing assembly hole 613 of the hinge module 600 disposed at the rear of the front frame 280. Therefore, the front housing 420, the front frame 280, and the hinge module 600 may be assembled to each other with one fastener. FIG. 51 is a view showing the hinge fastener B3 passing through the front housing 420 and the front frame 280 and then assembled to the hinge module 600.

The front housing 420 may include a fastening boss 428*a*. The fastening boss 428*a* may protrude from the front housing 420 toward the tank housing 460. The fastening boss 428*a* may be engaged with a guide mounting piece 468*a* of the tank housing 460 to be fastened to each other with a fastener B1. FIG. 24 is a view showing the fastening boss 428*a* and the guide mounting piece 468*a* fastened to each other with the fastener B1.

As shown in FIG. 25, the fastening boss 428*a* may be disposed adjacent to the tank entrance 424. In this embodiment, the fastening boss 428*a* may be disposed at opposite sides of the upper portion of the tank entrance 424, respectively. As another example, the fastening boss 428*a* may be disposed at the lower portion of the tank entrance 424, or may be disposed at both of the upper and lower portions thereof.

A housing fastening groove 428*b* may be formed in the front housing 420. The housing fastening groove 428*b* may be formed by being recessed on a rear surface of the front housing 420 or penetrating the front housing 420. A fastening protrusion 468*b* of the tank housing 460 described hereinafter may be inserted into the housing fastening groove 428*b*. The housing fastening groove 428*b* and the fastening protrusion 468*b* may allow the front housing 420 and the tank housing 460 to be coupled to each other, together with the fastening boss 428*a* and the guide mounting piece 468*a*.

The housing fastening groove 428*b* may be disposed adjacent to the tank entrance 424. In this embodiment, housing fastening grooves 428*b* may be disposed at opposite sides of the lower portion of the tank entrance 424. More specifically, a pair of fastening bosses 428*a* may be disposed at the upper portion of the tank entrance 424, and a pair of housing fastening grooves 428*b* may be disposed at the lower portion thereof. As another example, the housing fastening grooves 428*b* may be disposed at the upper portion of the tank entrance 424, or may be disposed at both of the upper and lower portions thereof. Further, the housing fastening grooves 428*b* may be provided at the tank housing 460, and the fastening protrusion 468*b* may be provided at the front housing 420.

Figure 27:
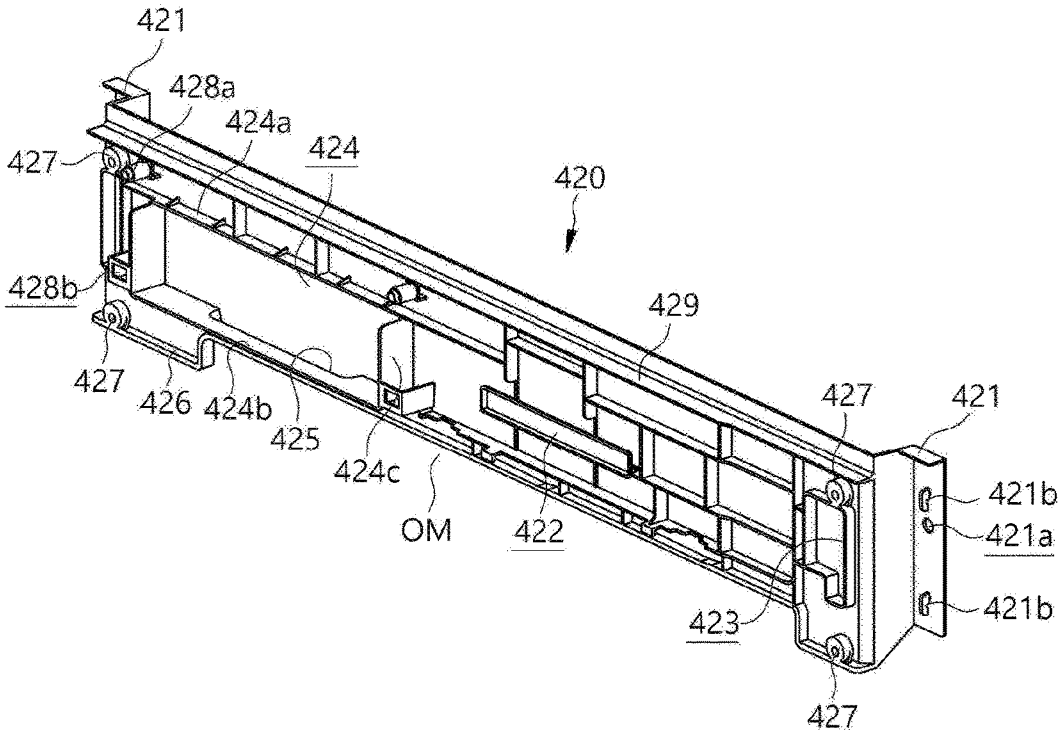
FIG. 27 is a perspective view of the front housing according to an embodiment.

As shown in FIG. 27, the front housing 420 may include a panel rib 429. The panel rib 429 may be disposed on an edge of a rear surface of the front housing 420. The panel rib 429 may protrude rearwards from the rear surface of the front housing 420. The panel rib 429 may cover the rear side of the front housing 420, and may reinforce the strength of the front housing 420.

In this embodiment, the panel rib 429 may extend in the leftward-rightward direction on an upper portion of the rear surface of the front housing 420. The panel rib 429 may be disposed higher than the tank entrance 424 on the rear surface of the front housing 420.

The front housing 420 may include an avoidance portion OM at the lower portion thereof. The avoidance portion OM may be shaped such that a part of the lower portion of the front housing 420 is omitted. The avoidance portion OM is formed to prevent the lower portion of the front housing 420 from interrupting discharge of air. The avoidance portion OM may be shaped to be depressed upward from the lower portion of the front housing 420. More specifically, the avoidance portion OM may be formed between lower fastening bodies 426 protruding on lower portions of left and right or lateral ends of the front housing 420.

Figure 19:
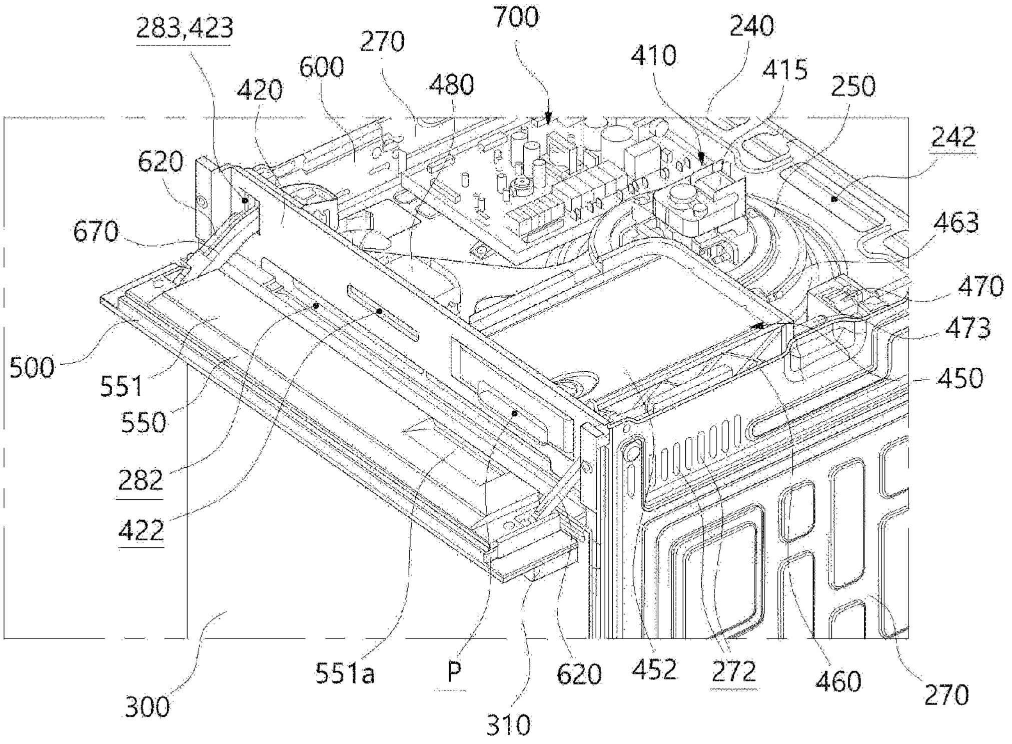
FIG. 19 is a perspective view showing an opened state of the panel unit of FIG. 18.

Hereinafter, the water tank 450 constituting the steam device will be described. Referring to FIGS. 17 to 19, the water tank 450 may be stored in the electric chamber S2. The water tank 450 may supply water for a steam function to a heater while being stored in the electric chamber S2. In addition, when the water tank 450 is removed from the electric chamber S2, the user may fill water into the water tank 450 or drain water in the water tank 450. The steam function is not necessarily limited to cooking of an object to be cooked. For example, the steam device may be used to clean the inside space of the cooking chamber.

In this embodiment, the water tank 450 may be disposed at a rear of the panel unit 500. Accordingly, when the panel unit 500 is closed, the water tank 450 is prevented from being exposed outwards. As shown in FIG. 19, when the panel unit 500 is opened, only then the water tank 450 may be exposed outwards.

The water tank 450 may have an approximately hexahedral structure. The water tank 450 may include a water storage space 451 (referring to FIG. 31) that can store water therein. The water stored in the water tank 450 may be heated by the heater of the steam device to be sprayed into the cavity S1 in a steam form. Further, when a cleaning function is performed to remove foreign substances, such as limescale, from the internal space of a pipe of the cooking appliance, water that has completed the cleaning function may flow into the water tank 450.

A tank cover 452 may be provided at an upper portion of the water tank 450. The tank cover 452 may cover an upper portion of the water storage space 451. In this embodiment, the tank cover 452 is configured as a separate object from the water tank 450. In addition, the tank cover 452 may include a separate tank lid 452'. When the tank lid 452' is removed, the user may fill water into the water storage space 451, or drain water in the water storage space 451. As another example, the tank cover 452 may be omitted, or may be integrally formed with the water tank 450.

The water tank 450 may include a tank connecting tube 453. The tank connecting tube 453 may serve as a connecting tube to move water into and out of the water storage space 451. The tank connecting tube 453 may protrude from the water tank 450 outwards. The protruding portion may be engaged with a housing connecting tube 463 of the tank housing 460 described hereinafter. On the other hand, the housing connecting tube 463 of the tank housing 460 protrudes toward the water tank 450, and the tank connecting tube 453 may be provided at the water tank 450 with a recessed shape to allow the housing connecting tube 463 to be inserted thereinto.

In this embodiment, the tank connecting tube 453 includes a pair of tank connecting tubes 453. One of the pair of tank connecting tubes 453 may be used to supply water to the external space, and another one may be used for external water to be supplied. However, when the cooking appliance does not have the cleaning function, the tank connecting tube 453 may be composed of one tank connecting tube 453.

Referring to FIG. 31, the tank cover 452 may include a cover sealing portion **452*a*. The cover sealing portion 452*a* may prevent leaking from occurring through a coupling portion between the main body of the water tank 450 and the tank cover 452. The cover sealing portion 452*a* may be disposed sequentially by enclosing an edge of the tank cover 452. Reference numeral 452*b* is a sealing guide, and is provided to fix the cover sealing portion 452*a***.

A front surface of the front housing 420 and a front surface of the water tank 450 may form a continued flat surface. In other words, the front surface of the front housing 420 and the front surface of the water tank 450 may form a same level. Then, the cooking appliance may provide the unified aesthetic to the user.

The water tank 450 may include the second pocket 455. The second pocket 455 may be formed at a portion at which the front surface of the front housing 420 and the front surface of the water tank 450 are connected to each other. The second pocket 455 may have a shape recessed from the front surface of the water tank 450. The second pocket 455 may provide a gripping space in which the user may withdraw the water tank 450 or insert the water tank thereinto.

The second pocket 455 may be formed at a lower portion of the front surface of the water tank 450. In addition, the second pocket 455 may be formed to be gradually higher toward the center portion of the water tank 450. In other words, the second pocket 455 may be formed to be gradually increased in a vertical width rearwards from the front surface of the water tank 450. As shown in FIG. 31, the second pocket 455 is formed in a direction to the center portion of the water tank 450, so that the internal space of the second pocket 455 expands. Accordingly, the user may put a finger into the second pocket 455 to be easily grip the water tank 450.

Slip prevention ribs **455*a'* may be provided at a surface 455*a* of the second pocket 455. The slip prevention ribs 455*a'* may protrude from the surface 455*a* of the second pocket 455. The slip prevention ribs 455*a'* may serve to increase a frictional force between the user's finger and the surface 455*a* of the second pocket 455. A plurality of slip prevention ribs 455*a'* may be disposed at constant intervals in a frontward to rearward direction of the second pocket 455**.

The second pocket 455 may be formed at the same position as the first pocket 425 of the front housing 420. Accordingly, the first pocket 425 and the second pocket 455 may form one connected pocket P. As shown in FIGS. 30 and 31, the first pocket 425 and the second pocket 455 may be formed in recessed shapes at corresponding positions. The user may easily put the finger into the pocket P through an entrance of the pocket P formed by the first pocket 425 and the second pocket 455.

More specifically, as shown in FIG. 31, the first pocket 425 may extend to be upwardly-inclined rearwards, and the second pocket 455 may also extend to be upwardly-inclined rearwards. Accordingly, the user's finger may be naturally guided upward, and may grip an innermost portion of the pocket P at the same time.

Further, the pocket P may be disposed above the exhaust port 282. As shown in FIG. 31, the exhaust port 282 may be narrowed in width toward the front side. Accordingly, when the pocket P is disposed above the exhaust port 282, a vertical height of an entrance portion of the pocket P may be greatly secured.

Although not shown in the drawings, the water tank 450 may be omitted. If the water tank 450 is omitted, other parts may be mounted in the tank chamber **450*a* in place of the water tank 450**.

Figure 28:
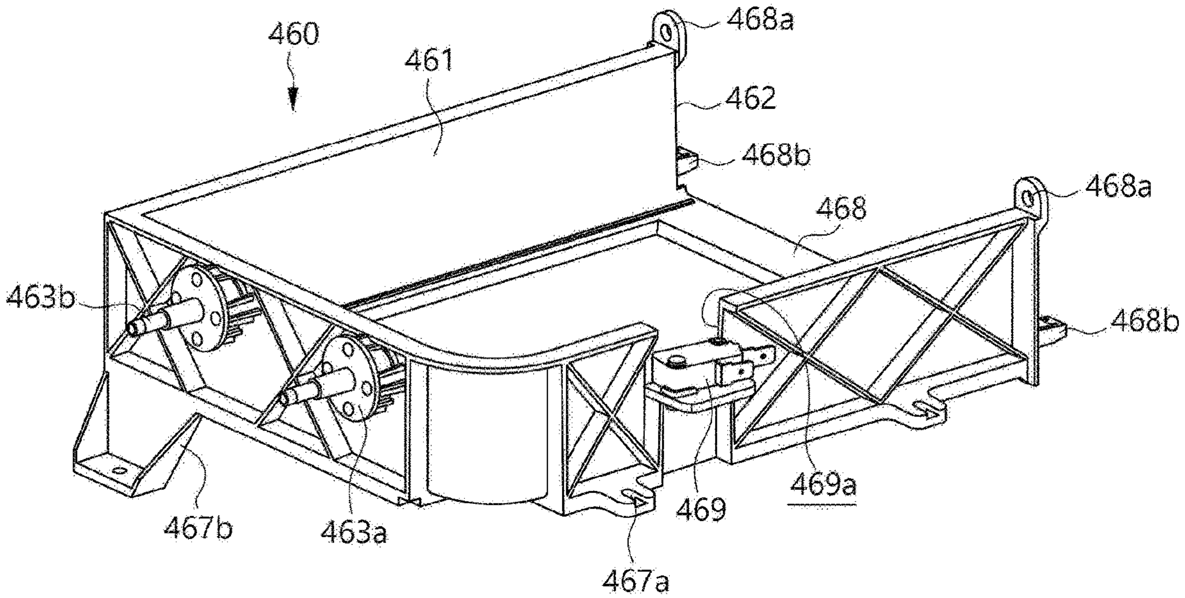
FIG. 28 is a perspective view of the tank housing according to an embodiment.
Figure 29:
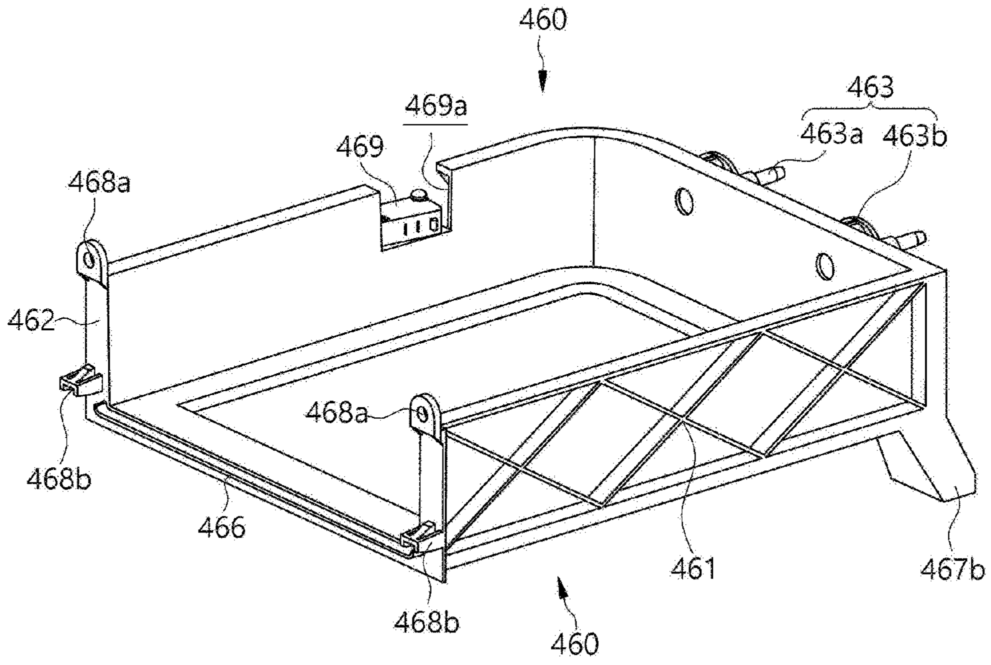
FIG. 29 is a perspective view of the tank housing according to an embodiment, at an angle different front an angle in FIG. 28.

The tank housing 460 storing the water tank 450 therein will be described hereinafter. Referring to FIGS. 28 to 29, the tank housing 460 may be formed with a frame as a housing body 461 having an approximate hexahedron shape. The housing body 461 may provide the tank chamber 450*a* that allows the water tank 450 to be stored in the cooking appliance. The housing body 461 may be open forward, and the tank chamber 450*a* suitable for a shape of the water tank 450 may be formed in the housing body 461.

The tank chamber 450*a* may have an approximate hexahedron shape. The tank chamber 450*a* may be respectively open forward and upward. In other words, the tank housing 460 may have structure omitted at a front surface and an upper surface and open forward and upward. The open front surface of the tank chamber 450*a* serves as an opening, so that the water tank 450 may be drawn in/out through the opening.

A bottom surface of the tank chamber 450*a* may have a depressed bottom portion depressed downward. The depressed bottom portion may be formed at a center portion of the bottom surface of the tank chamber 450*a*. The depressed bottom portion may reduce a contact area between the tank housing 460 and the water tank 450 to reduce friction. Further, even when leaking occurs in the water tank 450 and the tank housing 460, the depressed bottom portion may store a predetermined amount of water. Water stored in the depressed bottom portion may be naturally vaporized by heat in the electric chamber.

In this embodiment, the opening formed in the front side of the tank chamber 450*a* may form a passage continued to the tank entrance 424. Therefore, the water tank 450 may be inserted into and removed from the tank chamber 450*a* through the opening of the tank chamber 450*a*, and the continued passage formed by the tank entrance 424 of the front housing 420.

The upper surface of the tank housing 460 is omitted, but the upper cover 260 shields the upper portion of the tank housing 460, so it is fine to omit the upper surface of the tank housing. More specifically, when the upper surface of the tank housing 460 is omitted, in the insertion and removal process of the water tank 450, a contact area between a surface of the water tank 450 and the tank housing 460 is reduced and friction may be reduced.

As another example, the tank housing 460 may have a structure in which the upper surface is provided and the front surface of the tank housing 460 is open. Further, as another example, the tank housing 460 may be omitted, and the water tank 450 may be directly stored into the tank chamber 450*a* provided in the electric chamber S2.

The front surface 462 of the tank housing 460 may be disposed to face the rear surface of the front housing 420. The front surface 462 of the tank housing 460 may face left and right or lateral ends of the tank entrance 424 formed in the front housing 420. As shown in FIG. 24, the front surface 462 of the tank housing 460 may be in close contact with the side guides 424*c* of the front housing 420.

The housing connecting tube 463 may be provided at a rear surface of the tank housing 460. The housing connecting tube 463 may be engaged with the tank connecting tube 453 of the water tank 450 to form a continuous inner flow path. The housing connecting tube 463 may supply water in the water storage space 451 of the water tank 450 towards the heater. Further, the housing connecting tube 463 may discharge water, which remains in the cooking appliance after performing the cleaning function, into the water storage space 451. For example, the housing connecting tube 463 may include a first housing connecting tube 463*a* provided to supply water into the cooking appliance, and a second housing connecting tube 463*b* provided to drain remaining water in the tube of the cooking appliance into the water storage space 451.

In this embodiment, the housing connecting tube 463 may protrude rearwards. The protruding housing connecting tube 463 may be connected to a pump 470 (referring to FIG. 18). The pump 470 may supply water in the water storage space 451 towards the heater through the housing connecting tube 463 and the tank connecting tube 453. The pump 470 may include two pumps, and one of the two pumps may supply the water in the water storage space 451 to the heater, and another one may discharge the remaining water in the tube of the cooking appliance into the water storage space 451.

The tank housing 460 may be spaced apart from the bottom surface of the electric chamber S2. More specifically, a lower surface of the housing body 461 of the tank housing 460 may be spaced apart from the bottom surface of the electric chamber S2. The bottom surface of the electric chamber S2 is in contact with a ceiling of the cavity S1, so that the temperature in the cavity S1 may be transmitted to the bottom surface of the electric chamber S2. In this embodiment, the tank housing 460 is spaced upward from the bottom surface of the electric chamber S2, so that it is possible to prevent the temperature in the cavity S1 from being directly transmitted to both of the tank housing 460 and the water tank 450.

In addition, a height of the tank chamber 450*a* may be smaller than a distance between the upper surface of the guide duct 250 and a ceiling surface of the electric chamber S2. Accordingly, the lower portion of the tank chamber 450*a* is spaced upward from the bottom surface of the electric chamber S2, and the upper portion of the tank chamber 450*a* may be spaced apart from the ceiling surface of the electric chamber S2. As another example, the ceiling surface of the electric chamber S2, that is, the lower surface of the upper cover 260, may constitute the upper portion of the tank chamber 450*a*.

In addition, referring to FIG. 22, the tank housing 460 may be disposed on an air flow path for cooling. More specifically, the tank housing 460 may be disposed to be vertically overlapped with the guide duct 250 guiding discharge of air. In this embodiment, a portion of the tank housing 460 may be disposed above the guide duct 250. Then, the tank housing 460 and the water tank 450 stored in the tank housing 460 may be cooled by air passing through the guide duct 250, and the air may lower the temperature of water in the water storage space 451.

The tank housing 460 and the bottom surface of the electric chamber S2 are spaced apart from each other, so that it is possible to prevent heat of the bottom surface of the electric chamber S2 from being directly transmitted to the tank housing 460, and a portion of the tank housing 460 is disposed on the guide duct 250, so that the tank housing 460 may be cooled by the air passing through the guide duct 250. Therefore, it is possible to prevent the tank housing 460 and the water tank 450 stored in the tank housing 460 from being deformed by heat with high temperature.

In this embodiment, the tank chamber 450*a* of the tank housing 460 may be spaced apart from each of the bottom surface of the electric chamber S2 and the ceiling surface of the electric chamber S2, that is, the lower surface of the upper cover 260. As another example, the tank chamber 450*a* of the tank housing 460 is spaced apart from the bottom surface of the electric chamber S2, but the ceiling surface of the electric chamber S2 may constitute the upper surface of the tank chamber 450*a*.

As shown in FIG. 24, the tank housing 460 may include the step difference rib 466. The step difference rib 466 may protrude forward from a lower portion of the front surface 462 of the tank housing 460. The step difference rib 466 may be provided in the leftward-rightward direction at the lower portion of the front surface 462 of the tank housing 460.

The step difference rib 466 may be stacked with the lower guide 424*b* of the front housing 420. More specifically, the lower guide 424*b* may be disposed at an upper portion of the step difference rib 466. Thus, the step difference rib 466 and the lower guide 424*b* are configured to be overlapped with each other, so that leakage of water between the front housing 420 and the tank housing 460 may be prevented. When leakage of water between the front housing 420 and the tank housing 460 occurs, the water penetrates into the cooking appliance to cause a breakdown of the cooking appliance, and contaminate the cooking appliance, and it is necessary to prevent leakage.

The step difference rib 466 may have a step difference at a lower portion of the tank housing 460. Accordingly, an upper surface of the lower guide 424*b* and a bottom surface of the entrance of the tank chamber 450*a* may form a continued flat surface. As shown in FIG. 24, an upper surface of the housing body 461 and the upper surface of the lower guide 424*b* may have the same height to form the continued surface. A peripheral portion of the entrance of the water tank 450 exposed outwards may provide the unified aesthetic.

An end of the lower guide 424*b* may be in close contact with the step difference rib 466 of the tank housing 460. More specifically, a lower surface of an end of the lower guide 424*b* may be stacked on an upper surface of the step difference rib 466. Therefore, a surface contact section may be formed between the lower guide 424*b* and the step difference rib 466.

In this embodiment, the lower guide 424*b* and the step difference rib 466 may be in surface-contact with each other at two different surfaces thereof. As shown in FIG. 24, the end of the lower guide 424*b* is in surface-contact with the front surface of the tank housing 460, and at the same time, a lower surface of the lower guide 424*b* is in surface-contact with the upper surface of the step difference rib 466. As described above, when the lower guide 424*b* and the step difference rib 466 are in surface-contact with each other at the two different surfaces, contact areas between the lower guide 424*b* and the step difference rib 466 are increased and leakage may be further efficiently prevented.

As another example, the lower guide 424*b* and the step difference rib 466 may be in contact with each other at one surface or three surfaces. The lower guide 424*b* is formed in a pocket shape, and the step difference rib 466 is inserted into the pocket, so that the lower guide 424*b* and the step difference rib 466 may be in surface-contact with each other at three surfaces.

A mounting bracket 467*a*, 467*b* of the tank housing 460 may allow the tank housing 460 from being spaced apart from the bottom surface of the electric chamber S2. The mounting bracket 467*a*, 467*b* is provided to fix the tank housing 460 to an internal portion of the electric chamber S2. The mounting bracket 467*a*, 467*b* may protrude from a surface of the tank housing 460. Although not shown in the drawings, the mounting bracket 467*a*, 467*b* may be fixed to the bottom surface of the electric chamber S2 with a fastener, such as a screw.

The upper surface of the guide duct 250 is disposed higher than the upper surface of the upper casing 240. Therefore, it is necessary to fix the tank housing 460 to each of the upper surface of the guide duct 250 and the upper surface of the upper casing 240. The tank housing 460 may include a plurality of mounting brackets 467*a*, 467*b* in this embodiment. Some of the plurality of mounting brackets 467*a*, 467*b* may be supported by the upper surface of the guide duct 250 and a remaining portion thereof may be supported by the upper surface of the upper casing 240.

More specifically, as shown in FIG. 22, the mounting brackets 467*a*, 467*b* may include first bracket 467*a* and second bracket 467*b*. The first bracket 467*a* and the second bracket 467*b* may have different heights from each other. The first bracket 467*a* may be fixed to the guide duct 250, and the second bracket 467*b* may be fixed to the upper surface of the upper casing 240.

The second bracket 467*b* may protrude further downward than the first bracket 467*a*. A length of the second bracket 467*b* protruding further than the first bracket 467*a* may be the same as the height of the guide duct 250. The second bracket 467*b* may extend downward from a rear end of the tank housing 460. As another example, the second bracket 467*b* may be provided at a side end, not at the rear end of the tank housing 460.

As shown in FIG. 18, the side surface of the tank housing 460 may be disposed to face the side through hole 272 of the side covers 270. External air flowing inwards through the side through hole 272 may lower the temperature of the tank housing 460 and the temperature of the water tank 450. The tank housing 460 and the water tank 450 may be cooled by the air transferred through the guide duct 250 and the air flowing inwards through the side through hole 272. Of course, the water stored in the water tank 450 may be cooled by the air transferred through the guide duct 250 and the air flowing inwards through the side through hole 272.

The front surface 462 of the tank housing 460 may include the guide mounting piece 468*a*. The guide mounting piece 468*a* may be in contact with the fastening boss 428*a* of the front housing 420. The guide mounting piece 468*a* may be engaged with the fastening boss 428*a* of the front housing 420 to be fastened to each other with the fastener B1. The guide mounting piece 468*a* may protrude upward from the front surface 462 of the tank housing 460. The guide mounting piece 468*a* may be provided at each of opposite portions with the tank entrance 424 as the center.

Further, the front surface 462 of the tank housing 460 may include the fastening protrusion 468*b*. The fastening protrusion 468*b* may be inserted into the housing fastening groove 428*b* of the front housing 420. The housing fastening groove 428*b* and the fastening protrusion 468*b* may allow the front housing 420 and the tank housing 460 to be coupled to each other, together with the fastening boss 428*a* and the guide mounting piece 468*a*.

In this embodiment, the fastening protrusion 468*b* may be located lower than the guide mounting piece 468*a*. Then, the fastener B1 may be fastened to the guide mounting piece 468*a* at a relatively high position, so that assembling workability may be enhanced. As another example, the fastening protrusion 468*b* may be disposed higher than the guide mounting piece 468*a*, and the tank housing 460 may include only the guide mounting piece 468*a* without the fastening protrusion 468*b*.

When the fastening protrusion 468*b* is inserted into the housing fastening groove 428*b* of the front housing 420, temporarily assembled state between the front housing 420 and the tank housing 460 may be maintained. Further, the fastening protrusion 468*b* and the housing fastening groove 428*b* may serve to guide an assembly position between the tank housing 460 and the front housing 420.

As described above, the structure of the guide mounting piece 468*a* and the fastening protrusion 468*b* may allow the tank housing 460 to be in close contact with the front housing 420. More specifically, the front surface 462 of the tank housing 460 may be in close contact with the rear surface of the front housing 420. Accordingly, the opening provided at the front side of the tank chamber 450*a* may be connected to the tank entrance 424. When the tank housing 460 is in close contact with the front housing 420, a gap therebetween is blocked to improve the aesthetic, and penetration of foreign substances or moisture through the gap therebetween may be prevented.

The front housing 420 may be fastened to the tank housing 460 through fastening between the housing fastening groove 428*b* and the fastening protrusion 468*b* and fastening between the fastening boss 428*a* and the guide mounting piece 468*a*. The assembly of the front housing 420 and the tank housing 460 fastened as described above may be mounted to the front frame 280 together. In other words, after the front housing 420 and the tank housing 460 are assembled first, the assembly of the front housing 420 and the tank housing 460 may be mounted to the front frame 280 together.

With the above-described assembling of the fastening protrusion 468*b* and the housing fastening groove 428*b*, the temporarily assembled state between the front housing 420 and the tank housing 460 may be maintained. Therefore, after the fastening protrusion 468*b* is inserted into the housing fastening groove 428*b* to temporarily assemble the two components first, the assembly may be mounted to the front frame 280. More specifically, the assembly of the front housing 420/the tank housing 460 temporarily assembled is mounted to the front frame 280, and then the fastener B1 may be fastened to the fastening boss 428*a* and the guide mounting piece 468*a*.

The upper portion of the front frame 280 may be disposed between the front housing 420 and the tank housing 460. The front housing 420 may be disposed in front of the cut-out portion 280*a* of the front frame 280, and the tank housing 460 may be disposed at a rear of the cut-out portion 280*a*.

Referring to FIG. 20, the lower guide 424*b* of the front housing 420 and the step difference rib 466 of the tank housing 460 may be disposed at the upper portion of the front frame 280. Further, one end of the step difference rib 466 may be stacked on an upper portion of an upper end of the front frame 280. One end of the step difference rib 466 may be disposed between the upper portion of the upper end of the front frame 280 and a lower portion of the lower guide 424*b*. Then, as a contact section between the front housing 420, the tank housing 460, and the front frame 280 expands, prevention of leakage and foreign substance inflow may be efficiently performed.

As shown in FIG. 28, the tank housing 460 may include a tank sensor 469. The tank sensor 469 may serve to detect whether the water tank 450 is stored in the tank housing 460. When the water tank 450 is inserted into the tank chamber 450*a*, a side surface of the water tank 450 presses the tank sensor 469 to allow the tank sensor 469 to detect storage.

The tank sensor 469 may be disposed closer to the rear surface of the tank housing 460 than the tank entrance 424, based on the center portion of the tank housing 460. Accordingly, the tank sensor 469 may detect whether or not the water tank 450 is completely inserted into the tank chamber 450*a*. Reference numeral 469*a* indicates a sensor mounting portion to expose the tank sensor 469 towards the tank chamber 450*a*.

As another example, the tank housing 460 may be omitted or may be integrally formed with the casing 100, 200. When the tank housing 460 is omitted, the tank chamber 450*a* may be provided in the electric chamber S2 by the casing 100, 200. For example, the tank chamber 450*a* may be provided at an upper portion of the upper casing 240 or at a lower portion of the upper cover 260. In this case, the tank chamber 450*a* may be spaced apart from a bottom surface of the upper casing 240. A side surface of the water tank 450 may be moved along a guide structure having a rail shape.

Figure 32:
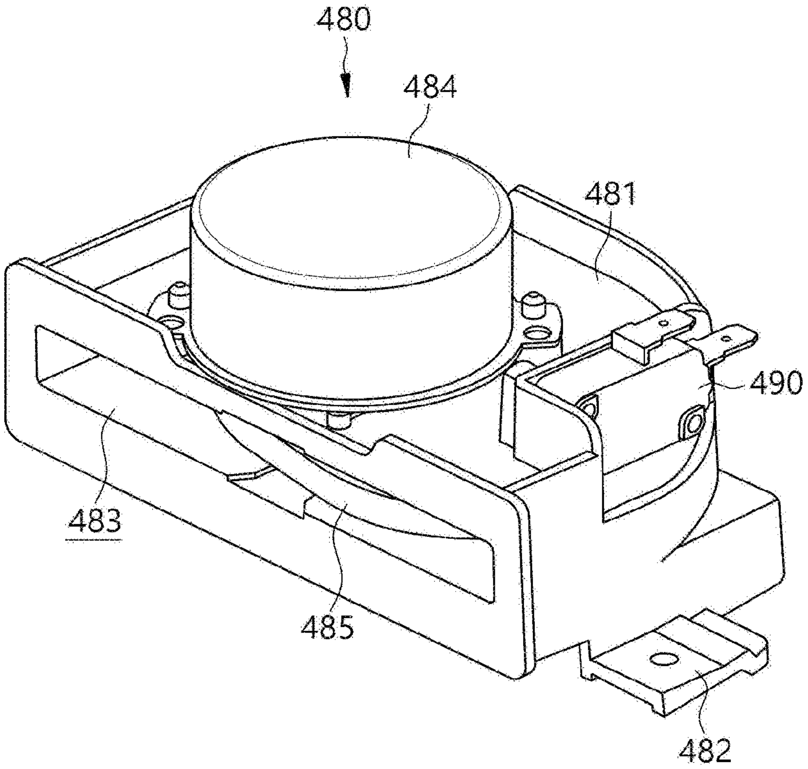
FIG. 32 is a perspective view of an opening device according to an embodiment.

Referring to FIGS. 32 to 33, the opening device 480 for opening the panel unit 500 will be described hereinafter. The opening device 480 may open the panel unit 500 forward. More specifically, the opening device 480 may allow movement in an initial movement section among the entire movement section where the panel unit 500 is opened to be automatically performed.

The panel unit 500 may be moved by the opening device 480 in a first opening section starting from the first position. Further, the panel unit 500 may be moved by gravity or an external force due to the user in a second opening section extending from a last end of the first opening section to the second position. This opening operation of the panel unit 500 will be described in detail hereinafter.

The opening device 480 may be disposed in the electric chamber S2. The opening device 480 may be disposed on a surface of the upper casing 240 constituting the electric chamber S2 or a surface of the guide duct 250 coupled to the upper casing 240. In this embodiment, the opening device 480 is fixed to the upper surface of the guide duct 250.

The opening device 480 may be disposed between a pair of hinge modules 600 described hereinafter. The pair of hinge modules 600 may serve to guide a movement passage of the panel unit 500, and the opening device 480 may automatically open the panel unit 500 in the first opening section among the movement passage.

When the opening device 480 is independently disposed between the pair of hinge modules 600, this independent structure of the opening device 480 and the hinge modules 600 may be less complicated than an integrated structure of the hinge modules 600 and the opening device 480. Further, the opening device 480 may be disposed at a position relatively far away from the hinge modules 600 constituting a rotational shaft of the panel unit 500, so that a larger opening force (torque) may be supplied to the panel unit 500.

Figure 33A:
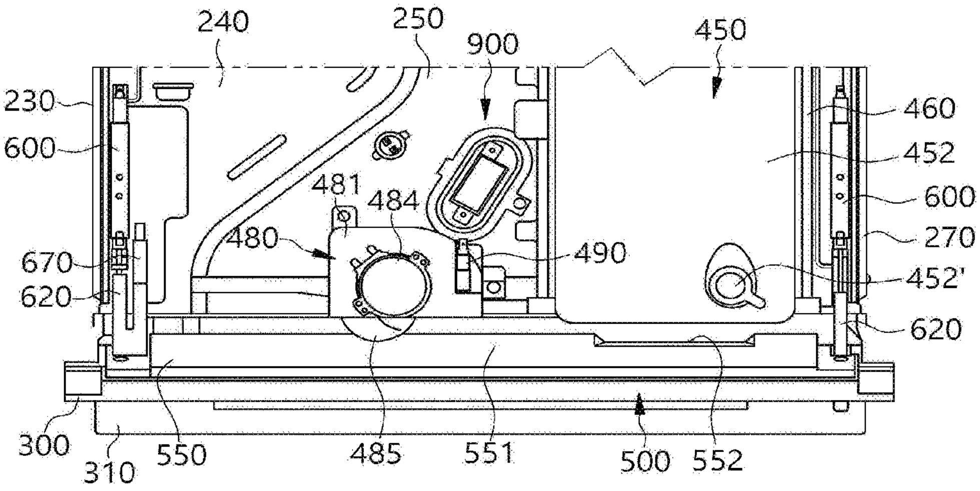
FIGS. 33A to 33C are operational state views successively showing an operation process of the opening device according to an embodiment.
Figure 33B:
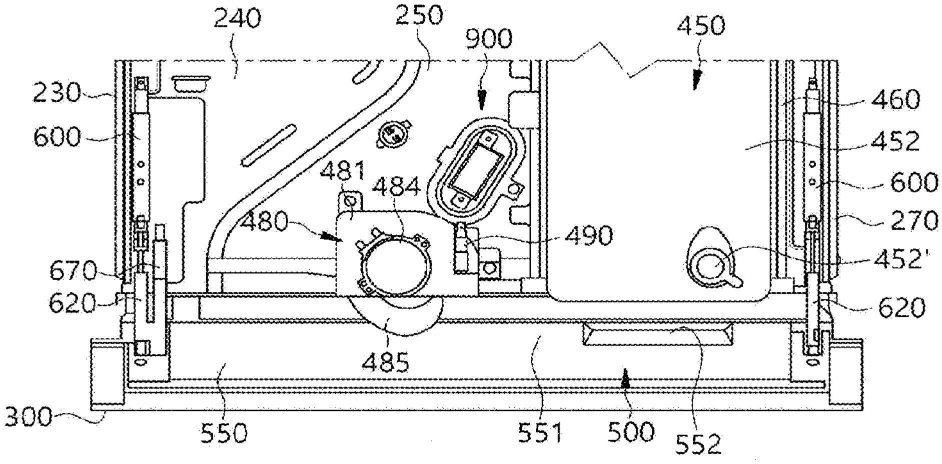
Figure 33C:
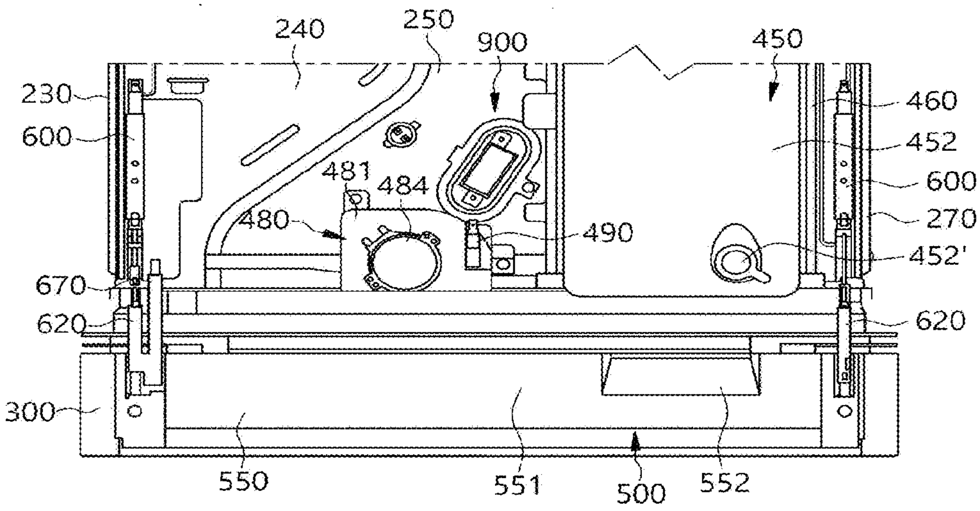

The opening device 480 may be disposed to be biased closer to either of the pair of hinge modules 600. As shown in FIGS. 33A-33C, in this embodiment, the opening device 480 may be disposed closer to a left or first lateral hinge module 600 of the pair of hinge modules 600. This arrangement may be to avoid the water tank 450 disposed at the right space. As another example, the opening device 480 may constitute a portion of the hinge modules 600. In other words, the opening device 480 may be integrally provided with the hinge modules 600.

Further, the opening device 480 may include one opening device in this embodiment, but may also include a plurality of opening devices. As another example, the opening device 480 is not disposed in the electric chamber S2, but may be disposed towards the panel unit 500.

The opening device 480 may open the panel unit 500 by a rotational force. FIG. 32 shows a structure of the opening device 480 for generating the rotational force. The opening device 480 is composed of one assembled module shape, and may be disposed in the electric chamber S2 in an assembled state.

A frame of the opening device 480 may be formed by an opening housing 481. An operation space 483 may be formed in the opening housing 481. The cam 485 may be inserted and removed through an opening of the operation space 483. The cam 485 may protrude forward with respect to the front housing 420 through the opening of the operation space 483 and the cam protruding port 422 of the front housing 420 connected to the opening. Reference numeral 482 indicates a housing fixation end to fix the opening housing 481 to the guide duct 250.

The opening housing 481 may include an opening motor 484. The opening motor 484 may generate a rotational force by power transmitted to the main panel unit 700. The rotational force of the opening motor 484 may be transmitted to the cam 485 connected to the opening motor 484 so that the cam 485 may be rotated.

The opening motor 484 may be a free motor formed to be reversely rotated when a load is applied. For example, when the opening motor 484 is operated to rotate the cam 485 and the panel unit 500 remains closed by an external force, an overload may be applied to the opening motor 484. The opening motor 484 may be rotated in a reverse direction to reduce a load.

The cam 485 may have an oval shape or a polygonal shape extending lengthwise in one direction, not a regular circle. Further, the cam 485 may have an eccentric structure in which a portion connected to the opening motor 484 is biased to one side from a center portion. Accordingly, in a process in which the cam 485 is rotated once, a portion of the cam 485 may protrude forward of the front housing 420 through the opening of the operation space 483 and the cam protruding port 422 connected to the opening of the operation space 483, and then may be inserted into the operation space 483 again.

More specifically, in the one rotation process of the cam 485, through a full storage position (referring to FIG. 33C) at which the cam 485 does not protrude from the opening housing 481 and a maximum protrusion position (referring to FIG. 33B) at which the cam 485 protrudes from the opening housing 481 as much as possible, the cam 485 may be returned to the full storage position (referring to FIG. 33C).

As another example, the opening device 480 may be linearly moved without being rotated. A portion of the opening device 480 may open the panel unit 500 while performing reciprocating movement. Further, as another example, the opening device 480 may be composed of an electromagnet that generates a repulsive force, thereby pushing the panel unit 500.

The opening device 480 may include an opening sensor 490. The opening sensor 490 may detect a rotated state of the cam 485. In other words, the opening sensor 490 may detect that the cam 485 is rotated once to be returned to an original position thereof. When the opening sensor 490 detects that the cam 485 has been completed rotated once, the main panel unit 700 may stop operation of the opening motor 484. The opening sensor 490 may be disposed at one side space of the opening housing 481, and may be pressed by the cam 485.

FIGS. 33A-33C show the panel unit 500 that is opened by the opening device 480. As shown in FIG. 33A, the cam 485 is rotated counterclockwise to protrude forward. Accordingly, the cam 485 may press a rear surface 551 of the panel unit 500 so as to allow the panel unit 500 to be opened at a predetermined angle.

In this state, when the cam 485 is further rotated, as shown in FIG. 33B, the cam 485 may be protrude as much as possible. FIG. 33B may be understood as a state in which the panel unit 500 has been moved in the first opening section starting from the first position where the panel unit 500 is completely closed.

Further, the panel unit 500 may be moved by gravity or an external force due to the user in a second opening section extending from a last end of the first opening section to the second position. As shown in FIG. 33C, the panel unit 500 is completely opened by gravity or an external force due to the user, and the cam 485 is in a state of being inserted into the opening housing 481 after completing one rotation.

As described above, when the cam 485 is returned to the full storage position where it is stored in the opening housing 481, the opening sensor 490 may be pressed by the cam 485 to detect a return signal. Further, the main panel unit 700 may stop operation of the opening motor 484 so that the cam 485 remains in the full storage position.

The series of opening movements of the panel unit 500 will be described hereinafter again.

Referring to FIGS. 34 to 40, the panel unit 500 will be described. The panel unit 500 may form a portion of the exterior shape of the front surface of the cooking appliance. The panel unit 500 may include a display unit 501 (referring to FIG. 1). The display unit 501 may include an input means that adjusts an operation of the cooking appliance and an output means that displays an operational state of the cooking appliance. For example, the panel unit 500 may include both of the input means and the output means, or the display unit 501 may be provided in a touch panel to which a touch input of the user is applied, and the input means may be integrally included in the display unit 501. For reference, the display unit 501 may be a portion of a first operation portion M1 described hereinafter.

When the display unit 501 and a touch sensor that detects a touch movement are configured as an inter-layered structure to form a touch screen, the display unit 501 may be used as not only the output device but also as the input device. The touch sensor may have a form of a touch film, a touch sheet, or a touch pad, for example.

The display unit 501 may include a lighting button 535 (referring to FIG. 1) to preset a function that manually turns on or off the lighting module 900 described hereinafter. Further, when the cooking appliance is an oven, the display unit 501 may display a self-cleaning button (not shown), for example. to preset a self-cleaning function of the cavity S1.

The panel unit 500 may be disposed in front of the front housing 420. Further, when the panel unit 500 is moved, the panel unit 500 may be disposed hereinafter the front housing 420. For reference, FIG. 2 shows a state in which the panel unit 500 covers the front housing 420 in front of the front housing 420, and FIG. 4 shows a state in which the front housing 420 is moved and the front housing 420 and the tank entrance 424 are opened.

In other words, FIG. 2 shows a closed state of the panel unit 500, and FIG. 4 shows an opened state of the panel unit 500. Further, when the panel unit 500 is opened, the water tank 450 may be removed and re-inserted. As shown in FIG. 5, the water tank 450 is ejected.

When the panel unit 500 is opened, the panel unit may serve as a kind of support when the water tank 450 is removed or inserted. When the panel unit 500 is opened, the water tank 450 may be moved along an upper surface of the panel unit 500. The upper surface of the panel unit 500 is based on the opened state of the panel unit 500.

The completely closed state of the panel unit 500 may be referred to as a first position, and the completely opened state thereof may be referred to as a second position. The panel unit 500 may be moved from the first position to the second position, and reversely, may be moved from the second position to the first position.

Further, a section in which the panel unit 500 is moved from the first position to the second position may be divided into the first opening section and the second opening section. The first opening section refers to a section where the panel unit 500 is moved by the opening device 480, and the second opening section refers to a section extending from the first opening section to the second position.

Figure 47:
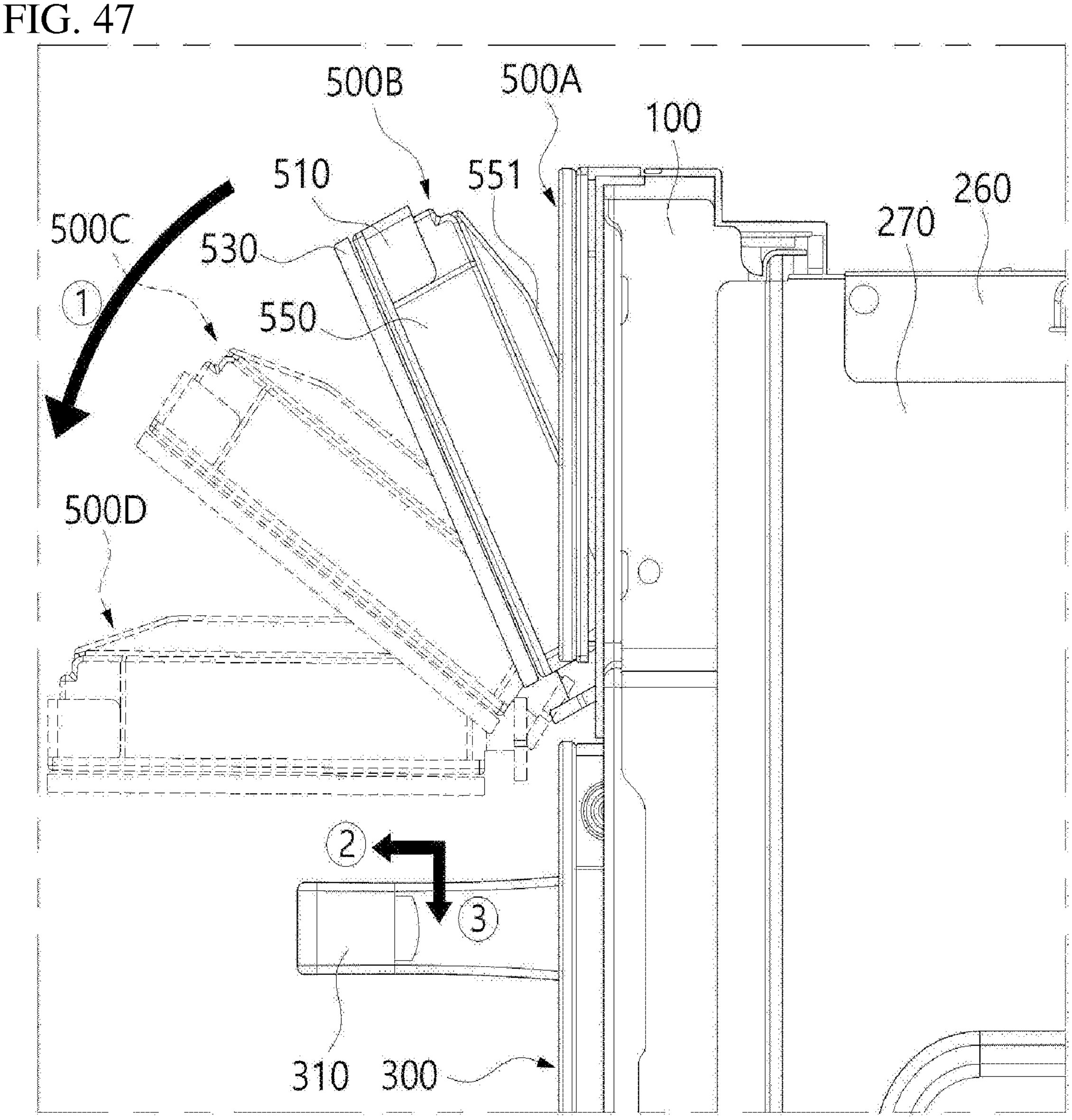
FIG. 47 is an operational state view sequentially showing opening of the panel unit according to an embodiment.

As described above, the panel unit 500 may be moved by the opening device 480 within the first opening section starting from the first position (referring to 500B in FIG. 47). Further, the panel unit 500 may be moved by gravity or an external force of the user within the second opening section extending from the last end of the first opening section to the second position (referring to 500D in FIG. 47).

More specifically, when the panel unit 500 is moved through the first opening section, the panel unit 500 is in a state of being opened at a predetermined angle. Accordingly, a torque on the hinge modules 600 the due to gravity is generated in the panel unit 500. The torque due to gravity may allow the panel unit 500 to be naturally rotated within the second opening section.

As another example, when a tension or a frictional force due to the hinge modules 600 is larger than the torque due to gravity, the panel unit 500 may be stopped at the last end of the first opening section. In this state, when the user further rotates the panel unit 500 downward, the panel unit 500 may be moved to the second position.

Figure 34:
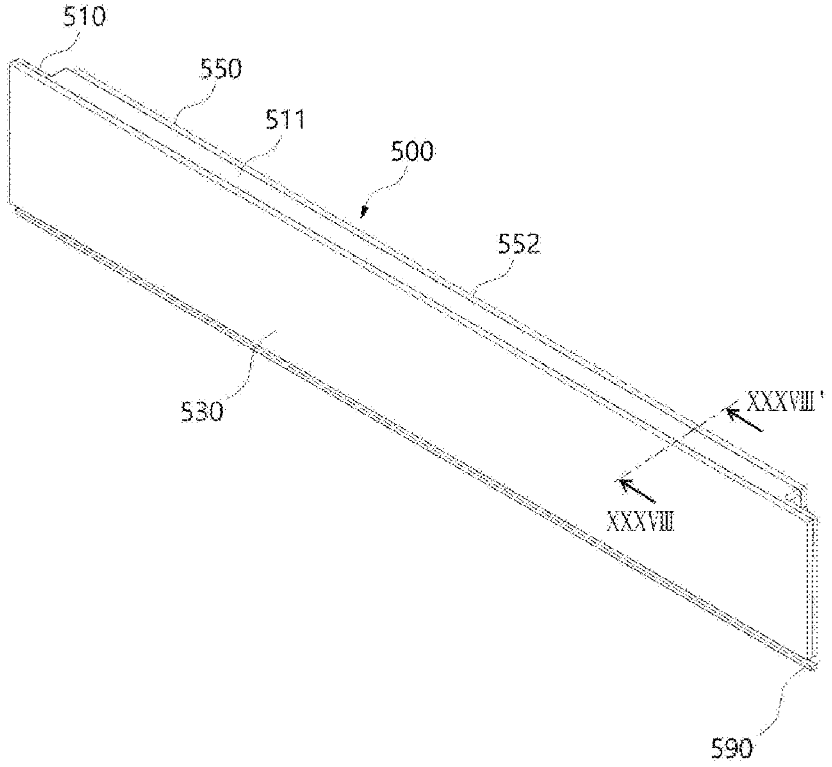
FIG. 34 is a perspective view of the panel unit according to an embodiment.

As shown in FIG. 34, the panel unit 500 may have an approximately hexahedral shape extending lengthwise in the leftward-rightward direction. The panel unit 500 may have a predetermined thickness, and may have a space therein for various components described hereinafter to be mounted therein.

When the panel unit 500 is located in the first position, the front surface of the panel unit 500 may be exposed in a direction towards the user, that is, forward. In addition, the rear surface 551 of the panel unit 500 may face the control panel 530.

Figure 35:
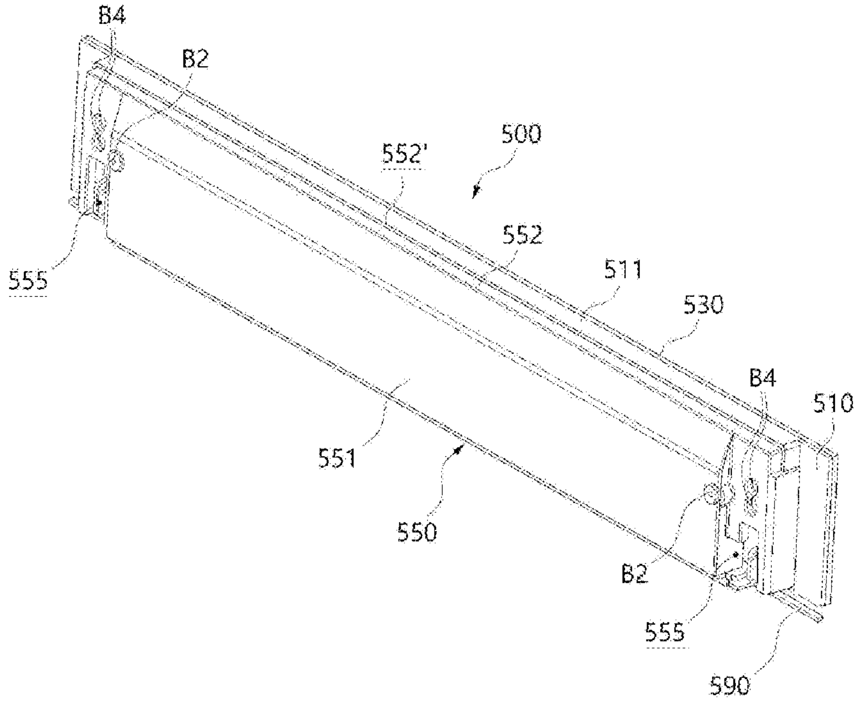
FIG. 35 is a perspective view of the panel unit according to an embodiment, at an angle different from an angle in FIG. 34.

FIG. 35 is a view showing the rear surface 551 of the panel unit 500. The pair of hinge modules 600 may be respectively connected to opposite ends of the panel unit 500. Reference numeral 555 indicates a hinge assembly port into which each of the hinge modules 600 is inserted, and a coupling structure between the hinge assembly port and each of the hinge modules 600 will be described hereinafter.

Figure 36:
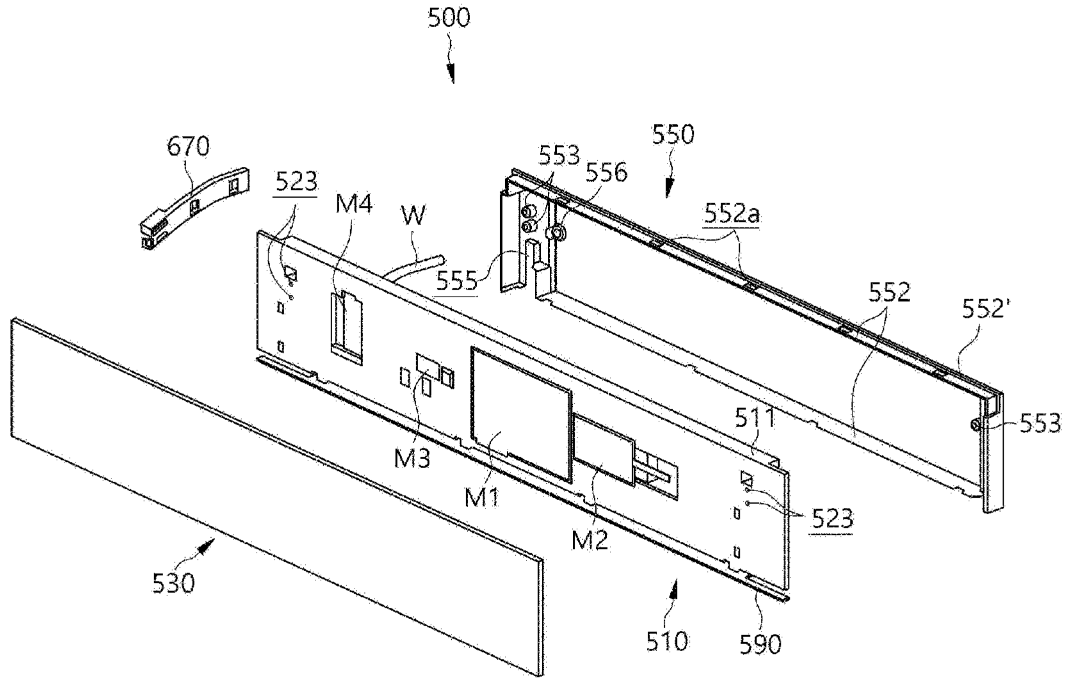
FIG. 36 is an exploded-perspective view of the panel unit according to an embodiment.
Figure 37:
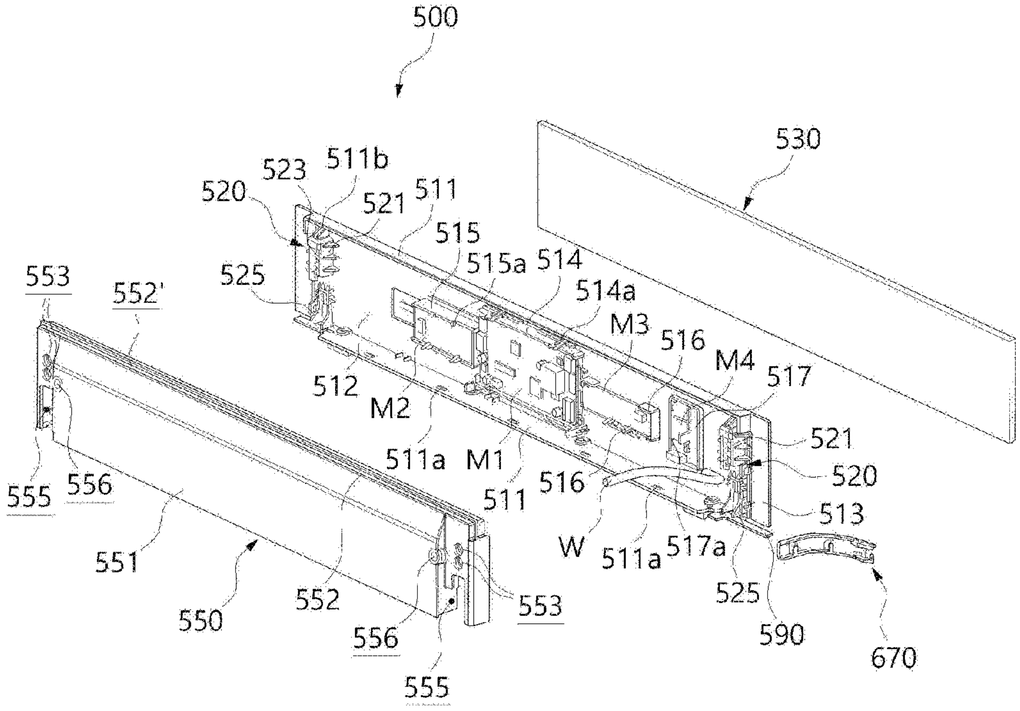
FIG. 37 is an exploded-perspective view of the panel unit according to an embodiment, at an angle different from an angle in FIG. 36.

Referring to FIGS. 36 and 37, the panel unit 500 may be composed of a plurality of components. Based on the main housing 510 constituting the center portion of the panel unit 500, the control panel 530 may be disposed at a front side, and a cover frame 550 may be disposed at a rear side. In this embodiment, the control panel 530 may extend in the leftward-rightward direction longer than the cover frame 550.

The control panel 530 may cover a front surface of the main housing 510, and may expose at least a portion of the first operation portion M1, a second operation portion M2, or a third operation portion M3 escribed hereinafter, forward. Further, an empty space may be formed between the main housing 510 and the cover frame 550 for components to be mounted therein.

The main housing 510 may have an approximately square plate shape. The main housing 510 may be disposed between the control panel 530 and the cover frame 550. When viewed from the front side of the panel unit 500, the main housing 510 may be covered at most of its surface thereof by the control panel 530.

The main housing 510 may accommodate components including the first to third operation portions to M3. Further, the main housing 510 may include a hinge coupled portion 520 respectively coupled to each of the hinge modules 600. A structure of the hinge coupled portion 520 will be described hereinafter.

As shown in FIG. 37, housing fences 511 may be provided on edges of the main housing 510. The housing fences 511 may be disposed to enclose a center portion of the main housing 510. The housing fences 511 may protrude rearwards. In this embodiment, the housing fences 511 may be respectively disposed at an upper portion and a lower portion of the main housing 510.

A housing fence 511 provided at the lower end of the main housing 510 may be formed longer than a housing fence 511 provided on the upper end of the main housing 510, in a coupling direction between the main housing 510 and the cover frame 550. Each of the housing fences 511 may include first fastening steps 511*a*. The first fastening steps 511*a* may protrude from each housing fence 511 towards the center portion of the main housing 510. Second fastening steps 552*a* of the cover frame 550 described hereinafter may be caught by the first fastening steps 511*a*.

The housing fences 511 may respectively include sealing members 511*b*. Each of the sealing members 511*b* may be disposed on an upper end of each of the housing fences 511. The sealing members 511*b* may serve to prevent penetration of water into the panel unit 500. Each of the sealing members 511*b* may be disposed along the upper end of each of the housing fences 511 to seal a gap between the main housing 510 and the cover frame 550. A waterproof function of the sealing members 511*b* will be described hereinafter.

A component mounting portion 512 may be provided on a rear surface of the main housing 510. The component mounting portion 512 may be formed at a center portion of the rear surface of the main housing 510, the center portion being surrounded by the housing fences 511 and a pair of hinge coupled portions 520 described hereinafter. The first to third operation portions M1 to M3, and a communication module M4, for example, may be disposed on the component mounting portion 512.

The component mounting portion 512 may be defined as the pair of housing fences 511 disposed on the upper and lower ends of the panel unit 500, and a pair of sealing fences 518 that connect the pair of housing fences 511 to each other, and spaced apart from each other in the leftward-rightward direction. In other words, the component mounting portion 512 may be understood as a space surrounded by the pair of housing fences 511 and the pair of sealing fences 518.

The component mounting portion 512 may include a cover assembly portion 513. The cover assembly portion 513 may be disposed towards an edge of the component mounting portion 512. The cover assembly portion 513 is provided for assembly between the main housing 510 and the cover frame 550. The cover assembly portion 513 may have a hook structure that protrudes towards the cover frame 550. A relative assembling portion (not shown) of the cover frame 550 may be caught by the cover assembly portion 513.

The first operation portion M1 may be disposed in the main housing 510. The first operation portion M1 may serve to receive input of the user, and to output information to the user at the same time. The first operation portion M1 may include a circuit board, and a touch screen, for example, connected to the circuit board.

The circuit board of the first operation portion M1 may be disposed to face the cover frame 550. Further, the touch screen may be disposed to face the control panel 530. The touch screen may be composed of a capacitive touch screen. In this case, the user can touch the control panel 530 to input a signal into the touch screen in a capacitive method. The touch screen may be understood as the display unit 501 described above.

The component mounting portion 512 of main housing 510 may include a first mounting guide 514 to fix the first operation portion M1. The first mounting guide 514 may have an approximate square frame structure surrounding the first operation portion M1. The first mounting guide 514 may be integrally formed with the component mounting portion 512, but may be provided separately from the component mounting portion 512. In other words, after the first operation portion M1 is first fixed to the first mounting guide 514, the first mounting guide 514 may be mounted to the component mounting portion 512. Reference numeral 514*a* indicates a first fixing hook to fix the first mounting guide 514 to the component mounting portion 512.

The second operation portion M2 may be disposed in the main housing 510. As described in the first operation portion M1, the second operation portion M2 may serve to receive input of the user, and to output information to the user at the same time. Otherwise, the second operation portion M2 may only perform a function of inputting a specific function. For example, the user can activate functions such as steam cooking, steam cleaning, for example. through the second operation portion M2.

The component mounting portion 512 of main housing 510 may include a second mounting guide 515 to fix the second operation portion M2. The second mounting guide 515 may have an approximate square frame structure surrounding the second operation portion M2. The second mounting guide 515 may be integrally formed with the component mounting portion 512, but may be provided separately from the component mounting portion 512. In other words, after the second operation portion M2 is first fixed to the second mounting guide 515, the second mounting guide 515 may be mounted to the component mounting portion 512. Reference numeral 515*a* indicates a second fixing hook to fix the second mounting guide 515 to the component mounting portion 512.

The third operation portion M3 may be disposed in the main housing 510. As described in the first and second operation portions M1 and M2, the third operation portion M3 may serve to receive input of the user, and to output information to the user at the same time. Otherwise, the third operation portion M3 may receive only a specific input signal. For example, the user may turn on or off power of the cooking appliance through the third operation portion M3.

The component mounting portion 512 of main housing 510 may include a third mounting guide 516 to fix the third operation portion M3. The third mounting guide 516 may have an approximate square frame structure surrounding the third operation portion M3. The third mounting guide 516 may be integrally formed with the component mounting portion 512, but may be provided separately from the component mounting portion 512. In other words, after the third operation portion M3 is first fixed to the third mounting guide 516, the third mounting guide 516 may be mounted to the component mounting portion 512. Reference numeral 516*a* indicates a third fixing hook to fix the third mounting guide 516 to the component mounting portion 512.

As another example, the first operation portion M1, the second operation portion M2, and the third operation portion M3 may be unified into one panel unit. For example, all functions of the second operation portion M2 and the third operation portion M3 may be included in the first operation portion M1.

The communication module M4 may be disposed in the component mounting portion 512 of the main housing 510. The communication module M4 may connect the cooking appliance wirelessly to the outside space. For example, the communication module M4 may implement various communication techniques, such as WLAN, Wi-Fi, Bluetooth, ZigBee, Zwave, and/or 5G, for example, for IoT. The user may control the cooking appliance at the outside space through the communication module M4. Further, the cooking appliance may receive external information through the communication module M4 to update cooking functions, or may transmit a problem of the cooking appliance to the outside space.

The component mounting portion 512 of main housing 510 may include a fourth mounting guide 517 to fix the fourth operation part M4. The fourth mounting guide 517 may have an approximate square frame structure surrounding the communication module M4. The fourth mounting guide 517 may be integrally formed with the component mounting portion 512, but may be provided separately from the component mounting portion 512. In other words, after the communication module M4 is fixed to the fourth mounting guide 517 first, the fourth mounting guide 517 may be mounted to the component mounting portion 512. Reference numeral 517*a* indicates a fourth fixing hook to fix the fourth mounting guide 517 to the component mounting portion 512.

The first to third operation portions M1 to M3 and the communication module M4 may be connected to the main panel unit 700 with a wire harness W. The wire harness W may be connected to the internal space of the electric chamber S2 along the hinge modules 600 described hereinafter. More specifically, the wire harness W may extend along either of the pair of hinge modules 600, and may be connected to the main panel unit 700 disposed in the electric chamber S2. The wire harness W may be covered by a wire cover 670, and a structure of the wire cover 670 will be described hereinafter.

The hinge coupled portion 520 may be provided in the main housing 510. The hinge coupled portion 520 is provided to couple the panel unit 500 to each of the hinge modules 600. The hinge coupled portion 520 may be respectively provided at each of left and right or lateral portions of the component mounting portion 512. The hinge coupled portion 520 may be integrally provided in the main housing 510. Structure of the hinge coupled portion 520 will be described with each hinge module 600 hereinafter.

The control panel 530 may be coupled to the main housing 510. The control panel 530 may be coupled to the main housing 510 to constitute the front surface of the panel unit 500. The front surface of the panel unit 500 is defined based on when the panel unit 500 is located in the first position. When the panel unit 500 is located in the second position, the control panel 530 is directed downward and may constitute a lower surface of the panel unit 500.

The control panel 530 may serve as a portion where the user touches when the user inputs a signal through the first to third operation portions M1 to M3. Further, the control panel 530 may serve to display output information forward when the first to third operation portions M1 to M3 output information of the cooking appliance.

The control panel 530 may be made of a tempered glass for touch screen or polymethylmethacrylate (PMMA). As another example, the control panel 530 may be integrally formed in the main housing 510 or may be a thin film, or may be omitted.

The cover frame 550 may be provided at the rear side of the main housing 510 that corresponds to the opposite side of the control panel 530. The cover frame 550 may be assembled to the main housing 510 to constitute the rear surface 551 of the panel unit 500. The cover frame 550 may be assembled to the main housing 510 to shield the component mounting portion 512.

The cover frame 550 may be shorter in transverse length than the main housing 510 and the control panel 530. The cover frame 550 disposed at the rear of the control panel 530 exposed towards the user may be exposed relatively less, and may improve the aesthetic of the panel unit 500.

Cover fences 552 may be provided on edges of the cover frame 550. Each of the cover fences 552 may protrude from an edge of a front surface of the cover frame 550 forward, that is, towards the control panel 530. The cover fences 552 may be overlapped with the housing fences 511 of the main housing 510 to prevent external dust or moisture, for example, from penetrating into the panel unit 500.

The cover fences 552 may be respectively provided along an upper end and a lower end of the cover frame 550. More specifically, the cover fences 552 may respectively extend in the leftward-rightward direction on the upper end and the lower end of the cover frame 550.

Lower cover fence 552 provided on the lower end of the cover frame 550 may be formed longer than an upper cover fence 552 provided on the upper end of the cover frame 550 in a coupling direction between the main housing 510 and the cover frame 550.

Accordingly, an overlapped area between the lower housing fence 511 and the lower cover fence 552 at the lower end of the panel unit 500 may be formed wider than an overlapped area between the upper housing fence 511 and the upper cover fence 552 at the upper end of the panel unit 500. When the panel unit 500 is located in the second position, a sealing area of the panel unit 500 may be formed larger at the rear side of the panel unit 500 where a contact area between the panel unit 500 and the water tank 450 is larger (based on FIG. 5).

Figure 38:
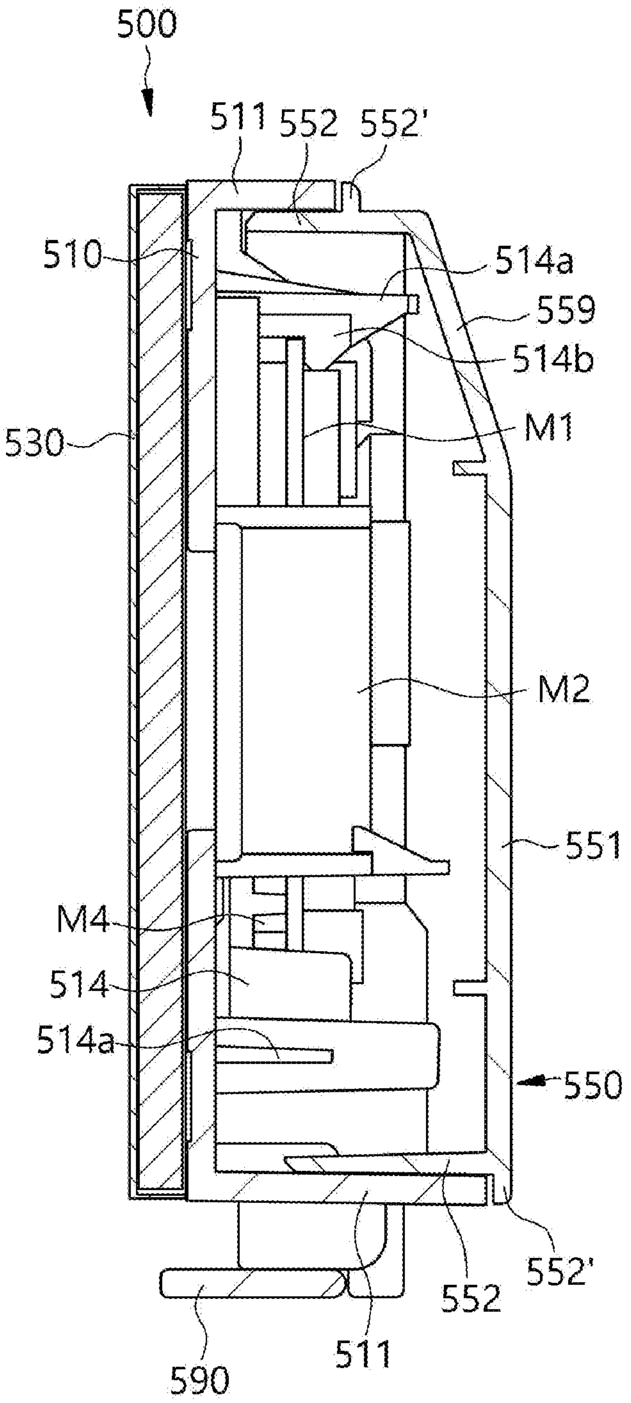
FIG. 38 is a cross-sectional view, taken along line XXXVIII-XXXVIII' in FIG. 34.

When the cover fences 552 are overlapped with the housing fences 511 of the main housing 510, the cover fences 552 may be in surface-contact with the housing fences 511, respectively. FIG. 38 is a view showing that the cover fences 552 may be vertically stacked with the housing fences 511, and be in surface-contact with each other.

Each of the housing fences 511 and each of the cover fences 552 may be disposed to face each other along two surfaces thereof. FIG. 38 is a view showing that one end of each of the housing fences 511 faces each of stopper ribs 552' provided in the cover fences 552. In FIG. 38, it is shown that one end of each of the housing fences 511 is spaced apart from each of the stopper ribs 552' provided in the cover fences 552, but one end of each of the housing fences 511 may be in close contact with the stopper ribs 552'. Further, although not shown in FIG. 38, each of the sealing members 511*b* is disposed between one end of each of the housing fences 511 and each of the stopper ribs 552', so that each of the sealing members may be compressed between one end of each of the housing fences 511 and each of the stopper ribs 552'.

The cover fences 552 may be provided to continuously surround edges of the cover frame 550, or may be provided intermittently. Each of the cover fences 552 may have a thin and unidirectional long plate structure, for example. As shown in FIG. 36, the cover fences 552 may be respectively provided in parallel along an upper portion and a lower portion of the cover frame 550. Reference numeral 552*a* indicates the second fastening steps 552*a* fixed by being caught by the first fastening steps 511*a* of the main housing 510.

As shown in FIG. 38, the cover fences 552 may be respectively stacked with the housing fences 511 of the main housing 510. Each of the housing fences 511 may be disposed at a position relatively further than the cover fences 552. Further, the housing fences 511 and the cover fences 552 may have surface-contact areas therebetween, thereby efficiently preventing penetration of external foreign substances or moisture.

The cover fences 552 may include the stopper ribs 552', respectively. Each of the stopper ribs 552' may limit an assembly depth when the cover frame 550 and the main housing 510 are assembled to each other. Each of the stopper ribs 552' may protrude further outwards from a surface of each of the cover fences 552. Further, each of the stopper ribs 552' may serve to cover an assembly portion between the main housing 510 and the cover frame 550.

A protruding height of each of the stopper ribs 552' from the surface of each of the cover fences 552 may be equal to or less than a thickness of each of the housing fences 511. Thus, each of the stopper ribs 552' does not protrude further outwards than the surface of each of the housing fences 511.

As shown in FIG. 37, a cover hinge hole 553 may be provided in the cover frame 550. The cover hinge hole 553 may be formed by penetrating through the cover frame 550 in the frontward-rearward direction. The cover hinge hole 553 may be respectively connected to a hinge fastening hole 523*a* (referring to FIG. 53) of the main housing 510. As a block fastener B4 is tightened, the block fastener B4 may pass through the cover hinge hole 553, a connection block 625 of each of the hinge modules 600, and the hinge fastening hole 523*a* in order. More specifically, the block fastener B4 may respectively pass through each cover hinge hole 553, each block assembly hole 625*a'* (referring to FIG. 54) of the connection block 625, and each hinge fastening hole 523*a* that are connected to each other to assemble the hinge modules 600 and the panel unit 500 to each other. In this embodiment, two cover hinge holes 553 may be disposed in the cover frame 550 with a different height from each other.

A hinge assembly port 555 may be open at a position adjacent to the cover hinge holes 553. The drive arm 620 of each of the hinge modules 600 may be inserted into each of the hinge assembly ports 555 when each of the hinge modules 600 is assembled to the panel unit 500. The hinge assembly ports 555 may be provided at opposite portions of the cover frame 550. Further, the hinge assembly ports 555 may be formed to extend to the lower end of the cover frame 550.

Cover fastening holes 556 may be provided in the cover frame 550. The cover fastening holes 556 may be provided to assemble the cover frame 550 to the main housing 510 with cover fasteners B2 (referring to FIG. 35). The cover fastening holes 556 may be respectively disposed at positions adjacent to the hinge assembly ports 555. As another example, the cover fastening holes 556 may be omitted, and the main housing 510 and the cover frame 550 may be assembled to each other with the structure of the first fastening steps 511*a*, and the second fastening steps 552*a*, for example.

A rear surface of the cover frame 550 may serve as the rear surface 551 of the panel unit 500. More specifically, when the panel unit 500 is located in the first position, the rear surface of the cover frame 550 is directed towards the front frame 280 and the front housing 420. Accordingly, when the opening device 480 is operated, the cam 485 of the opening device 480 presses the rear surface of the cover frame 550.

As shown in FIG. 38, a cover inclined portion 559 may be formed in the cover frame 550. Based on when the panel unit 500 is located in the first position, the cover inclined portion 559 may be formed to be inclined toward the upper cover fence 552 provided on the upper end of the cover frame 550. When the panel unit 500 is located in the second position and water pours onto the rear surface 551 of the cover frame 550, the cover inclined portion 559 may guide the water to flow downward.

Further, when the panel unit 500 is located in the first position, the cover inclined portion 559 may generate a gap between the rear surface 551 of the cover frame 550 and the front surface of the front housing 420. The user may put a hand into the gap between the cover inclined portion 559 and the front housing 420. Further, the user may grip the upper portion of the panel unit 500, and move the panel unit 500 from the first position to the second position, or vice versa.

Of course, the panel unit 500 may be moved by the opening device 480; however, when the user manually moves the panel unit 500, the user may more easily grip the panel unit 500 through the cover inclined portion 559. More specifically, the cover inclined portion 559 may reduce a thickness of the upper portion of the panel unit 500 so that the user may easily grip the upper portion of the panel unit.

Figure 39:
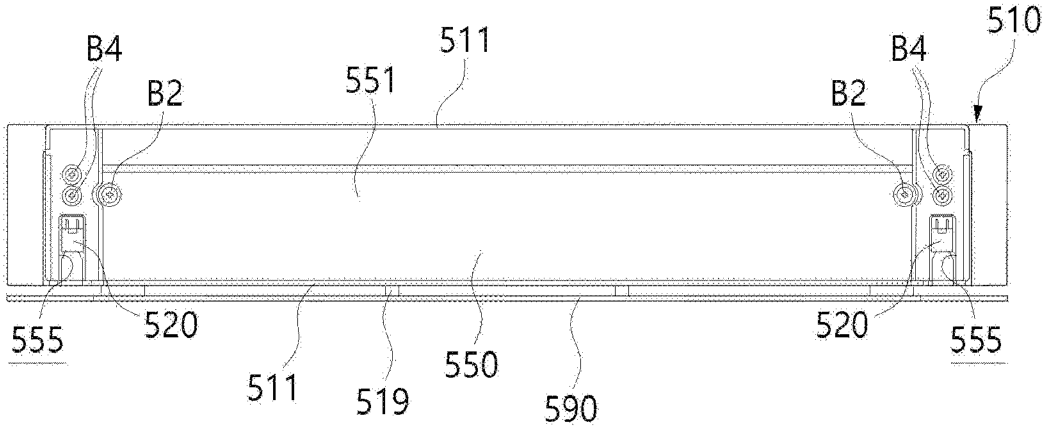
FIG. 39 is a rear view of the panel unit according to an embodiment.
Figure 40:
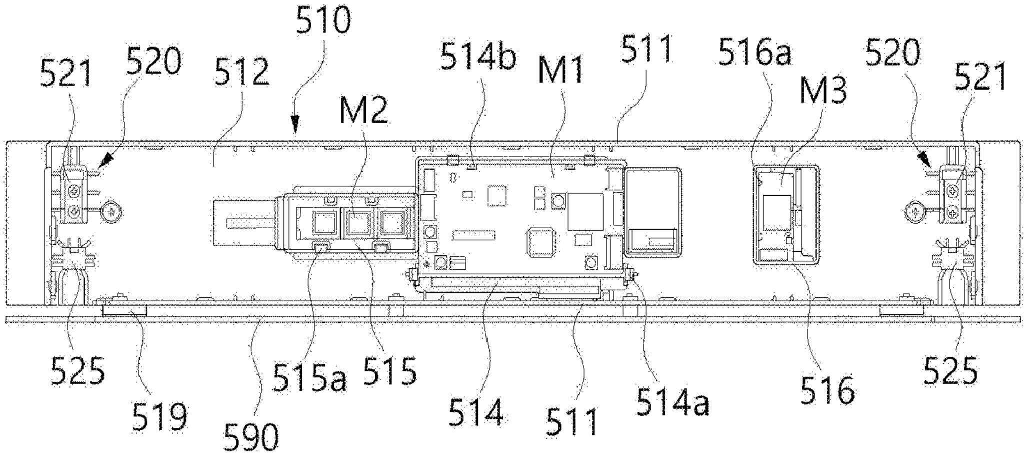
FIG. 40 is a rear view showing the panel unit according to an embodiment without a cover frame.
Figure 41:
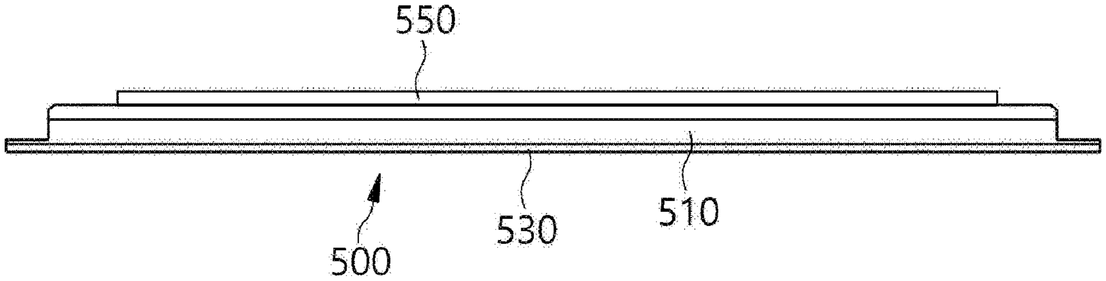
FIG. 41 is a plan view of the panel unit according to another embodiment.
Figure 42:
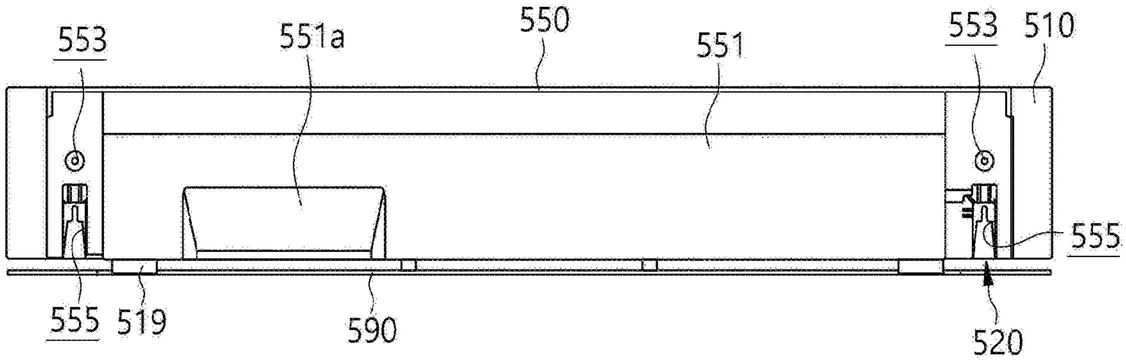
FIG. 42 is a rear view of the panel unit according to another embodiment.

As shown in FIGS. 39 and 40, the air guide 590 may be provided at a lower portion of the panel unit 500. The air guide 590 may protrude further downward from the lower portion of the panel unit 500. The air guide 590 may be connected to a lower surface of the main housing 510. As another example, the air guide 590 may be connected to a lower surface of the cover frame 550.

The air guide 590 may be disposed at the lower portion of the panel unit 500 to cover the exhaust port 282. The air guide 590 may be disposed in front of the exhaust port 282 to hide the exhaust port 282 from the user's view.

Further, the air guide 590 may guide air discharged through the exhaust port 282 and the air discharged through the door exhaust port 377 of the door frame 370 to be efficiently discharged forward without generating a vortex. The air guide 590 is exposed to the discharge air having a high temperature, so it is advantageous for the air guide 590 to be made of a metal material with high durability.

The air guide 590 may be connected to connection legs 519 disposed at the lower portion of the panel unit 500. The connection legs 519 may extend further downward from the lower surface of the main housing 510. The connection legs 519 may be integrally formed with the main housing 510, or may be formed in a separate object.

The air guide 590 may be coupled to a plurality of connection legs 519. The air guide 590 may have a flat plate structure. In this embodiment, the air guide 590 may be assembled with the connection legs 519 through a fastener. As another example, the air guide 590 may be assembled to the connection legs 519 by an adhesive, or may be coupled to the connection legs 519 through a pressure structure.

Referring to FIG. 38, the air guide 590 may have a longitudinal length longer than a vertical length thereof. Accordingly, the air guide 590 may guide a discharge direction of air discharged forward.

FIGS. 41 to 46 show another embodiment of the panel unit 500. For reference, repetitive description of structure of the panel unit 500 the same as the previous embodiment has been omitted.

The rear surface 551 of the panel unit 500 may have a pocket guide 551*a*. The pocket guide 551*a* may have a structure that is recessed from the rear surface 551 of the panel unit 500. The pocket guide 551*a* may be disposed in front of the pocket P. Accordingly, the pocket guide 551*a* may allow the user to more easily recognize a position of the pocket P.

The pocket guide 551*a* may be provided in the cover frame 550 of the panel unit 500. The pocket guide 551*a* may extend from a middle position of the rear surface of the cover frame 550 to an end thereof. Further, a recessed depth of the pocket guide 551*a* may be gradually larger in a direction toward the end of the cover frame 550. When the user grips the water tank 450 through the pocket P, the user may first move a hand toward the pocket P along the pocket guide 551*a*.

For better understanding, FIG. 19 shows the panel unit 500 having the pocket guide 551*a*. As the pocket guide 551*a* is disposed in front of the pocket P, the user may intuitively push his or her hand into the pocket P along the pocket guide 551*a*. Further, when the water tank 450 is removed, friction between the lower surface of the water tank 450 and the surface of the panel unit 500 may be reduced due to the pocket guide 551*a*.

Figure 43:
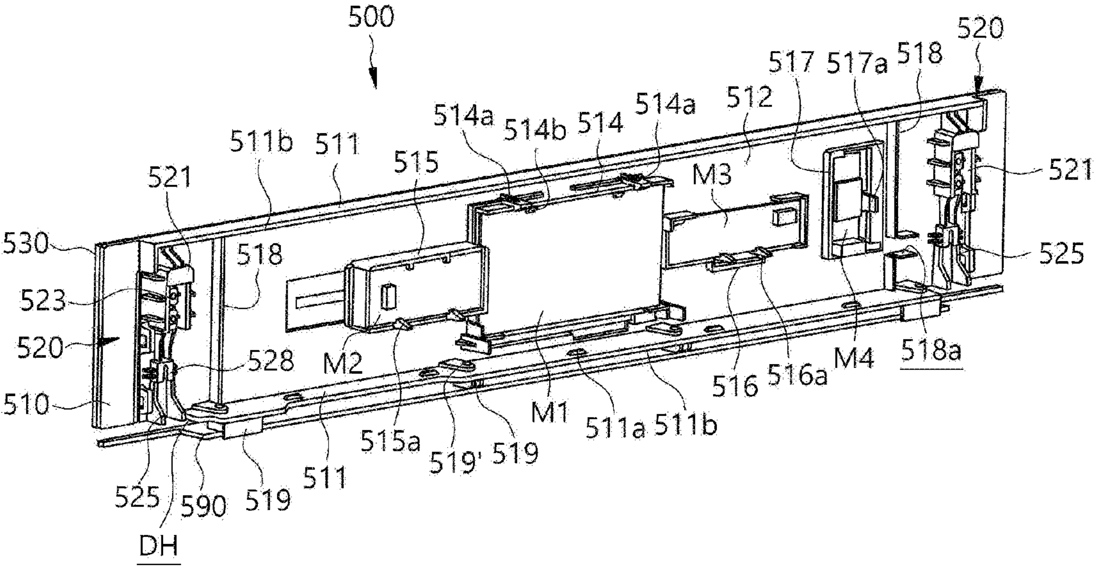
FIG. 43 is a perspective view showing the panel unit shown in FIG. 42 without the cover frame according to another embodiment.
Figure 44:
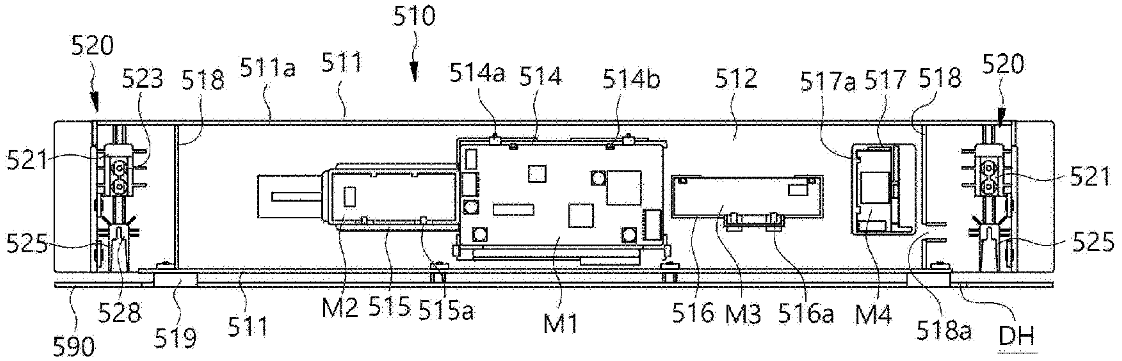
FIG. 44 is a rear view showing the panel unit shown in FIG. 42 without the cover frame according to another embodiment.

FIGS. 43 and 44 show a state of removing the cover frame 550 from the panel unit 500. The pair of sealing fences 518 may be provided in the component mounting portion 512. The pair of sealing fences 518 may stand upright in the component mounting portion 512. The pair of sealing fences 518 may be disposed at positions outside radially outward of the first to third operation portions M1 to M3 and the communication module M4 which are disposed in the component mounting portion 512. The pair of sealing fences 518 may prevent penetration of moisture or foreign substances into a center portion of the component mounting portion 512.

The pair of sealing fences 518 may be respectively provided at opposite portions of the component mounting portion 512. The pair of sealing fences 518 may prevent penetration of moisture or foreign substances towards the center portion of the component mounting portion 512 outside the component mounting portion 512, respectively.

Each of the pair of sealing fences 518 may be disposed between the component mounting portion 512 and the hinge coupled portion 520. Accordingly, even when penetration of moisture or foreign substances through the hinge coupled portion 520 occurs, the pair of sealing fences 518 may prevent penetration of moisture or foreign substances towards the component mounting portion 512.

More specifically, each sealing fence 518 may be respectively disposed to be spaced apart from each hinge coupled portion 520. Accordingly, a predetermined empty space may be formed between each sealing fence 518 and each hinge coupled portion 520. The empty space may store penetrated moisture or foreign substances.

Among the housing fences 511, the housing fence 511 provided at the lower end of the main housing 510 and each hinge coupled portion 520 may be spaced apart from each other. A drain hole DH may be formed in this space formed as described above. Further, each sealing fence 518 may be spaced apart from the housing fence 511 provided on the lower end of the main housing in a direction of the component mounting portion 512. Therefore, moisture or foreign substances remaining in an empty space between each sealing fence 518 and each hinge coupled portion 520 may be discharged downward through each drain hole DH.

More specifically, each drain hole DH may be formed between the housing fence 511 provided on the lower end of the main housing 510 and each hinge coupled portion 520. Further, each drain hole DH may be open downward based on the panel unit 500 located in the first position. Therefore, moisture and foreign substances may be moved downward by gravity, and may be discharged through each drain hole DH.

The housing fence 511 provided on the upper end of the main housing 510 may be connected to the hinge coupled portion 520. Accordingly, each drain hole DH may be formed at only the lower portion of the panel unit 500.

Opposite ends of each sealing fence 518 may be respectively connected to the upper housing fence 511 and the lower housing fences 511. Accordingly, the pair of sealing fences 518 may form an approximate square frame structure together with the pair of housing fences 511. Further, all the first to third operation portions M1 to M3 and the communication module M4 may be disposed in the square frame structure formed by the pair of sealing fences 518 and the pair of housing fences 511.

As another example, the sealing fence 518 may be provided in the cover frame 550, not in the main housing 510. The sealing fence 518 may protrude from the cover frame 550 towards the component mounting portion 512 of the main housing 510.

The pair of sealing fences 518 may be formed with protruding heights lower than protruding heights of the housing fences 511. When the sealing fence 518 is lower than the housing fence 511, a surface of the sealing fence 518 and a surface of the cover frame 550 may be spaced apart from each other. Air may flow through this space. When air may flow above the sealing fence 518, circuit components disposed in the component mounting portion 512 may be cooled.

The hinge coupled portion 520 may protrude higher than the sealing fence 518. The hinge coupled portion 520 formed higher as described above may serve as a cover wall itself to primarily prevent penetration of moisture and foreign substances. Further, each sealing fence 518 may serve as a kind of strength reinforcing rib.

A wire gate 518*a* may be provided on the sealing fence 518. The wire gate 518*a* may have a structure in which a portion of the sealing fence 518 is open. The wire harness W may extend outwards of the panel unit 500 through the wire gate 518*a*. A pair of guide walls may stand on portions on Mosite sides of the wire gate 518*a* to extend by a predetermined distance outwards of the main housing 510, and the wire harness W may pass through a gap between the guide walls. The wire gate 518*a* may be provided in either of the pair of sealing fences 518.

The wire gate 518*a* may be disposed to be spaced apart from both the upper end and the lower end of the main housing 510. Thus moisture and foreign substances moving along the upper end and the lower end of the main housing 510 may be prevented from moving towards the component mounting portion 512 through the wire gate 518*a*.

Figure 45:
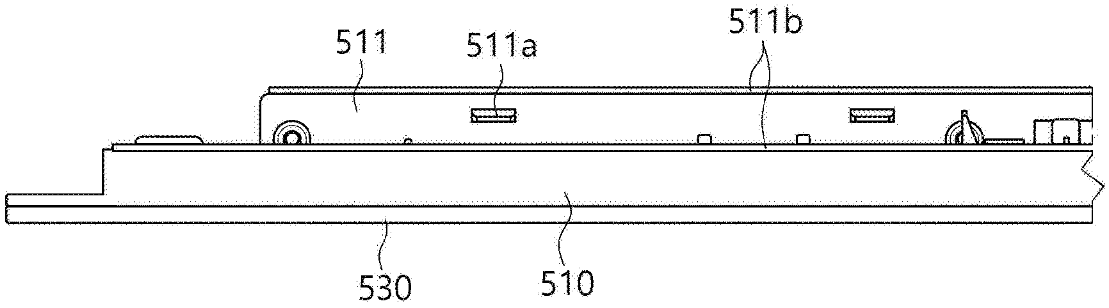
FIG. 45 is a plan view showing the panel unit shown in FIG. 42 without the cover frame according to another embodiment.
Figure 46:
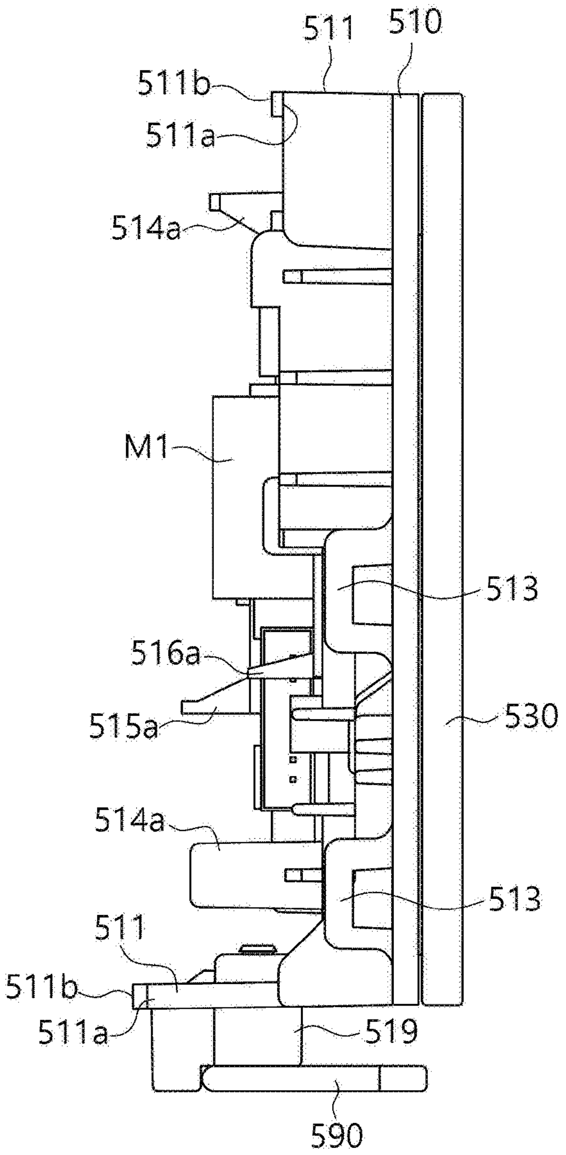
FIG. 46 is a side view showing the panel unit shown in FIG. 42 without the cover frame according to another embodiment.

As shown in FIGS. 45 and 46, each of the sealing members 511*b* may be provided on the upper end of each of the housing fences 511. Each of the sealing members 511*b* may be fixed to the upper end of each of the housing fences 511. The sealing members 511*b* may serve to prevent penetration of moisture and foreign substances into the panel unit 500. Each of the sealing members 511*b* may be disposed along the upper end of each of the housing fences 511 to seal a gap between the main housing 510 and the cover frame 550. The sealing members 511*b* may protrude in the assembly direction (leftward direction based on FIG. 46) between the housing fences 511 and the cover frame 550.

When the main housing 510 and the cover frame 550 are coupled to each other, the sealing members 511*b* may be compressed between the main housing 510 and the cover frame 550. Each housing fence 511 of the main housing 510 may face each stopper rib 552' provided in each cover fence 552 of the cover frame 550 (referring to FIG. 38), and each sealing member 511*b* disposed between each housing fence 511 and each stopper rib 552' may have a width formed larger than a gap between each housing fence 511 and each stopper rib 552' to be compressed.

Further, each sealing member 511*b* may reduce a gap between the main housing 510 and the cover frame 550. More specifically, each sealing member 511*b* may be compressed between each housing fence 511 and each stopper rib 552' to reduce a gap between the main housing 510 and the cover frame 550. Accordingly, noise due to the gap between the main housing 510 and the cover frame 550 may be reduced. Further, each sealing member may maintain a solidly fixed state between the main housing 510 and the cover frame 550.

Although not shown in the drawings, each sealing member 511*b* may be provided in an upper end of each sealing fence 518. Accordingly, edges of the component mounting portion 512 defined by the sealing fences 518 and the housing fences 511 may be sealed by the sealing members 511*b*. As another example, each of the sealing members 511*b* may be provided on an upper end of each of housing fences 511, and may be omitted in the housing fences 511.

As another example, the sealing members 511*b* may be disposed in the cover frame 550, not in the main housing 510. More specifically, each of the sealing members 511*b* may be provided at each of the cover fences 552 of the cover frame 550.

The hinge modules 600 may be connected to the panel unit 500. The hinge modules 600 may connect the panel unit 500 and the casing 100, 200 to each other, so that the panel unit 500 may be moved between the first position and the second position.

As shown in FIG. 47, the panel unit 500 may be moved between the first position, that is, a closed state, and the second position, that is, an opened state. Reference numeral 500*a* indicates the panel unit 500 located in the first position, and reference numeral 500*d* indicates the panel unit 500 located in the second position. Further, reference numerals 500*b* and 500*c* respectively indicate states of the panel unit 500 moved between the first position and the second position.

A section from the first position 500*a* to a position moved by a predetermined distance may be divided as the first opening section 500*a*-500*b*, and a section from an end 500*b* of the first opening section to the second position 500*d* may be divided as the second opening section 500*b*-500*d*. The opening device 480 described above may move the panel unit 500 by the first opening section. Further, the panel unit 500 may be moved by gravity or an external force due to the user in a second opening section extending from a last end of the first opening section to the second position.

In this embodiment, the panel unit 500 may not be rotated on a fixed rotational shaft, and may be rotated and moved forward and downward simultaneously with rotation. Based on FIG. 47, the panel unit 500 may be rotated counterclockwise (direction of arrow ①), and simultaneously, the panel unit 500 may be moved forward (direction of arrow ②) and downward, that is, a direction of gravity (direction of arrow ③).

As another example, the panel unit 500 may be rotated counterclockwise (direction of arrow ①) and simultaneously may be moved downward, that is, a direction of gravity (direction of arrow ③). As another example, the panel unit 500 may only be rotated counterclockwise (direction of arrow ①), and may not be moved forward or downward.

As described above, when the panel unit 500 is rotated and moved forward and downward at the same time, a total movement distance of the panel unit 500 may be increased. When a movement distance of the panel unit 500 is increased, the tank entrance 424 may be exposed wider towards the user.

More specifically, when the panel unit 500 is moved forward, a frontward-rearward distance in which the upper surface (the rear surface 551 of the cover frame 550) the panel unit 500 in the second position may guide removal or insertion of the water tank 450 may be increased.

Further, when the panel unit 500 is moved downward, a height of the upper surface (the rear surface 551 of the cover frame 550) of the panel unit 500 in the second position may be less than or at least equal to a height of the lower end of the tank entrance 424. The panel unit 500 lowered in height does not interfere with the water tank 450 when the water tank 450 is removed or inserted.

The lower end of the panel unit 500 in the first position 500*a* may be disposed higher than the upper end of the door 300. The lower end of the panel unit 500 may mean a lower surface of the main housing 510 or the cover frame 550. The lower end of the panel unit 500 in the second position 500*d* may be disposed lower than the upper end of the door 300. The lower end of the panel unit 500 may mean a lower surface of the control panel 530.

Further, the panel unit 500 in the second position 500*d* may be disposed at a position located farther forward from the casing 100, 200 than the front surface of the door 300. As shown in FIG. 47, the entire panel unit 500 may be disposed in front of the front surface of the door 300 (left side based on the drawing). Accordingly, a distance in which the panel unit 500 may guide insertion and removal of the water tank 450 may be formed longer.

A rotational angle of the panel unit 500 in the second opening section may be larger than a rotational angle of the panel unit 500 in the first opening section. For example, the rotational angle of the panel unit 500 in the first opening section may be between 20° and 40°, and the rotational angle of the panel unit 500 in the second opening section may be between 50° and 70°. When the panel unit 500 is rotated by the first opening section, a torque by gravity may be applied largely on each hinge module 600. Therefore, even when the opening device 480 rotates the panel unit 500 within the first opening section by a relatively small angle, the panel unit 500 may be naturally opened by gravity within the second opening section.

Further, a total rotational angle at which the panel unit 500 is rotated from the first position to the second position may be between 80° and 100°. When a rotational angle of the panel unit 500 is preset as this angle range, the panel unit 500 may serve as a kind of support when the water tank 450 is removed or inserted.

When the total rotational angle at which the panel unit 500 is rotated to the second position is 90°, the upper surface of the panel unit 500 may be parallel to a depthwise direction of the tank chamber 450*a* in which the water tank 450 is stored. Therefore, the water tank 450 may be inserted into or removed from the tank chamber 450*a* with the upper surface of the panel unit 500 as a support.

When a rotational angle of the panel unit 500 is between 80° and 89°, the panel unit 500 is in an upward raised state at a predetermined angle, and the upper surface of the panel unit 500 (the rear surface 551 of the cover frame 550 based on 500D in FIG. 47) may be in a downward inclined state in a direction of the casing 100, 200 (left side based on the drawing). Therefore, when the water tank 450 is inserted into the tank chamber 450*a*, the upper surface of the panel unit 500 may serve as a guide in order to easily insert the water tank 450.

Further, when a rotational angle of the panel unit 500 is between 91° and 100°, the panel unit 500 is in a downward sagging state at a predetermined angle, and the upper surface of the panel unit 500 (the rear surface 551 of the cover frame 550 based on 500D of FIG. 47) may be in a downward inclined state towards the outside space of the casing 100, 200 (left side based on the drawing). Therefore, when the water tank 450 is removed out of the tank chamber 450*a*, the upper surface of the panel unit 500 may serve as a guide so that the water tank 450 may be easily removed while sliding along the upper surface of the panel unit 500.

Figure 48A:
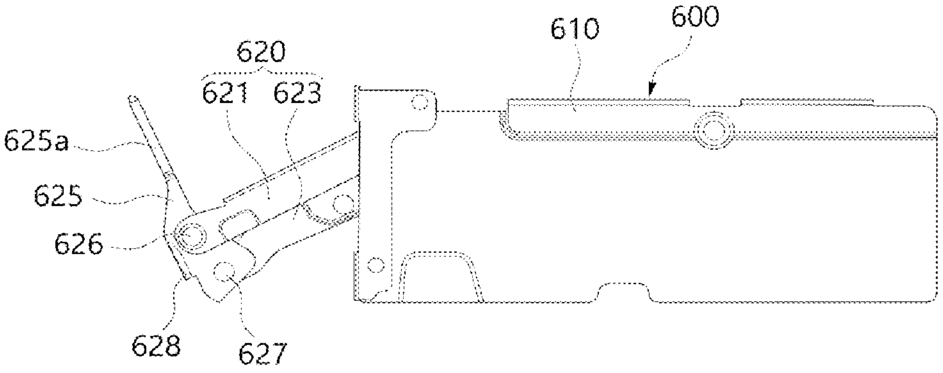
FIGS. 48A to 48C are operational state views successively showing operation of a hinge module according to an embodiment as the panel unit is opened.
Figure 48B:
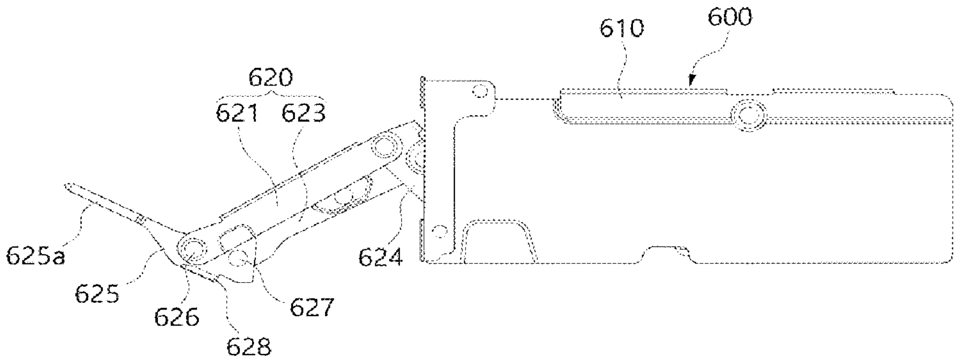
Figure 48C:
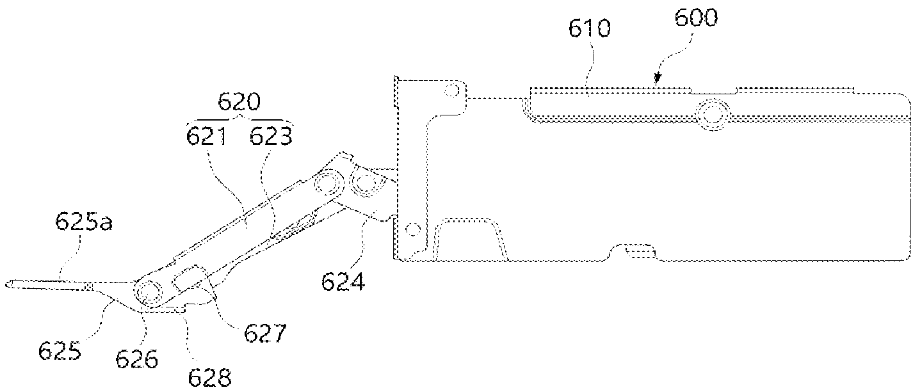

FIGS. 48A-48C are views showing operational states of each hinge module 600 in order. For reference, in FIGS. 48A-48C, each hinge module 600 is only shown without the panel unit 500. The drive arm 620 and each of connection block 625 may protrude from hinge housing 610 of each hinge module 600. The connection block 625 may be coupled to the panel unit 500 to control movement of the panel unit 500.

FIG. 48A shows each hinge module 600 when the panel unit 500 is located at the end 500*b* of the first opening section in FIG. 47. Further, FIG. 48B shows each hinge module 600 in a state 500Cc of the panel unit 500 during moving from the end 500*b* of the first opening section to the second position. FIG. 48C shows each hinge module 600 when the panel unit 500 is located in the second position 500*d*.

As shown in FIGS. 48A-4C, the connection block 625 is rotated counterclockwise and is moved forward and downward at the same time. This operation of the connection block 625 may be implemented by a plurality of links included in the hinge modules 600 and connection structure of the drive arm 620. This connection structure will be described again hereinafter.

Figure 49:
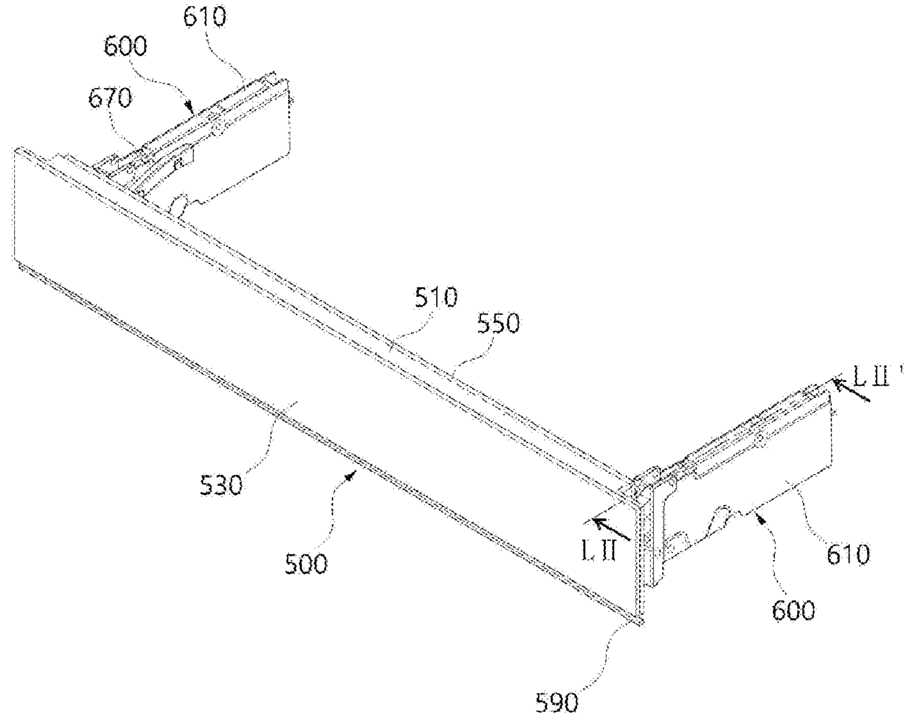
FIG. 49 is a perspective view showing a coupled state of the panel unit and hinge modules according to an embodiment.
Figure 50:
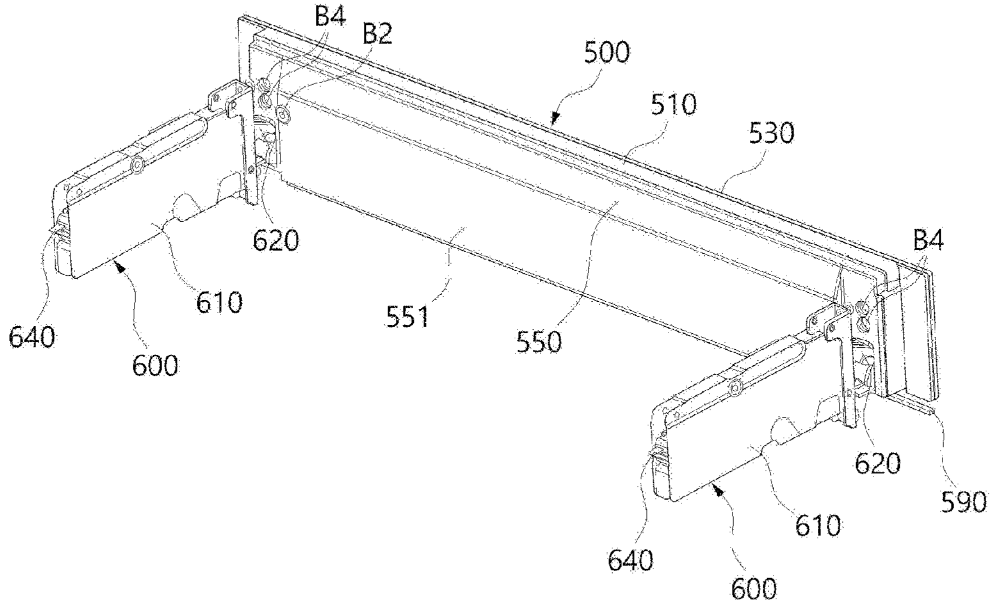
FIG. 50 is a perspective view showing the coupled state of the panel unit and the hinge modules according to an embodiment, at an angle different from an angle in FIG. 49.

FIGS. 49 and 50 show an assembled state between the hinge modules 600 and the panel unit 500. The pair of hinge modules 600 may be respectively connected to opposite ends of the panel unit 500. The pair of hinge modules 600 may have a same operational mechanism. The pair of hinge modules 600 may have a same structure, or may have a symmetric structure.

The hinge modules 600 may be inserted into the panel unit 500 through the hinge assembly ports 555 formed in the cover frame 550 of the panel unit 500, respectively. The hinge housing 610 of each of the hinge modules 600 may remain fixed to the electric chamber S2, and the drive arm 620 may only protrude to be connected to the panel unit 500. Although omitted in FIGS. 49 and 50, the front frame 280 and the front housing 420 may be disposed between the hinge modules 600 and the panel unit 500.

FIG. 51 is a cross-sectional view showing the panel unit 500 located in the first position. As shown in the drawings, the drive arm 620 of the hinge modules 600 may protrude forward of the front frame 280 and the front housing 420.

The connection block 625 rotatably connected to the drive arm 620 stands vertically together with the panel unit 500.

Each of the hinge modules 600 may be assembled to both the front housing 420 and the front frame 280 with the hinge fastener B3. The hinge fastener B3 may pass through the second hinge assembly hole 427 of the front housing 420 and the first hinge assembly hole 288 of the front frame 280 and then may be tightened to each of the hinge modules 600 disposed at the rear of the front frame 280. Accordingly, the hinge modules 600 may be solidly fixed to the front frame 280, and in this process, the front housing 420 may also be fixed to the front frame 280. For reference, the hinge fastener B3 may be fastened to both of the second hinge assembly hole 427 and the first hinge assembly hole 288 when the panel unit 500 is in the opened state, that is, in the second position.

Figure 52A:
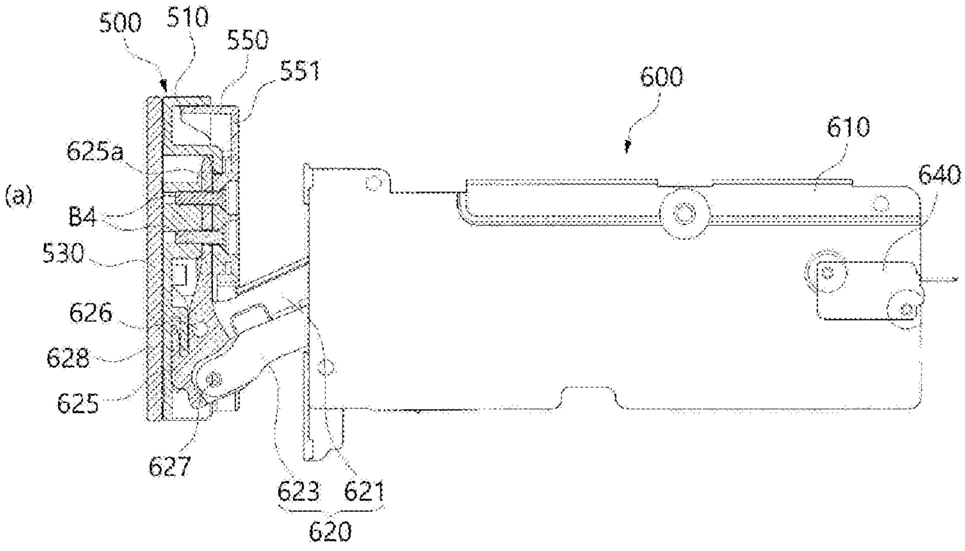
FIGS. 52A and 52B are a cross-sectional view, taken along line LII-LII' in FIG. 49, and a block diagram showing a structure of each hinge module.

Further, as shown in FIG. 52A, the connection block 625 of the hinge modules 600 may be coupled to the panel unit 500 with the block fasteners B4. The block fastener B4 may pass through the connection block 625 to be assembled to the hinge coupled portion 520 provided in the main housing 510. In this embodiment, a total of two block fasteners B4 may be fastened at different positions. The connection block 625 may be fixed to the panel unit 500 by not only the block fastener B4 but also a hinge locking structure described hereinafter (structure of block locking portion 528 and locking piece 628, referring to FIG. 55).

In FIGS. 53 to 56, structure of each hinge coupled portion 520 to fix each hinge module 600 to the panel unit 500 is shown. The hinge coupled portion 520 may be provided at the main housing 510 of the panel unit 500. The hinge coupled portion 520 may be disposed at each of opposite portions of the main housing 510. As the hinge coupled portion 520 is covered with the cover frame 550, after the panel unit 500 is assembled, exposure of most of the hinge coupled portion 520 may be prevented.

Figure 53:
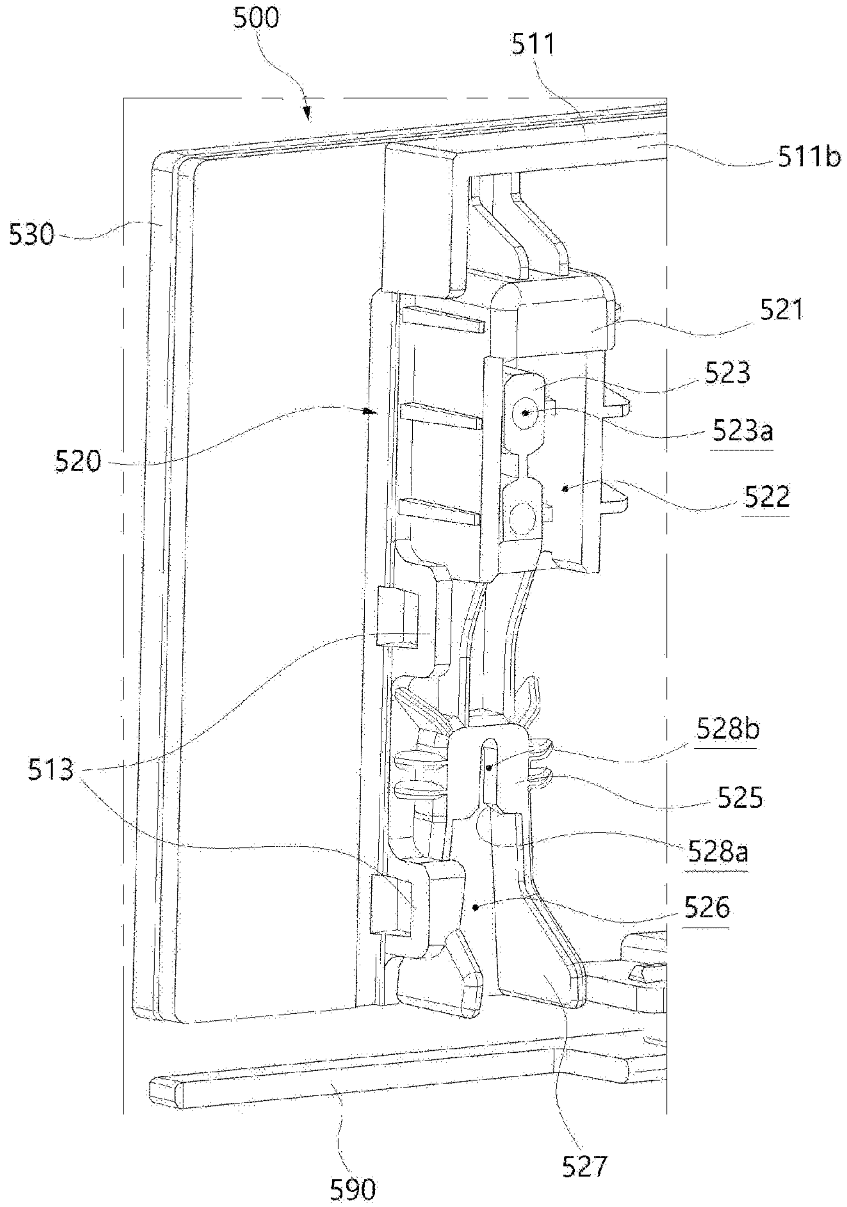
FIG. 53 is a perspective view of a hinge coupled portion without the cover frame from the panel unit according to an embodiment.

As shown in FIG. 53, the hinge coupled portion 520 may be provided at the main housing 510. The hinge coupled portion 520 may be disposed at a position close to an edge of the main housing 510. The hinge coupled portion 520 may be provided at the rear surface of the main housing 510 in the upward-downward direction, that is, a heightwise direction when the panel unit 500 is located in the first position.

The hinge coupled portion 520 may include first hinge coupled portion 521 and second hinge coupled portion 525. The first hinge coupled portion 521 and the second hinge coupled portion 525 may serve as coupling portions where the hinge modules 600 and the panel unit 500 are coupled to each other. Based on when the panel unit 500 is in the opened state, that is, in the second position, the first hinge coupled portion 521 may be disposed at a position located farther from the hinge housing 610 than the second hinge coupled portion 525.

In other words, the first hinge coupled portion 521 and the second hinge coupled portion 525 may be disposed to be spaced apart from each other in a direction perpendicular to the rotational shaft of the panel unit 500. The rotational shaft of the panel unit 500 extends in the leftward-rightward direction of the cooking appliance, and in this embodiment, the rotational shaft is not fixed in a specific position and is moved forward and downward in the moving process of the panel unit 500.

The first hinge coupled portion 521 may have protrude rearwards from the main housing 510. Further, the first hinge coupled portion 521 may surround a seating boss 523. The connection block 625 of each the hinge modules 600 may be fixed to the seating boss 523 with each of the block fasteners B4.

Figure 54:
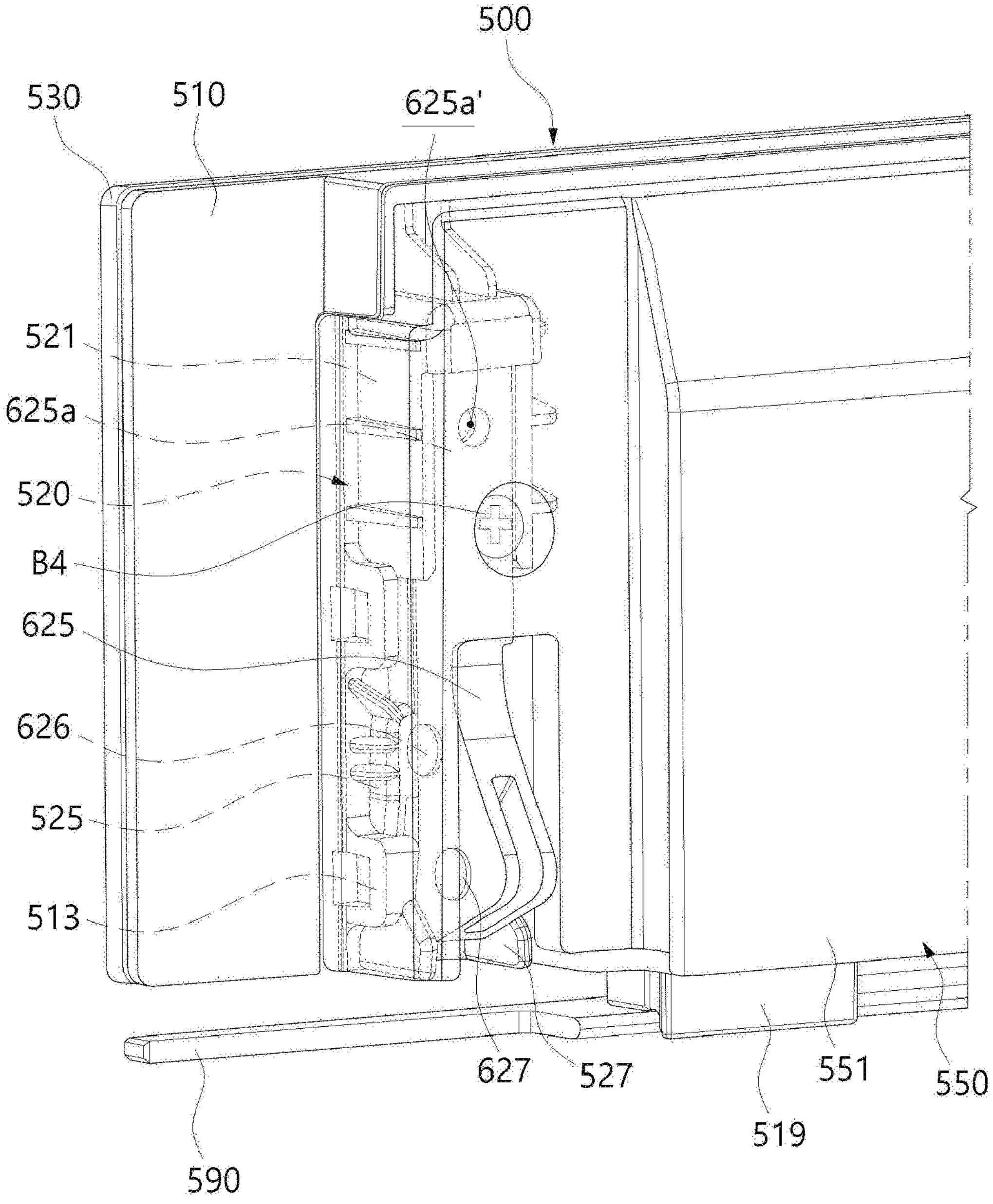
FIG. 54 is a perspective view showing a coupled state of a connection block of each hinge module to the hinge coupled portion of the panel unit according to an embodiment.

The seating boss 523 may protrude from an internal space of the first fastening space 522 formed in the first hinge coupled portion 521. The hinge fastening hole 523*a* may be formed in the seating boss 523, and each block fastener B4 may be tightened in each hinge fastening hole 523*a*. The block fastener B4 may be a screw, and a portion of an end of each block fastener B4 may be tightened in the hinge fastening hole 523*a*. For reference, FIG. 54 shows that the block fastener B4 is assembled while the connection block 625 is seated in the first hinge coupled portion 521.

The seating boss 523 and the hinge fastening hole 523*a* may include a plurality of seating bosses and a plurality of hinge fastening holes. In this embodiment, the seating bosses 523 and the hinge fastening holes 523*a* may be disposed to be spaced apart from each other in a direction perpendicular to the rotational shaft of the panel unit 500, like the hinge coupled portions 520. Therefore, the connection block 625 of each of the hinge modules 600 may be fixed in the first hinge coupled portion 521 at at least two portions.

The second hinge coupled portion 525 may be provided at the rear surface of the main housing 510. The second hinge coupled portion 525 may be disposed to be continuous with the first hinge coupled portion 521. The connection block 625 of the drive arm 620 may be connected to each of the first hinge coupled portion 521 and the second hinge coupled portion 525.

A portion of the connection block 625 may be caught by and fixed to the second hinge coupled portion 525. The second hinge coupled portion 525 may have a fixing structure without a separate fastener, unlike the first hinge coupled portion 521. Therefore, before the block fastener B4 is assembled to the first hinge coupled portion 521, the second hinge coupled portion 525 may allow the connection block 625 to be temporarily coupled to the hinge coupled portion 520.

For reference, in this embodiment, after the main housing 510, the control panel 530, and the cover frame 550 that constitute the panel unit 500 are assembled to each other, the hinge modules 600 may be assembled to the panel unit 500. Even when the cover frame 550 covers the rear surface of the main housing 510, the connection block 625 of each of hinge modules 600 may be inserted into the panel unit 500 through the hinge assembly port 555 formed in the cover frame 550.

The second hinge coupled portion 525 may have a second fastening space 526. A lower end of the second fastening space 526 may be opened. The connection block 625 may be fitted upward from the open lower portion of the second fastening space 526. An upper end of the second fastening space 526 may be connected to the first fastening space 522.

An assembly guide 527 may be provided on each of opposite sides of the second fastening space 526. The assembly guide 527 may have a kind of wall structure that stands upright on each of opposite sides of the second fastening space 526. The connection block 625 may be inserted into between opposite assembly guides 527. A lower end of the assembly guide 527 may extend to the lower end of the main housing 510, and an upper end of the assembly guide 527 may be connected to block locking portion 528 described hereinafter.

The assembly guide 527 may have a height formed higher at a lower end of the second fastening space 526 than an upper end thereof. The connection block 625 may be inserted from a lower side of the assembly guide 527, and the lower end of the assembly guide 527 formed higher may form an entrance through which the connection block 625 is inserted. At the same time, the assembly guide 527 may be formed to be gradually widened towards an entrance of the lower end into which the connection block 625 is inserted.

Further, the connection block 625 may have a portion for connection to a connection link 624 described hereinafter, at a lower end thereof, so that a height of the lower end of the connection block 625 may be formed high. Based on FIG. 55, the height refers to the leftward-rightward width of the connection blocks 625. Therefore, it is advantageous that the assembly guide 527 has a height formed higher at a lower end.

The block locking portion 528 may be provided above the second hinge coupled portion 525. The block locking portion 528 may be a portion at which the connection block 625 is caught and fixed. The block locking portion 528 may be spaced apart from a bottom surface of the second fastening space 526 and cover the upper portion of the second fastening space 526. Accordingly, the block locking portion 528 may have a locking pocket 528*a* with a bottom opening facing the second fastening space 526.

Figure 55:
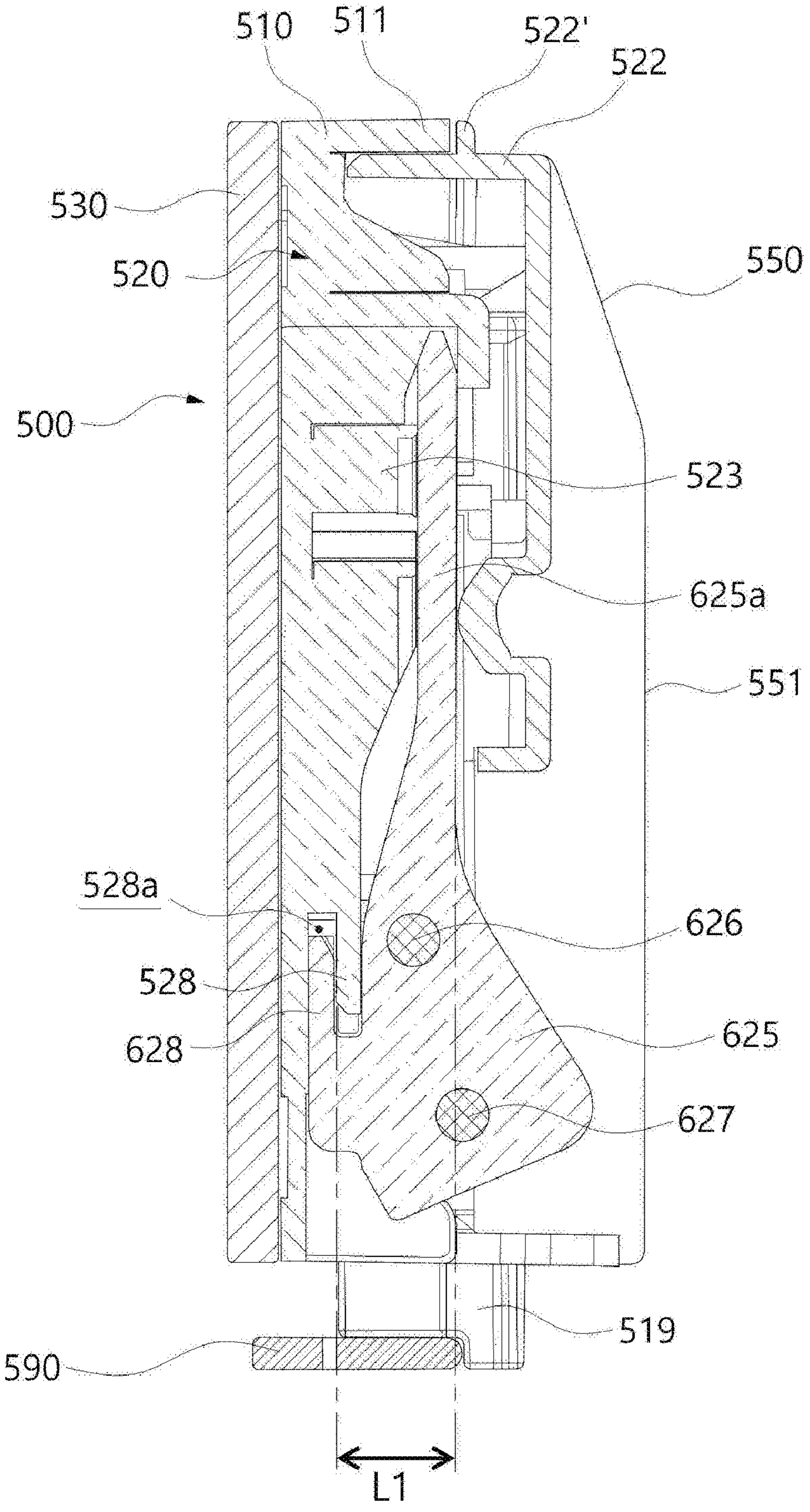
FIG. 55 is a cross-sectional view showing a coupled state of the connection block of each hinge module to the hinge coupled portion of the panel unit according to an embodiment.

As shown in FIG. 55, a locking piece 628 of the connection block 625 may be locked and fixed to the block locking portion 528. When the locking piece 628 is inserted into the locking pocket 528*a* of the block locking portion 528, the panel unit 500 may remain locked to the connection block 625. For example, referring to FIG. 55, the panel unit 500 may remain locked to the connection block 625 without shaking clockwise or counterclockwise.

Figure 64:
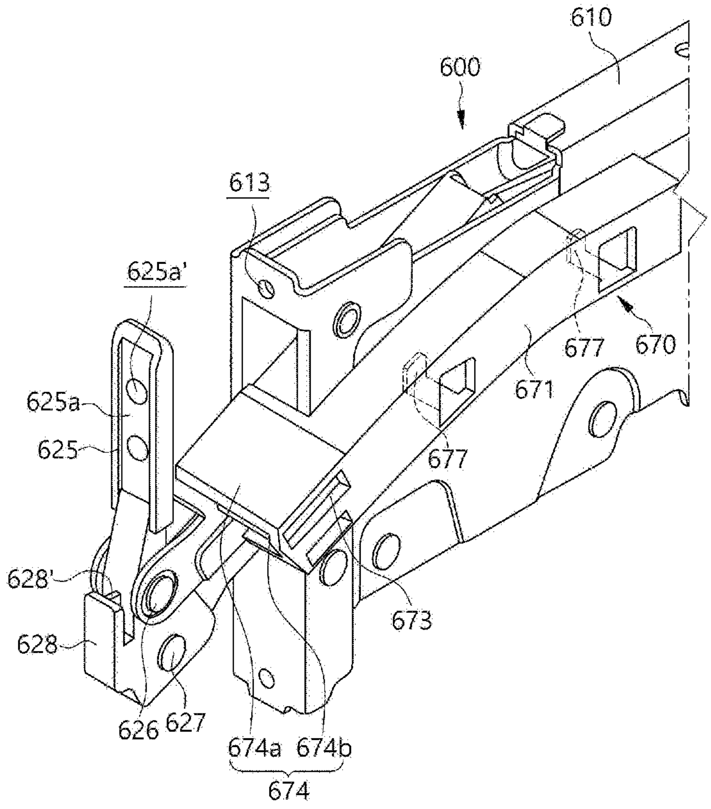
FIG. 64 is a perspective view of each hinge module and the wire cover according to an embodiment.

As shown in FIG. 53, a slit 528*b* may be vertically formed in the block locking portion 528. The slit 528*b* may be formed along a center portion of the block locking portion 528, and may communicate with the locking pocket 528*a*. The slit 528*b* may be provided to prevent interference with a portion of the locking piece 628 provided in the connection block 625. The locking piece 628 may have an approximate T-shaped section, and the slit 528*b* may be formed suitable for the cross-sectional shape. Referring to FIG. 64, it is shown that the locking piece 628 is connected to a main body of the connection block 625 with a connection bridge 628'. The connection bridge 628' and the locking piece 628 may form an approximate T-shape.

Figure 56:
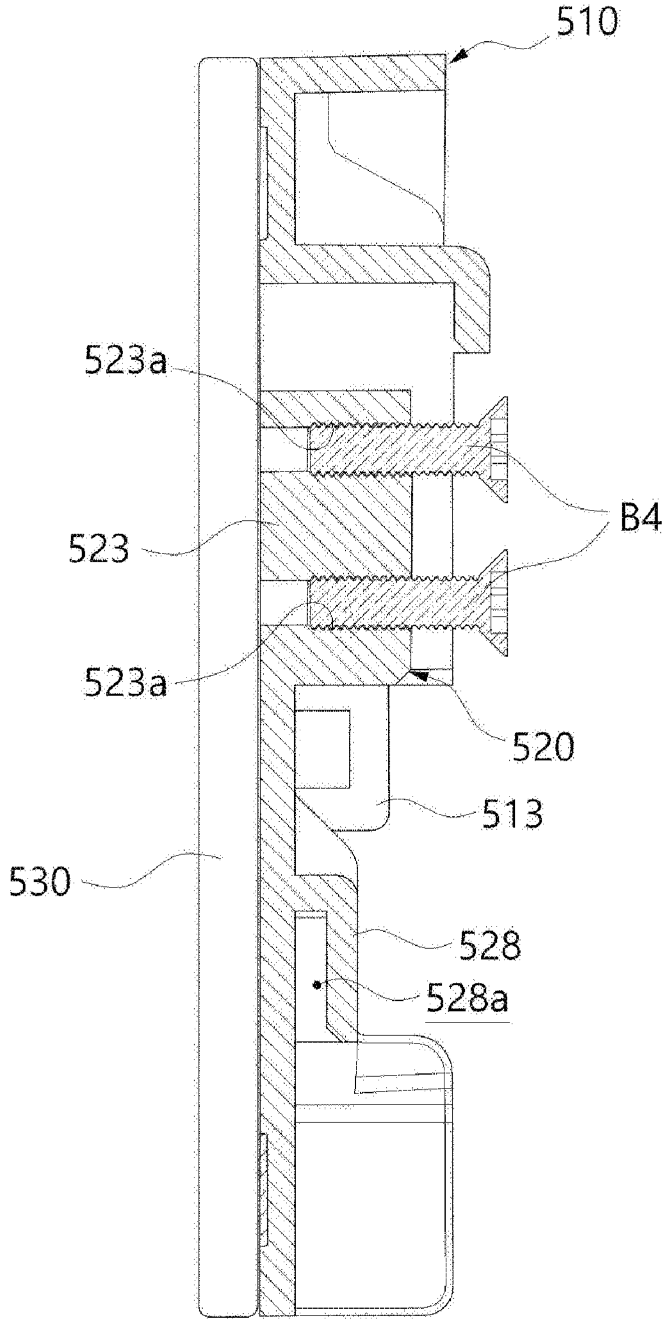
FIG. 56 is a cross-sectional view showing a structure of the hinge coupled portion of the panel unit according to an embodiment.

FIG. 56 is a cross-sectional view showing a structure of the hinge coupled portion 520 without the connection block 625. As shown in the drawing, the seating boss 523 and the hinge fastening holes 523*a* are formed at an upper portion of the hinge coupled portion 520, so that the block fasteners B4 may be assembled thereto. Further, the block locking portion 528 and the locking pocket 528*a* may be provided at a lower portion of the hinge coupled portion 520. As described above, a plurality of assembly structures disposed to be spaced apart from each other in an assembly direction of the connection block 625 may assemble the connection block 625 and the hinge coupled portion 520 to each other.

Figure 57:
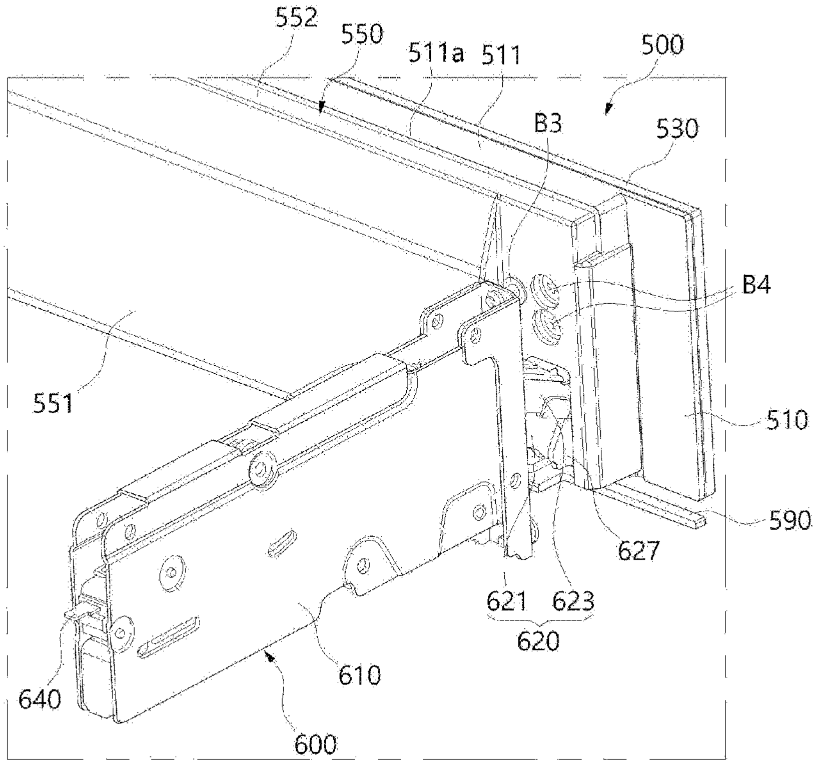
FIG. 57 is a view showing a coupled portion of the panel unit and each hinge module according to an embodiment.

FIG. 57 is a view showing a coupled state of the panel unit 500 and the hinge modules 600 to each other. As shown in the drawing, the components constituting the panel unit 500 may be assembled first, then the drive arm 620 of each of the hinge modules 600 may be assembled to the panel unit 500. The connection block 625 provided in the drive arm 620 may be inserted into the hinge coupled portion 520 of the panel unit 500 through the hinge assembly port 555 open in the cover frame 550. Then, the connection block 625 may be fixed to the panel unit 500 with the block fastener B4. FIG. 57 shows tightened block fasteners B4.

Figure 58:
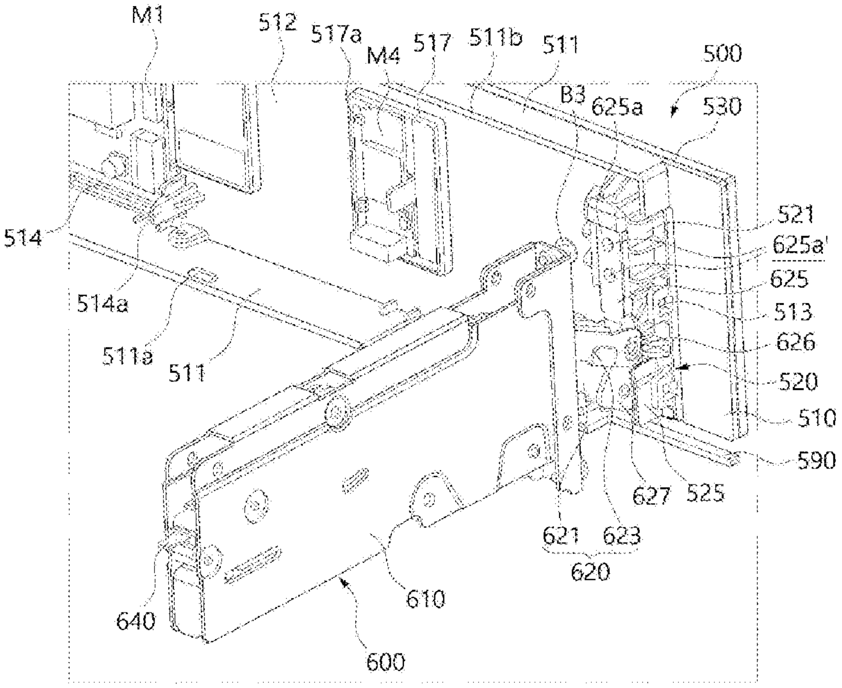
FIG. 58 is a perspective view of the coupled portion of the panel unit and each hinge module of FIG. 57 without the cover frame of the panel unit.

As shown in FIG. 58, this view shows a state in which the cover frame 550 of the panel unit 500 is omitted from FIG. 57. As described above, a pair of block fasteners B4 may pass through the connection blocks 625 to be tightened in the first hinge coupled portion 521. Further, a lower portion of the connection block 625 may be caught by the second hinge coupled portion 525.

The hinge coupled portion 520 may include the first hinge coupled portion 521 and the second hinge coupled portion 525. The first hinge coupled portion 521 and the second hinge coupled portion 525 may extend from the upper end of the main housing 510 to the lower end thereof in a heightwise direction of the panel unit 500. Therefore, the panel unit 500 and the hinge modules 600 may be solidly fixed to each other.

More specifically, the first hinge coupled portion 521 and the second hinge coupled portion 525 may be disposed in an upward-downward direction perpendicular to a leftward-rightward direction (Y-axis direction in FIG. 1), that is, a direction of the rotational shaft of the panel unit 500. Therefore, in the moving process of the panel unit 500, a load applied to a connected portion to each hinge module 600 may be dispersed into a wide area of the panel unit 500, and may enhance durability of the panel unit 500 and each hinge module 600. The upward-downward direction is based on when the panel unit 500 is located in the first position, and is a Z-axis direction in FIG. 1. However, when the panel unit 500 is in the second position, the upward-downward direction is an X-axis direction in FIG. 1.

Figure 59:
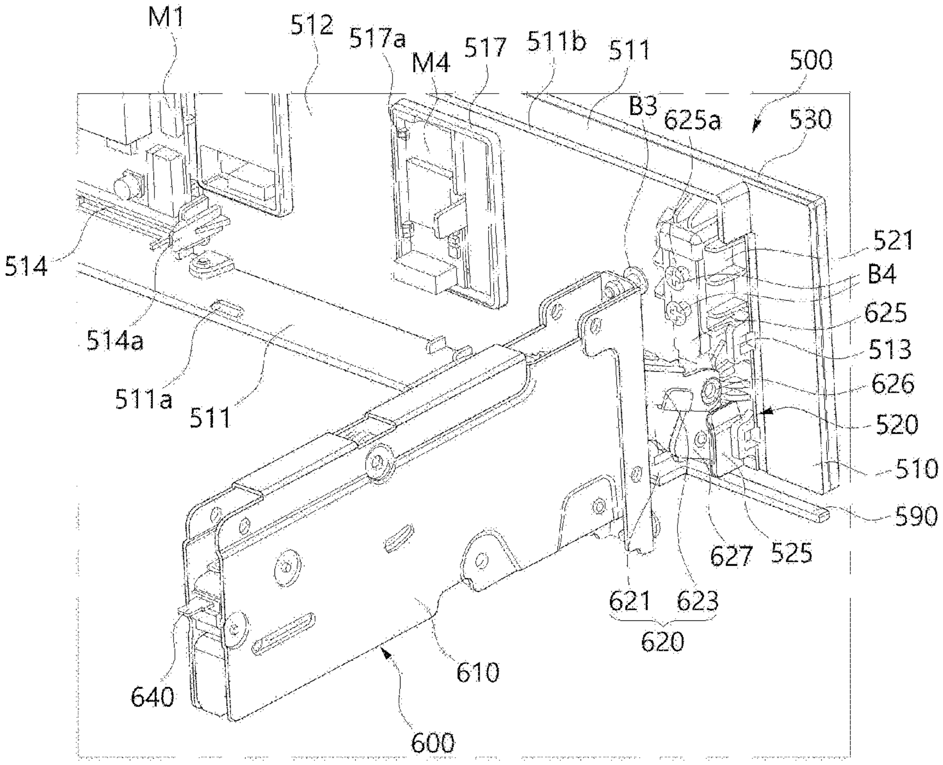
FIG. 59 is a perspective view of the coupled portion of the panel unit and each hinge module of FIG. 58 without a fastener.

FIG. 59 is a view showing structure of FIG. 58 without the block fasteners B4. As shown in the drawing, even when the block fasteners B4 are removed, the panel unit 500 may maintain a coupled state to each hinge module 600. This is because the locking piece 628 of the connection block 625 is caught by the block locking portion 528 of the second hinge coupled portion 525 described above. Therefore, while holding the panel unit 500 on the locking piece 628 first, the operator may tight the block fasteners B4.

The hinge modules 600 may guide movement of the panel unit 500. The panel unit 500 may be connected to the casing 100, 200 through the hinge modules 600. In other words, each hinge module 600 connects the panel unit 500 and the casing 100, 200 to each other, and may relatively move the panel unit 500 with respect to the casing 100, 200.

The hinge modules 600 may be respectively connected to opposite ends of the panel unit 500. The two hinge modules 600 are symmetrically disposed at opposite portions of the panel unit 500 to guide movement of the panel unit 500. As another example, a hinge module 600 may be connected to either of the opposite end portions of the panel unit 500.

Referring to FIGS. 48A-48C, a frame of each hinge module 600 may be formed of the hinge housing 610. The hinge housing 610 may have an approximate hexahedron structure. The hinge housing 610 may be disposed in the electric chamber S2. In this embodiment, the hinge housing 610 may be disposed inside of each side cover 270, in the electric chamber S2.

The hinge housing 610 may maintain a fixed state to the electric chamber S2. The hinge housing 610 may be fixed to the casing 100, 200. More specifically, the hinge housing 610 may be fixed to at least one of the side covers 270 and the front frame 280 constituting the casing 100, 200. In this embodiment, the hinge housing 610 may be fixed to both of the front frame 280 and the front housing 420 that are disposed at a front thereof, at the same time.

Figure 62:
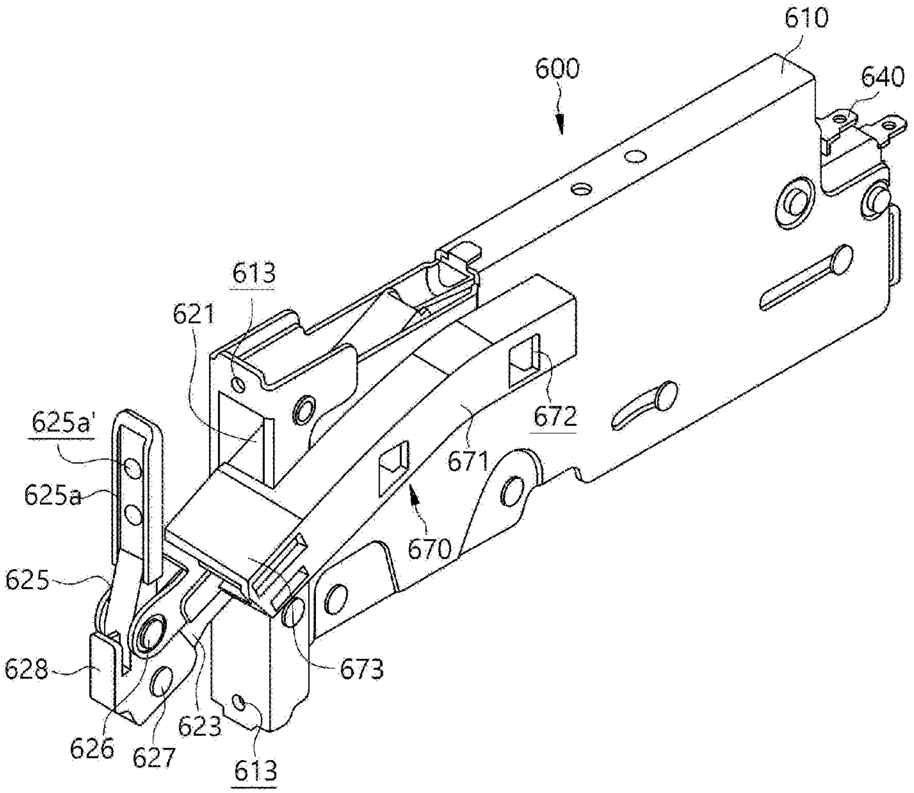
FIG. 62 is a perspective view of each hinge module and a wire cover according to an embodiment.

Referring to FIG. 62, the hinge housing 610 may have the housing assembly hole 613. The housing assembly hole 613 may be formed in a front surface of the hinge housing 610. The housing assembly hole 613 is provided to fix the hinge housing 610 to the casing 100,200. The hinge fastener B3 may pass through the second hinge assembly hole 427 of the front housing 420 and the first hinge assembly hole 288 of the front frame 280, and then may be fastened to the housing assembly hole 613. Thus, each hinge module 600 may be fixed to the front frame 280 and the front housing 420 at the same time. The housing assembly hole 613 may be formed in each of a front portion and a lower portion of the hinge housing 610.

Referring to FIGS. 48A-48C again, the hinge housing 610 may include the drive arm 620. A portion of the drive arm 620 may be inserted into and removed out of the hinge housing 610. A first end of the drive arm 620 may be connected to an internal portion of the hinge housing 610, and a second end of the drive arm 620 may be connected to the connection block 625. The connection block 625 may be coupled to the panel unit 500, but as another example, the connection block 625 may be omitted and the drive arm 620 may be directly coupled to the panel unit 500.

The drive arm 620 may be moved forward with respect to the hinge housing 610. Further, the drive arm 620 may be moved downward with respect to the hinge housing 610. As shown in FIGS. 48B and 48C, the drive arm 620 may be moved forward with respect to the hinge housing 610 (leftward direction based on FIG. 48B), and moved downward (downward direction based on FIG. 48C). As shown in the drawings, when the drive arm 620 is moved forward and downward, a total movement distance of the panel unit 500 may be increased. When a movement distance of the panel unit 500 is increased, a larger or wider portion of the tank entrance 424 may be exposed to the user.

The drive arm 620 may include a first drive arm 621 and a second drive arm 623. The first drive arm 621 and the second drive arm 623 may be disposed side by side. Each of the first drive arm 621 and the second drive arm 623 may be rotatably connected to the connection block 625. The first drive arm 621 and the second drive arm 623 may be rotatably connected to different positions in the connection block 625. Reference numeral 626 indicates a first shaft 626 where the connection block 625 is connected to the first drive arm 621, and reference numeral 627 indicates a second shaft 627 where the connection block 625 is connected to the second drive arm 623. The first shaft 626 and the second shaft 627 may be understood as connection shafts that connect the panel unit 500 to each hinge module 600 so that the panel unit 500 and each hinge module 600 may relatively rotatable.

Figure 65:
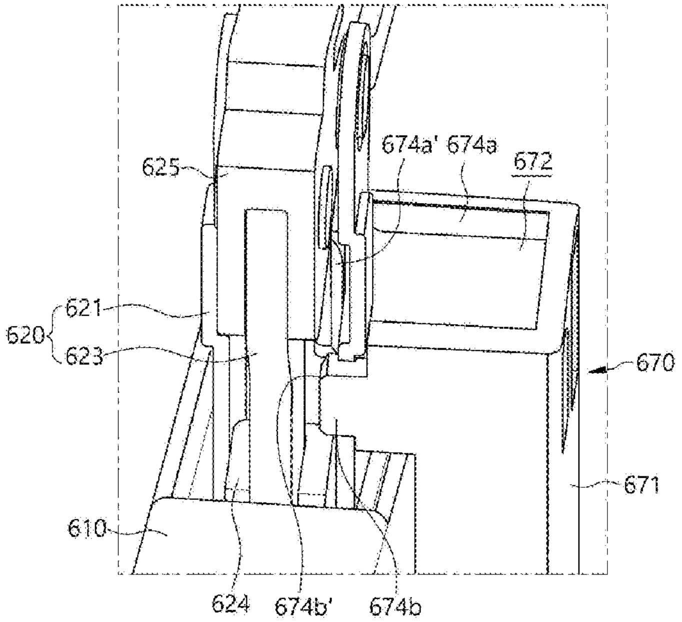
FIG. 65 is an enlarged-perspective view showing a coupled state of each hinge module and the wire cover according to an embodiment.

The first drive arm 621 and the second drive arm 623 may be disposed to be overlapped with each other. As the first drive arm 621 has a width larger than a width of the second drive arm 623, the second drive arm 623 may be covered by the first drive arm 621. As described above, when the first drive arm 621 and the second drive arm 623 are disposed to be overlapped with each other, even when the first drive arm 621 and the second drive arm 623 are independently operated, the first drive arm 621 and the second drive arm 623 do not interfere with each other. This state is shown in FIG. 65.

The first drive arm 621 and the second drive arm 623 may be connected to each other by the connection link 624. One end of the connection link 624 is rotatably connected to the hinge housing 610, and may be rotatably connected to both of the first drive arm 621 and the second drive arm 623 at the same time. The connection link 624 may guide movement of the first drive arm 621 and movement of the second drive arm 623.

Figure 52B:
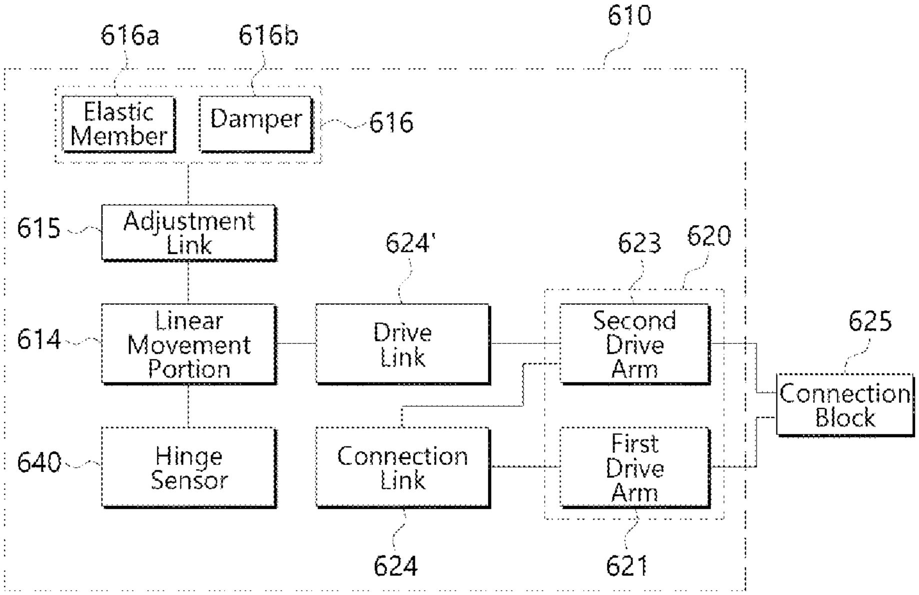

FIG. 52B is a block diagram showing structure of each hinge module 600. As shown in FIG. 52B, a linear movement portion 614 may be provided in the hinge housing 610. The linear movement portion 614 may guide movement of the drive arm 620 while being linearly moved inside of the hinge housing 610.

The linear movement portion 614 may be connected to a drive link 624'. A first end of the drive link 624' may be rotatably connected to the linear movement portion 614, and a second end thereof may be rotatably connected to the second drive arm 623. As the second drive arm 623 is connected to the connection link 624 and the connection link 624 is connected to the first drive arm 621, as a result, the drive link 624' may be indirectly connected to the second drive arm 623.

A tension adjustment portion 616 may be connected to the linear movement portion 614. The tension adjustment portion 616 may adjust a tension applied to each hinge module 600 when the panel unit 500 is moved. The tension adjustment portion 616 may prevent the panel unit 500 from being sharply opened. Further, the tension adjustment portion 616 may stop the panel unit 500 at a specific angle.

The tension adjustment portion 616 may include an elastic member **616*a* and a damper 616*b*. A first end of the elastic member 616*a* may be fixed to the hinge housing 610, and may include a spring connected to the linear movement portion 614 as a second end thereof. Accordingly, the spring may provide an elastic force of a constant magnitude to the linear movement portion 614. As the linear movement portion 614 should be moved while enduring the elastic force of the spring, the panel unit 500 indirectly connected to the linear movement portion 614** may also receive the elastic force of the spring.

The damper **616*b* may be moved in response to movement of the linear movement portion 614. The damper 616*b* applies a load of a predetermined magnitude to the linear movement portion 614 in a movement process of the linear movement portion 614 to limit a movement speed of the linear movement portion 614. The damper 616*b* may include a hydraulic damper 616*b* switching kinetic energy of the linear movement portion 614 into thermal energy. After the panel unit 500 is initially rotated at a predetermined angle by the opening device 480, when the panel unit 500 naturally rotated due to gravity applied to the panel unit 500, the damper 616*b* may serve a shock absorbing function. In other words, the damper 616*b* may allow the panel unit 500** to be moved at a relatively slow speed within the second opening section extending from an end of the first opening section to the second position.

As another example, either of the spring and the damper **616*b* of the tension adjustment portion 616 may be omitted. For example, when the damper 616*b* is omitted, the spring provides a constant elastic force to the linear movement portion 614 to compensate gravity applied to the panel unit 500. Further, as another example, both the spring and the damper 616*b*** may be omitted.

The tension adjustment portion 616 is not directly connected to the linear movement portion 614, and may be connected thereto through an adjustment link 615. The adjustment link 615 may be disposed inside of the hinge housing 610. A first end of the adjustment link 615 may be rotatably fixed to the hinge housing 610, and a second end of the adjustment link 615 may be rotatably connected to the linear movement portion 614. Further, the tension adjustment portion 616 may be connected to the adjustment link 615. A load applied to the tension adjustment portion 616 may be transmitted to the linear movement portion 614 through the adjustment link 615. As another example, the tension adjustment portion 616 may be directly connected to the linear movement portion 614.

The connection block 625 may be connected to the drive arm 620. The connection block 625 may connect the drive arm 620 to the panel unit 500. The connection block 625 may include the first shaft 626 connected to the first drive arm 621, and the second shaft 627 connected to the second drive arm 623. The first shaft 626 and the second shaft 627 are disposed at different positions so as to limit a rotational angle of the connection block 625.

As described above, as the connection block 625 connects each hinge module 600 and the panel unit 500 to each other, the connection block 625 may be referred to as a connection portion between each hinge module 600 and the panel unit 500. A rotational center of the panel unit 500 may be provided in the connection block 625.

The connection block 625 may include a connection end portion 625*a*. The connection end portion 625*a* may have an approximate plate structure extending from the connection block 625. The connection end portion 625*a* may be placed in the first hinge coupled portion 521. As shown in FIG. 54, the connection end portion 625*a* may be disposed on the first hinge coupled portion 521.

The connection end portion 625*a* may be placed on the seating boss 523 of the first hinge coupled portion 521. Further, each block assembly hole 625*a*' formed in the connection end portion 625*a* may be connected to each hinge fastening hole 523*a* of the seating boss 523. The holes may be fastened to each other by the block fastener B4, and as the block fastener B4 is tightened, the block fastener may pass through each cover hinge hole 553, each block assembly hole 625*a*', and each hinge fastening hole 523*a* constituting each hinge module 600 in order. More specifically, the fastener may pass through each cover hinge hole 553, each block assembly hole 625*a*', and each hinge fastening hole 523*a* that are connected to each other, so that assembly between the cover frame 550, the connection block 625, and the main housing 510 may be achieved. Like the hinge fastening holes 523*a* and the cover hinge holes 553, two block assembly holes 625*a*' spaced apart from each other may be formed in the connection end portion 625*a*.

The connection block 625 may include the locking piece 628. The locking piece 628 may be inserted into and caught by the locking pocket 528*a* of the second hinge coupled portion 525. Referring to FIG. 64, the locking piece 628 may be connected to the main body of the connection block 625 with the connection bridge 628'. The connection bridge 628' and the locking piece 628 may form an approximate T-shape. The connection bridge 628' makes a connection portion between the locking piece 628 and the main body of the connection blocks 625 large so as to enhance durability of the connection block 625. In order to prevent interference with the connection bridge 628', the block locking portion 528 of the second hinge coupled portion 525 may have the slit 528*b* in the upward-downward direction.

As shown in FIG. 55, the connection end portion 625*a* and the locking piece 628 of the connection block 625 may be disposed at positions different from each other in the frontward-rearward direction. The frontward-rearward direction refers to a thickness direction of the connection block 625, and indicates the leftward-rightward direction based on FIG. 55. When the connection end portion 625*a* and the locking piece 628 are provided at different heights, heights of two portions where the connection block 625 is fixed to the main housing 510 may be different.

More specifically, the connection end portion 625*a* is fixed to the first hinge coupled portion 521 and the locking piece 628 may be fixed to the second hinge coupled portion 525, and a fixed portion to the first hinge coupled portion 521 and a fixed portion to the second hinge coupled portion 525 are disposed at positions different from each other in the frontward-rearward direction. Reference numeral L1 indicates a distance or spacing between the fixed portion to the first hinge coupled portion 521 and the fixed portion to the second hinge coupled portion 525.

Simultaneously, the connection end portion 625*a* and the locking piece 628 may be located at vertically different positions. The connection end portion 625*a* may be disposed at an upper portion of the connection block 625 higher than the locking piece 628. Therefore, the connection end portion 625*a* and the locking piece 628 may be coupled to the main housing 510 at positions vertically spaced apart from each other.

As described above, the connection block 625 may be fixed to the main housing 510 at different positions in the frontward-rearward direction and the upward-downward direction. Accordingly, each hinge module 600 and the panel unit 500 may be coupled to each other at positions spaced in various directions, and an external force applied to a coupling portion between each hinge module 600 and the panel unit 500 may be widely dispersed.

Each hinge module 600 may include a hinge sensor 640. The hinge sensor 640 may detect whether or not each hinge module 600 is operated. At least a portion of the hinge sensor 640 may be disposed in the hinge housing 610. The hinge sensor 640 disposed in the hinge housing 610 may detect operation of one of a plurality of components constituting each hinge module 600. For example, the hinge sensor 640 may detect movement of the linear movement portion 614. When the linear movement portion 614 presses the hinge sensor 640, the hinge sensor 640 may detect that the linear movement portion 614 is located in an initial position. The main panel unit 700 connected to the hinge sensor 640 may determine that the panel unit 500 is located in the first position, by a signal transmitted from the hinge sensor 640.

Figure 60:
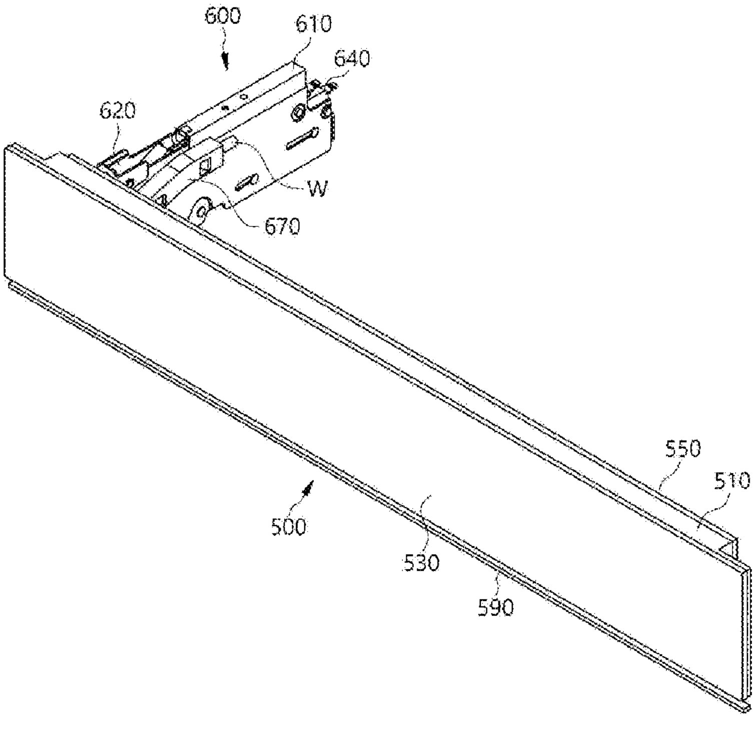
FIG. 60 is a perspective view showing the coupled state of the panel unit and each hinge module coupled to each other according to an embodiment.
Figure 61:
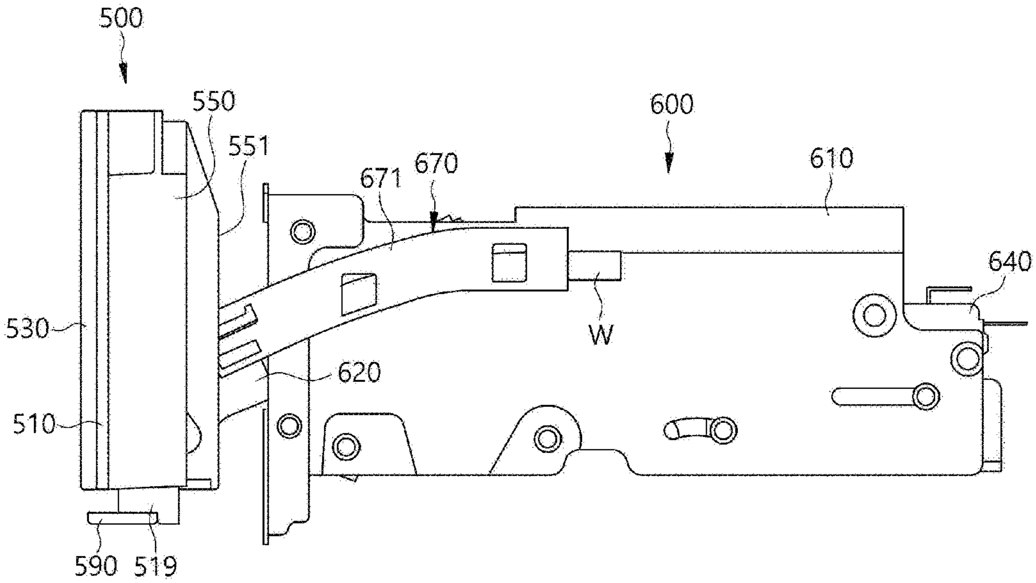
FIG. 61 is a side view showing the coupled state of the panel unit and each hinge module coupled to each other according to an embodiment.

FIG. 60 is a view showing a portion of the wire harness W connected to the panel unit 500 and the wire cover 670 fixing the wire harness W. The wire cover 670 covers the wire harness W to prevent the wire harness W from being exposed outwards to enhance the aesthetic of the cooking appliance. Further, the wire cover 670 constrains the wire harness W not to be freely moved and to extend along the hinge modules 600, so that interference between the wire harness W and surrounding components may be prevented.

The wire cover 670 may be assembled to the drive arm 620 of each hinge module 600. In this embodiment, as the wire harness W extends towards one of the pair of hinge modules 600, the wire cover 670 may also be assembled only to one hinge module 600.

In this embodiment, the wire cover 670 may be moved along the hinge module 600 while extending parallel to at least a portion of a surface of the hinge module 600. Accordingly, the wire cover 670 may maintain close contact with the hinge module 600 during movement. When the wire cover 670 is moved in close contact with the hinge modules 600, a surface area of a component exposed between the panel unit 500 and the casing 100, 200 may be reduced. Further, the wire cover 670 may appear to be a portion of each hinge module 600, and may provide a high sense of unity.

The wire cover 670 may have an approximately hexahedral shape. The wire cover 670 may have a vertical height larger than a vertical height of the drive arm 620. The vertical height of the wire cover 670 may be formed larger than a diameter of the wire harness W.

Further, a longitudinal length of the wire cover 670 may be shorter than a longitudinal length of the hinge housing 610. When the drive arm 620 completely protrudes, that is, the panel unit 500 is in the second position, the wire cover 670 may have a length in which an end of the wire cover 670 is not exposed outwards and is located in the hinge through hole 423 of the front housing 420. Then, when the panel unit 500 is in the second position, the wire harness W may also be covered by the wire cover 670. As shown in FIG. 18, a side surface of the drive arm 620 exposed forward of the front housing 420 is covered by the wire cover 670.

The wire cover 670 may be coupled to the drive arm 620. When the wire cover 670 is coupled to the drive arm 620, the wire cover 670 may be moved together with the drive arm 620. While the wire cover 670 continuously covers the wire harness W, the wire cover 670 may be moved along a constant movement path of the drive arm 620.

The wire cover 670 may pass through the upper hinge hole 283 open in the front frame 280 together with the second drive arm 623. When the panel unit 500 is in the second position where the panel unit is completely opened, a second end of the wire cover 670 does not protrude outwards of the upper hinge hole 283, and still remains located in the electric chamber S2. Accordingly, the wire cover 670 may cover and protect an exposed portion of the wire harness W.

A frame of the wire cover 670 may be formed by a cover body 671. The cover body 671 may have a hollow tubular structure. An internal portion of the cover body 671 may have a guide channel 672 (referring to FIG. 65) through which the wire harness W passes. The guide channel 672 may have a structure having open opposite ends. In this embodiment, the cover body 671 has an approximate square cross-sectional area, on the other hand, the cover body 671 may have a circular shape or other polygonal shapes.

The cover body 671 may be formed to be downwardly-inclined towards a coupling head 673, that is, one end connected to the first drive arm 621 of each hinge module 600, or may be formed along a curved path. The cover body 671 may have a shape according to a movement path of the first drive arm 621, and may reduce friction with the wire harness W in a movement process.

However, when the cover body 671 has a circular shape, the cover body 671 may have a constant radius of curvature. It is advantageous that a radius of curvature of the cover body 671 is larger than or equal to a radius of rotation of the first drive arm 621. In other words, the cover body 671 may have a curved path that is equal to or less than the radius of rotation of the first drive arm 621. The cover body 671 may extend in an extending direction of the wire harness W, and friction with the wire harness W in the movement process may be reduced.

Further, the wire cover 670 may be configured to the wire harness W during movement. More specifically, a longitudinal length of the cover body 671 may be formed shorter than a longitudinal length of the hinge housing 610.

One surface of the guide channel 672 may be open. The wire harness W may be inserted into the guide channel 672 through the open surface of the guide channel 672. The open surface of the guide channel 672 may be covered with the hinge housing 610 or the first drive arm 621.

As shown in FIG. 64, before the first drive arm 621 protrudes forward, a side surface of the hinge housing 610 may cover the open surface of the guide channel 672. Further, when the first drive arm 621 protrudes forward, the wire cover 670 may also be moved forward. At least a portion of the entire open surface of the guide channel 672 may be covered with a side surface of the first drive arm 621.

Further, the wire cover 670 may be moved within a height range of the hinge housing 610. In other words, an upper end and a lower end of the cover body 671 may be located within a section between the upper end and the lower end of the hinge housing 610 at all times. Therefore, the side surface of the hinge housing 610 may cover the entire open surface of the guide channel 672.

The wire cover 670 may be coupled to the first drive arm 621 of the drive arm 620. As shown in FIG. 62, this view shows the coupling head 673 of the wire cover 670 coupled to the first drive arm 621. The coupling head 673 may be provided at a first end of the wire cover 670.

The coupling head 673 may have structure covering a surface of the first drive arm 621. For example, the coupling head 673 may have a kind of a tongs structure. Further, a remaining portion of the wire cover 670 extending from the coupling head 673 may be disposed along a surface of the hinge housing 610.

The vertical height of the wire cover 670 including the coupling head 673 may be formed larger than a vertical height of the first drive arm 621. The wire cover 670 may cover the first drive arm 621 more stably.

When the panel unit 500 is located in the first position, one surface of the coupling head 673 may face a front surface of the hinge housing 610 constituting each hinge module 600. The coupling head 673 may be caught by the front surface of the hinge housing 610, and separation of the wire cover 670 further rearwards from an original position thereof may be naturally prevented.

Figure 63:
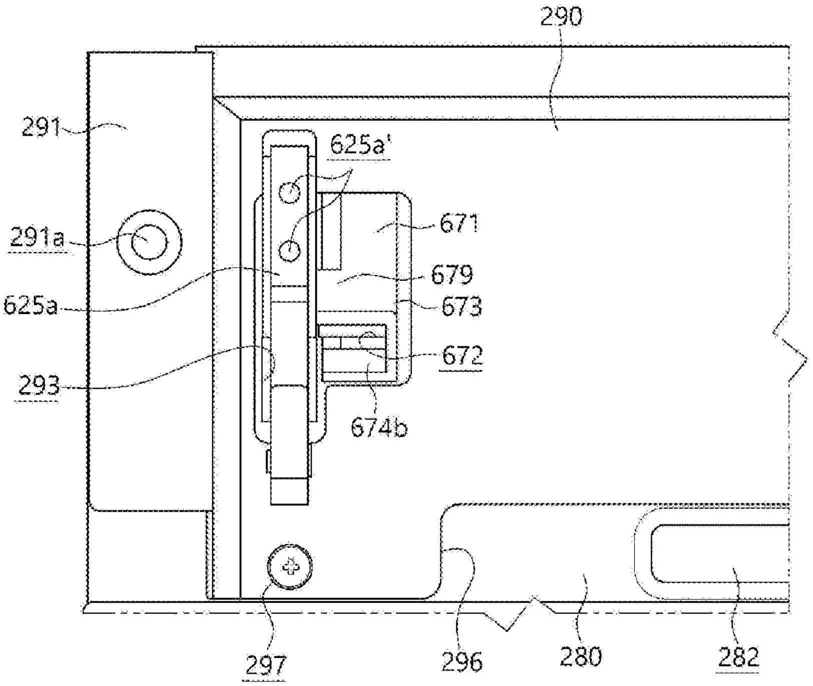
FIG. 63 is a front view showing a mounted state of each hinge module and the wire cover mounted to the front frame and the front housing according to an embodiment.

Referring to FIGS. 63 to 65, the coupling head 673 may include a coupling finger 674 (see FIG. 64). The coupling finger 674 may cover a surface of the first drive arm 621. The coupling finger 674 may have an elastically deformable cantilever structure, so that the coupling finger 674 may be elastically deformed to some degree and then restored when being assembled to the first drive arm 621. The coupling finger 674 may protrude from the cover body 671 in a direction perpendicular to the movement direction of the first drive arm 621.

The coupling finger 674 may include a first coupling finger **674*a* and a second coupling finger 674*b*. The first coupling finger 674*a* and the second coupling finger 674*b* may extend from an upper portion and a lower portion of the cover body 671 to constitute the coupling head 673. The first coupling finger 674*a* and the second coupling finger 674*b* may surround the first drive arm 621**.

The first coupling finger **674*a* may protrude from the cover body 671 to surround a plurality of surfaces of the first drive arm 621. As shown in FIG. 65, the first coupling finger 674*a* may surround upper, side, and lower surfaces of the first drive arm 621. The first coupling finger 674*a* may be coupled to the first drive arm 621 while being rotated. In this process, as the first coupling finger 674*a* is elastically deformed to some degrees and then restored, the first coupling finger 674*a* may be coupled to the first drive arm 621 while surrounding the plurality of surfaces of the first drive arm 621**.

A first coupling end **674*a*' may be provided on an end of the first coupling finger 674*a*. The first coupling end 674*a*'** may further extend from the end of the first coupling finger

674*a*. In this embodiment, the first coupling end 674*a*' may protrude forward from an internal portion of the guide channel 672. The first coupling end 674*a*' may surround a lower surface of the first drive arm 621. As another example, the first coupling end 674*a*' may protrude upward to surround a side surface of the first drive arm 621, not the lower surface.

The second coupling finger 674*b* may protrude from the cover body 671 to surround a surface of the first drive arm 621. Like the first coupling finger 674*a*, the second coupling finger 674*b* may be coupled to the first drive arm 621. The second coupling finger 674*b* may allow the wire cover 670 to be stably fixed to the first drive arm 621 together with the first coupling finger 674*a*.

The second coupling finger 674*b* may be provided with a different height from the first coupling finger 674*a*. The height refers to the upward-downward direction based on FIG. 65. As the second coupling finger 674*b* and the first coupling finger 674*a* have different heights from each other, the coupling head 673 may have an approximate tongs shape when viewed from the front side.

Further, the second coupling finger 674*b* may surround the first drive arm 621 at a different position from the first coupling finger 674*a* based on the frontward-rearward direction. In other words, the second coupling finger 674*b* may be coupled to the first drive arm 621 at a position relatively farther from the connection block 625 than the first coupling finger 674*a*. As described above, when the second coupling finger 674*b* is coupled to the first drive arm 621 at the different position from the first coupling finger 674*a*, the number of coupling points between the wire cover 670 and the first drive arm 621 is increased and a coupling area widened, so that a coupling force therebetween may be improved.

Although not shown in the drawings, the second coupling finger 674*b* may be fitted into a coupling groove recessed from the lower surface of the first drive arm 621. When the second coupling finger 674*b* is fitted into the coupling groove, the second coupling finger 674*b* is not relatively moved in the frontward-rearward direction with respect to the first drive arm 621, and may remain fixed at a constant position.

The second coupling finger 674*b* may include a second coupling end 674*b*'. The second coupling end 674*b*' may extend from an end of the second coupling finger 674*b* in a direction different from a direction of the second coupling finger 674*b* extending from the cover body 671. In this embodiment, the second coupling end 674*b*' may protrude upward. The second coupling end 674*b*' may surround an inner side surface of the first drive arm 621.

Eventually, the first coupling finger 674*a* surrounds the upper surface, the inner side surface, and the lower surface of the first drive arm 621, and the second coupling finger 674*b* surrounds the lower surface and the inner side surface of the first drive arm 621. Further, the first coupling finger 674*a* and the second coupling finger 674*b* have vertical positions and longitudinal positions different from each other, so that the first coupling finger 674*a* and the second coupling finger 674*b* may be coupled to the first drive arm 621 at various positions and assembly stability may be enhanced.

As shown in FIG. 64, the cover body 671 may include a wire clip 677. The wire clip 677 may protrude from an edge of the guide channel 672 in a direction of covering the open surface of the guide channel 672. The wire clip 677 may prevent the wire harness W inserted in the guide channel 672 from being separated out of the guide channel 672.

A plurality of wire clips 677 may be disposed along the cover body 671. More specifically, the plurality of wire clips 677 may be disposed in an extending direction of the wire harness W. The plurality of wire clips 677 may be provided on an edge of the open surface of the guide channel 672.

The door locking device 800 will be described hereinafter with reference to FIGS. 66 to 79. The door locking device 800 may be disposed in the casing 100, 200. The door locking device 800 may maintain a locked state of the door 300 so that the door 300 is not arbitrarily opened. As another example, the door locking device 800 may be disposed at the door 300, not in the casing 100, 200.

Figure 66:
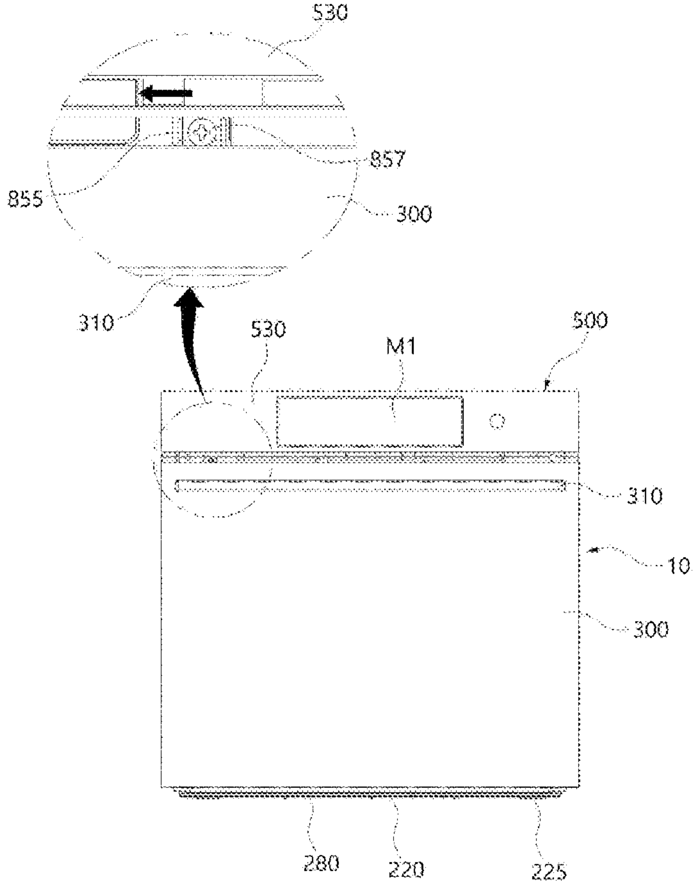
FIG. 66 is a front view showing a location of a door locking device according to an embodiment.

FIG. 66 is a view showing a location at which the door locking device 800 is disposed. As shown in FIG. 66, a portion of the door locking device 800 may be disposed between the lower end of the panel unit 500 and the upper end of the door 300. More specifically, the locking head 855 of the latch 850 constituting the door locking device 800 may have a height between the lower end of the panel unit 500 and the upper end of the door 300.

As described above, when a portion of the door locking device 800 is disposed between the lower end of the panel unit 500 and the upper end of the door 300, the operator may manipulate the door locking device 800 between the lower end of the panel unit 500 and the upper end of the door 300. For example, when it is necessary to open the door 300 while the door 300 is locked, the operator disassembles a head fastener 857 assembled to the latch 850 of the door locking device 800, and slides the locking head 855 in one direction (direction of arrow in FIG. 66), so that the door may be turned to an unlocked state. This process will be described hereinafter.

The door locking device 800 may be exposed only through a gap between the lower end of the panel unit 500 and the upper end of the door 300. Therefore, as the head fastener 857, for example, is exposed when the user looks into the gap between the lower end of the panel unit 500 and the upper end of the door 300 at the front side, the door locking device 800 does not degrade the aesthetic of the cooking appliance.

Further, as described hereinafter, when the head fastener 857 is separated, the user may insert a tool, such as a screwdriver, through the gap between the lower end of the panel unit 500 and the upper end of the door 300. The gap between the lower end of the panel unit 500 and the upper end of the door 300 may form a guide path for inserting a kind of tool. Therefore, the user may more easily insert a tool towards the head fastener 857.

Figure 67:
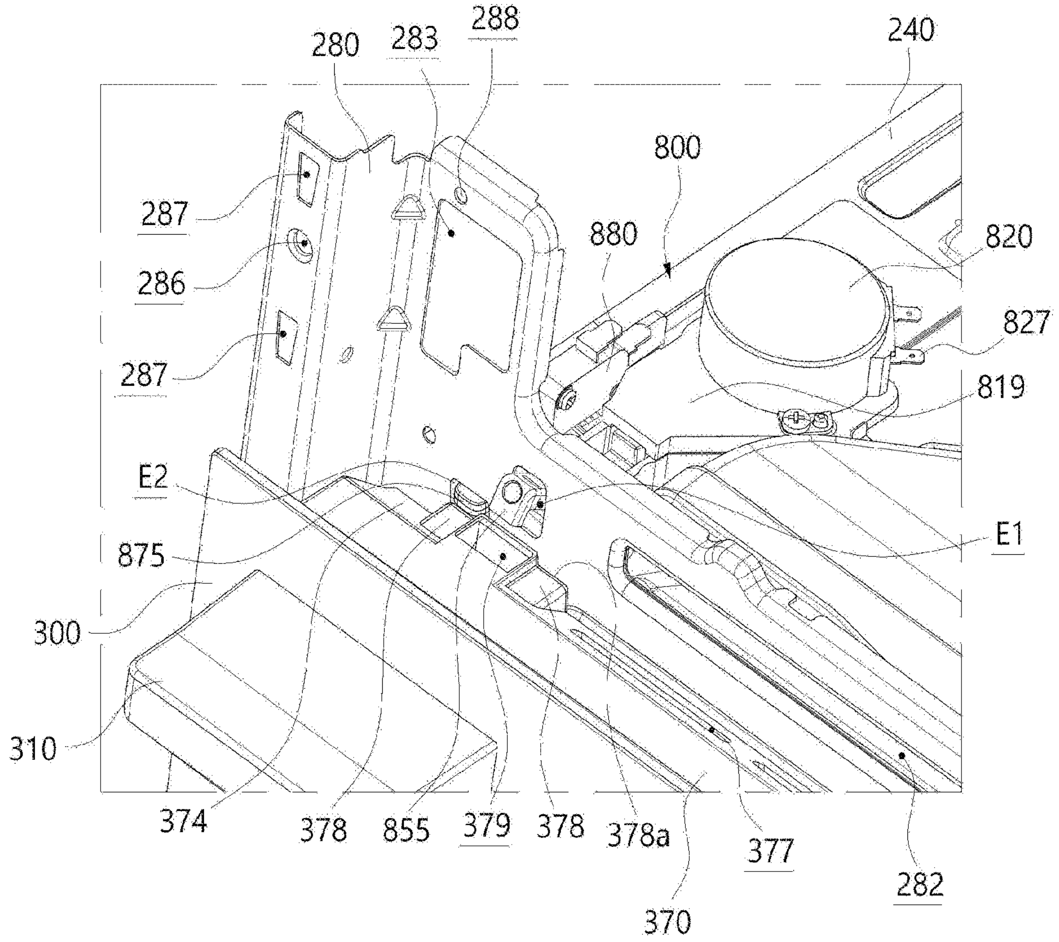
FIG. 67 is a perspective view showing a mounted state of the door locking device according to an embodiment, to the electric chamber of the casing.

As shown in FIG. 67, an exposed state of the electric chamber S2 without the upper cover 260 is shown. The door locking device 800 may be fixed to the upper surface of the upper casing 240. The door locking device 800 may be disposed in front of the upper casing 240. Further, the door locking device 800 may be disposed to be biased to either side portion of the upper casing 240 based on the leftward-rightward direction. In this embodiment, the door locking device 800 is disposed close to a left or first lateral end of the upper casing 240. Therefore, the door locking device 800 may be adjacent to each hinge module 600. As another example, the door locking device 800 may be disposed at a right or second lateral end of the upper casing 240, or may be disposed at a center portion thereof.

A portion of the door locking device 800, more specifically, the locking head 855 of the latch 850 may protrude forward through a latch hole E1 formed in the front frame 280. The protruding locking head 855 may be caught by the fixing hole 379 formed in the door frame 370. One end of the locking head 855 may protrude downward, so that the locking head 855 may be inserted into the fixing hole 379. For reference, FIG. 67 is a view showing a state in which the latch 850 is not rotated downward and the locking head 855 is also caught by the fixing hole 379.

As the locking head 855 of the door locking device 800 is caught by the door frame 370, the door 300 may be locked only when the door 300 is closed. As shown in FIG. 68, this view shows the door 300 before it is completely closed, and as the fixing hole 379 of the door frame 370 is spaced apart from the locking head 855, the locking head 855 is in a state in which the locking head cannot be caught by the fixing hole 379.

Figure 69:
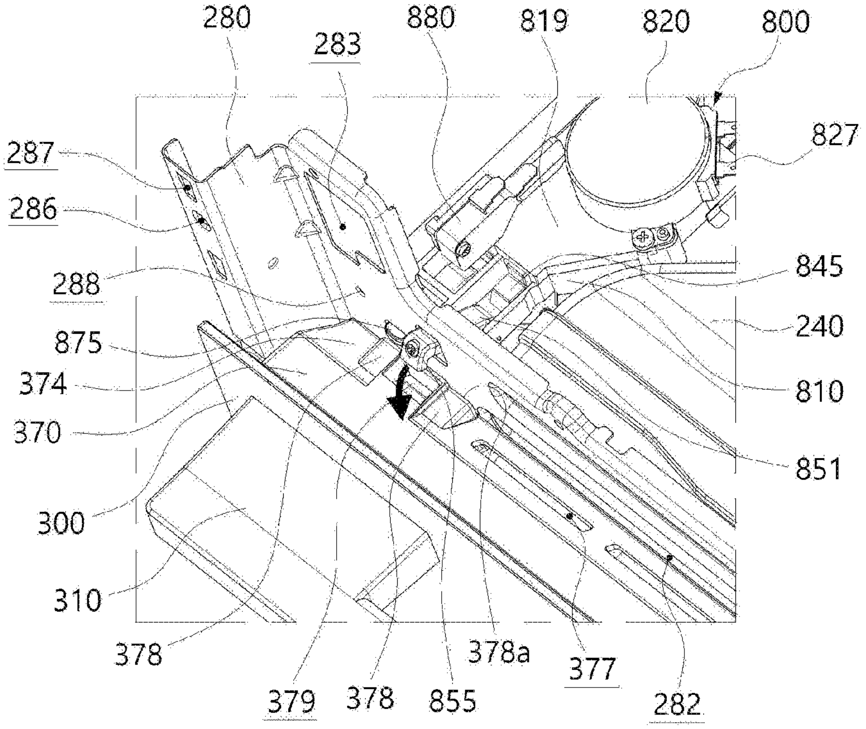
FIG. 69 is a perspective view showing a close state of the door according to an embodiment with respect to the front surface of the casing.

In this state, when the door 300 is closed in a direction of arrow of FIG. 68, the door 300 is moved to a closed state, as shown in FIG. 69. When the door 300 is closed as described above, the fixing hole 379 may be located on a rotational path of the locking head 855. When the locking head 855 is rotated in a direction of arrow of FIG. 69, the locking head 855 may be inserted into the fixing hole 379 to lock the door 300.

The door locking device 800 may be automatically operated through a power sources, such as a motor, for example. The door locking device 800 may be automatically operated between the locked state and the unlocked state. The door locking device 800 may be connected to the main panel unit 700 to be controlled in operation by the main panel unit 700.

Figure 70:
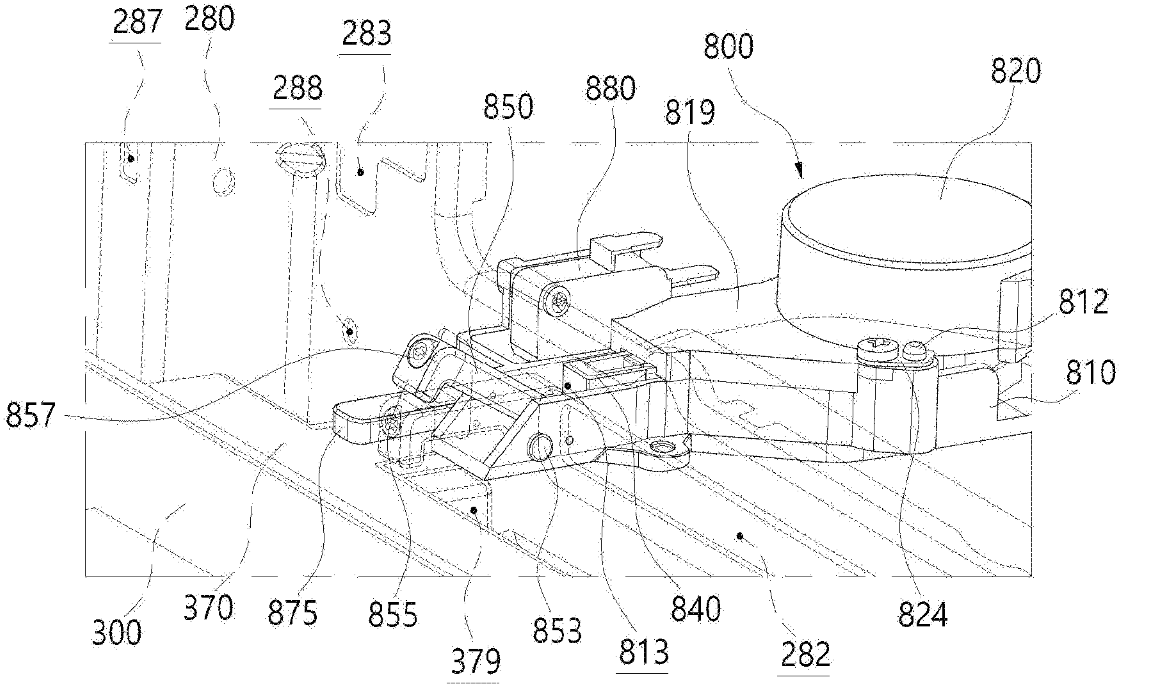
FIG. 70 is an operational state view showing both before and after operation of the door locking device according to an embodiment.
Figure 71:
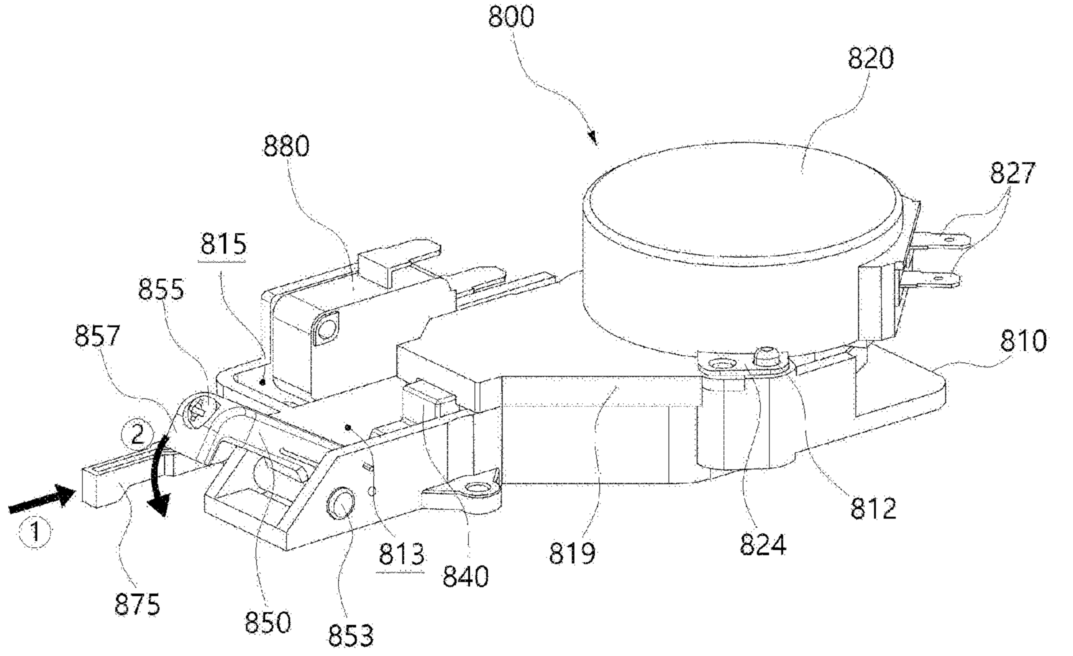
FIG. 71 is a perspective view of the door locking device according to an embodiment.

Referring to FIGS. 70 and 71, a frame of the door locking device 800 is formed of a locking housing 810. The locking housing 810 may be disposed in the upper casing 240. In the locking housing 810, components, such as a locking motor 820, locking gear 831, 835, a drive slider 840, the latch 850, the closing button 870, a button spring 879, a locking sensor 860, and a closing sensor 880, for example, described hereinafter, may be disposed.

When the closing button 870 is pressed by the door 300 rearwards (direction of arrow ①), the closing sensor 880 detects this movement, and the main panel unit 700 may operate the locking motor 820. As the locking motor 820 is operated, the latch 850 may be rotated downward (direction of arrow ②) to lock the door 300.

When the components are installed in the locking housing 810, the latch 850 and the closing button 870 protrude forward. Further, the locking gear 831, 835 and the drive slider 840 may be shielded by a locking cover 819. As described above, with the components assembled in the locking housing 810, the door locking device 800 may be disposed in the upper casing 240.

Figure 72:
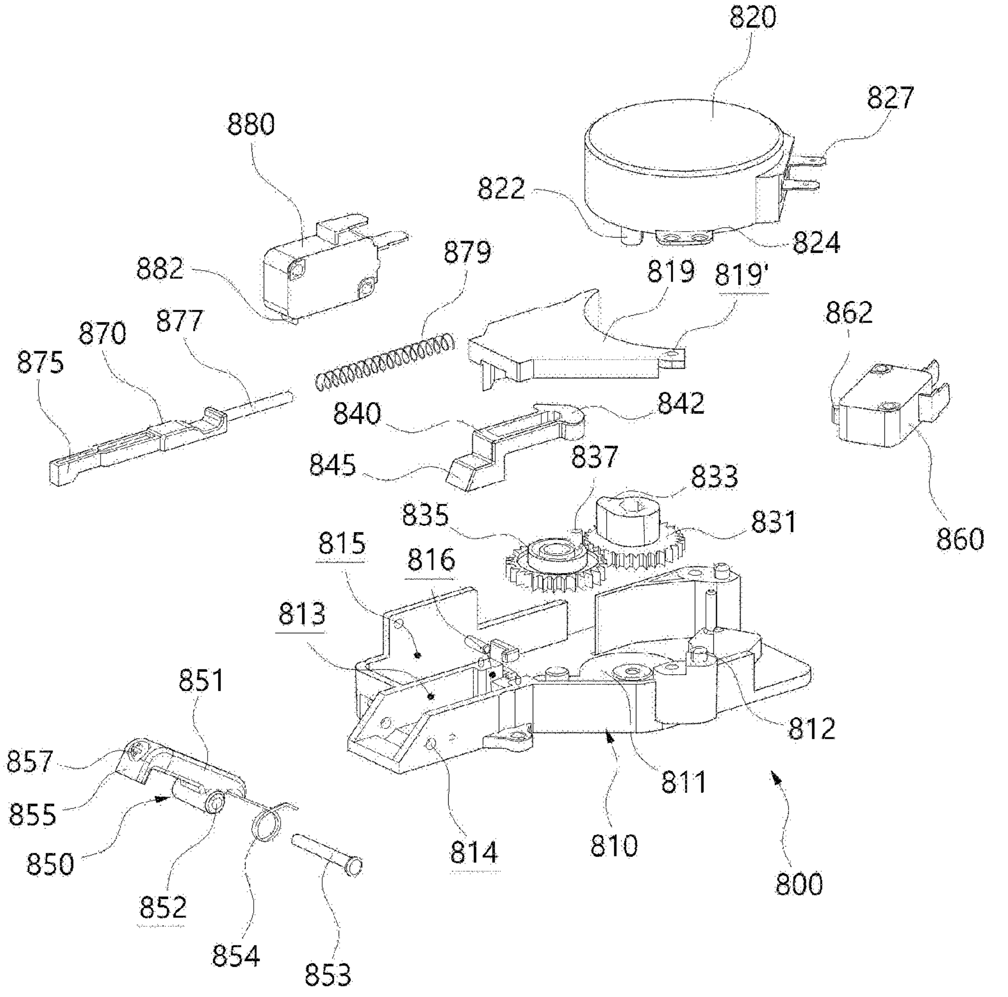
FIG. 72 is an exploded-perspective view showing components of the door locking device according to an embodiment.

As shown in FIG. 72, the locking housing 810 may have an installation space 811 having a depressed shape. A mounting protrusion 812 may be provided on an edge of the installation space 811. Each of a cover hole 819' of the locking cover 819 and a bracket hole 824 of the locking motor 820 may be fitted over the mounting protrusion 812. The mounting protrusion 812 may protrude from an upper surface of a wall structure enclosing the installation space 811.

As another example, the locking housing 810 may be omitted, or the locking housing 810 may be integrally provided in the electric chamber S2. In other words, the locking housing 810 may be a portion of the upper casing 240 constituting the casing 100, 200. In this case, the locking gear 831, 835, the drive slider 840, and the latch 850, for example, may be directly installed in the upper casing 240.

Further, the locking motor 820 may be disposed above the wall structure enclosing the installation space 811. Accordingly, the locking gear 831, 835, the drive slider 840, and the latch 850, for example, may be disposed below the locking motor 820.

A first operation path 813 and a second operation path 815 may be disposed in front of the installation space 811. The first operation path 813 and the second operation path 815 may be divided from each other. The latch 850 and the drive slider 840 may be disposed in the first operation path 813. The closing button 870 may be disposed in the second operation path 815.

The installation space 811 may be covered with the locking cover 819. The locking cover 819 may cover an upper portion of the installation space 811 to cover a portion of the locking gear 831, 835 and a portion of the drive slider 840. The locking cover 819 may be disposed at a different position from the locking motor 820 in order to avoid interference with the locking motor 820.

The locking motor 820 may be disposed at the upper portion of the installation space 811. The locking motor 820 may supply a rotational force to operate the door locking device 800. A terminal 827 of the locking motor 820 is connected to the main panel unit 700, so that power and an operation signal may be received from the main panel unit 700. Reference numeral 824 indicates a bracket hole fitted over the mounting protrusion 812.

A motor shaft 822 may protrude at a lower portion of the locking motor 820. The motor shaft 822 may be rotated by a rotational force of the locking motor 820. The motor shaft 822 may be engaged with first locking gear 831 of the locking gear 831, 835 described hereinafter to rotate the first locking gear 831.

The locking gear 831, 835 may be disposed in the installation space 811. The locking gear 831, 835 may be rotated by the locking motor 820 to operate the drive slider 840. The locking gear 831, 835 may be composed of a plurality of gears. The locking gear 831, 835 may include the first locking gear 831 engaged with the motor shaft 822 to be rotated, and second locking gear 835 engaged with the first locking gear 831 to be rotated in a direction opposite to a direction of rotation of the first locking gear 831. The first locking gear 831 and the second locking gear 835 may be spur gears, for example, disposed side by side.

A sensing protrusion 833 may be provided on the first locking gear 831. The sensing protrusion 833 may protrude from a surface of the first locking gear 831. The sensing protrusion 833 may operate the locking sensor 860. In a process of rotating the first locking gear 831, the sensing protrusion 833 presses the locking sensor 860 so that the locking sensor 860 detects a rotational state of the first locking gear 831. Reference numeral 862 indicates a button 877 of the locking sensor 860 pressed by the sensing protrusion 833.

A drive protrusion 837 may be provided at the second locking gear 835. The drive protrusion 837 may protrude on a surface of the second locking gear 835. The drive protrusion 837 may be engaged with the drive slider 840 to linearly move the drive slider 840. In other words, rotational movement of the second locking gear 835 may be switched into linear movement of the drive slider 840. More specifically, the drive protrusion 837 is connected to a link end 842 of the drive slider 840 so as to operate the drive slider 840.

As another example, the locking gear 831, 835 may be composed of one gear. Both the sensing protrusion 833 and the drive protrusion 837 may be included in one gear. Further, as another example, the locking gear 831, 835 may be composed of three or more gears. In this case, a plurality of gears may be engaged to each other to be rotated to implement a reduction function reducing a rotational speed of the locking motor 820.

The drive slider 840 may be connected to the second locking gear 835. The drive slider 840 may be disposed on the first operation path 813. The drive slider 840 may be linearly moved in the frontward-rearward direction along the first operation path 813. A first end of the drive slider 840 is connected to the second locking gear 835, and a second end thereof may selectively interfere with the latch 850 to rotate the latch 850.

The link end 842 may be provided at the first end of the drive slider 840. The link end 842 may be disposed above the second locking gear 835 to partially cover the second locking gear 835. Although not shown in the drawing, a lower surface of the link end 842 may have a link slot into which the drive protrusion 837 of the second locking gear 835 is fitted. The drive protrusion 837 may be moved along a circular arc of the link slot to linearly move the drive slider 840.

A drive head 845 may be provided on the second end of the drive slider 840. The drive head 845 may interfere with the latch 850 in a linear movement process of the drive slider 840. More specifically, the drive head 845 may dig under a lower portion of an interference end 851 of the latch 850 to lift one side portion of the latch 850. When one side portion of the latch 850 is lifted, another side portion is lowered, and the locking head 855 may be provided at the lowered portion.

A surface of the drive head 845 may be a curved surface or inclined surface. In other words, the drive head 845 may have a height gradually reduced in a direction towards an end thereof. Accordingly, the drive head 845 may more easily dig under the lower portion of the interference end 851 of the latch 850.

As shown in FIG. 72, the drive head 845 and the link end 842 of the drive slider 840 may have heights different from each other. The drive head 845 may be provided relatively lower than the link end 842. The link end 842 is disposed above the second locking gear 835, so that the link end 842 may be provided higher than the drive head 845.

The latch 850 may be disposed in front of the drive slider 840. A portion of the latch 850 may be rotatably provided in the first operation path 813. When the latch 850 is rotated, in this process, the locking head 855 provided at a front portion of the latch 850 may face downward or the locking head 855 may be lifted upward.

The latch 850 may be rotated in a first direction to be caught by the fixing hole 379. Further, the latch 850 may be rotated in a second direction opposite to the first direction to be separated from the fixing hole 379.

In this embodiment, the latch 850 may be disposed higher than the locking button 870. The locking button 870 may be pressed by the pushing surface 378*a* of the locking body 378 formed in the door 300 at a lower position than the latch 850.

The interference end 851 may be provided at one end of the latch 850. The interference end 851 may serve as a portion that interferes with the drive slider 840 and is lifted by the drive slider 840. The drive head 845 of the drive slider 840 may lift the lower portion of the interference end 851.

A latch rotational shaft 853 may be connected to a rotational groove 852 of the latch 850. The latch rotational shaft 853 is fitted into a latch rotational hole 814 formed in the locking housing 810 to serve as a rotational center shaft of the latch 850. While the rotational groove 852 of the latch 850 is disposed in the first operation path 813, the latch rotational shaft 853 may be fitted into the rotational groove 852 by being inserted into the latch rotational hole 814 from the external space of the first operation path 813.

The latch 850 may include a return spring 854. The return spring 854 may be a torsion spring fitted over the latch rotational shaft 853. The return spring 854 may supply a rotational force to the latch 850 so that the latch 850 is rotated in a direction in which the locking head 855 of the latch 850 is lifted, that is, upward. Therefore, when the drive slider 840 interferes with the latch 850 to prevent the latch 850 from being lowered, the locking head 855 of the latch 850 is in an unlocked state, that is, a lifted state.

Figure 73:
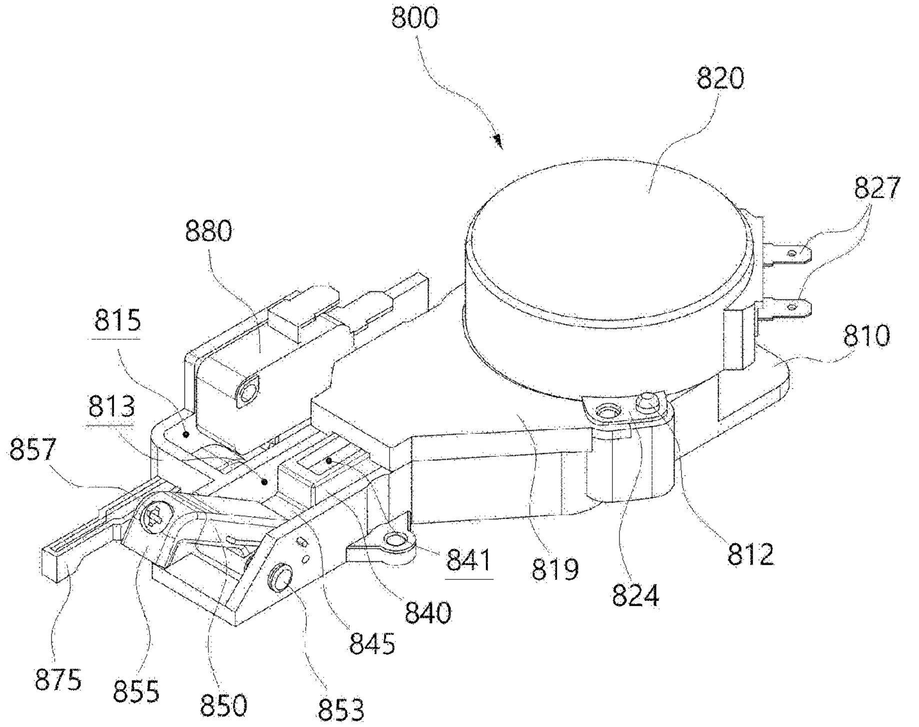
FIG. 73 is a perspective view showing an unlocked state of the door locking device according to an embodiment.
Figure 74:
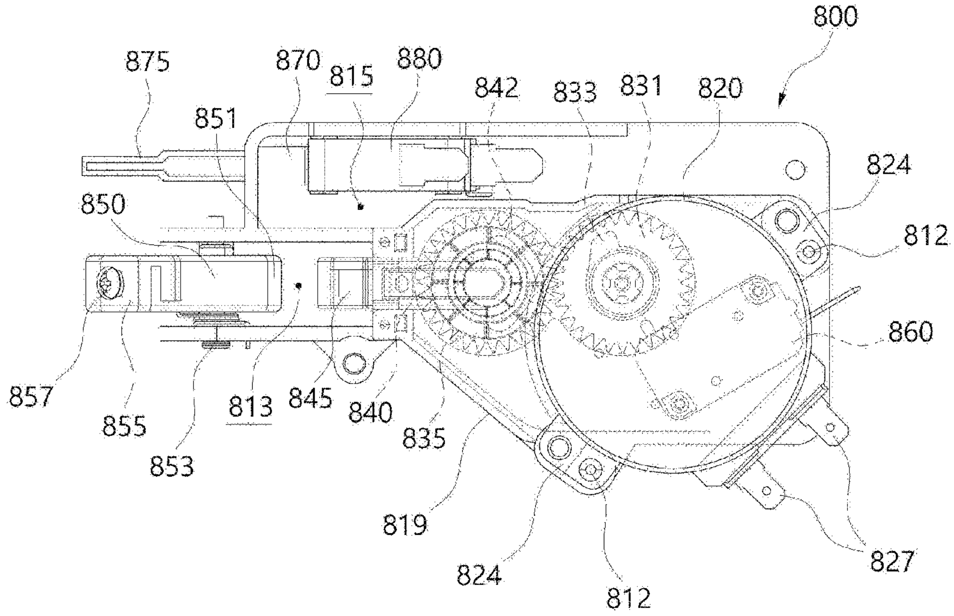
FIG. 74 is a plan view showing the unlocked state of the door locking device according to an embodiment.

FIGS. 73 and 74 are views showing a lifted state of the locking head 855, that is, the door locking device 800 in the unlocked state. As shown in the drawings, when the drive slider 840 retreats rearwards, the locking head 855, that is, the front portion of the latch 850, may be lifted. As the return spring 854 is connected to the latch 850, when the drive slider 840 does not lift the interference end 851 of the latch 850, the door locking device 800 may be in the unlocked state.

As shown in FIG. 74, in the unlocked state, the sensing protrusion 833 of the first locking gear 831 does not press the locking sensor 860. Simultaneously, the drive protrusion 837 (not shown in FIG. 74) of the second locking gear 835 is moved rearwards so that the link end 842 of the drive slider 840 is in the rearward moved state. Further, the drive head 845 of the drive slider 840 also retreats so as to be spaced apart from the interference end 851 of the latch 850.

Figure 75:
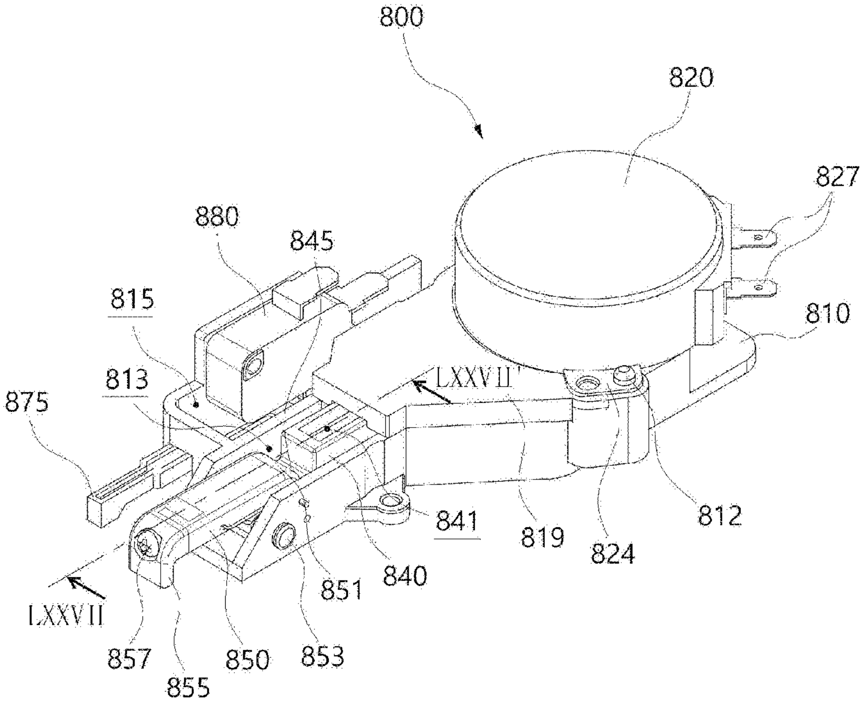
FIG. 75 is a perspective view showing a locked state of the door locking device according to an embodiment.
Figure 76:
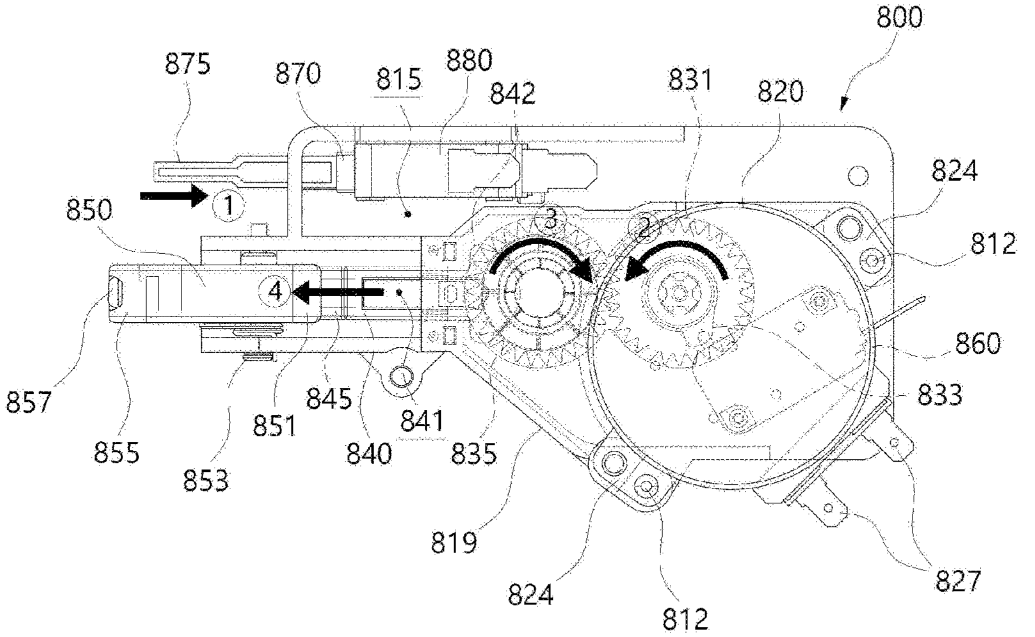
FIG. 76 is a plan view showing the locked state of the door locking device according to an embodiment.

FIGS. 75 and 76 are views showing a lowered state of the locking head 855, that is, the door locking device 800 in the locked state. As shown in the drawings, the drive slider 840 is moved forward, the locking head 855, that is, the front portion of the latch 850 is lowered. When the drive slider 840 is moved forward while enduring the elastic force of the return spring 854, the drive slider 840 may lift the interference end 851 of the latch 850 to be in the locked state.

As shown in FIG. 76, when the closing button 870 retreats (direction of arrow ①) while being pressed by the door 300, the closing sensor 880 may detect this movement. A signal of the closing sensor 880 is transmitted to the main panel unit 700, so that the main panel unit 700 may operate the locking motor 820.

When the locking motor 820 is operated, the locking motor 820 may rotate the first locking gear 831 in a first direction (direction of arrow ②). Further, the second locking gear 835 engaged with the first locking gear 831 may be rotated in a second direction (direction of arrow ③). When the second locking gear 835 is rotated, the drive protrusion 837 (not shown in FIG. 76) of the second locking gear 835 may be moved forward so that the link end 842 of the drive slider 840 may also be moved forward (direction of arrow ④).

Simultaneously, the drive head 845 of the drive slider 840 is also moved forward to dig under the interference end 851 of the latch 850. Accordingly, the locking head 855 disposed opposite to the interference end 851 may be rotated downward. Further, the locking head 855 may be caught by the fixing hole 379 (referring to FIG. 70).

In this state, the sensing protrusion 833 of the first locking gear 831 may press the locking sensor 860 so that the locking sensor 860 may detect the locked state. In a process of rotating the first locking gear 831, the sensing protrusion 833 presses the locking sensor 860 so that the locking sensor 860 detects the rotational state of the first locking gear 831. The main panel unit 700 may detect this locked state, and may stop operation of the locking motor 820. In this embodiment, when the first locking gear 831 is rotated once, the sensing protrusion 833 presses the locking sensor 860. In other words, when the first locking gear 831 is rotated once, the sensing protrusion 833 is returned to an original position thereof to operate the locking sensor 860.

Figure 77:
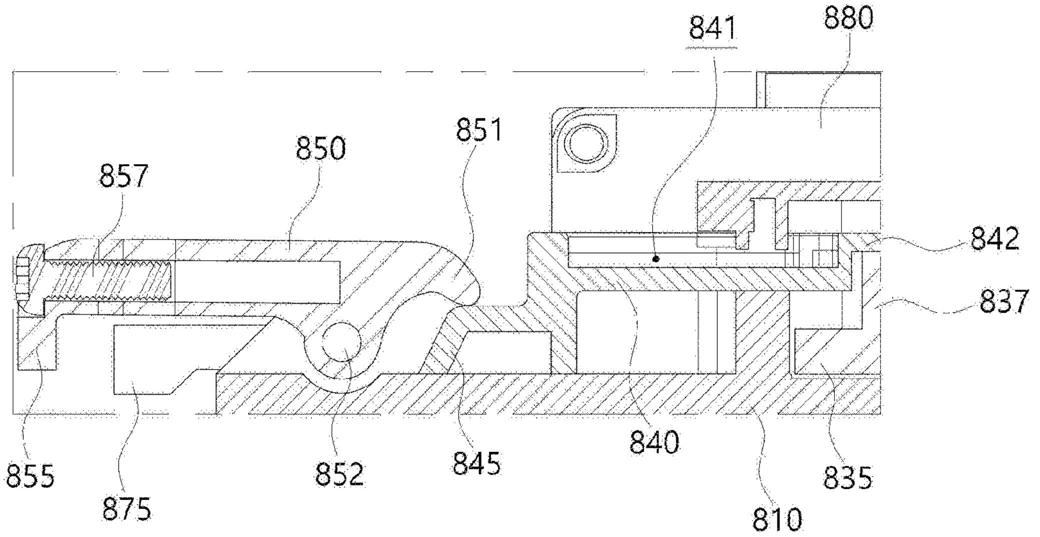
FIG. 77 is a cross-sectional view, taken along line LXXVII-LXXVII' in FIG.
Figure 78:
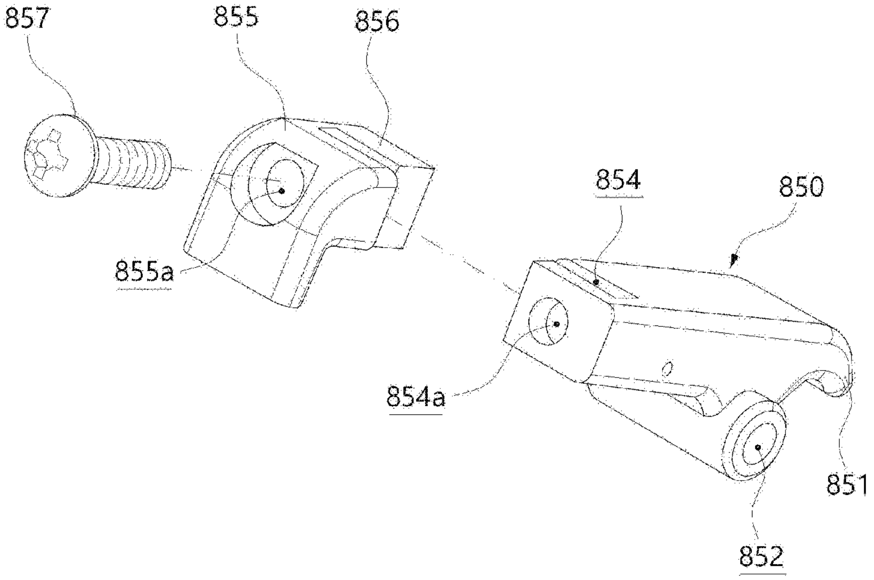
FIG. 78 is a perspective view showing a separated state of a locking head of the door locking device according to an embodiment.

As shown in FIGS. 77 and 78, the locking head 855 may be provided at an opposite side to the interference end 851 with the rotational groove 852 as a center. The locking head 855 may be rotated in a reverse direction of a rotational direction of the interference end 851. In other words, when the interference end 851 is lifted by the drive head 845, the locking head 855 is lowered downward. On the other hand, when the interference end 851 is lowered downward by the return spring 854, the locking head 855 is lifted upward.

The locking head 855 may be separated from one end portion of the latch 850. The locking head 855 may be removably assembled to the latch 850 by the head fastener 857. Further, when the head fastener 857 is unscrewed from the latch 850, the locking head 855 may be separated from the latch 850.

As shown in FIG. 78, a latch groove 854 may be formed at a front portion of the latch 850. A head coupling portion 856 of the locking head 855 may be fitted into the latch groove 854. The latch groove 854 and the head coupling portion 856 may extend in a direction parallel to the rotational shaft of the latch 850, that is, a direction parallel to a direction of the rotational groove 852.

When the head coupling portion 856 is fitted into the latch groove 854, a first release hole 854*a* formed in the end portion of the latch 850 and a second release hole 855*a* formed in the locking head 855 may be connected to each other. The head fastener 857 may be fastened to the first release hole 854*a* and the second release hole 855*a* connected to each other as described above. When the head fastener 857 is a bolt, the head fastener 857 may be rotated to be tightened by the first release hole 854*a* and the second release hole 855*a*.

On the other hand, when the head fastener 857 is separated, the locking head 855 may be disassembled from the latch 850. After the head fastener 857 is separated, when the locking head 855 is moved in a direction in which the head coupling portion 856 is removed from the latch groove 854, the locking head 855 is separated from the latch 850.

The locking head 855 may be separated from the door locking device 800 in an emergency. For example, the cooking appliance is operated abnormally or opening of the door 300 is impossible due to power failure during operation of the cooking appliance, it is necessary to arbitrarily open the door 300. The user unscrews the head fastener 857 and separates the locking head 855 to turn the door 300 to the unlocked state.

As shown in FIG. 79, when the head fastener 857 is separated forward (direction of arrow ①), the locking head 855 may be separated leftwards (direction of arrow ②). When the locking head 855 is caught by the fixing hole 379 of the door frame 370, the door 300 is turned to the locked state, and when the locking head 855 is separated from the door locking device 800, the door 300 may be naturally turned to the unlocked state.

The fixing hole 379 of the door frame 370 may serve as a portion at which the locking head 855 is caught, and simultaneously, as a path through which the locking head 855 is moved after separation. FIG. 79 is a view showing the locking head 855 separated from the latch 850 and then is moved leftwards along the fixing hole 379. Therefore, the user may unscrew the head fastener 857 and then easily separate the locking head 855, thereby lowering a risk of losing the separated locking head 855.

The head fastener 857 may be in forward-exposed state. As shown in FIG. 71, the head fastener 857 may be exposed forward between the upper end of the door 300 and the lower end of the panel unit 500. A height or distance between the upper end of the door 300 and the lower end of the panel unit 500 is equal to or wider than a diameter of the head fastener 857, so that when the user does not look at the gap from the front side, the head fastener 857 may not be visible. When the head fastener 857 is exposed in a state in which the user looks at the door 300 from the front side, the user may unscrew the head fastener 857 using a tool, such as a screwdriver. Further, when the locking head 855 is moved leftwards, the door is released from the locked state in which the door locking device 800 catches and locks the door 300, and the door may be unlocked.

Referring to FIGS. 71 and 72, the closing button 870 may be provided in the door locking device 800. The closing button 870 is provided to detect whether the door 300 is in a closed state or an opened state. The closing button 870 is disposed on the second operation path 815 of the locking housing 810, and may be moved in the frontward-rearward direction.

A portion of the closing button 870 may protrude forward. A front portion of the closing button 870 may protrude forward through a bottom hole E2 of the front frame 280 (referring to FIG. 67). The front portion of the protruding closing button 870 may be pressed by the rear surface of the door 300. When the front end of the closing button 870 retreats by being pressed by the door 300, a second end of the closing button 870 presses the closing sensor 880 so that the closing sensor 870 may detect closing of the door 300. For reference, FIG. 68 is a view showing a state before a pressed end 875, that is, the front portion of the closing button 870 is pressed by the pushing surface 378*a* of the locking body 378, and FIG. 69 is a view showing a state in which the pressed end 875, that is, the front portion of the closing button 870 retreats by being pressed by the pushing surface 378*a* of the locking body 378.

The closing button 870 may be disposed at a further outer portion of the casing 100, 200 based on the leftward-rightward width direction of the casing 100, 200 than the latch 850. In this embodiment, the closing button 870 is disposed at a left or first lateral side of the latch 850. Accordingly, the closing button 870 may be disposed at a position relatively farther from the user's view.

The closing button 870 may have a bar shape extending lengthwise in one direction. The pressed end 875 pressed by the door 300 may be provided at the front portion of the closing button 870. The pressed end 875 may have a wide front surface pressed by the door 300. Further, a rear portion of the closing button 870 may have the button 877 that presses the closing sensor 880.

Further, the button spring 879 may be inserted into the button 877. The button spring 879 may supply an elastic force that allows the closing button 870 to be moved forward, to the closing button 870. A first end of the button spring 879 is caught by and fixed to the button 877, and a second end thereof may be supported by the locking housing 810.

Reference numeral 882 indicates a closing detection button of the closing sensor 880 pressed by the button 877. The closing detection button 882 may be pressed by an end of the button 877, but may be pressed by a step provided at a front end of the button 877. As shown in FIG. 76, a direction in which the closing button 870 retreats by being pressed by the door 300 is marked with arrow ①.

The lighting module 900 will be described hereinafter with reference to FIGS. 80 to 87. The lighting module 900 emits light into the cavity S1, so that the user may observe the internal space of the cavity S1. The lighting module 900 may be disposed in the casing 100, 200. In this embodiment, the lighting module 900 may be disposed in the electric chamber S2.

The lighting module 900 may include the lighting guide 910 disposed in the lighting coupling portion 255 of the electric chamber S2, and a lighting device 920 surrounded by the lighting guide 910. The lighting guide 910 may surround the lighting device 920, and may prevent external heat from directly affecting the lighting device 920.

The lighting guide 910 may constitute a portion of the lighting module 900. The lighting guide 910 may be understood as a casing of the lighting module 900.

Figure 80:
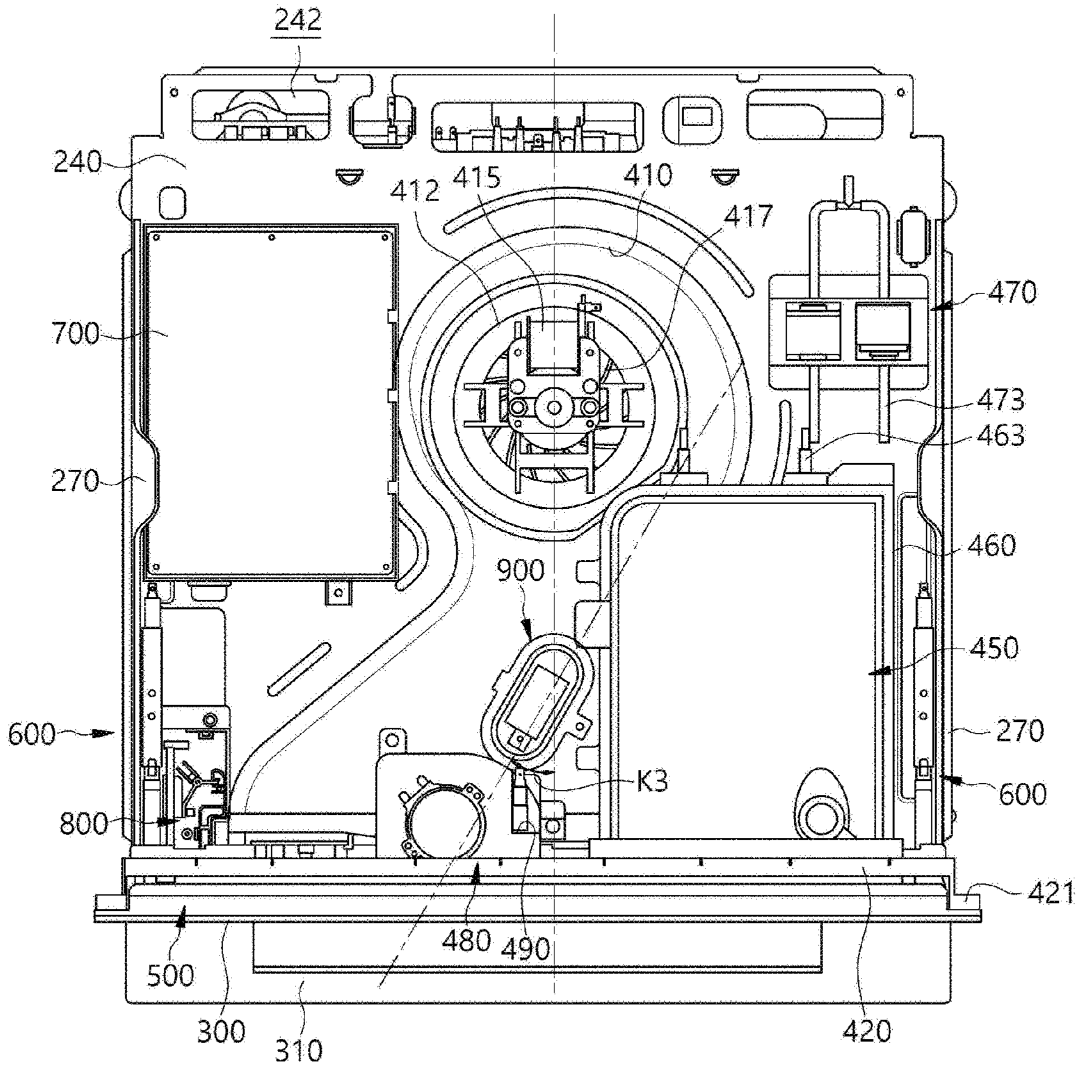
FIG. 80 is a plan view showing a disposed state of a lighting module according to an embodiment in the electric chamber.

As shown in FIG. 80, the lighting module 900 may be disposed in the upper casing 240. The lighting module 900 may be directly disposed in the upper casing 240, or may be disposed in the guide duct 250 coupled to the upper casing 240. In this embodiment, the lighting module 900 may be disposed in the lighting coupling portion 255 extending through the guide duct 250 to the upper casing 240.

As described above, when the lighting module 900 is disposed in the guide duct 250, the lighting module 900 may be cooled by air passing through the internal space of the guide duct 250, that is, the third air flow path AC3 (air discharge glow path). As the lighting module 900 is disposed towards the cavity S1, the lighting module 900 may be affected by a high temperature in the cavity S1, but may be continuously cooled by air in the guide duct 250.

The lighting module 900 may be disposed in the guide **250*b* of the guide duct 250. More specifically, the lighting module 900 may be disposed on an imaginary extension line passing through the center portion of the cooling fan module 410. In other words, it may be understood that both the cooling fan module 410 and the lighting module 900 are disposed on the at a center portion in the leftward-rightward width direction of the upper casing 240**, and as a result, are disposed at a center portion in the leftward-rightward width direction of the cooking appliance.

As described above, when the lighting module 900 is disposed at the center portion in the leftward-rightward width direction of the upper casing 240, the lighting module 900 may emit light toward the center portion of the cavity S1. When light is emitted towards the center portion of the cavity S1, light may be evenly dispersed so that neither side of the cavity S1 is lighter or darker, and the user may observe the object to be cooked inside of the cavity S1 more clearly.

The lighting module 900 may be disposed obliquely to have a predetermined angle with respect to the imaginary extension line passing through the center portion of the cooling fan module 410. An angle between the imaginary extension line passing through the center portion of the cooling fan module 410 and an imaginary extension line extending in a longitudinal direction (inclination direction based on FIG. 80) of the lighting module 900 may be referred to as K3. As described above, when the lighting module 900 is disposed obliquely, resistance generated when air discharged along the guide duct 250 passes through left and right or lateral sides of the lighting module 900 may be reduced.

The lighting coupling portion 255 to which the lighting module 900 is mounted may extend in an inclination direction between 20 degrees and 40 degrees with respect to the imaginary extension line passing through the center portion of the cooling fan module 410. Reduction of a flow rate of air passing through the guide duct 250 due to the lighting coupling portion 255 may be minimized. Further, when the lighting coupling portion 255 is disposed in this inclination direction, deviation of the amount of discharge of air for each position in the exhaust port 282 may be reduced.

Figure 81:
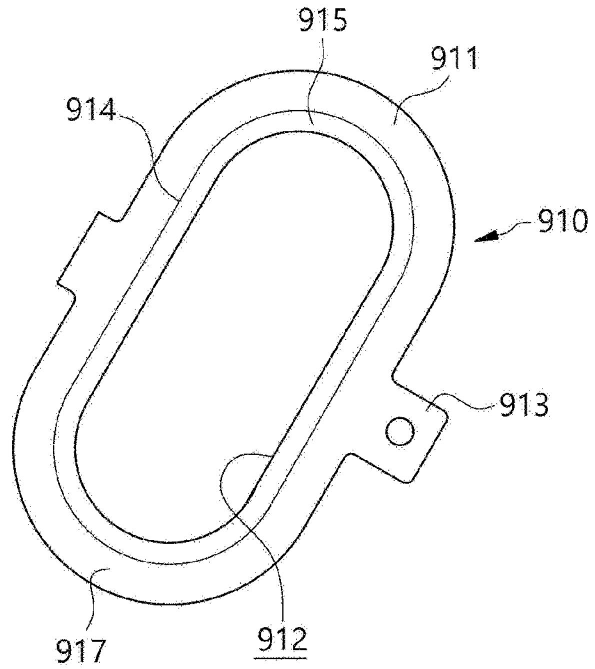
FIG. 81 is a plan view showing a structure of a lighting guide according to an embodiment.
Figure 82:
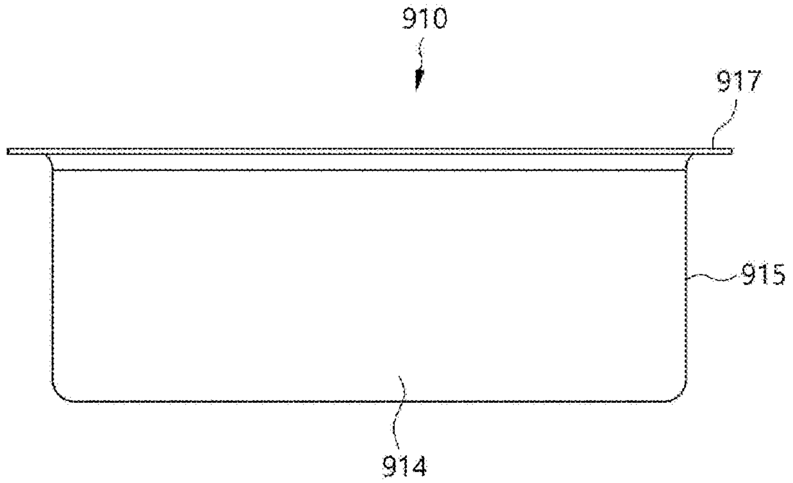
FIG. 82 is a side view showing the structure of the lighting guide according to an embodiment.

FIGS. 81 and 82 are views showing structure of the lighting guide 910 of the lighting module 900 fixed to the lighting coupling portion 255. A frame of the lighting guide 910 may be formed of a guide body 911. The guide body 911 may be a 3-dimensional structure having a predetermined height. The guide body 911 may be disposed in the guide duct 250, that is, in the third air flow path AC3.

More specifically, the lighting guide 910 may be disposed at a position spaced forward from the cooling fan module 410 to face the door 300. In other words, the lighting guide 910 may be disposed relatively closer to the front side of the electric chamber S2 than the cooling fan module 410.

Further, the cooling fan module 410 may be disposed at a rear side based on a center portion of the electric chamber S2, and the lighting guide 910 may be disposed at a front side based on the center portion of the electric chamber S2.

The guide body 911 may extend longer in the upward-downward direction than in the leftward-rightward width-wise direction. Further, the guide body 911 may have relatively short upper and lower portions with curved structures. Accordingly, the lighting guide 910 may have an approximately oval planar structure. This structure of the lighting guide 910 may induce air flowing inside of the third air flow path AC3 to naturally flow into opposite sides of the lighting guide 910.

The lighting guide 910 may be disposed to be inclined in a rotational direction (direction of arrow based on FIG. 80) of the fan blade 417 based on a center line (vertically extending line in FIG. 80) of the cooling fan module 410 extending in the frontward-rearward direction. Flow resistance of air due to the lighting guide 910 may be reduced. In other words, as the lighting guide 910 is disposed side by side with a discharge direction of air, the flow resistance of air may be reduced. In other words, the lighting guide 910 may be disposed in a direction facing the discharge direction of air discharged from the cooling fan module 410.

The lighting guide 910 may be inclined at an angle between 20° and 40° in the rotational direction of the fan blade 417 based on the center line of the cooling fan module 410 extending in the frontward-rearward direction. In this embodiment, as the fan blade 417 is rotated clockwise, the lighting guide 910 may be also disposed in a clockwise rotated state. When the fan blade 417 is rotated counterclockwise, the lighting guide 910 may be also disposed in a counterclockwise rotated state.

Table 1 below shows a flow rate (unit: CMM, Cubic Meter per Minute) according to an inclination angle (unit: °) of the lighting guide 910, and pressure standard deviation. The flow rate indicates a flow rate of air discharged by the cooling fan module 410 and discharged to the exhaust port 282. Further, the pressure standard deviation indicates standard deviation of pressure due to air discharged from each of a left or first lateral end, a center portion, a right or second lateral end of the exhaust port 282.

TABLE 1

| inclination angle | flow rate | pressure standard deviation |
|---|---|---|
| 5 | 1.55 | 3.14 |
| 10 | 1.49 | 2.99 |
| 15 | 1.68 | 1.54 |

TABLE 1-continued

| inclination angle | flow rate | pressure standard deviation |
|---|---|---|
| 20 | 2.21 | 1.15 |
| 25 | 2.29 | 1.18 |
| 30 | 2.24 | 1.14 |
| 35 | 2.25 | 1.21 |
| 40 | 2.22 | 1.25 |
| 45 | 1.71 | 2.02 |
| 50 | 1.54 | 2.89 |
| 55 | 1.34 | 3.55 |
| 60 | 1.31 | 3.78 |
| 65 | 1.19 | 3.91 |
| 70 | 1.23 | 4.22 |

As shown in Table 1, when the inclination angle of the lighting guide 910 is between 5° and 15°, the flow rate is small, and the pressure standard deviation is large. Further, when the inclination angle of the lighting guide 910 is in between 45° and 70°, the flow rate is reduced again, and the pressure standard deviation increases.

When the lighting guide 910 is inclined at an angle between 20° and 40° in the rotational direction of the fan blade 417 based on the center line of the cooling fan module 410 extending in the frontward-rearward direction, the flow rate is relatively large and the pressure standard deviation is relatively small. Therefore, it may be advantageous for the inclination angle of the lighting guide 910 to be between 20° and As described above, when the inclination angle of the lighting guide 910 is between 20° and 40°, the inclination angle of the lighting guide 910 may be equal to a discharge direction of air discharged to the outlet 256*a* of the discharge space 256. As described above, the discharge space 256 may be gradually widened towards the outlet 256*a* of the discharge space 256, and accordingly, the discharge direction of air discharged to the outlet 256*a* of the discharge space 256 along an inner wall of the body 250*a* may extend parallel to an inclination direction of the fan coupling portion 254.

The extending line extending in the longitudinal direction of the lighting guide 910 may pass through the body 250*a* of the guide duct 250 in which the cooling fan module 410 is disposed. Simultaneously, the extending line extending in the longitudinal direction of the lighting guide 910 may extend to a position deviated from the fan blade 417. The extending line extending in the longitudinal direction of the lighting guide 910 may pass through the discharge space 256. Then, the lighting guide 910 does not directly face the fan blade 417, but may face the discharge direction of air.

The lighting guide 910 may be disposed closer to a front end of the electric chamber S2 than the cooling fan module 410. In other words, the lighting guide 910 may be disposed closer to the front frame 280 facing the door 300, than the cooling fan module 410. Accordingly, sufficient space for air flow may be formed between the lighting guide 910 and the cooling fan module 410.

The lighting guide 910 and the cooling fan module 410 may be disposed on a center line of the electric chamber S2 extending in the frontward-rearward direction. In other words, the lighting guide 910 and the cooling fan module 410 may be disposed on a center portion of a leftward-rightward widthwise direction of the electric chamber S2. Air discharged by the cooling fan module 410 may evenly flow forward of the cooking chamber S2, and light emitted by the lighting module 900 may be evenly transmitted to the entire internal space of the cavity S1.

A guide space 912 may be formed at a center portion of the lighting guide 910. The guide space 912 may be formed by vertically penetrating the lighting guide 910. An upper portion of the guide space 912 may open towards the internal space of the electric chamber S2, and a lower portion of the guide space 912 may be open towards the cavity S1. A lighting housing 921, and a lighting substrate 930, for example, described hereinafter, may be disposed in the guide space 912.

The guide space 912 may have a long hole shape. The long hole shape means that a frontward-rearward depthwise direction is longer than a leftward-rightward widthwise direction. The leftward-rightward widthwise direction indicates the leftward-rightward direction of the cooking appliance, and means a Y-axis direction in FIG. 1. Further, the frontward-rearward depthwise direction is defined based on the cooking appliance viewed from the front side, and means an X-axis direction in FIG. 1. The guide space 912 may cover a side surface of the lighting device 920 with a predetermined clearance.

An upper end of the lighting guide 910 may be seated on an upper surface of the guide duct 250. A lower end of the lighting guide 910 may be connected to a bottom of the third air flow path AC3, that is, the air discharge flow path. The lighting guide 910 may be disposed over the entire height direction of the third air flow path AC3, and air does not pass through the upper portion or the lower portion of the lighting guide 910, and air may pass through a side surface of the lighting guide 910.

A guide fixation piece 913 may be provided on the upper end of the lighting guide 910. The guide fixation piece 913 is provided to fasten the lighting guide 910 to the guide duct 250, and the guide fixation piece 913 may be assembled to the upper surface of the guide duct 250 using a separate fastener.

A guide step (no reference numeral assigned) may be provided at an entrance of the guide space 912. The guide step 914 may have a shape a width of which is gradually narrowed from a locking rib 917 towards an internal side of the guide space 912. The guide step 914 may serve as a guide when the lighting device 920 is inserted into the guide space 912, and may increase a peripheral strength of the locking rib 917.

A flat surface 914 may be provided at a side surface of the guide body 911. The flat surface 914 may be provided at each of opposite surfaces of the guide body 911. When viewed from a plan view, as shown in FIG. 81, the flat surface 914 may form a linear section on the side surface of the guide body 911. The guide space 912 may have an entirely long hole shape due to the flat surface 914.

Among surfaces of the lighting guide 910, a portion of or the entire surface facing the cooling fan module 410 may be a curved surface. In this embodiment, a curved portion 915 may be provided on a front surface of the guide body 911 facing an upper side of the guide duct 250, that is, the cooling fan module 410. More specifically, the curved portion 915 may face the outlet 256*a* of the discharge space 256 through which air is discharged by the cooling fan module 410. The curved portion 915 may connect a pair of flat surfaces 914 to each other. The curved portion 915 may be formed such that a surface of the guide duct 250 disposed in the guide duct 250 is formed as a curved surface.

The curved portion 915 makes the surface of the guide duct 250 into a streamlined shape, so that a flow of air passing through the third air flow path AC3 may be smooth. When viewed from a plan view, as shown in FIG. 81, the curved portion 915 may have an approximate semi-circular structure. In this embodiment, the curved portion 915 may be provided at each of a front portion and a rear portion of the lighting guide 910. On the other hand, the curved portion 915 may be provided only at the front portion of the lighting guide 910.

The locking rib 917 may be provided at an edge of the upper end of the lighting guide 910. The locking rib 917 may protrude in a direction widening a width of the lighting guide 910. The locking rib 917 may allow the lighting guide 910 to be caught and fixed to the lighting coupling portion 255. The locking rib 917 may be seated on an upper end of the lighting coupling portion 255.

When the lighting guide 910 is disposed in the lighting coupling portion 255, the locking rib 917 is caught by an upper edge of the lighting coupling portion 255, and the guide body 911 may protrude towards the upper surface of the upper casing 240. In other words, the guide body 911 may be disposed in the third air flow path AC3 corresponding to the internal space of the guide duct 250.

Figure 83:
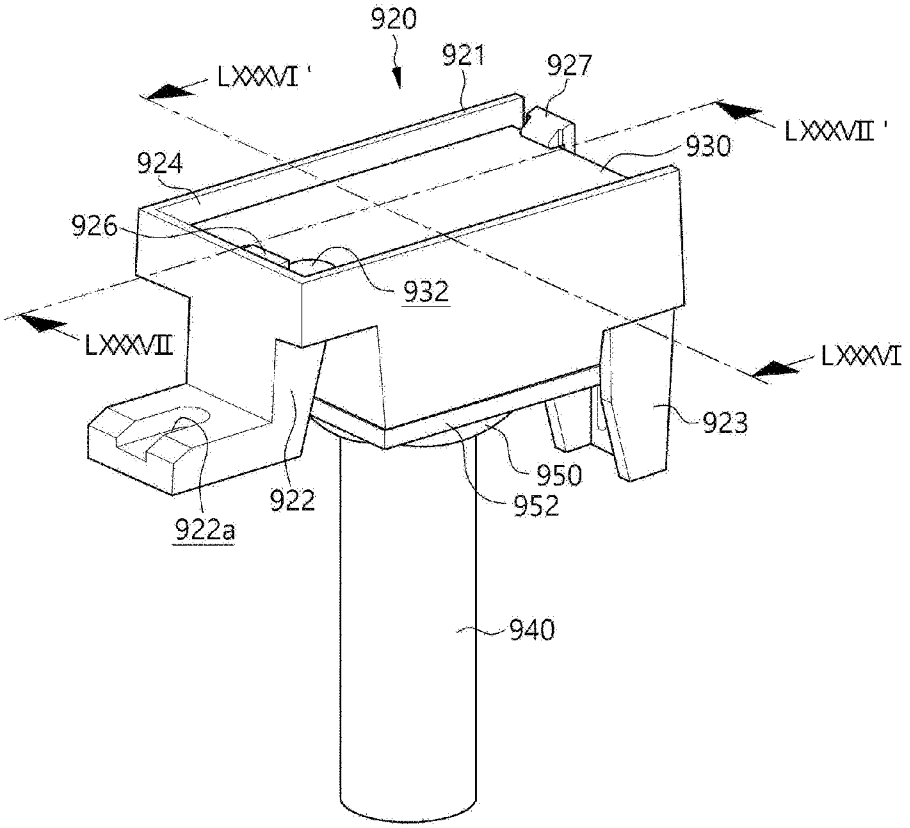
FIG. 83 is a perspective view showing a structure of a lighting device according to an embodiment.

FIG. 83 is a view showing the lighting device 920. The lighting device 920 may be provided in the guide space 912 of the lighting guide 910. The lighting device 920 may be connected to the main panel unit 700 to emit light into the cavity S1. The lighting device 920 may include the lighting substrate 930 electrically connected to the main panel unit 700 and including a light source 935, and the lighting substrate 930 may be exposed towards the electric chamber S2.

Figure 84:
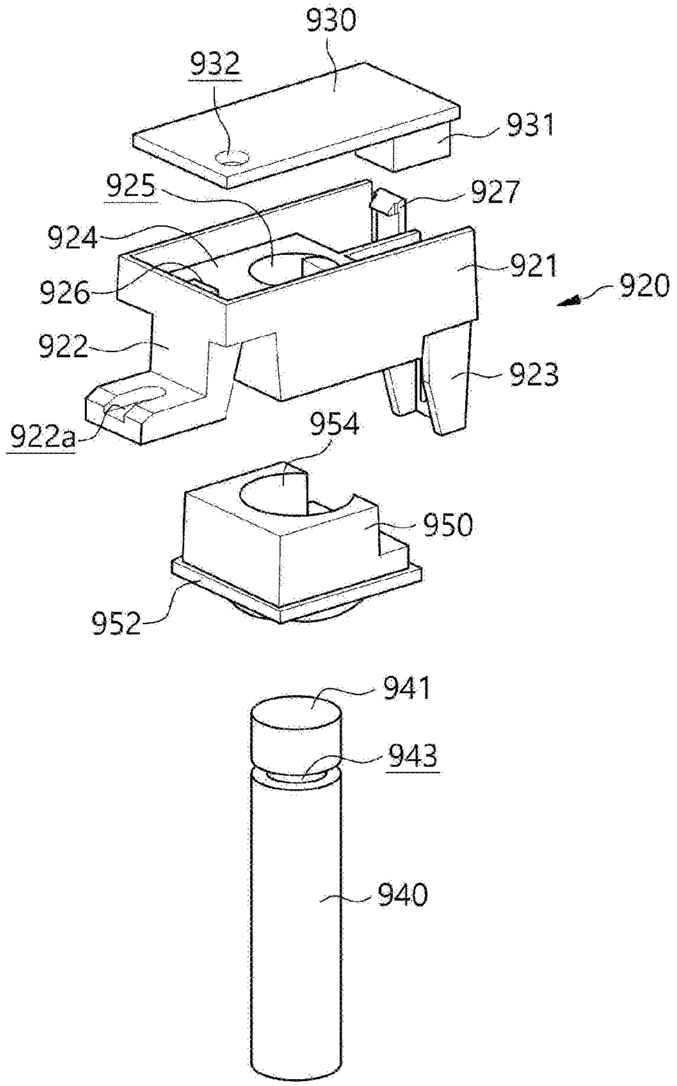
FIG. 84 is an exploded-perspective view showing components of the lighting device according to an embodiment.
Figure 85:
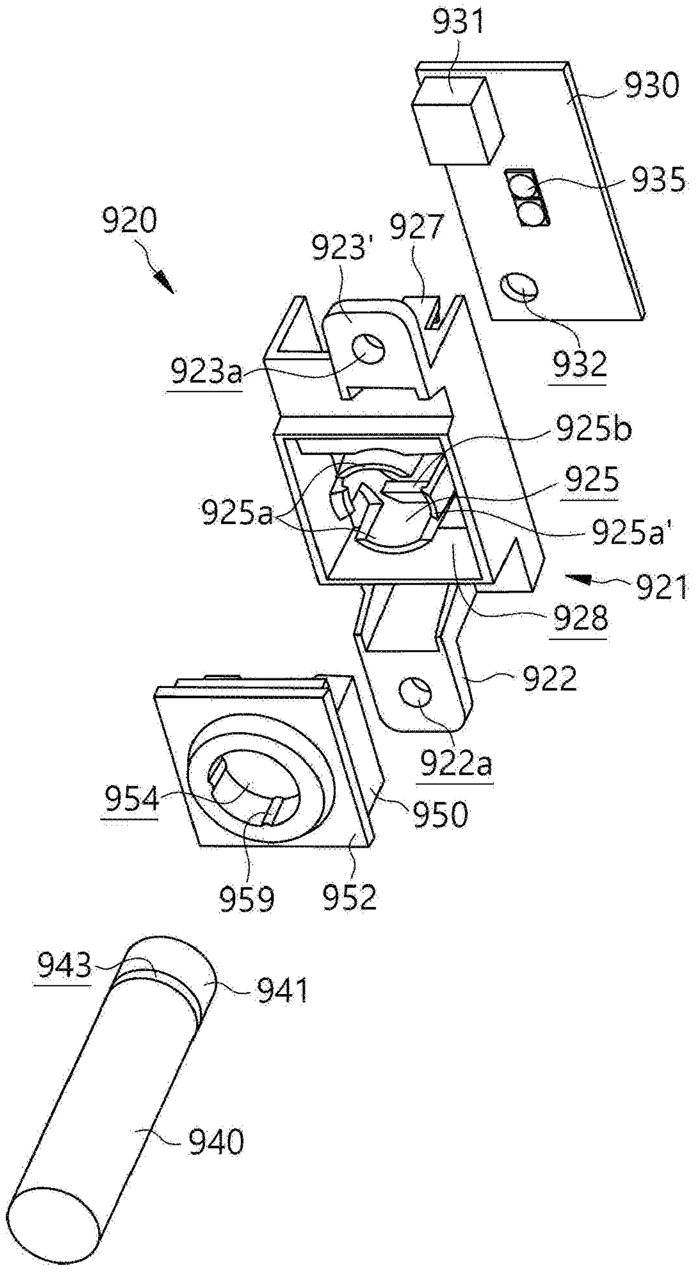
FIG. 85 is an exploded-perspective view showing components of the lighting device according to an embodiment, at an angle different from FIG. 84.

More specifically, a frame of the lighting device 920 may be formed of the lighting housing 921. As shown in FIGS. 84 to 85, the lighting housing 921 may have an approximately hexahedral shape. An upper portion of the lighting housing 921 may be surrounded by the guide space 912 of the lighting guide 910, and a portion of a lower portion thereof may be fixed to the upper casing 240.

The lighting housing 921 may include a portion for fixing the lighting housing 921. In this embodiment, a lighting fixing bracket 922 and an insertion body 923 may serve to fix the lighting housing 921 to the lighting coupling portion 255. The lighting fixing bracket 922 and the insertion body 923 may protrude downward with respect to the lighting housing 921. Further, the lighting fixing bracket 922 and the insertion body 923 may be provided at opposite ends of the lighting housing 921 to be spaced apart from each other.

The lighting fixing bracket 922 may have a lighting fixing hole 922*a* into which a fastener is assembled, and may be fixed to the upper casing 240 by the fastener, such as a screw. The lighting fixing bracket 922 may extend in an approximately L-shape from the lighting housing 921.

The insertion body 923 may be inserted into the upper casing 240. The insertion body 923 may be fixed to the upper casing 240 together with the lighting fixing bracket 922, thereby preventing the lighting housing 921 from being relatively rotated with respect to the upper casing 240. Further, before the lighting fixing bracket 922 is fixed with a fastener, the insertion body 923 may temporarily fix the lighting housing 921 to the upper casing 240. In this embodiment, the insertion body 923 may protrude further downward than the lighting fixing bracket 922.

FIG. 85 is a view showing another embodiment different from FIG. 84, and as shown in the drawing, the insertion body 923 is omitted from the lighting housing 921, and a pair of the lighting fixing brackets 922 and 923' may be provided therein. The pair of lighting fixing brackets 922 and 923' may include lighting fixing holes 922*a* and 923*a*, respectively, and may be fixed to the upper casing 240 by using different fasteners.

A light source mounting portion 924 may be provided at an upper portion of the lighting housing 921. The light source mounting portion 924 may be formed in a shape depressed on the upper portion of the lighting housing 921. The lighting substrate 930 described hereinafter may be disposed in the lighting housing 921. Further, the lighting housing 921 may include a first substrate fixing portion 926 and a second substrate fixing portion 927, and may fix the lighting substrate 930.

A lighting hole 925 may penetrate the lighting housing 921. The lighting hole 925 may vertically penetrate the lighting housing 921. The lighting hole 925 may serve as a passage through which the light source 935 of the lighting substrate 930 passes. The lighting hole 925 may have a circular structure. As shown in FIG. 84, one end of the lighting hole 925 may be open towards the light source mounting portion 924.

Referring to FIG. 85, a guide holder 925*a* may be provided on edge of the lighting hole 925. The guide holder 925*a* may enclose the lighting hole 925, and may protrude downward, that is, towards the cavity S1. The guide holder 925*a* may hold and fix a portion of the light guide 940 connected to the light source 935. A hook end 925*a*' may protrude on an end of the guide holder 925*a*.

The guide holder 925*a* may be composed of a plurality of guide holders 925*a* that enclose the lighting hole 925. The plurality of guide holders 925*a* may be spaced apart from each other and may be elastically deformed. The guide holder 925*a* may have a cantilever structure, so that the guide hole 925*a* may be naturally elastically deformed in a coupling process to the light guide 940 and then recovered after being coupled to the light guide 940. More specifically, a first end of the guide holder 925*a* may be connected to a lower portion of the light source mounting portion 924, and a second end of the guide holder 925*a* may be a free end extending downward.

Figure 86:
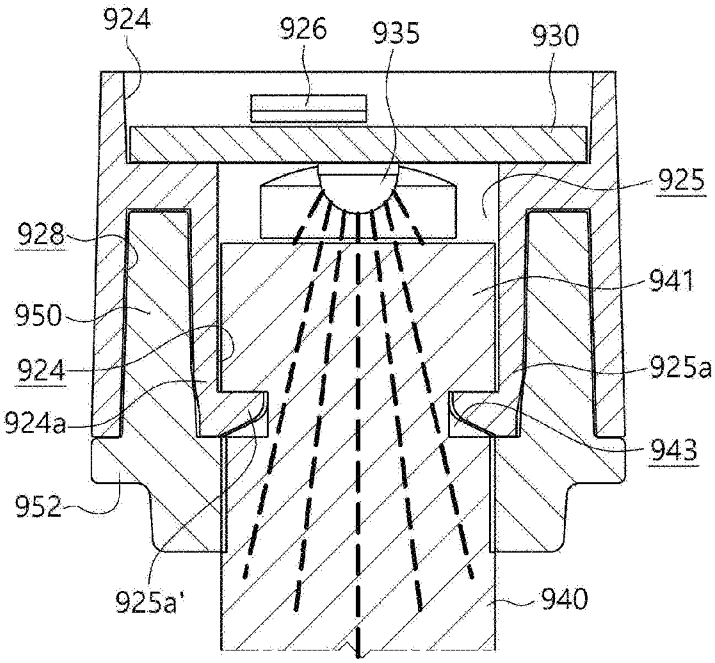
FIG. 86 is a cross-view of the light device, taken along line LXXXVI-LXXXVI' in FIG. 83.
Figure 87:
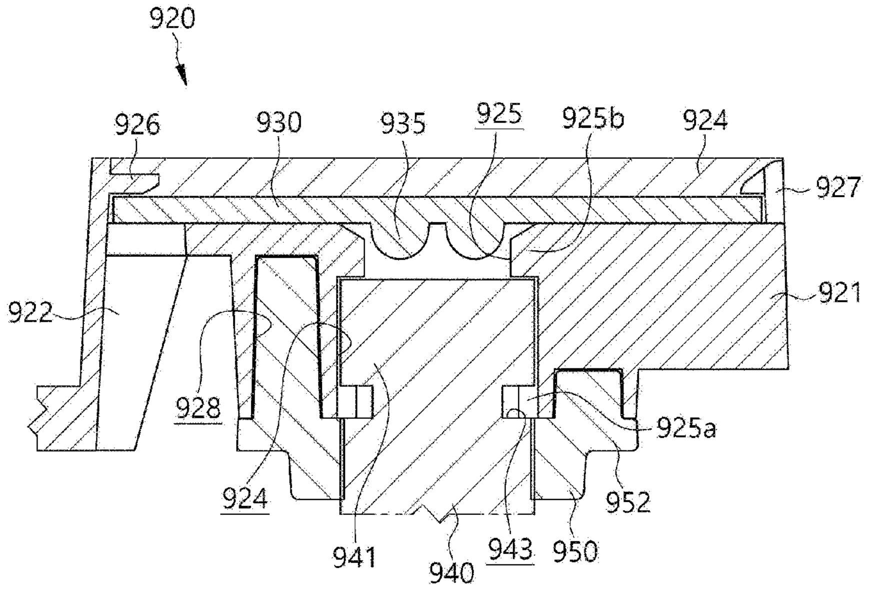
FIG. 87 is a cross-sectional view of the light device, taken along line LXXXVII-LXXXVII' in FIG. 83.

The guide holder 925*a* may be composed of a plurality of guide holders 925*a*, and some of the guide holders 925*a* may include hook ends 925*a*', respectively. As shown in FIG. 85, among a total of four guide holders 925*a*, two guide holders 925*a* may have hook ends 925*a*', respectively, and the remaining two guide holders 925*a* may not include the hook end 925*a*'. As shown in FIG. 86, the hook end 925*a*' may be fitted into a locking groove 943 of the light guide 940. As shown in FIG. 87, the two guide holders 925*a* without the hook end 925*a*' may cover the locking groove 943.

The hook end 925*a*', that is, an end of the guide holder 925*a* may protrude towards a center portion of the lighting hole 925. The hook end 925*a*' protruding as described above may be inserted into the locking groove 943 of the light guide 940 described hereinafter. When the hook end 925*a*', that is, an end of the guide holder 925*a* is fitted into the locking groove 943, the light guide 940 may not be separated downward, that is, towards the cavity S1 and may be fixed.

The upper portion of the lighting housing 921 may include the first substrate fixing portion 926 and the second substrate fixing portion 927. The first substrate fixing portion 926 and the second substrate fixing portion 927 may hold and fix edges of the lighting substrate 930. The first substrate fixing portion 926 and the second substrate fixing portion 927 may be provided at portions on opposite sides of the lighting hole 925 with the lighting hole 925 as the center.

The first substrate fixing portion 926 may protrude from an inner surface of the lighting housing 921 towards a center portion thereof, thereby having a structure that covers a portion of an upper surface of the lighting substrate 930.

Further, the second substrate fixing portion 927 may have a cantilever structure, and may hold and fix the upper surface of the lighting substrate 930. The lighting substrate 930 may be configured such that one or a first portion is first held by the first substrate fixing portion 926 and another or a second portion is held by the second substrate fixing portion 927.

As shown in FIGS. 84 to 87, the lighting hole 925 may include the upper guide holder 925*a*. The upper guide holder 925*a* may protrude from an inner surface of the lighting hole 925 in a direction reducing a diameter of the lighting hole 925. The upper guide holder 925*a* is in contact with an upper surface of the light guide 940, thereby supporting the upper surface of the light guide 940. When the upper surface of the light guide 940 is supported by the upper guide holder 925*a*, the light guide 940 is prevented from being further moved upward, that is, towards the lighting substrate 930. Then, the upper surface of the light guide 940 may maintain a constant distance from the light source 935 of the lighting substrate 930.

As shown in FIG. 87, the upper guide holder 925*a* may support the upper surface of the light guide 940. A plurality of upper guide holders 925*a* may be disposed in the lighting hole 925. The plurality of upper guide holders 925*a* may be disposed to enclose an inner circumferential surface of the lighting hole 925. The plurality of upper guide holders 925*a* support the upper portion of the light guide 940, thereby preventing the light guide 940 from being biased in one direction.

More specifically, upper guide holder 925*a* may be provided at a position higher than a position of the guide holder 925*a*. Further, the upper guide holder 925*a* may be disposed to be overlapped on the upper surface of the light guide 940. Then, the upper guide holder 925*a* may be disposed between the lighting substrate 930 with the light source 935 and the upper surface of the light guide 940.

As shown in FIG. 85, a sealing space 928 may be formed outside the guide holder 925*a*. The sealing space 928 may be formed between a surface of the guide holder 925*a* and an inner wall of the lighting housing 921. The sealing space 928 may open downward, that is, towards the cavity S1. A sealing block 950 described hereinafter may be inserted into the sealing space 928. The sealing block 950 may be inserted into the sealing space 928 so as to pressurize the guide holder 925*a* towards the center portion of the lighting hole 925, that is, towards the light guide 940.

The lighting substrate 930 may be disposed above the lighting housing 921. The lighting substrate 930 may include the light source 935 that emits light. The lighting substrate 930 may include the light source 935 so as to emit light downward, that is, towards the cavity S1, through the lighting hole 925. The light source 935 may include a plurality of light sources. In this embodiment, the light source 935 may be composed of a light emitting diode (LED). As another example, the light source 935 may be composed of a halogen lamp.

The lighting substrate 930 may include a light source component 931. The light source component 931 may be an electronic component, such as a condenser. The light source component 931 may be disposed on a lower surface of the lighting substrate 930. The light source component 931 may be one or a plurality of light source components 931. As another example, the light source component 931 may be a component that fixes the lighting substrate 930, regardless of operation of the light source 935.

A substrate hole 932 may penetrate the lighting substrate 930. The substrate hole 932 may be provided to fasten the lighting substrate 930 to an upper surface of the lighting housing 921 with a fastener. A separate fastener (not shown) may be assembled to the substrate hole 932. As another example, the substrate hole 932 may be omitted, and the lighting substrate 930 may be fixed only with the first substrate fixing portion 926 and the second substrate fixing portion 927.

The light guide 940 may be assembled to a lower portion of the lighting housing 921. The light guide 940 may serve to evenly disperse light of the light source 935. The light guide 940 may be disposed such that a first end thereof faces the light guide 940 and a second end thereof faces the internal space of the cavity S1.

The light guide 940 may have an approximately cylindrical shape. The light guide 940 may receive light from the light guide 940 to disperse the light into the cavity S1. In order to allow light to penetrate the light guide 940, the light guide 940 may be made of a transparent or translucent material, for example. For example, the light guide 940 may be made of a quartz material.

At least a portion of the light guide 940 may be disposed in the cavity S1. As another example, the light guide 940 may have a polyprism shape or a simple flat plate shape. Further, the light guide 940 may be omitted, and light of the light source 935 may be directly emitted into the cavity S1.

The light guide 940 may have the locking groove 943. The locking groove 943 may be formed in a recessed shape while extending around a side surface of the light guide 940. The guide holder 925*a* may be fitted into the locking groove 943. More specifically, the hook end 925*a*' of the guide holder 925*a* is fitted into the locking groove 943, thereby preventing the light guide 940 from being separated downward.

The locking groove 943 may be formed close to the upper portion 941 of the light guide 940 facing the light source 935. Further, the locking groove 943 may continuously extend around the side surface of the light guide 940. As another example, the locking groove 943 may be intermittently formed at a constant distance on the side surface of the light guide 940.

The sealing block 950 may be inserted into the sealing space 928 of the lighting housing 921. The sealing block 950 may enclose the light guide 940, thereby firmly fixing the light guide 940. The sealing block 950 may serve as a kind of insulator that reduces the amount of transmission of high temperature heat inside of the cavity S1 to the lighting substrate 930 through the light guide 940. Further, the sealing block 950 may prevent moisture or foreign substances in the cavity S1 from being transmitted to the lighting substrate 930.

The sealing block 950 may be made of a material having elasticity. For example, the sealing block 950 may be made of a silicone material or a rubber material. The entire sealing block 950 may be made of one elastic material or a portion of sealing block 950 may be made of an elastic material.

As shown in FIG. 86, this view shows that the sealing block 950 is inserted into the sealing space 928. The sealing block 950 inserted in the sealing space 928 may pressurize the guide holder 925*a* towards the center portion of the lighting hole 925, that is, towards a surface of the light guide 940. The guide holder 925*a* has an approximate cantilever structure, and may be deformed towards the light guide 940 by the sealing block 950. Accordingly, the guide holder 925*a* may strongly pressurize the surface of the light guide 940, and the hook end 925*a*' of the guide holder 925*a* may stably maintain a state in which the light guide 940 is inserted in the locking groove 943.

A thickness of the sealing block 950 may be larger than a width of the sealing space 928. In the process in which the sealing block 950 is inserted into the sealing space 928, the sealing block 950 may pressurize the guide holder 925*a* towards the light guide 940 by the amount of overlapping with the width of the sealing space 928. While the light guide 940 is first assembled to the lighting housing 921, it is advantageous that the sealing block 950 is assembled to the lighting housing 921.

The sealing block 950 may have an approximately hexahedral shape. A center portion of the sealing block 950 may have a guide through hole 954 through which the light guide 940 passes. The upper portion 941 of the light guide 940 may be disposed in the lighting hole 925 through the guide through hole 954.

As shown in FIG. 85, a pressure protrusion 959 may protrude on an inner surface of the guide through hole 954 towards a center portion of the guide through hole 954. The pressure protrusion 959 may protrude in a direction of reducing a diameter of the guide through hole 954. The pressure protrusion 959 may pressurize a surface of the light guide 940 inserted into the guide through hole 954.

As shown in FIG. 84, the sealing block 950 may include an elastic deformation portion (no reference numeral assigned) that opens the guide through hole 954 sideways. The elastic deformation portion may be a portion formed by omitting a portion of a side surface of the sealing block 950. The elastic deformation portion may supply a clearance where the sealing block 950 is elastically deformable when being pressure-inserted into the sealing space 928.

A block support 952 may be provided at a lower portion of the sealing block 950. The block support 952 may protrude in a direction in which a width thereof is increased than an upper portion of the sealing block 950. The block support 952 may be caught by a lower end of the lighting housing 921 to limit an assembly depth of the sealing block 950. The block support 952 may be supported by a peripheral portion of an entrance of the sealing space 928.

Figure 88:
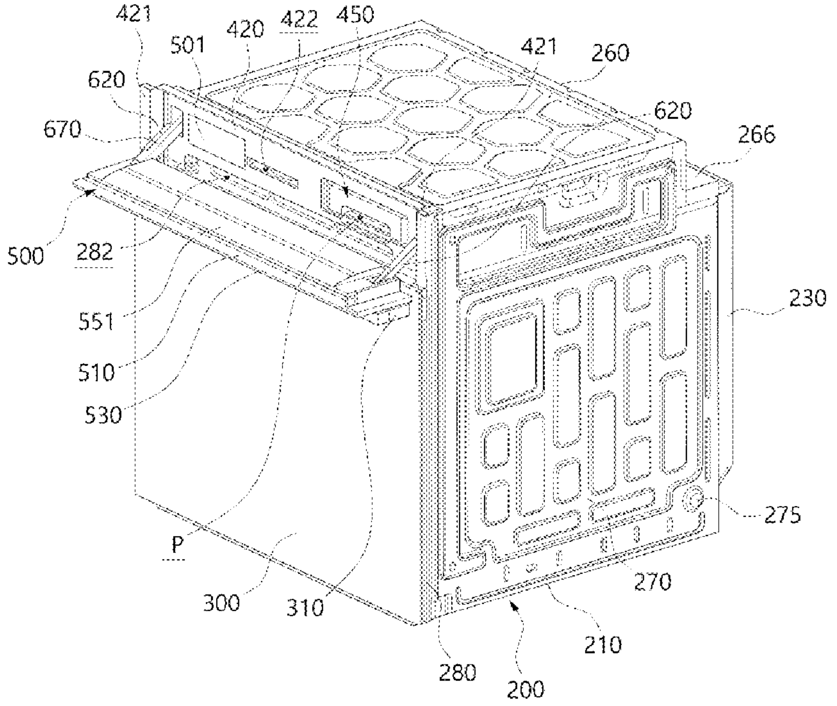
FIG. 88 is a perspective view of a second embodiment of a panel unit comprising a cooking appliance according to the present invention.

FIG. 88 illustrates a second embodiment of a panel unit comprising a cooking appliance according to the present invention. As shown, the panel unit 500 may not include both the input means and the output means. Further, the front housing 420 may be provided with a display unit 501 that functions as either the input means or the output means. Accordingly, the display unit 501 may be normally concealed by the panel unit 500, and may be exposed when the panel unit 500 is opened.

Figure 89:
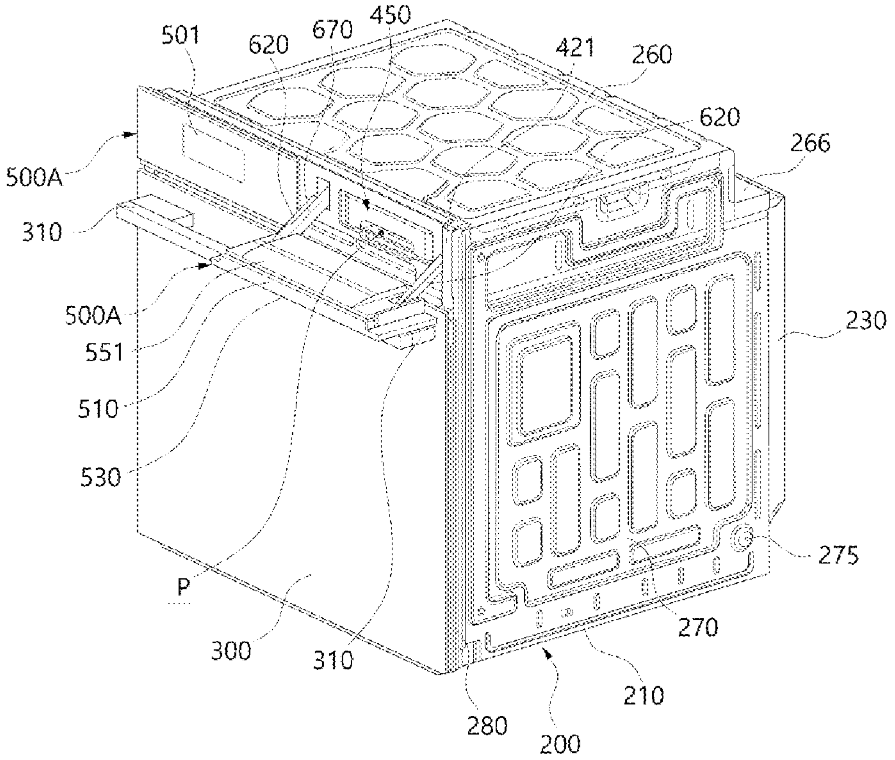
FIG. 89 is a perspective view of a third embodiment of a panel unit comprising a cooking appliance according to the present invention.

FIG. 89 illustrates a third embodiment of a panel unit comprising a cooking appliance according to the present invention. As shown, the panel unit may include a first panel unit 500A that is rotated to open and close, and a second panel unit 500B that is fixed without opening and closing. The first panel unit 500A and the second panel unit 500B may be disposed left and right of each other. In FIG. 89, the first panel unit 500A is disposed relatively to the right and the second panel unit 500B is disposed to the left, but conversely, the first panel unit 500A may be disposed to the right. In this case, the display unit 501 may be provided on the second panel unit 500B. In another embodiment, the second panel unit 500B may also be opened and closed by rotation, but the second panel unit may be opened and closed by rotation independently of the first panel unit 500A. In another embodiment, the second panel unit 500B may be slidable in an up-and-down direction or a back-and-forth direction, unlike the first panel unit 500A.

Figure 90:
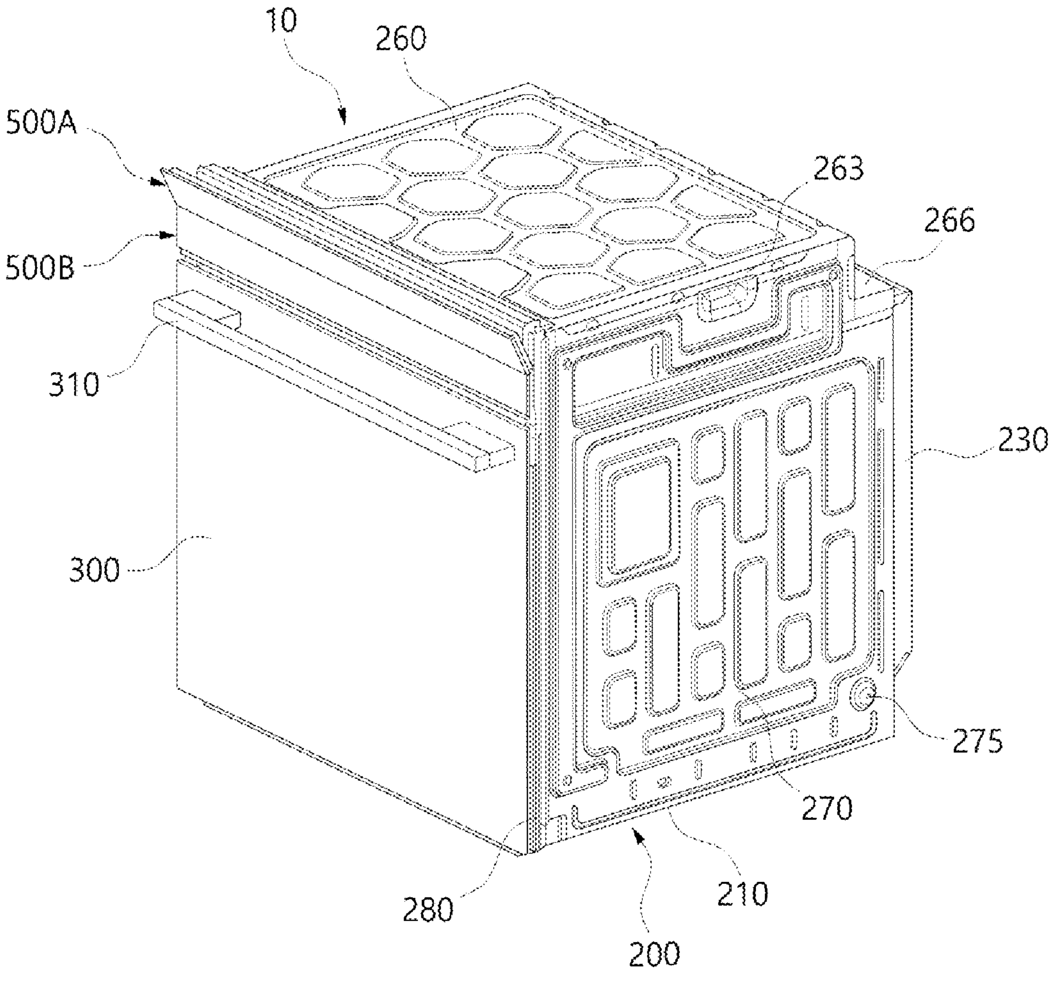
FIG. 90 is a perspective view of a fourth embodiment of a panel unit comprising a cooking appliance according to the present invention.

FIG. 90 illustrates a fourth embodiment of a panel unit comprising a cooking appliance according to the present invention. As shown, the panel unit may include a first panel unit 500A that is rotated to open and close, and a second panel unit 500B that is fixed without opening and closing. The first panel unit 500A and the second panel unit 500B may be disposed in an upward or downward direction. In other words, the first panel unit 500A disposed at the top may be rotatable, while the second panel unit 500B disposed at the bottom may remain fixed. Conversely, the first panel unit 500A may be disposed relatively at the lower end. In this case, the display unit 501 may be provided on the second panel unit 500B. In another embodiment, the second panel unit may also be opened and closed by rotation, but the second panel unit 500B may be opened and closed by rotation independently of the first panel unit 500A. In another embodiment, the second panel unit 500B may be slidable in an up-and-down direction or a back-and-forth direction, unlike the first panel unit 500A.

The present disclosure has been made keeping in mind the above problems occurring in the related arts, and the present disclosure is intended to combine both of a device detecting closing of a door and a device turning the door into a locked state into one module.

Another objective of the present disclosure is to combine both of a relative component driving a door closing detecting device and a relative component by which a door locking device is caught, into one component in a door.

A yet another objective of the present disclosure is to change a rotation movement of a motor into a rectilinear movement by using gears that are engaged with each other to be rotated, and to implement a proper torque and a proper rotation speed through a gear ratio of the gears.

In order to achieve the above-described objectives, according to one aspect of the present disclosure, the present disclosure may include a casing including a cavity therein, and a door opening and closing the cavity. In addition, a door locking device disposed in the casing may catch the door to turn the door into a locked state. At this point, a locking housing of the door locking device may include a latch and a closing button. The latch may be caught by a door fixing hole of the door while being rotated, and the closing button may be pressed by a rear surface of the door. As described above, a device (closing button) detecting closing of the door, and a device (latch) turning the door into the locked state may be formed in one door locking device. Then, the closing button and the latch occupy only a small amount of installation space in the cooking appliance, so that the cooking appliance can be miniaturized.

In addition, the locking housing may be disposed in an upper space of the casing divided from the cavity. The modularized locking housing may be disposed in the wide upper space, so that the mounting performance thereof can be improved.

Furthermore, the closing button may be disposed in the locking housing to be able to protrude and retract. The closing button may be pressed by the rear surface of the door in a protruding state from the locking housing to be inserted into the locking housing. As described above, in a closing process of the door, the closing button may be operated by being pressed, and the latch adjacent to the closing button may be operated at the same time.

In addition, a locking body may protrude on the rear surface of the door while face the closing button. The fixing hole may open in the locking body and the latch may be caught by the fixing hole. The locking body is a relative component operating both of the latch and the closing button, and the two components (latch and closing button) may be operated with one closing button. Therefore, the number of components of the cooking appliance may be reduced and the structure thereof may be simplified.

Furthermore, the latch may be disposed higher than the closing button. Accordingly, the closing button may be more hidden from a user's view.

In addition, a door frame may be provided at an upper portion of the door. The locking body may be disposed at the door frame. Since the locking body is disposed at the door frame, the locking body may be implemented by changing a part of a structure of the existing door frame.

Furthermore, the fixing hole may be open upwards on a center portion of the locking body, and a pushing surface having a flat surface shape may be formed on a left side or a right side of the fixing hole in the locking body. As described above, since the fixing hole and the pushing surface are continuously formed to be adjacent to each other, there is no need to install structure to operate the two components (latch and closing button) separately at the door.

In addition, when the door is closed, the pushing surface may form a flat surface in parallel to a front surface of the casing. Accordingly, when the door is closed, the pushing surface and the front surface of the casing may be brought into close contact with each other.

Furthermore, an entrance of the fixing hole may be located higher than an upper end of the pushing surface. Accordingly, a rotation angle of the latch may be reduced.

In addition, an upper portion of the door frame may include an inclined surface inclined downwards towards the casing, and the locking body may protrude upwards on the inclined surface. The locking body may fills a kind of empty space formed by the inclined surface, and the latch may be rotated in the empty space without interference with the door.

Furthermore, the inclined surface of the door frame may have a door exhaust port open upwards while being spaced apart from the locking body. The inclined surface may guide a direction of air discharged through the door exhaust port.

In addition, the closing button may be disposed at a position further out of the casing than the latch based on the left-right width direction of the casing.

Furthermore, a front frame may be disposed in front of the casing. An upper portion of the front frame may have a latch hole through which the latch may protrude, and a button hole through which the closing button may protrude.

In addition, the locking housing of the locking device may include a first operation path on which the latch may be disposed, and a second operation path formed at one side of the first operation path and in parallel to the first operation path. The closing button may be disposed on the second operation path. Therefore, one locking housing may provide both operation spaces of the two components.

Furthermore, the locking housing may include a locking motor, and a locking gear rotated by the locking motor, and having a driving protrusion on an upper portion thereof. In addition, the locking housing may include a link end connected to the driving protrusion. Furthermore, the driving slider may be linearly moved in the locking housing in conjunction with rotation of the driving protrusion. At this point, the latch may be configured such that a first end thereof based on a rotation shaft may protrude forwards of the locking housing to be caught by the fixing hole and a second end thereof may interfere with the driving slider. As described above, since the latch is operated by rotation of the locking gear, the latch may have a proper torque and a proper rotation speed through a gear ratio of the locking gear.

At this point, the locking housing may have an installation space in which the locking gear is disposed, and the installation space may be connected to the first operation space.

In addition, a driving head may be provided on one end of the driving slider, which corresponds to the opposite side of the link end. The driving head may support a lower portion of an interference end provided at a second end of the latch to maintain a locking head provided at a first end of the latch in a caught state with respect to the fixing hole.

Furthermore, the locking gear may include a first locking gear configured to be rotated on a rotation shaft in a direction perpendicular to a rotation shaft of the latch, and to be rotated by the locking motor. In addition, a second locking gear may be engaged with the first locking gear to be rotated. The second locking gear may be rotated on a rotation shaft in parallel to the rotation shaft of the first locking gear, and having the driving protrusion on an upper portion thereof.

Furthermore, the link end may be disposed on an upper portion of the second locking gear. A link slot may be depressed on a lower surface of the link end facing an upper surface of the second locking gear, and the driving protrusion may be inserted into the link slot. At this point, the link slot may be shaped in a circular arc.

Furthermore, an upper portion of the first locking gear may have a sensing protrusion protruding at a position eccentric from a center portion of the first locking gear. In a rotation process of the first locking gear, the sensing protrusion may operate a locking sensor disposed in the locking housing. Accordingly, when the first locking gear is rotated once, the sensing protrusion may be returned to an original position thereof to operate the locking sensor.

Furthermore, the closing button may include a pressed end protruding forwards of the upper space, a button part extending rearwards from the pressed end, and a button spring fitted over the button part. At this point, when the closing button is moved rearwards, the button part may press a closing sensor to operate the closing sensor.

Furthermore, a panel unit may be disposed in front of the casing at a different height from the door. The panel unit may be moved from the first position to the second position as an upper end of the panel unit is rotated to be moved downwards. At this point, the latch may be disposed at a height between a lower end of the panel unit and an upper end of the door.

Furthermore, the upper space may include the tank chamber. A water tank having a water storage space therein may be stored in the tank chamber. When the panel unit is moved to the second position, an entrance of the tank chamber may be opened.

As described above, the cooking appliance according to the present disclosure has following effects.

According to the present disclosure, a device (closing button) detecting closing of the door, and a device (latch) turning the door into the locked state may be formed in one door locking device. Then, the closing button and the latch occupy only a small amount of installation space in the cooking appliance, so that the cooking appliance can be miniaturized.

Furthermore, when the closing button and the latch are disposed adjacent to each other, an exposure point of components exposed outwards of the cooking appliance is reduced, so that the sense of aesthetic of the cooking appliance can be improved.

Furthermore, the closing button and the latch may be disposed adjacent to each other, and thus relative components to operate the closing button and the latch may be formed in one locking body disposed at the door. Therefore, the number of components of the cooking appliance may be reduced and the structure thereof may be simplified.

At this point, the locking body may be provided at the door frame disposed at the upper portion of the door. The locking body may be easily implemented by partially deforming a shape of an existing door frame, and thus while adopting the door locking function, a structural change at the door can be minimized.

Furthermore, the locking body may be a structure protruding from the inclined surface formed at the door frame. The inclined surface may form a space depressed between the door and the casing, and the locking body may be formed while filling a part of this space. Accordingly, even when the locking body is added, the locking body is prevented from protruding further outwards of the door, and the sense of aesthetic of the door is not deteriorated.

Furthermore, a rotation force of the locking motor operating the latch may be transmitted to the latch through the locking gear. At this point, the latch may have a proper torque and a proper rotation speed through a gear ratio of the locking gear. Therefore, operation of the latch can be more precisely controlled.

Furthermore, the locking gear may include the first locking gear and the second locking gear that are engaged with each other to be rotated. At this point, the first locking gear may include the sensing protrusion and thus may operate the locking sensor while being rotated, and the second locking gear may include the driving protrusion moving the driving slider. As described above, the two gears may precisely control operation of the latch through a gear ratio, and in addition, may operate the driving slider and the locking sensor in a rotation process, so that the number of components of the door locking device can be reduced and the structure thereof can be simplified.

Although embodiments have been described for illustrative purposes, those skilled in the art will appreciate that various modifications, additions and substitutions are possible, without departing from the scope and spirit as disclosed in the accompanying claims. Therefore, the embodiments described above have been described for illustrative purposes, and should not be intended to limit the technical spirit, and the scope and spirit are not limited to the embodiments. The protective scope should be interpreted by the accompanying claims, and all technical spirits within the equivalent scope should be interpreted as being included in the scope and spirit.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A cooking appliance, comprising:

a casing having a cavity therein;

a door disposed at a front of the casing and configured to open and close the cavity; and a door locking device disposed at the casing, and configured to lock the door in a closed state, wherein the door locking device comprises:

a locking housing disposed at the casing;

a latch disposed at the locking housing, partially protruding forward from the casing, and configured to be caught by a fixing hole of the door when rotated in a first direction, and separated from the fixing hole when rotated in a second direction; and a closing button spaced apart from the latch in the locking housing, and configured to be pressed by a rear surface of the door to be inserted into the locking housing, and wherein the closing button is laterally spaced from the latch in the locking housing.

2. The cooking appliance of claim 1, wherein the locking housing is disposed in an upper space of the casing divided from the cavity.

3. The cooking appliance of claim 1, wherein the closing button is disposed in the locking housing and configured to protrude from and be inserted into the locking housing, and wherein the closing button is pressed by the rear surface of the door while protruding from the locking housing to be inserted into the locking housing.

4. The cooking appliance of claim 1, wherein the latch is disposed higher than the closing button.

5. The cooking appliance of claim 1, wherein the rear surface of the door has a locking body that protrudes toward the closing button, and wherein the fixing hole to which the latch is caught is provided in the locking body.

6. The cooking appliance of claim 5, wherein a door frame is provided at an upper portion of the door, wherein the locking body is disposed at the door frame, wherein the fixing hole is open upward at a center portion of the locking body, and wherein a pushing surface having a flat surface shape is formed on a first lateral side or a second lateral side of the fixing hole in the locking body.

7. The cooking appliance of claim 6, wherein when the door is closed, the pushing surface forms a flat surface that extends parallel to a front surface of the casing.

8. The cooking appliance of claim 6, wherein an entrance of the fixing hole is located higher than an upper end of the pushing surface, and wherein the entrance of the fixing hole has a same height as an upper surface of the door frame.

9. The cooking appliance of claim 6, wherein an upper portion of the door frame has an inclined surface inclined downward towards the casing, wherein the locking body is provided on the inclined surface, and wherein the inclined surface of the door frame has a door exhaust port open upward and spaced apart from the locking body.

10. The cooking appliance of claim 1, wherein a front frame is disposed in front of the casing, and wherein an upper portion of the front frame has a latch hole through which the latch protrudes and a button hole through which the closing button protrudes.

11. The cooking appliance of claim 1, wherein the door locking housing of the locking device comprises:

a first operation path on which the latch is disposed; and a second operation path formed at one side of the first operation path in parallel to the first operation path, and in which the closing button is disposed.

12. The cooking appliance of claim 1, wherein the locking housing comprises:

a locking motor;

at least one locking gear configured to be rotated by the locking motor, and having a drive protrusion that protrudes on an upper portion thereof;

a drive slider disposed in the locking housing, having a link end connected to the drive protrusion, and configured to be linearly moved in the locking housing in conjunction with rotation of the drive protrusion; and the latch, a first end of which based on a rotational shaft protrudes forward of the locking housing to be caught by the fixing hole, and a second end of which interferes with the drive slider.

13. The cooking appliance of claim 12, wherein the locking housing has an installation space in which the at least one locking gear is disposed, wherein the installation space is connected to a first operation space in which the latch is disposed, or wherein a drive head is provided on one end of the drive slider and the drive head corresponds to an opposite side of the link end, and wherein the drive head is configured to support a lower portion of an interference end provided on a second end of the latch to maintain a locking head provided at a first end of the latch in a caught state to the fixing hole.

14. The cooking appliance of claim 12, wherein the at least one locking gear comprises:

a first locking gear configured to be rotated on a rotational shaft in a direction perpendicular to a rotational shaft of the latch, and to be rotated by the locking motor; and a second locking gear configured to be rotated while being engaged with the first locking gear, and to be rotated on a rotational shaft that extends parallel to the rotational shaft of the first locking gear, and having the drive protrusion protruding on an upper portion thereof.

15. The cooking appliance of claim 14, wherein the link end is disposed on the upper portion of the second locking gear, wherein a link slot, into which the drive protrusion is inserted, is recessed into a lower surface of the link end, and wherein the link slot is shaped in a circular arc, or wherein an upper portion of the first locking gear has a sensing protrusion that protrudes at a position eccentric from a center portion of the first locking gear, and in a rotation process of the first locking gear, the sensing protrusion operates a locking sensor disposed in the locking housing, or when the first locking gear is rotated once, the sensing protrusion is returned to an original position thereof to operate the locking sensor.

16. The cooking appliance of claim 1, wherein the closing button comprises:

a pressed end that protrudes forward with respect to the casing;

a button that extends rearward from the pressed end; and a button spring fitted over the button, wherein when the closing button is moved rearward, the button presses a closing sensor to operate the closing sensor.

17. The cooking appliance of claim 1, wherein a panel unit is disposed in front of the casing at a different height from a height of the door, wherein the panel unit is moved from a first position to a second position while being rotated such that an upper end of the panel unit is moved downward, and wherein the latch is disposed at a height between a lower end of the panel unit and an upper end of the door.

18. The cooking appliance of claim 17, wherein a tank chamber is provided in an upper space of the casing, and a water tank having a water storage space therein is stored in the tank chamber, and when the panel unit is moved to the second position, an entrance of the tank chamber is opened.

19. A cooking appliance, comprising:

a casing having a cavity and an upper space divided from the cavity;

a door disposed at a front of the casing and configured to open and close the cavity; and a door locking device disposed in the upper space, and configured to lock the door in a closed state, wherein the door locking device comprises:

a latch that protrudes forward from the upper space, and configured to be caught by a fixing hole of the door while being rotated; and a closing button disposed at one side of the latch and laterally spaced from the latch, and configured to be pressed by a rear surface of the door to be inserted into the upper space.

20. A cooking appliance, comprising:

a casing having a cavity and an upper space divided from the cavity;

a door disposed at a front of the casing and configured to open and close the cavity; and a door locking device disposed in the upper space, the door locking device including a motor, and configured to lock the door in a closed state, wherein the door locking device comprises:

a latch that protrudes forward from the upper space, and configured to be caught by a fixing hole of the door while being rotated; and a closing button disposed at one side of the latch and spaced apart from the latch, and configured to be pressed by a rear surface of the door to be inserted into the upper space, wherein when a sensor senses that the closing button is pressed rearward by the door, the door locking device is automatically operated to lock the door.

* * * * *